US012592043B2

(12) United States Patent
Scapel et al.

(10) Patent No.: US 12,592,043 B2
(45) Date of Patent: Mar. 31, 2026

(54) SYSTEMS, METHODS, AND GRAPHICAL USER INTERFACES FOR DISPLAYING AND MANIPULATING VIRTUAL OBJECTS IN AUGMENTED REALITY ENVIRONMENTS

(71) Applicant: Apple Inc., Cupertino, CA (US)

(72) Inventors: Nicolas V. Scapel, London (GB); Patrick W. O'Keefe, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/219,627

(22) Filed: Jul. 7, 2023

(65) Prior Publication Data

US 2023/0386146 A1      Nov. 30, 2023

Related U.S. Application Data

(63) Continuation of application No. 17/202,233, filed on Mar. 15, 2021, now Pat. No. 11,727,650.
(Continued)

(51) Int. Cl.
| G06T 19/00 | (2011.01) |
| G06F 3/04815 | (2022.01) |
| G06T 7/70 | (2017.01) |

(52) U.S. Cl.
CPC ........ G06T 19/006 (2013.01); G06F 3/04815 (2013.01); G06T 7/70 (2017.01)

(58) Field of Classification Search
CPC ......... G06T 19/006; G06T 7/70; G06T 15/40; G06F 3/011; G06F 3/04815
See application file for complete search history.

(56) References Cited

U.S. PATENT DOCUMENTS 7,072,810 B2      7/2006   Ramanathan et al.
8,244,462 B1      8/2012   Zhu
(Continued)

FOREIGN PATENT DOCUMENTS

AU      2018101226 A4      9/2018
AU      2019100486 A4      6/2019
(Continued)

OTHER PUBLICATIONS

Notice of Allowance, dated Sep. 13, 2021, received in U.S. Appl. No. 17/030,209 (7639), 9 pages.
(Continued)

*Primary Examiner* — Chante E Harrison
(74) *Attorney, Agent, or Firm* — Morgan, Lewis & Bockius LLP

(57) ABSTRACT

A computer system having one or more cameras displays in an augmented reality user interface a representation of a field of view of the one or more cameras, including a plurality of objects in a physical environment. In response to one or more first user inputs, the system places or moves a virtual object at or to a location in the representation of the field of view that corresponds to a physical location on or near a first surface of a first physical object. If the virtual object is positioned at a portion of the first surface that does not include other physical objects, or that includes a physical object that extends from the first surface by less than a threshold amount, the first virtual object is in the representation of the field of view with a predefined spatial relationship to a representation of the first surface.

27 Claims, 70 Drawing Sheets

Related U.S. Application Data

(60) Provisional application No. 62/991,062, filed on Mar. 17, 2020.

(56) References Cited

U.S. PATENT DOCUMENTS

| | | | |
|---|---|---|---|
| 8,365,081 B1 | 1/2013 | Amacker et al. | |
| 8,982,156 B2 | 3/2015 | Maggiore | |
| 9,152,209 B2 | 10/2015 | Jeong et al. | |
| 9,330,500 B2* | 5/2016 | Karsch | G06T 19/006 |
| 9,448,687 B1 | 9/2016 | McKenzie et al. | |
| 9,495,794 B2 | 11/2016 | Masumoto | |
| 9,661,308 B1 | 5/2017 | Wang et al. | |
| 9,665,960 B1 | 5/2017 | Masters et al. | |
| 9,678,651 B2 | 6/2017 | Moha et al. | |
| 9,696,897 B2 | 7/2017 | Garcia | |
| 9,767,606 B2 | 9/2017 | Kapinos et al. | |
| 9,846,027 B2 | 12/2017 | Kimura et al. | |
| 9,870,644 B2 | 1/2018 | Ha et al. | |
| 9,953,434 B2 | 4/2018 | Natori et al. | |
| 10,049,504 B2 | 8/2018 | Chen et al. | |
| 10,074,179 B2 | 9/2018 | Arita et al. | |
| 10,268,266 B2 | 4/2019 | Mathey-Owens et al. | |
| 10,296,869 B2 | 5/2019 | Hulth | |
| 10,347,033 B2 | 7/2019 | Masumoto | |
| 10,445,867 B2 | 10/2019 | Glatfelter et al. | |
| 10,540,699 B1 | 1/2020 | Prabhu et al. | |
| 10,606,075 B2 | 3/2020 | Choi et al. | |
| 10,606,609 B2 | 3/2020 | Energin et al. | |
| 10,762,716 B1 | 9/2020 | Paul et al. | |
| 10,861,241 B2 | 12/2020 | Ghaleb | |
| 10,972,680 B2* | 4/2021 | Wigdor | G06F 3/147 |
| 10,999,629 B1 | 5/2021 | Cieslak et al. | |
| 11,204,678 B1 | 12/2021 | Baker et al. | |
| 11,449,189 B1 | 9/2022 | Bond et al. | |
| 11,521,063 B1 | 12/2022 | Powers et al. | |
| 11,523,063 B2 | 12/2022 | Ith et al. | |
| 2008/0008361 A1 | 1/2008 | Nozaki et al. | |
| 2008/0222233 A1 | 9/2008 | Shi et al. | |
| 2008/0255961 A1 | 10/2008 | Livesey | |
| 2009/0002719 A1 | 1/2009 | Chang et al. | |
| 2010/0235726 A1 | 9/2010 | Ording et al. | |
| 2011/0022942 A1 | 1/2011 | Flemings et al. | |
| 2011/0107270 A1 | 5/2011 | Wang et al. | |
| 2011/0216167 A1 | 9/2011 | Katz et al. | |
| 2011/0249117 A1 | 10/2011 | Yoshihama et al. | |
| 2011/0252405 A1 | 10/2011 | Meirman et al. | |
| 2011/0279381 A1 | 11/2011 | Tong et al. | |
| 2011/0279445 A1 | 11/2011 | Murphy et al. | |
| 2011/0304607 A1 | 12/2011 | Ito | |
| 2012/0121134 A1 | 5/2012 | Yoshizumi | |
| 2012/0194544 A1 | 8/2012 | Yokohata | |
| 2012/0249741 A1 | 10/2012 | Maciocci et al. | |
| 2013/0044128 A1* | 2/2013 | Liu | G02B 27/017 |
| | | | 345/633 |
| 2013/0127895 A1 | 5/2013 | Miller et al. | |
| 2013/0215230 A1 | 8/2013 | Miesnieks et al. | |
| 2013/0332892 A1 | 12/2013 | Matsuki | |
| 2014/0071130 A1 | 3/2014 | Piemonte | |
| 2014/0098191 A1 | 4/2014 | Rime et al. | |
| 2014/0125668 A1 | 5/2014 | Steed et al. | |
| 2015/0062120 A1* | 3/2015 | Reisner-Kollmann | |
| | | | G06T 19/006 |
| | | | 345/419 |
| 2015/0062123 A1 | 3/2015 | Yuen | |
| 2015/0067588 A1 | 3/2015 | Shim et al. | |
| 2015/0074711 A1 | 3/2015 | Spitz et al. | |
| 2015/0169525 A1 | 6/2015 | Palm et al. | |
| 2015/0187119 A1 | 7/2015 | Masumoto | |
| 2015/0221345 A1 | 8/2015 | Zhao et al. | |
| 2015/0227645 A1 | 8/2015 | Childs et al. | |
| 2016/0026253 A1 | 1/2016 | Bradski et al. | |
| 2016/0040981 A1 | 2/2016 | Kang et al. | |
| 2016/0049011 A1 | 2/2016 | Kasahara et al. | |
| 2016/0063714 A1 | 3/2016 | Middleton et al. | |
| 2016/0086322 A1 | 3/2016 | Arita et al. | |
| 2016/0147408 A1 | 5/2016 | Bevis et al. | |
| 2016/0148433 A1 | 5/2016 | Petrovskaya et al. | |
| 2016/0170624 A1 | 6/2016 | Zambetti et al. | |
| 2016/0189426 A1 | 6/2016 | Thomas et al. | |
| 2016/0210602 A1 | 7/2016 | Siddique et al. | |
| 2016/0240011 A1 | 8/2016 | Metaio et al. | |
| 2016/0329006 A1 | 11/2016 | Weber et al. | |
| 2016/0363990 A1 | 12/2016 | Key | |
| 2017/0021273 A1 | 1/2017 | Rios | |
| 2017/0053621 A1 | 2/2017 | Chen et al. | |
| 2017/0061696 A1 | 3/2017 | Li et al. | |
| 2017/0115488 A1 | 4/2017 | Ambrus et al. | |
| 2017/0132841 A1 | 5/2017 | Morrison | |
| 2017/0212585 A1 | 7/2017 | Kim et al. | |
| 2017/0220887 A1 | 8/2017 | Fathi et al. | |
| 2017/0230641 A1 | 8/2017 | Scavezz et al. | |
| 2017/0277670 A1 | 9/2017 | Smith et al. | |
| 2017/0289221 A1 | 10/2017 | Khalid et al. | |
| 2017/0316576 A1 | 11/2017 | Colbert et al. | |
| 2017/0358142 A1 | 12/2017 | Lee et al. | |
| 2017/0372510 A1 | 12/2017 | Ye et al. | |
| 2018/0004283 A1 | 1/2018 | Mathey-Owens et al. | |
| 2018/0045963 A1* | 2/2018 | Hoover | G02B 27/0189 |
| 2018/0088794 A1 | 3/2018 | Graham et al. | |
| 2018/0114372 A1 | 4/2018 | Nagy et al. | |
| 2018/0165888 A1 | 6/2018 | Duan et al. | |
| 2018/0199039 A1 | 7/2018 | Tepte | |
| 2018/0203561 A1 | 7/2018 | Chang et al. | |
| 2018/0203581 A1 | 7/2018 | Takeda | |
| 2018/0204385 A1 | 7/2018 | Sarangdhar et al. | |
| 2018/0300952 A1 | 10/2018 | Evans et al. | |
| 2018/0336732 A1 | 11/2018 | Schuster | |
| 2018/0336737 A1 | 11/2018 | Varady et al. | |
| 2019/0005730 A1 | 1/2019 | Xu et al. | |
| 2019/0033058 A1 | 1/2019 | Tsurumi | |
| 2019/0051054 A1 | 2/2019 | Jovanovic et al. | |
| 2019/0065027 A1 | 2/2019 | Hauenstein et al. | |
| 2019/0068889 A1 | 2/2019 | Lee et al. | |
| 2019/0172261 A1 | 6/2019 | Alt et al. | |
| 2019/0180082 A1 | 6/2019 | Moravec et al. | |
| 2019/0180506 A1 | 6/2019 | Gebbie et al. | |
| 2019/0180512 A1 | 6/2019 | Fedosov et al. | |
| 2019/0213389 A1 | 7/2019 | Peruch et al. | |
| 2019/0221035 A1 | 7/2019 | Clark et al. | |
| 2019/0221041 A1 | 7/2019 | Lin | |
| 2019/0289419 A1 | 9/2019 | Eronen et al. | |
| 2019/0310757 A1 | 10/2019 | Lee et al. | |
| 2019/0311512 A1 | 10/2019 | VanBlon et al. | |
| 2019/0333278 A1 | 10/2019 | Palangie et al. | |
| 2019/0339058 A1 | 11/2019 | Dryer et al. | |
| 2019/0339839 A1 | 11/2019 | Paul, Sr. et al. | |
| 2019/0340799 A1 | 11/2019 | Dryer et al. | |
| 2019/0355121 A1 | 11/2019 | Nelson et al. | |
| 2019/0369404 A1 | 12/2019 | Joshi et al. | |
| 2020/0005538 A1 | 1/2020 | Neeter | |
| 2020/0020164 A1 | 1/2020 | Coffman et al. | |
| 2020/0027201 A1 | 1/2020 | Chen | |
| 2020/0053318 A1 | 2/2020 | Li et al. | |
| 2020/0098140 A1 | 3/2020 | Jagnow et al. | |
| 2020/0106965 A1 | 4/2020 | Lam et al. | |
| 2020/0143593 A1 | 5/2020 | Rudman et al. | |
| 2020/0184667 A1 | 6/2020 | Miller et al. | |
| 2020/0200794 A1 | 6/2020 | Niles et al. | |
| 2020/0226823 A1* | 7/2020 | Stachniak | G06T 19/006 |
| 2020/0232783 A1 | 7/2020 | Dryer et al. | |
| 2020/0261799 A1 | 8/2020 | Cahill et al. | |
| 2020/0312029 A1 | 10/2020 | Heinen et al. | |
| 2020/0322595 A1 | 10/2020 | Abe et al. | |
| 2020/0368616 A1 | 11/2020 | Delamont | |
| 2020/0382718 A1 | 12/2020 | Malia et al. | |
| 2021/0004996 A1 | 1/2021 | Murillo et al. | |
| 2021/0019946 A1* | 1/2021 | Sonasath | G06T 7/33 |
| 2021/0096726 A1* | 4/2021 | Faulkner | G06F 3/04883 |
| 2021/0097768 A1* | 4/2021 | Malia | G06F 3/04845 |
| 2021/0097776 A1* | 4/2021 | Faulkner | G06F 3/04842 |
| 2021/0158427 A1 | 5/2021 | Jobetto et al. | |
| 2021/0174596 A1* | 6/2021 | Zhang | G02B 27/017 |
| 2021/0191600 A1* | 6/2021 | Lemay | G06F 3/0485 |

(56) References Cited

U.S. PATENT DOCUMENTS

| | | |
|---|---|---|
| 2021/0241483 A1 | 8/2021 | Dryer et al. |
| 2021/0241505 A1 | 8/2021 | Dryer et al. |
| 2021/0254962 A1 | 8/2021 | Dryer et al. |
| 2021/0286502 A1 | 9/2021 | Lemay et al. |
| 2021/0295602 A1 | 9/2021 | Scapel et al. |
| 2021/0304465 A1 | 9/2021 | Dryer et al. |
| 2022/0036648 A1 | 2/2022 | Wang |
| 2022/0091722 A1 | 3/2022 | Faulkner et al. |
| 2022/0092861 A1 | 3/2022 | Sharma et al. |
| 2022/0130118 A1 | 4/2022 | Malia et al. |
| 2022/0239842 A1 | 7/2022 | Malia et al. |
| 2022/0276041 A1 | 9/2022 | Dryer et al. |
| 2022/0335697 A1 | 10/2022 | Harding et al. |
| 2023/0199296 A1 | 6/2023 | Malia et al. |
| 2023/0368458 A1 | 11/2023 | Dryer et al. |
| 2024/0011764 A1 | 1/2024 | Dryer et al. |
| 2024/0045564 A1 | 2/2024 | Dryer et al. |
| 2024/0153219 A1 | 5/2024 | Queen et al. |
| 2024/0273832 A1 | 8/2024 | Newman et al. |
| 2024/0290051 A1 | 8/2024 | Malia et al. |

FOREIGN PATENT DOCUMENTS

| | | | |
|---|---|---|---|
| CN | 1629888 A | | 6/2005 |
| CN | 102607423 A | | 7/2012 |
| CN | 103218854 A | | 7/2013 |
| CN | 105103198 A | | 11/2015 |
| CN | 105164999 A | | 12/2015 |
| CN | 105554247 A | | 5/2016 |
| CN | 105579946 A | | 5/2016 |
| CN | 105589199 A | | 5/2016 |
| CN | 105608746 A | | 5/2016 |
| CN | 106164934 A | | 11/2016 |
| CN | 106251185 A | | 12/2016 |
| CN | 106575299 A | | 4/2017 |
| CN | 112189220 B | | 1/2021 |
| EP | 1563370 A | | 8/2005 |
| EP | 2 394 714 A1 | | 12/2011 |
| EP | 2 983 139 A1 | | 2/2016 |
| EP | 2 988 486 A1 | | 2/2016 |
| EP | 3017591 A1 | | 5/2016 |
| JP | 6264665 B2 | | 11/2002 |
| JP | 2008-287691 A | | 11/2008 |
| JP | 2011-199560 | | 10/2011 |
| JP | 2011259243 A | | 12/2011 |
| JP | 2013-229672 A | | 11/2013 |
| JP | 2014-143453 A | | 8/2014 |
| JP | 2015-080199 A | | 4/2015 |
| JP | 2015146173 A | | 8/2015 |
| JP | 2016-110676 A | | 6/2016 |
| JP | 2017-111515 A | | 6/2017 |
| JP | 2017-120531 A | | 7/2017 |
| JP | 2017-536618 A | | 12/2017 |
| JP | 2019-516180 A | | 6/2019 |
| JP | 2019-145072 A | | 8/2019 |
| KR | 20100003252 A | | 1/2010 |
| KR | 20130108684 A | | 10/2013 |
| KR | 2015-0018828 A | | 2/2015 |
| KR | 101629134 B1 | | 6/2016 |
| KR | 20160141688 A | | 12/2016 |
| KR | 20170087501 A | | 7/2017 |
| KR | 20180066276 A | | 6/2018 |
| KR | 20210031894 A | * | 3/2021 |
| KR | 20210081904 A | * | 7/2021 |
| WO | WO 2011/029209 A1 | | 3/2011 |
| WO | WO 2013/096052 A2 | | 6/2013 |
| WO | WO 2013/099616 A1 | | 7/2013 |
| WO | WO 2013/176830 A | | 11/2013 |
| WO | WO 2014/013689 A1 | | 1/2014 |
| WO | WO 2014/157340 A1 | | 10/2014 |
| WO | WO 2014/197631 A1 | | 12/2014 |
| WO | WO 2016/017254 A1 | | 2/2016 |
| WO | WO 2017/134886 | | 8/2017 |
| WO | WO 2018/164932 A | | 9/2018 |
| WO | WO 2019/032736 A1 | | 2/2019 |
| WO | WO 2017/213070 A1 | | 4/2019 |
| WO | WO 2019/217148 A1 | | 11/2019 |
| WO | WO 2020/068073 A1 | | 4/2020 |
| WO | WO 2021/158427 A1 | | 8/2021 |

OTHER PUBLICATIONS

Notice of Allowance, dated Nov. 13, 2023, received in U.S. Appl. No. 17/720,227 (7786), 5 pages.

Final Office Action, dated May 15, 2023, received in U.S. Appl. No. 17/568,624 (7839), 31 pages.

Office Action, dated Oct. 27, 2023, received in U.S. Appl. No. 17/568,624 (7839), 33 pages.

Final Office Action, dated Jun. 2, 2023, received in Japanese Patent Application No. 2022-077644 (7859JP), which corresponds with U.S. Appl. No. 17/716,984, 4 pages.

Invitation to Pay Additional Fees, dated Oct. 5, 2023, received in International Patent Application No. PCT/US2023/021563 (7853WO), which corresponds with U.S. Appl. No. 18/144,746, 19 pages.

Fukiage et al., "Reduction of Contradictory Partial Occlusion in Mixed Reality by Using Characteristics of Transparency Perception", 2012 IEEE International Symposium On, IEEE, Nov. 5, 2012, 11 pages.

Joaquim, et al., "Dynamic Occlusion Handling for Real-Time AR Applications", https://doi.org/10.1145335/99973365700, Nov. 2019, 10 pages.

Office Action, dated May 23, 2024, received in European U.S. Appl. No. 17/202,233 (7678EP), which corresponds with U.S. Appl. No. 17/202,233, 6 pages.

Notice of Allowance, dated Mar. 5, 2024, received in Japanese Patent Application No. 2022-103836 (7794JP), which corresponds with U.S. Appl. No. 17/307,957, 1 page.

Final Office Action, dated Jul. 5, 2024, received in Korean Patent Application No. 2023-7019367 (7794KR), which corresponds with U.S. Appl. No. 17/307,957, 3 pages.

Notice of Allowance, dated Mar. 25, 2024, received in Australian Patent Application No. 2022202851 (7802AU), which corresponds with U.S. Appl. No. 17/344,846, 3 pages.

Patent, dated May 13, 2024, received in Japanese Patent Application No. 2022-142210 (7802JP), which corresponds with U.S. Appl. No. 17/344,846, 3 pages.

Notice of Allowance, dated Feb. 15, 2024, received in U.S. Appl. No. 17/568,624 (7839), 8 pages.

Notice of Allowance, dated Mar. 25, 2024, received in Australian Patent Application No. 2022235625 (7859AU), which corresponds with U.S. Appl. No. 17/568,624, 3 pages.

Notice of Allowance, dated Feb. 9, 2024, received in Australian Patent Application No. 2022231686 (7877AU), which corresponds with U.S. Appl. No. 17/750,133, 3 pages.

Certificate of Grant, dated Jun. 13, 2024, received in Australian Patent Application No. 2022231686 (7877AU), which corresponds with U.S. Appl. No. 17/750,133, 3 pages.

Office Action, dated Apr. 24, 2024, received in U.S. Appl. No. 18/372,606 (7965), 8 pages.

Office Action, dated Jun. 20, 2024, received in U.S. Appl. No. 18/382,444 (8007), 14 pages.

Extended European Search Report, dated Apr. 26, 2024, received in European Patent Application No. 24151350.6 (7877EP), which corresponds with U.S. Appl. No. 17/750,133, 8 pages.

Office Action, dated Dec. 22, 2023, received in Korean Patent Application No. 2020-0123687 (7738KR), which corresponds with U.S. Appl. No. 17/018,980, 9 pages.

Office Action, dated Nov. 24, 2023, received in Korean Patent Application No. 2023-7019367 (7794KR), which corresponds with U.S. Appl. No. 17/307,957, 7 pages.

Office Action, dated Dec. 8, 2023, received in Japanese Patent Application No. 2022-142210 (7802JP), which corresponds with U.S. Appl. No. 17/344,846, 5 pages.

Office Action, dated Dec. 11, 2023, received in Korean Patent Application No. 2023-7012345 (7859KR), which corresponds with U.S. Appl. No. 17/716,984, 10 pages.

(56) References Cited

OTHER PUBLICATIONS

International Search Report and Written Opinion, dated Dec. 14, 2023, received in International Patent Application No. PCT/US2023/021563 (7853WO), which corresponds with U.S. Appl. No. 18/144,746, 29 pages.

Aakash G Technical, "App Review #1 / Measure—Tango AR / How to Use", https://www.youtube.com/watch?v=fj2iiOg36KE, May 13, 2017, 2 pages.

Anonymous, "How to Select Surface and Image Anchors", https:helpx.adobe.com/aeor/how-to-surface-and-image-anchors.html, Oct. 20, 2020, 6 pages.

Apple, "MeasureKit—AR ruler app for iOS 11", https://measurekit.com, Sep. 15, 2017, 10 pages.

Berthiaume, "Augmented Reality Scanning Enables Retail Innovation (Video)", https://www.scandit.com/gb/augmented-reality-scanning-enables-retail-innovation-video, Oct. 3, 2017, 5 pages.

Bhalwankar, "Triple Tap to Zoom Feature in Android Phones", https://www.youtube.com/watch?v=KlnbLhA2jg8, Jan. 25, 2014, 2 pages.

Burns, "Google Measure it Demo with Tango", https://www.youtube.com/watch?v=b74VtGGJPBg, May 20, 2016, 2 pages.

IPhoneWave, "How to Use iPhone, [online]", http://web.archive.org/web/20111012000236/http:www.ipodwave.com:80/iphone/howto/camera_video.html, Oct. 12, 2011, 5 pages.

Jain et al., "OverLay: Practical Mobile Augmented Reality", Proceedings of the 13th Annual International conference on Mobile Systems, Applications, and Services. May 18, 2015, 14 pages.

LaanLabs, "AirMeasure—AR Tape & Ruler", https://itunes.apple.com/us/app/airmeasure-ar-tape-ruler/id1251282152, Jun. 4, 2018, 3 pages.

Laanlabs, "AirMeasure—The Augmented Reality Toolkit", https://www.youtube.com/watch?v=9ycpvj6hbdE, Sep. 12, 2017, 2 pages.

Langlotz et al., "Sketching up the World: in Situ Authoring for Mobile Augmented reality", http://mooslechner.infor/workperformed/at/smartphone2010.pdf, Jul. 27, 2011, 8 pages.

Lenovo, Lenovo Tech World 2016—Keynote Livestream from San Francisco, https://www.youtube.com/watch?v=MBgQLraVGJQ, Jun. 9, 2016, 2 pages.

Lenovo, "Lenovo_PHAB2_Pro_User_Guide V1.0" https://pcsupport.lenovo.com/do/en/products/tablets/phab-series/phab2-pro-documentation/doc_userguide, Aug. 29, 2017, 10 pages.

Lynch, "How to Zoom in On iPhone: The Quick Tutorial!", https://www.payetteforward.com/how-to-zoom-in-on-iphone-quck-tutorial, Feb. 26, 2018, 4 pages.

Mapletree Apps, "Apple ARKit iPhone Demo—Measure 3D Pro—Ruler on iOS (1)", https://www.youtube.com/watch?v=fzn3RsveJss, Oct. 1, 2017, 2 pages.

Mapletree Apps, "Apple ARKit iPhone Demo—Measure 3D Pro—Ruler on iOS (2)", https://www.youtube.com/watch?v=fzn3RsveJss, Oct. 1, 2017, 2 pages.

Mapletree Apps, "Measure 3D Tutorial series #1—How to Measure a Room", https://www.youtube.com/watch?v=HGV18HXXZqw, Apr. 19, 2018, 2 pages.

Mapletree Apps, Measure 3D Tutorial series #4—How to Measure Length in Horizonal and Vertical Planes, https://www.youtube.com/watch?V-2PjcbrgS50Q, Apr. 19, 2018, 2 pages.

Mapletree Appls, "Measure 3D Tutorial #5—How to Measure Rectangle Shapes", https://www.youtube.com/watch?v=8Gg0SMwkvQU, Apr. 19, 2018, 2 pages.

Marriott, Adobe Aero: Getting Started with AR/Tutorial, https://www.youtube.com/watch?v=EU2V8Pn0GE4, Nov. 19, 2019, 3 pages.

Miller, "Apple Shares Detailed Human Interface Guidelines for Developers Building ARKit Apps", https://9to5mac.com/2017/08/29/arkit-human-interface-guidelines/, Aug. 29, 2017, 5 pages.

Nuernberger et al., "SnapToReality: Aligning Augmented Reality to the Real World", http://eyalofek.org/Papers/CHI2016_Snap2Reality.pdf., May 7-12, 2016, 12 pages.

Occipital HQ, "TapMeasure Spatial Utility to Capture and Measure Your Space", https://www.youtube.com/watch?v=Hy1Ex2MAXM, Sep. 19, 2017, 2 pages.

Perhiniak, "Yes I'm a Designer: Designing an Augmentged Reality Scene in Adobe Aero" https://wwwyoutube.com/watch?v=fo8a?G0, Jan. 27, 2020, 14 pages.

SmartPicture, "PLNAR—Your AR Measurement Tool", https://www.youtube.com/watch?v=H_cqZqKLjws, Sep. 28, 2017, 2 pages.

SmarPicture Tech, "Mobile App Design for Bay Area—Rely on the Reinvently Agency", https://appadvice.com/app/plnar/1282049921, Sep. 21, 2018, 5 pages.

YouTube, "A1 Corner & Edge Detection (beta)", https://www.youtube.com/watch?v=YSNklighUtxA, Nov. 21, 2020, 2 pages.

YouTube, "How Do I Use The iPhone Measure App? How Accurate Is It?", https://www.youtube.com/watch?v=RvhZ074Vs7c, Aug. 8, 2018, 3 pages.

YouTube, "Third Aurora: Adobe Aero Tutorial—How to get Started with Adobe Aero", https://www.youtube.com/watch?v=EU2v8P, Nov. 18, 2019, 3 pages.

YouTube, AR Measure—Automatic Measure in Augmented Reality, https://www.youtube.com/watch?v=70CQfH76vg4, Mar. 16, 2019, 2 pages.

YouTube, Huawei P30 Pro AR Measure / Measure length, depth, area and volume hxos plus, https;//www.youtube.com/watch?v=0OX5QaK7YY, Mar. 26, 2019, 2 pages.

YouTube, Yes, I'm a Designer: "Designing an Augmented Reality Scene in Adobe Aero", https:www.youtube.com/watch?v=fo8aGOvCY7k, Jan. 27, 2020, 3 pages.

Office Action, dated Feb. 21, 2019, received in U.S. Appl. No. 16/145,015, 34 pages.

Notice of Allowance, dated Jun. 5, 2019, received in U.S. Appl. No. 16/145,015, 12 pages.

Office Action, dated Aug. 31, 2018, received in Danish Patent Application No. 201870350, which corresponds with U.S. Appl. No. 16/145,015, 11 pages.

Office Action, dated May 28, 2019, received in Danish Patent Application No. 201870350, which corresponds with U.S. Appl. No. 16/145,015, 6 pages.

Office Action, dated Feb. 21, 2020, received in Danish Patent Application No. 201870350, which corresponds with U.S. Appl. No. 16/145,015, 8 pages.

Intention to Grant, dated Mar. 30, 2023, received in European Patent Application No. 21178349.3, which corresponds with U.S. Appl. No. 16/145,015, 8 pages.

Office Action, dated Oct. 6, 2021, received in European Patent Application No. 21178349.3, which corresponds with U.S. Appl. No. 16/145,015, 8 pages.

Notice of Allowance, dated Nov. 22, 2019, received in U.S. Appl. No. 16/138,779, 17 pages.

Office Action, dated Jul. 7, 2021, received in Australian Patent Application No. 2019267352, which corresponds with U.S. Appl. No. 16/138,779, 5 pages.

Notice of Acceptance, dated Aug. 9, 2021, received in Australian Patent Application No. 2019267352, which corresponds with U.S. Appl. No. 16/138,779, 3 pages.

Patent, dated Dec. 2, 2021, received in Australian Patent Application No. 2019267352, which corresponds with U.S. Appl. No. 16/138,779, 3 pages.

Office Action, dated Aug. 31, 2018, received in Danish Patent Application No. 201870351, which corresponds with U.S. Appl. No. 16/138,779, 11 pages.

Office Action, dated Feb. 13, 2020, received in Danish Patent Application No. 201870351, which corresponds with U.S. Appl. No. 16/138,779, 10 pages.

Office Action, dated Mar. 21, 2019, received in U.S. Appl. No. 16/145,025, 14 pages.

Final Office Action, dated Sep. 19, 2019, received in U.S. Appl. No. 16/145,025, 15 pages.

Office Action, dated Jun. 12, 2020, received in U.S. Appl. No. 16/145,025, 17 pages.

Final Office Action, dated Dec. 18, 2020, received in U.S. Appl. No. 16/145,025, 17 pages.

Notice of Allowance, dated Mar. 17, 2021, received in U.S. Appl. No. 16/145,025, 5 pages.

(56) References Cited

OTHER PUBLICATIONS

Innovation Patent, dated May 22, 2019, received in Australian Patent Application No. 2019100486, which corresponds with U.S. Appl. No. 16/138,779, 3 pages.

Certificate of Examination, dated Jul. 19, 2019, received in Australian Patent Application No. 2019100486, which corresponds with U.S. Appl. No. 16/138,779, 5 pages.

Office Action, dated Aug. 3, 2020, received in Chinese Patent Application No. 201910261469.3, which corresponds with U.S. Appl. No. 16/138,779, 5 pages.

Office Action, dated Jan. 20, 2021, received in Chinese Patent Application No. 201910261469.3, which corresponds with U.S. Appl. No. 16/138,779, 11 pages.

Notice of Allowance, dated Apr. 20, 2021, received in Chinese Patent Application No. 201910261469.3, which corresponds with U.S. Appl. No. 16/138,779, 6 pages.

Patent, dated Jul. 13, 2021, received in Chinese Patent Application No. 201910261469.3, which corresponds with U.S. Appl. No. 16/138,779, 6 pages.

Office Action, dated Sep. 28, 2018, received in Danish Patent Application No. 201870352, which corresponds with U.S. Appl. No. 16/145,025, 7 pages.

Office Action, dated Jan. 31, 2019, received in Danish Patent Application No. 201870352, which corresponds with U.S. Appl. No. 16/145,025, 4 pages.

Office Action, dated Sep. 16, 2019, received in Danish Patent Application No. 201870352, which corresponds with U.S. Appl. No. 16/145,025, 3 pages.

Office Action, dated Aug. 27, 2020, received in Danish Patent Application No. 201870352, which corresponds with U.S. Appl. No. 16/145,025, 2 pages.

Intention to Grant, dated Mar. 10, 2021, received in Danish Patent Application No. 201870352, which corresponds with U.S. Appl. No. 16/145,025, 2 pages.

Decision to Grant, dated Jul. 2, 2021, received in Danish Patent Application No. 201870352, which corresponds with U.S. Appl. No. 16/145,025, 2 pages.

Patent, dated Nov. 9, 2021, received in Danish Patent Application No. 201870352, which corresponds with U.S. Appl. No. 16/145,025, 3 pages.

Office Action, dated Jul. 17, 2019, received in European Patent Application No. 19159743.4, which corresponds with U.S. Appl. No. 16/145,025, 8 pages.

Office Action, dated Oct. 5, 2020, received in European Patent Application No. 19159743.4, which corresponds with U.S. Appl. No. 16/145,025, 6 pages.

Decision to Grant, dated Jun. 24, 2021, received in European Patent Application No. 19159743.4, which corresponds with U.S. Appl. No. 16/145,025, 2 pages.

Certificate of Grant, dated Aug. 13, 2021, received in European Patent Application No. 19159743.4, which corresponds with U.S. Appl. No. 16/145,025, 3 pages.

Office Action, dated Dec. 13, 2021, received in Japanese Patent Application No. 2020-562126, which corresponds with U.S. Appl. No. 16/145,025, 2 pages.

Notice of Allowance, dated May 30, 2022, received in Japanese Patent Application No. 2020-562126, which corresponds with U.S. Appl. No. 16/145,025, 2 pages.

Patent, dated Jun. 30, 2022, received in Japanese Patent Application No. 2020-562126, which corresponds with U.S. Appl. No. 16/145,025, 3 pages.

Office Action, dated Oct. 26, 2022, received in Korean Patent Application No. 2020-7032392, which corresponds with U.S. Appl. No. 16/145,025, 5 pages.

Notice of Allowance, dated May 19, 2023, received in Korean Patent Application No. 2020-7032392, which corresponds with U.S. Appl. No. 16/145,025, 2 pages.

Office Action, dated Sep. 20, 2022, received in Indian Patent Application No. 202017052984, which corresponds with U.S. Appl. No. 16/145,025, 11 pages.

Notice of Allowance, dated May 15, 2020, received in U.S. Appl. No. 16/574,029, 10 pages.

Office Action, dated Jan. 20, 2022, received in Australian Patent Application No. 2019349408, which corresponds with U.S. Appl. No. 16/574,029, 3 pages.

Notice of Acceptance, dated Jul. 29, 2022, received in Australian Patent Application No. 2019349408, which corresponds with U.S. Appl. No. 16/574,029, 3 pages.

Notice of Allowance, dated Mar. 2, 2022, received in Chinese Patent Application No. 202110369762.9, which corresponds with U.S. Appl. No. 16/574,029, 7 pages.

Patent, dated Mar. 29, 2022, received in Chinese Patent Application No. 202110369762.9, which corresponds with U.S. Appl. No. 16/574,029, 6 pages.

Notice of Allowance, dated Apr. 25, 2022, received in Japanese Patent Application No. 2021-510765, which corresponds with U.S. Appl. No. 16/574,029, 2 pages.

Patent, dated May 12, 2022, received in Japanese Patent Application No. 2021-510765, which corresponds with U.S. Appl. No. 16/574,029, 3 pages.

Office Action, dated Dec. 29, 2022, received in Indian Patent Application No. 202117008282, which corresponds with U.S. Appl. No. 16/574,029, 10 pages.

Office Action, dated Feb. 24, 2023, received in Indian Patent Application No. 202118009402, which corresponds with U.S. Appl. No. 16/574,029, 7 pages.

Office Action, dated Jul. 6, 2022, received in Korean Patent Application No. 2021-7005584, which corresponds with U.S. Appl. No. 16/574,029, 13 pages.

Notice of Allowance, dated Mar. 22, 2023, received in Korean Patent Application No. 2021-7005584, which corresponds with U.S. Appl. No. 16/574,029, 2 pages.

Patent, dated Apr. 11, 2023, received in Korean Patent Application No. 2021-7005584, which corresponds with U.S. Appl. No. 16/574,029, 4 pages.

Office Action, dated Apr. 30, 2021, received in U.S. Appl. No. 17/030,209, 27 pages.

Office Action, dated Jan. 8, 2021, received in U.S. Appl. No. 17/018,958, 27 pages.

Notice of Allowance, dated Apr. 20, 2021, received in U.S. Appl. No. 17/018,958, 12 pages.

Office Action, dated Aug. 13, 2021, received in Australian Patent Application No. 2020239688, which corresponds with U.S. Appl. No. 17/018,958, 4 pages.

Office Action, dated Nov. 5, 2021, received in Australian Patent Application No. 2020239688, which corresponds with U.S. Appl. No. 17/018,958, 4 pages.

Notice of Allowance, dated Feb. 22, 2022, received in Australian Patent Application No. 2020239688, which corresponds with U.S. Appl. No. 17/018,958, 3 pages.

Certificate of Grant, dated Jun. 23, 2022, received in Australian Patent Application No. 2020239688, which corresponds with U.S. Appl. No. 17/018,958, 4 pages.

Office Action, dated Dec. 18, 2020, received in Danish Patent Application No. 202070602, which corresponds with U.S. Appl. No. 17/018,958, 10 pages.

Office Action, dated Mar. 14, 2022, received in Danish Patent Application No. 202070602, which corresponds with U.S. Appl. No. 17/018,958, 5 pages.

Office Action, dated Nov. 14, 2022, received in Danish Patent Application No. 202070602, which corresponds with U.S. Appl. No. 17/018,958, 2 pages.

Office action, dated Dec. 3, 2021, received in Indian Patent Application No. 202014041448, which corresponds with U.S. Appl. No. 17/018,958, 10 pages.

Notice of Allowance, dated Dec. 20, 2021, received in Japanese Patent Application No. 2020-159787, which corresponds with U.S. Appl. No. 17/018,958, 2 pages.

Notice of Allowance, dated Feb. 18, 2022, received in Japanese Patent Application No. 2022-005327, which corresponds with U.S. Appl. No. 17/018,958, 2 pages.

(56)          References Cited

OTHER PUBLICATIONS

Patent, dated Mar. 14, 2022, received in Japanese Patent Application No. 2022-005327, which corresponds with U.S. Appl. No. 17/018,958, 3 pages.

Office Action, dated Nov. 8, 2021, received in Korean Patent Application No. 2020-0124085, which corresponds with U.S. Appl. No. 17/018,958, 9 pages.

Notice of Allowance, dated Jul. 13, 2022, received in Korean Patent Application No. 2020-0124085, which corresponds with U.S. Appl. No. 17/018,958, 2 pages.

Patent, dated Jul. 22, 2022, received in Korean Patent Application No. 2020-0124085, which corresponds with U.S. Appl. No. 17/018,958, 4 pages.

Office Action, dated Aug. 13, 2021, received in U.S. Appl. No. 17/202,233, 19 pages.

Final Office Action, dated Feb. 15, 2022, received in U.S. Appl. No. 17/202,233, 24 pages.

Office Action, dated Aug. 16, 2022, received in U.S. Appl. No. 17/202,233, 25 pages.

Notice of Allowance, dated Mar. 22, 2023, received in U.S. Appl. No. 17/202,233, 8 pages.

Office Action, dated Feb. 21, 2021, received in U.S. Appl. No. 16/841,550, 8 pages.

Notice of Allowance, dated May 4, 2021, received in U.S. Appl. No. 16/841,550, 12 pages.

Notice of Allowance, dated Dec. 7, 2021, received in U.S. Appl. No. 16/997,860, 10 pages.

Office Action, dated Jan. 22, 2021, received in U.S. Appl. No. 17/018,980, 17 pages.

Office Action, dated May 14, 2021, received in U.S. Appl. No. 17/018,980, 4 pages.

Notice of Allowance, dated May 28, 2021, received in U.S. Appl. No. 17/018,980, 5 pages.

Office Action, dated Aug. 20, 2021, received in Australian Patent Application No. 2020239675, which corresponds with U.S. Appl. No. 17/018,980, 4 pages.

Office Action, dated Dec. 16, 2021, received in Australian Patent Application No. 2020239675, which corresponds with U.S. Appl. No. 17/018,980, 2 pages.

Notice of Allowance, dated Jan. 21, 2022, received in Australian Patent Application No. 2020239675, which corresponds with U.S. Appl. No. 17/018,980, 3 pages.

Certificate of Grant, dated May 26, 2022, received in Australian Patent Application No. 2020239675, which corresponds with U.S. Appl. No. 17/018,980, 3 pages.

Office Action, dated Dec. 18, 2020, received in Danish Patent Application No. 202070603, which corresponds with U.S. Appl. No. 17/018,980, 9 pages.

Office Action, dated Feb. 25, 2022, received in Danish Patent Application No. 202070603, which corresponds with U.S. Appl. No. 17/018,980, 2 pages.

Office Action, dated Feb. 17, 2023, received in Danish Patent Application No. 202070603, which corresponds with U.S. Appl. No. 17/018,980, 4 pages.

Office Action, dated Aug. 10, 2021, received in Indian Patent Application No. 202014040937, which corresponds with U.S. Appl. No. 17/018,980, 7 pages.

Office Action, dated Dec. 20, 2021, received in Japanese Patent Application No. 2020-159788, which corresponds with U.S. Appl. No. 17/018,980, 2 pages.

Notice of Allowance, dated Feb. 18, 2022, received in Japanese Patent Application No. 2022-005328, which corresponds with U.S. Appl. No. 17/018,980, 3 pages.

Patent, dated Mar. 14, 2022, received in Japanese Patent Application No. 2022-005328, which corresponds with U.S. Appl. No. 17/018,980, 3 pages.

Office Action, dated Jan. 7, 2021, received in U.S. Appl. No. 17/018,994, 7 pages.

Notice of Allowance, dated Feb. 23, 2021, received in U.S. Appl. No. 17/018,994, 8 pages.

Office Action, dated Aug. 13, 2021, received in Australian Patent Application No. 2020239691, U.S. Appl. No. 17/018,994 (7739AU), 5 pages.

Office Action, dated Nov. 15, 2021, received in Australian Patent Application No. 2020239691, U.S. Appl. No. 17/018,994, 4 pages.

Notice of Allowance, dated Mar. 2, 2022, received in Australian Patent Application No. 2020239691, U.S. Appl. No. 17/018,994, 3 pages.

Office Action, dated Jan. 12, 2021, received in Danish Patent Application No. 2020-70604, which corresponds with U.S. Appl. No. 17/018,994, 8 pages.

Office Action, dated Feb. 4, 2022, received in Danish Patent Application No. 2020-70604, which corresponds with U.S. Appl. No. 17/018,994, 3 pages.

Office Action, dated Nov. 2, 2022, received in Danish Patent Application No. 2020-70604, which corresponds with U.S. Appl. No. 17/018,994, 3 pages.

Office Action, dated Dec. 2, 2021, received in Indian Patent Application No. 202014041104, which corresponds with U.S. Appl. No. 17/018,994, 7 pages.

Office Action, dated Jan. 7, 2022, received in Japanese Patent Application No. 2020-159789, which corresponds with U.S. Appl. No. 17/018,994, 5 pages.

Notice of Allowance, dated Aug. 8, 2022, received in Japanese Patent Application No. 2020-159789, which corresponds with U.S. Appl. No. 17/018,994, 1 page.

Patent, dated Sep. 9, 2022, received in Japanese Patent Application No. 2020-159789, which corresponds with U.S. Appl. No. 17/018,994, 3 pages.

Office Action, dated Apr. 5, 2022, received in U.S. Appl. No. 17/307,957, 10 pages.

Notice of Allowance, dated May 4, 2022, received in U.S. Appl. No. 17/307,957, 12 pages.

Office Action, dated Aug. 31, 2022, received in Australian Patent Application No. 2021240284, which corresponds with U.S. Appl. No. 17/307,957, 2 pages.

Notice of Allowance, dated Sep. 14, 2022, received in Australian Patent Application No. 2021240284, which corresponds with U.S. Appl. No. 17/307,957, 3 pages.

Patent, dated Jan. 19, 2023, received in Australian Patent Application No. 2021240284, which corresponds with U.S. Appl. No. 17/307,957, 3 pages.

Office Action, dated Nov. 2, 2022, received in Chinese Patent Application No. 202110660753.5, 2 pages.

Office Action, dated Jul. 22, 2022, received in U.S. Appl. No. 17/344,846, 8 pages.

Final Office Action, dated Dec. 23, 2022, received in U.S. Appl. No. 17/344,846, 8 pages.

Notice of Allowance, dated Apr. 28, 2023, received in U.S. Appl. No. 17/344,846, 5 pages.

Office Action, dated Mar. 29, 2023, received in Australian Patent Application No. 2022202851, which corresponds with U.S. Appl. No. 17/344,846, 3 pages.

Office Action, dated Feb. 3, 2023, received in U.S. Appl. No. 17/568,624, 44 pages.

Noticed of Allowance, dated Dec. 7, 2022, received in U.S. Appl. No. 17/716,984, 10 pages.

Office Action, dated Jun. 2, 2023, received in Japanese Patent Application No. 2022-077644, which corresponds with U.S. Appl. No. 17/716,984, 6 pages.

Office Action, dated May 17, 2023, received in U.S. Appl. No. 17/750,133, 23 pages.

European Search Report, dated Sep. 23, 2021, received in European Patent Application No. 21178349.3, which corresponds with U.S. Appl. No. 16/145,015, 4 pages.

Invitation to Pay Additional Fees, dated Jul. 15, 2019, received in International Patent Application No. PCT/US2019/029904, which corresponds with U.S. Appl. No. 16/145,015, 29 pages.

International Search Report and Written Opinion, dated Sep. 9, 2019, received in International Patent Application No. PCT/US2019/029904, which corresponds with U.S. Appl. No. 16/145,015, 31 pages.

(56)            References Cited

OTHER PUBLICATIONS

European Search Report, dated Jul. 4, 2019, received in European Patent Application No. 19158743.4, which corresponds with U.S. Appl. No. 16/145,025, 4 pages.
Invitation to Pay Additional Fees, dated Dec. 12, 2019, received in International Patent Application No. PCT/US2019052140, which corresponds with U.S. Appl. No. 16/574,029, 18 pages.
International Search Report and Written Opinion, dated Feb. 5, 2020, received in International Patent Application No. PCT/US2019052140, which corresponds with U.S. Appl. No. 16/574,029, 22 pages.
Invitation to Pay Additional Fees, dated Jan. 19, 2021, received in International Patent Application No. PCT/US2020/052641, which corresponds with U.S. Appl. No. 17/030,209, 15 pages.
International Search Report and Written Opinion, dated Mar. 12, 2021, received in International Patent Application No. PCT/US2020/052641, which corresponds with U.S. Appl. No. 17/030,209, 21 pages.
Invitation to Pay Additional Fees, dated Jun. 23, 2021, received in International Patent Application No. PCT/US2021/022378, which corresponds with U.S. Appl. No. 17/200,676, 15 pages.
International Search Report and Written Opinion, dated Aug. 13, 2021, received in International Patent Application No. PCT/US2021/022378, which corresponds with U.S. Appl. No. 17/200,676, 19 pages.
Invitation to Pay Additional Fees, dated May 17, 2021, received in International Patent Application No. PCT/US2021/015556, which corresponds with U.S. Appl. No. 17/018,958, 19 pages.
International Search Report and Written Opinion, dated Jul. 8, 2021, received in International Patent Application No. PCT/US2021/015556, which corresponds with U.S. Appl. No. 17/018,958, 26 pages.
Invitation to Pay Additional Fees, dated Jul. 26, 2022, received in International Patent Application No. PCT/US2022/024894, which corresponds with U.S. Appl. No. 17/720,227, 34 pages.
Office Action, dated Sep. 14, 2023, received in U.S. Appl. No. 17/720,227, 5 pages.
Office Action, dated Sep. 1, 2023, received in Japanese Patent Application No. 2022-103836, which corresponds with U.S. Appl. No. 17/307,957, 2 pages.
Office Action, dated Sep. 4, 2023, received in Australian Patent Application No. 2022235625, which corresponds with U.S. Appl. No. 17/568,624, 3 pages.
Patent, dated Jun. 8, 2023, received in Korean Patent Application No. 2020-7032392, which corresponds with U.S. Appl. No. 16/145,025, 4 pages.
Patent, dated Jun. 20, 2023, received in Chinese Patent Application No. 202110660753.5, 7 pages.
Notice of Allowance, dated Jun. 28, 2023, received in U.S. Appl. No. 17/750,133, 10 pages.
Office Action, dated Jul. 5, 2023, received in Australian Patent Application No. 2022231686, which corresponds with U.S. Appl. No. 17/750,133, 2 pages.
Notice of Allowance, dated Jul. 6, 2023, received in U.S. Appl. No. 18/107,381, 24 pages.
Grant Certificate, dated Jul. 25, 2024, received in Australian Patent Application No. 2022202851, which corresponds with U.S. Appl. No. 17/344,846, 3 pages.
Grant Certificate, dated Jul. 25, 2024, received in Australian Patent Application No. 2022235625, which corresponds with U.S. Appl. No. 17/568,624, 3 pages.
Notice of Allowance, dated Aug. 7, 2024, received in U.S. Appl. No. 18/372,606, 7 pages.
Notice of Allowance, dated Jun. 13, 2024, received in U.S. Appl. No. 18/388,176, 10 pages.
Office Action, dated Mar. 24, 2025, received in Japanese Patent Application No. 2024-060325, which corresponds with U.S. Appl. No. 16/138,779, 5 pages.

Patent, dated Mar. 11, 2025, received in Indian Patent Application No. 202017052984, which corresponds with U.S. Appl. No. 16/145,025, 4 pages.
Patent, dated Mar. 21, 2025, received in Indian Patent Application No. 202118009402, which corresponds with U.S. Appl. No. 16/574,029, 4 pages.
Office Action, dated Jan. 16, 2025, received in Chinese Patent Application No. 202210629947.3, which corresponds with U.S. Appl. No. 17/030,209, 2 pages.
Office Action, dated Apr. 16, 2025, received in European Application No. 20789374.4, which corresponds with U.S. Appl. No. 17/018,958, 14 pages.
Patent, dated Feb. 27, 2025, received in Indian Patent Application No. 202014041448, which corresponds with U.S. Appl. No. 17/018,958, 6 pages.
Office Action, dated Mar. 4, 2025, received in Japanese Patent Application No. 2024-026846, which corresponds with U.S. Appl. No. 16/997,860, 7 pages.
Office Action, dated Mar. 20, 2025, received in U.S. Appl. No. 18/144,746, 22 pages.
Patent, dated Apr. 1, 2025, received in European Patent Application No. 24151350.6, 7 pages.
Office Action, dated Feb. 27, 2025, received in U.S. Appl. No. 18/656,318, 15 pages.
Office Action, dated Dec. 23, 2024, received in Indian Patent Application No. 202118009402, which corresponds with U.S. Appl. No. 16/574,029, 3 pages.
Office action, dated Sep. 30, 2024, received in Indian Patent Application No. 202014041448, which corresponds with U.S. Appl. No. 17/018,958, 8 pages.
Notice of Allowance, dated Dec. 4, 2024, received in Korean Patent Application No. 2020-0123687, which corresponds with U.S. Appl. No. 17/018,980, 3 pages.
Patent, dated Sep. 23, 2024, received in Indian Patent Application No. 202014041104, which corresponds with U.S. Appl. No. 17/018,994, 6 pages.
Notice of Allowance, dated Nov. 7, 2024, received in Korean Patent Application No. 2023-7019367, which corresponds with U.S. Appl. No. 17/307,957, 3 pages.
Office Action, dated Nov. 5, 2024, received in Japanese Patent Application No. 2022-077644, which corresponds with U.S. Appl. No. 17/716,984, 17 pages.
Office Action, dated Sep. 23, 2024, received in Korean Patent Application No. 2023-7012345, which corresponds with U.S. Appl. No. 17/716,984, 5 pages.
Intent to Grant, dated Oct. 14, 2024, received in European Patent Application No. 24151350.6, 11 pages.
Notice of Allowance, dated Jan. 10, 2025, received in U.S. Appl. No. 18/382,444, 6 pages.
Office Action, dated Aug. 14, 2024, received in U.S. Appl. No. 18/412,251, 10 pages.
Office Action, dated Apr. 28, 2025, received in European Patent Application No. 19783191.0, which corresponds with U.S. Appl. No. 16/574,029, 6 pages.
Office Action, dated May 13, 2025, received in Japanese Patent Application No. 2024-076652, which corresponds with U.S. Appl. No. 18/382,444, 4 pages.
Office Action, dated Apr. 29, 2025, received in Australian Patent Application No. 2024202935, 5 pages.
Notice of Allowance, dated May 16, 2025, received in U.S. Appl. No. 18/656,318, 11 pages.
Office Action, dated Nov. 10, 2025, received in U.S. Appl. No. 18/437,634, 13 pages.
Intent to Grant, dated Oct. 28, 2025, received in European Patent Application No. 23193039.7, which corresponds with U.S. Appl. No. 17/018,980, 7 pages.
Notice of Allowance, dated Oct. 17, 2025, received in Japanese Patent Application No. 2024-113573, which corresponds with U.S. Appl. No. 18/388,176, 2 pages.

* cited by examiner

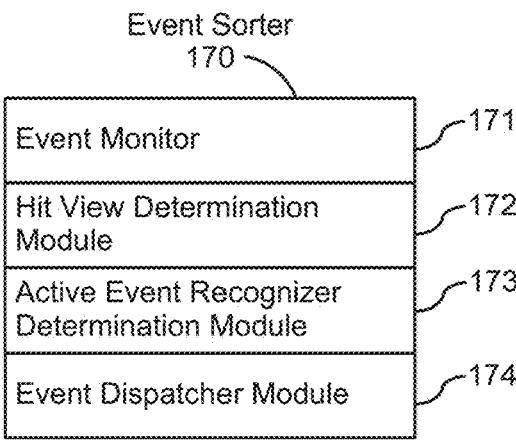
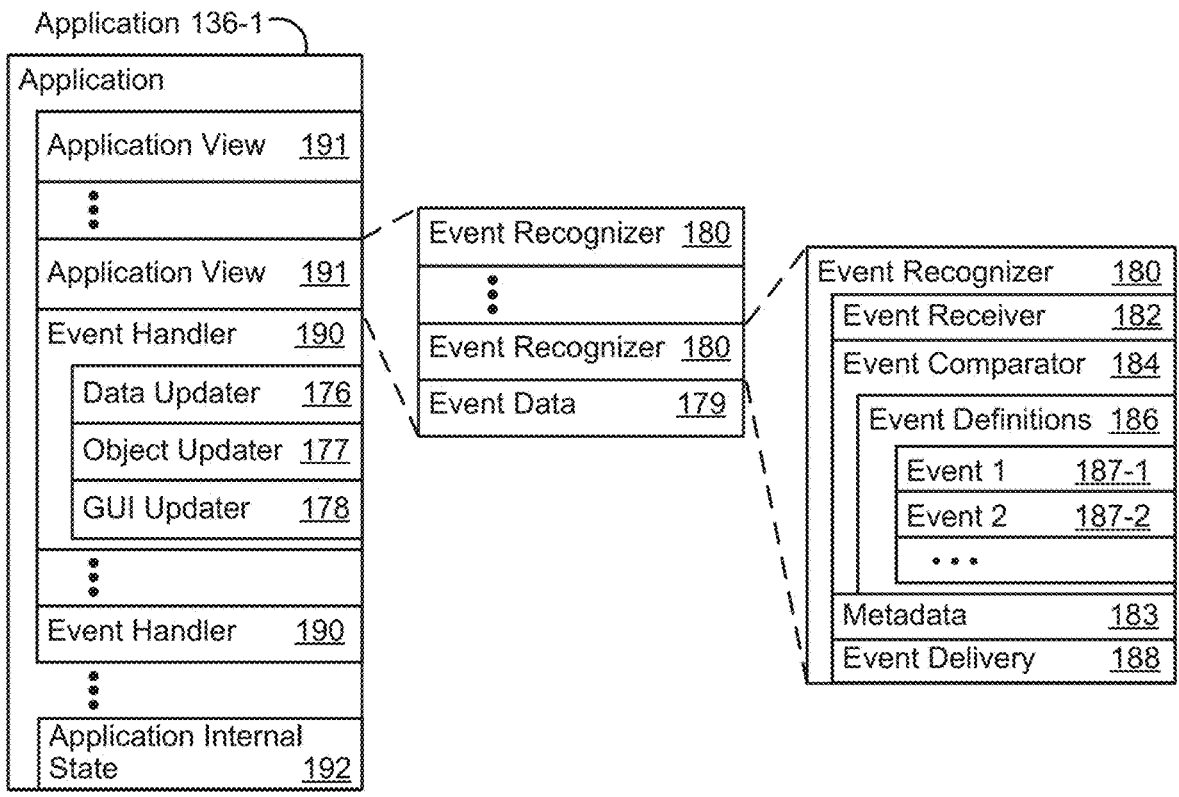
Figure 1B

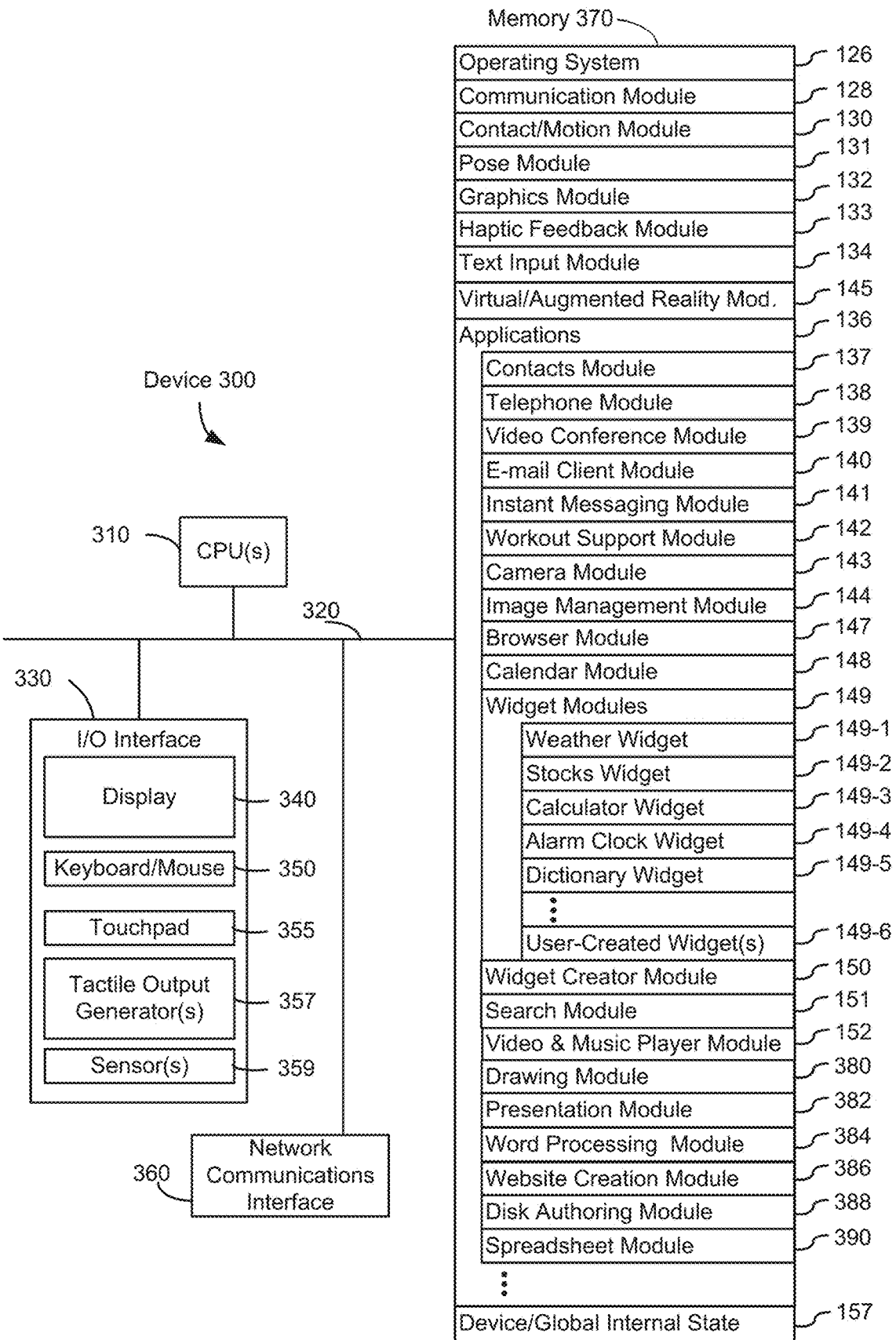

Memory 370

| | |
|---|---|
| Operating System | 126 |
| Communication Module | 128 |
| Contact/Motion Module | 130 |
| Pose Module | 131 |
| Graphics Module | 132 |
| Haptic Feedback Module | 133 |
| Text Input Module | 134 |
| Virtual/Augmented Reality Mod. | 145 |
| Applications | 136 |
| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Browser Module | 147 |
| Calendar Module | 148 |
| Widget Modules | 149 |
| Weather Widget | 149-1 |
| Stocks Widget | 149-2 |
| Calculator Widget | 149-3 |
| Alarm Clock Widget | 149-4 |
| Dictionary Widget | 149-5 |
| ⋮ | |
| User-Created Widget(s) | 149-6 |
| Widget Creator Module | 150 |
| Search Module | 151 |
| Video & Music Player Module | 152 |
| Drawing Module | 380 |
| Presentation Module | 382 |
| Word Processing  Module | 384 |
| Website Creation Module | 386 |
| Disk Authoring Module | 388 |
| Spreadsheet Module | 390 |
| ⋮ | |
| Device/Global Internal State | 157 |

Device 300

310 — CPU(s)

320

330

I/O Interface

Display — 340

Keyboard/Mouse — 350

Touchpad — 355

Tactile Output Generator(s) — 357

Sensor(s) — 359

360 — Network Communications Interface

Figure 3A

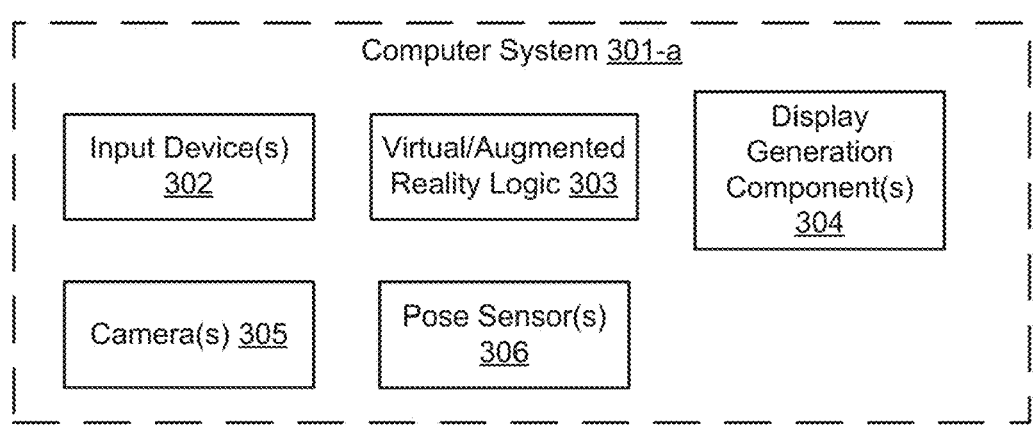
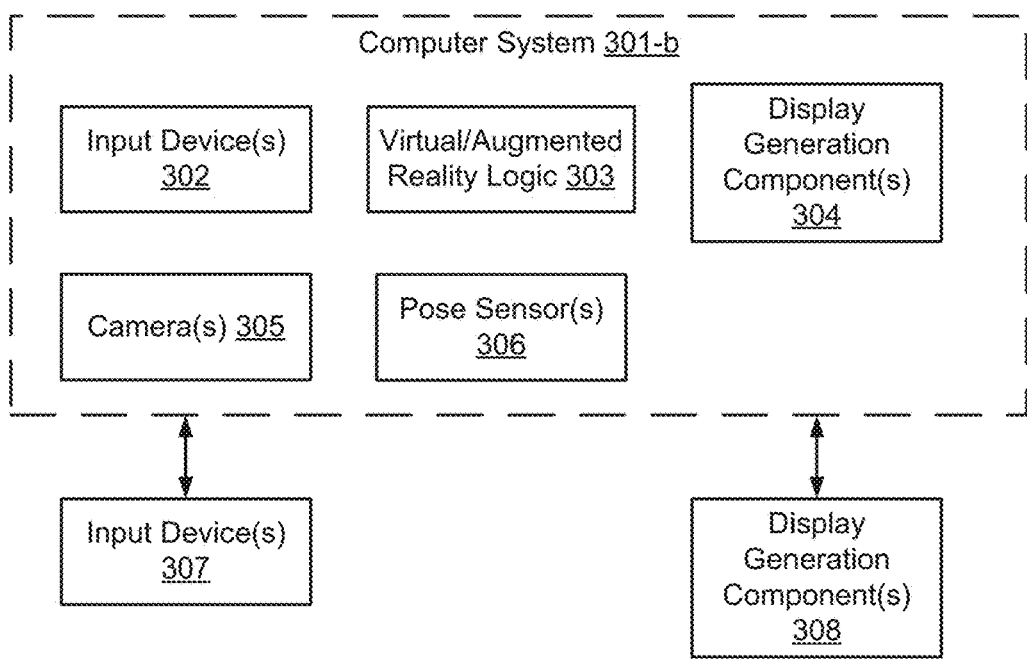
Figure 3B

Portable Multifunction Device 100

Touch Screen 112

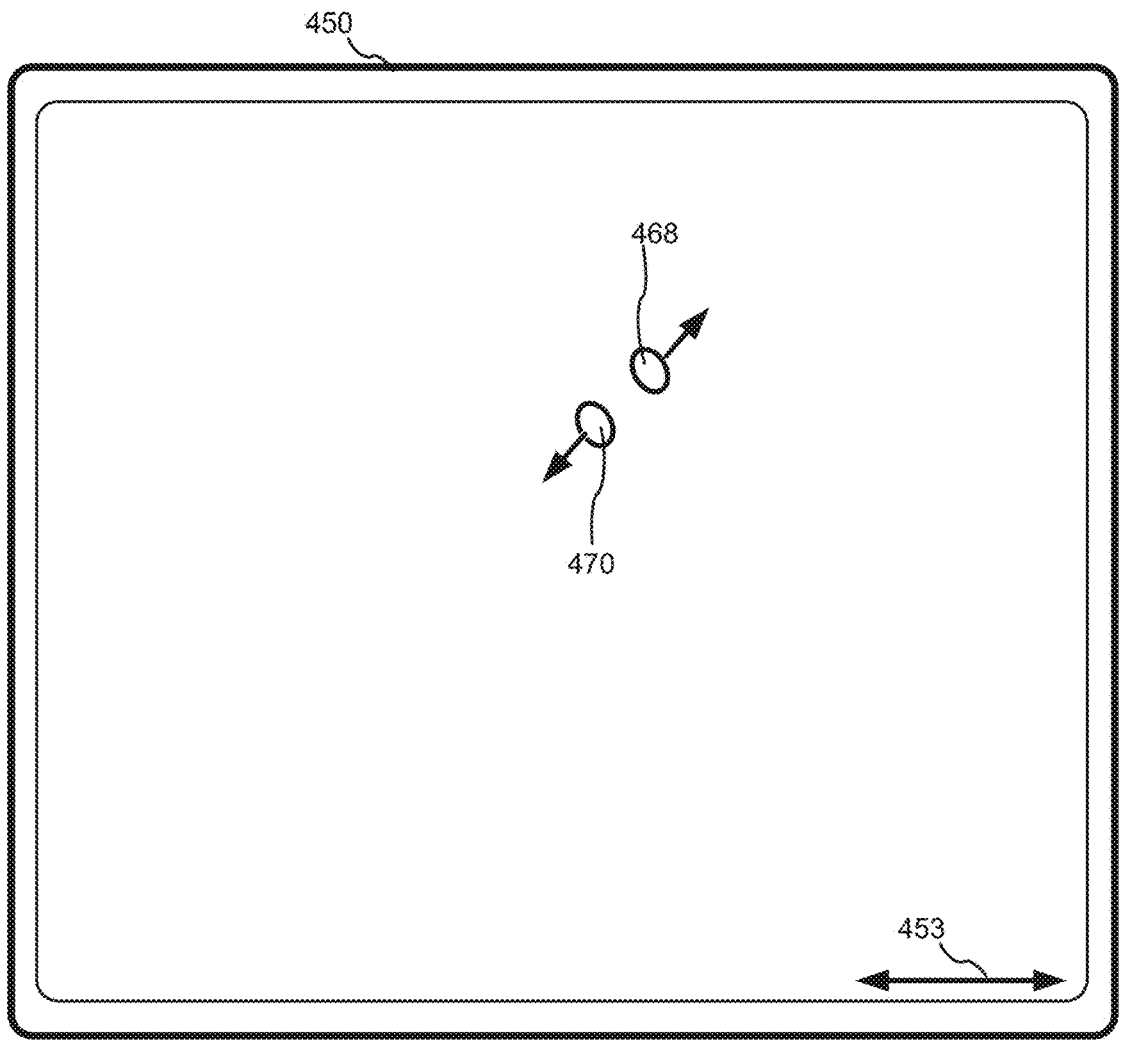
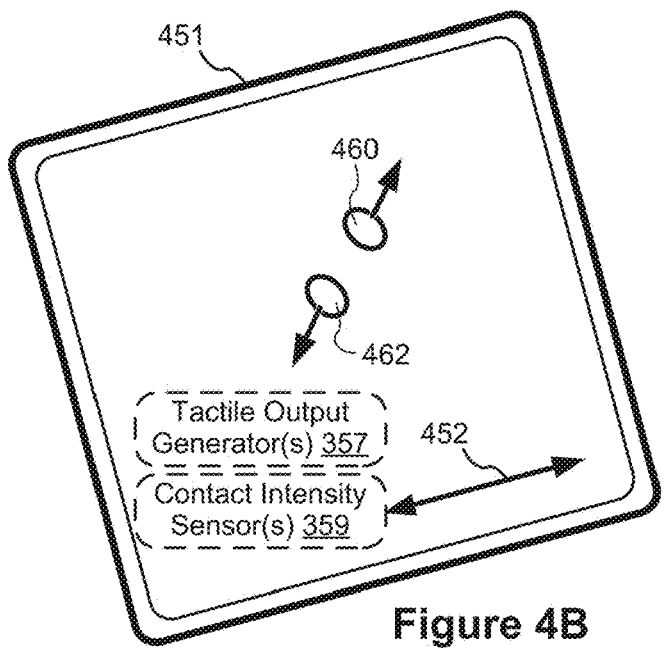
Figure 4B

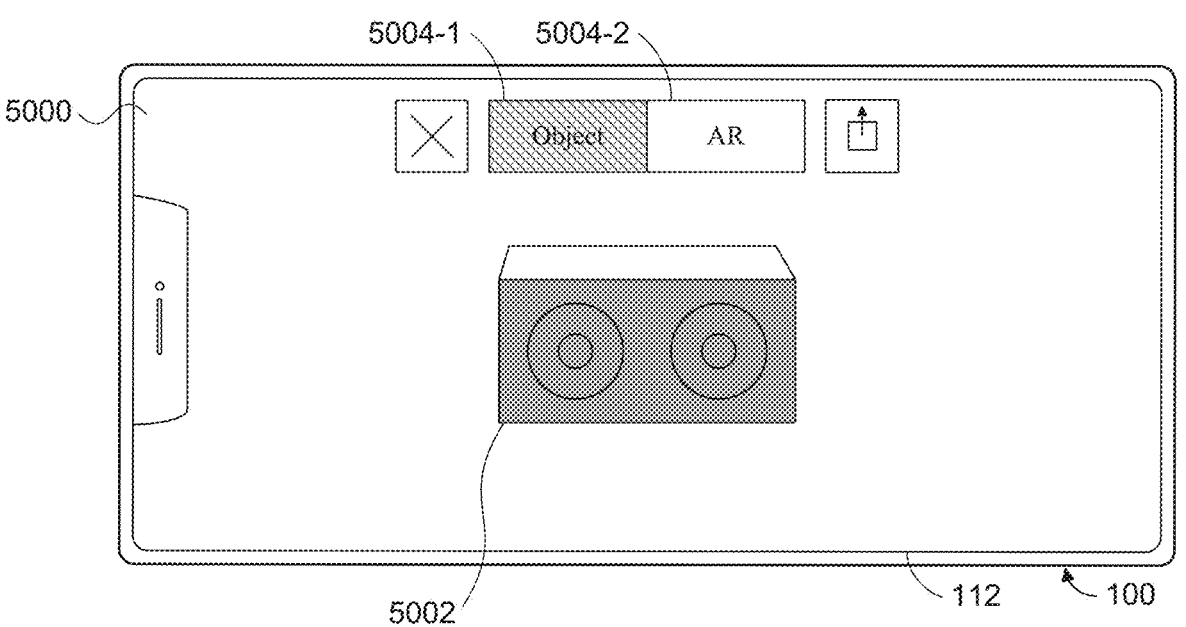
Figure 5A1
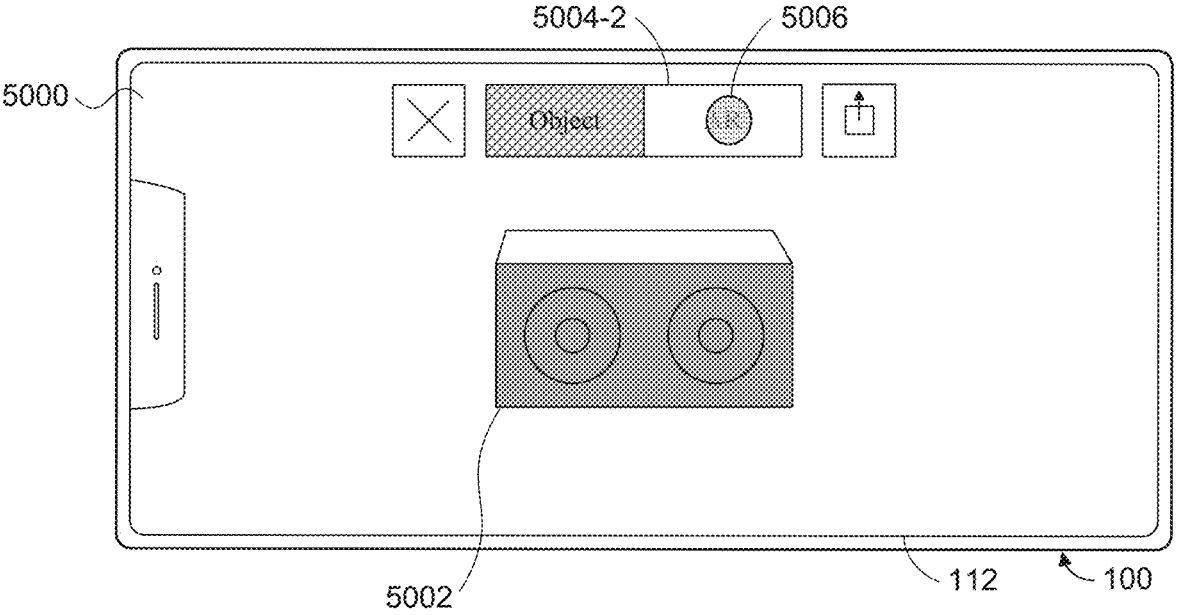
Figure 5A2

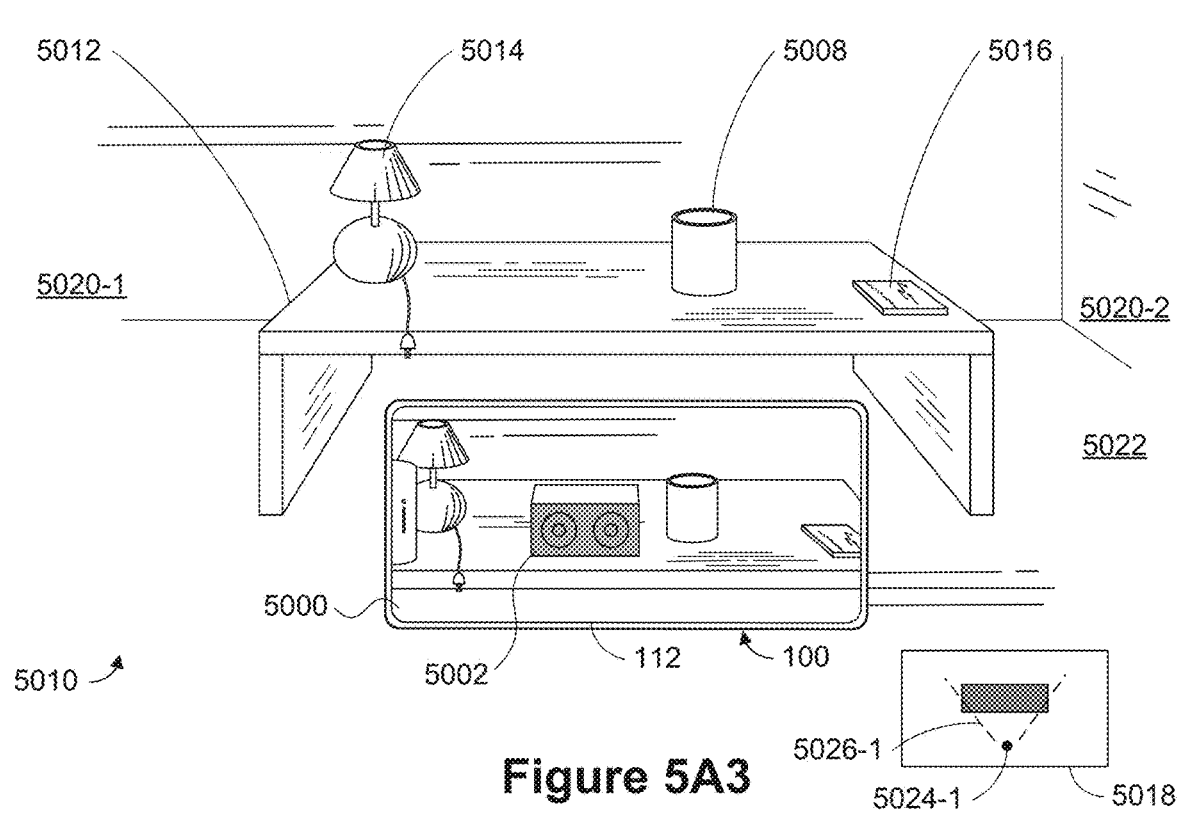
Figure 5A3
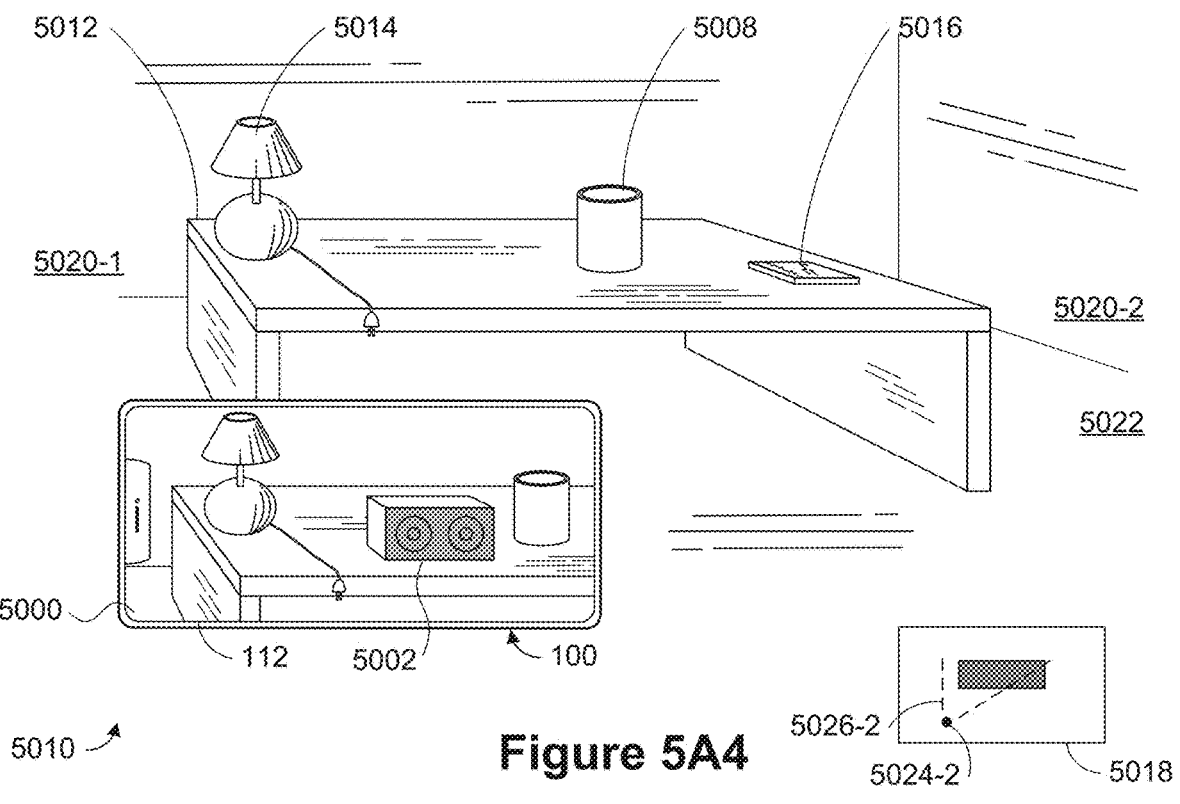
Figure 5A4

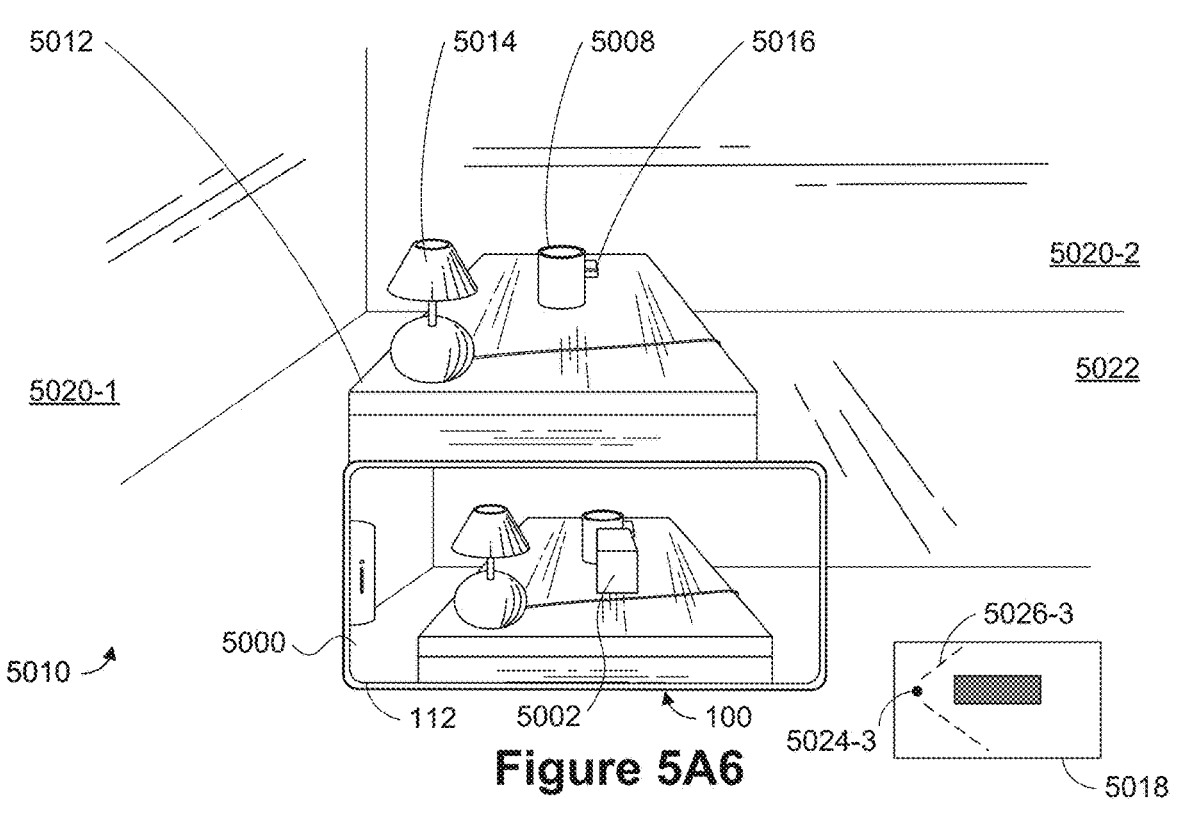
Figure 5A5
Figure 5A6

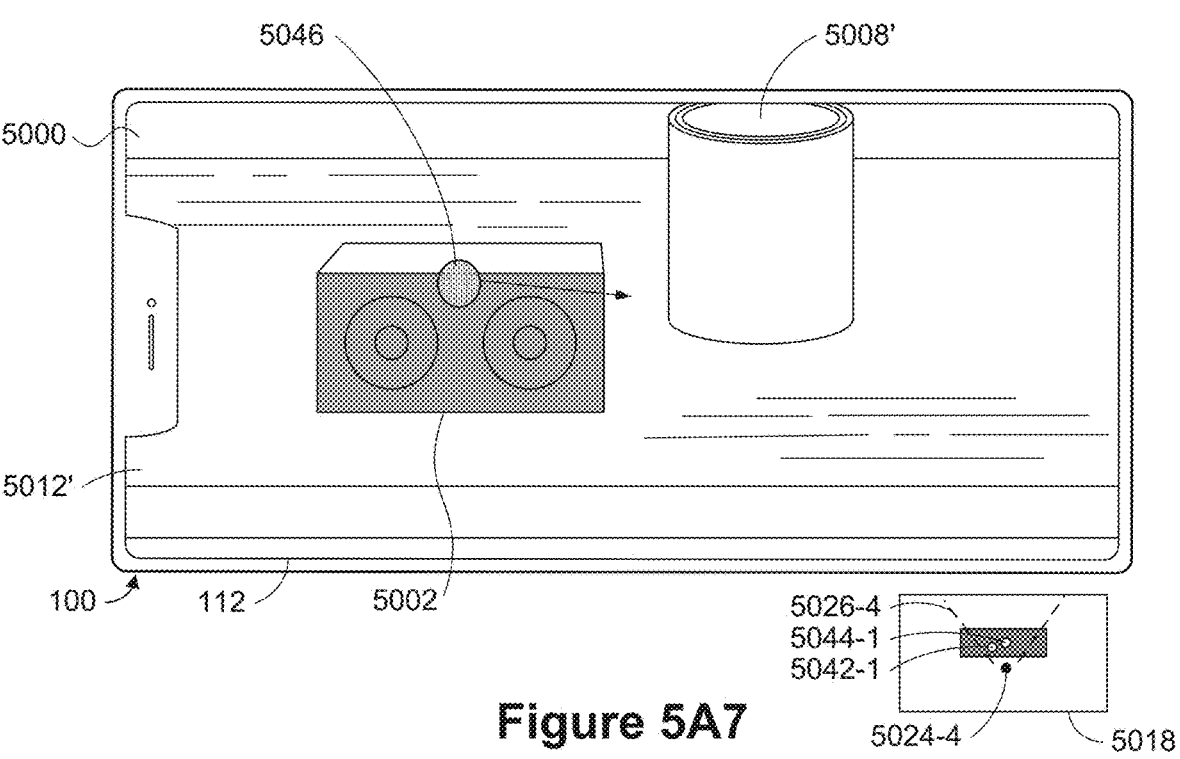
Figure 5A7
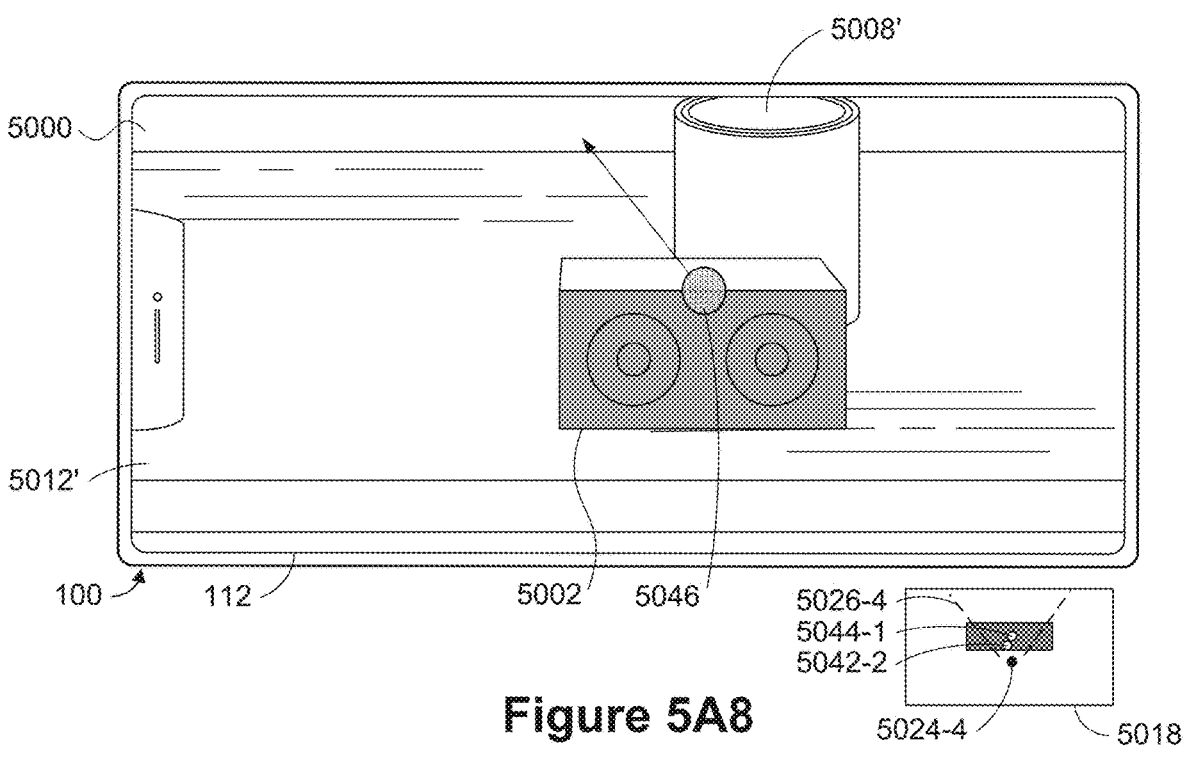
Figure 5A8

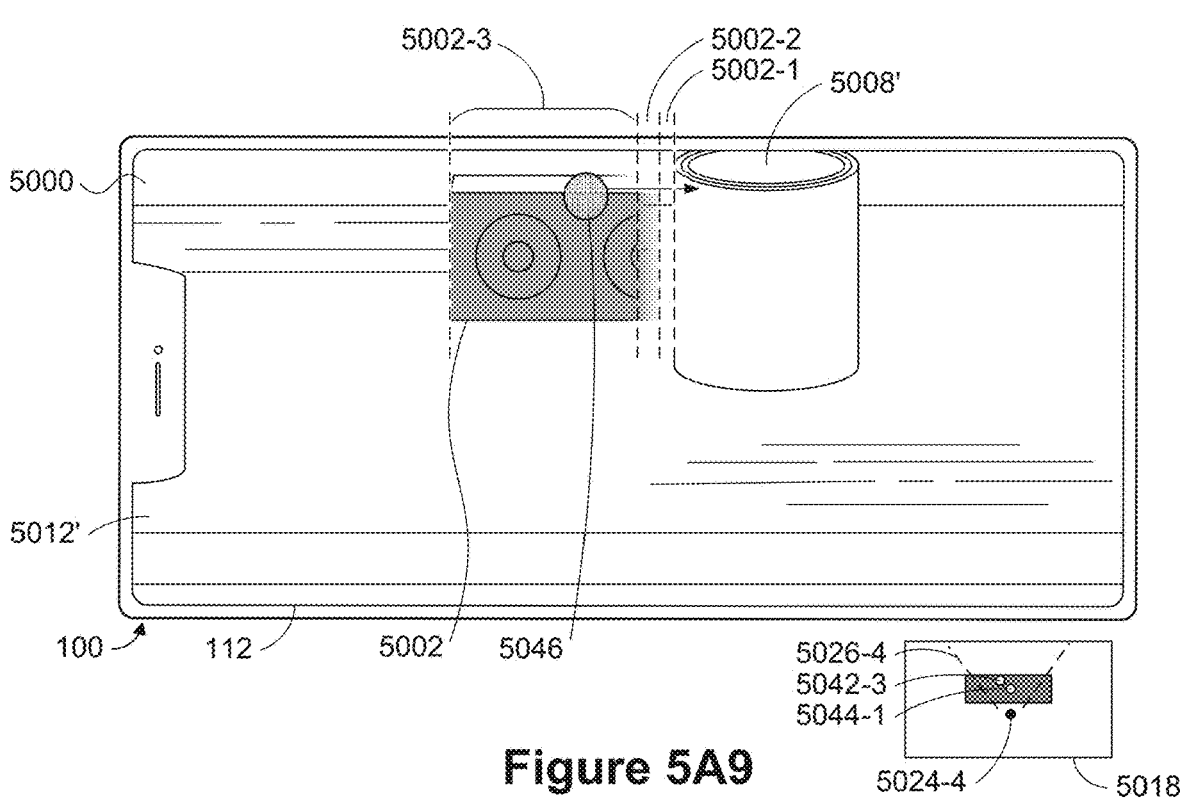
Figure 5A9
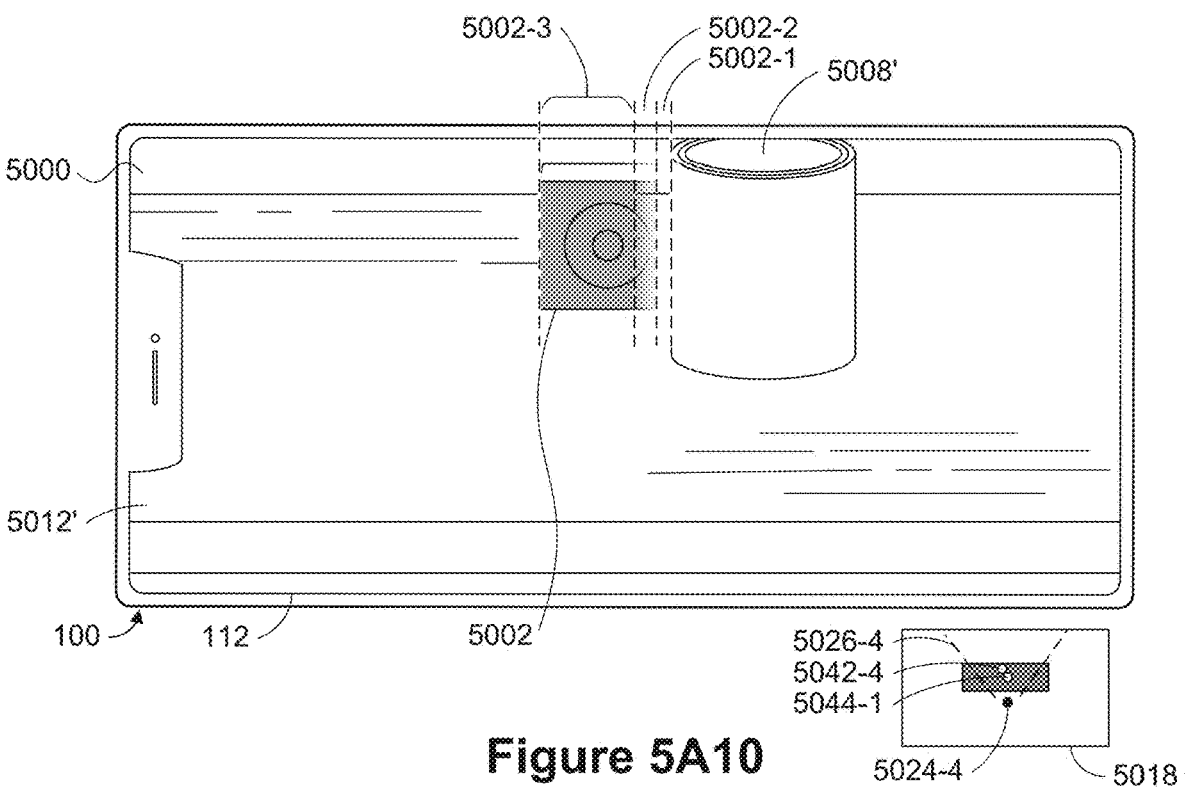
Figure 5A10

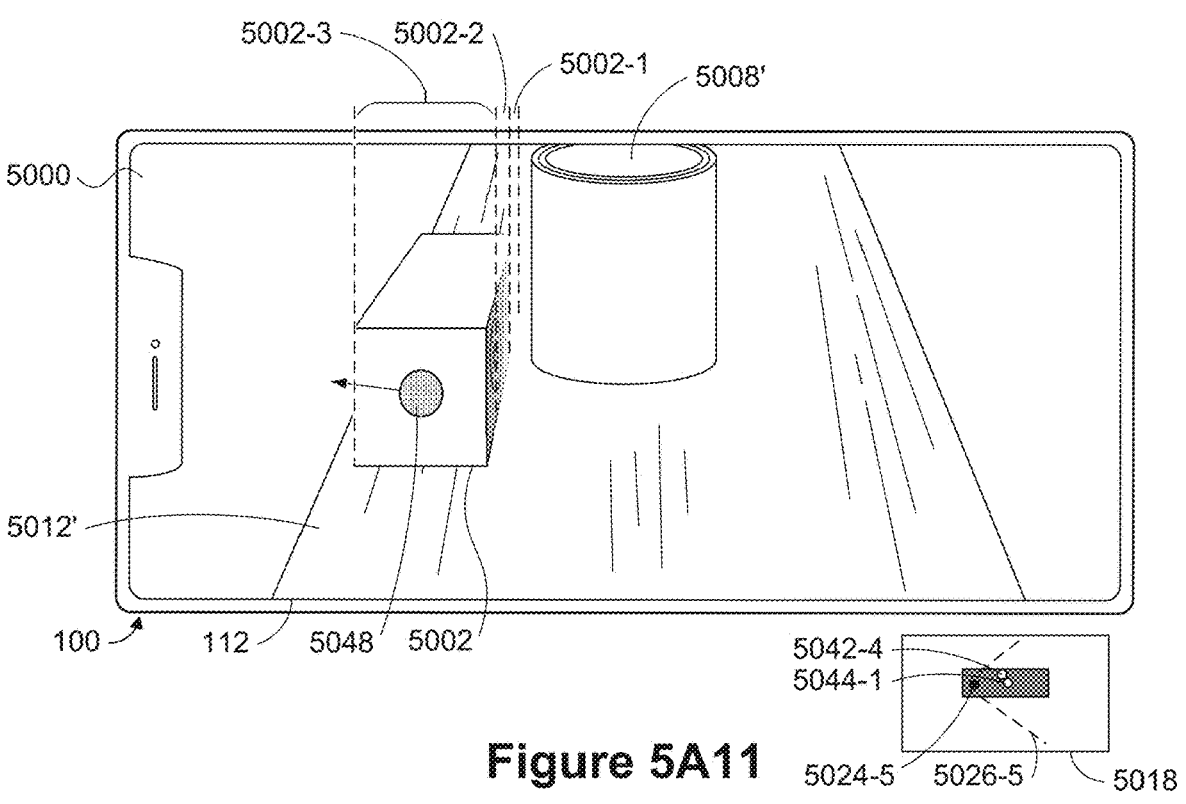
Figure 5A11
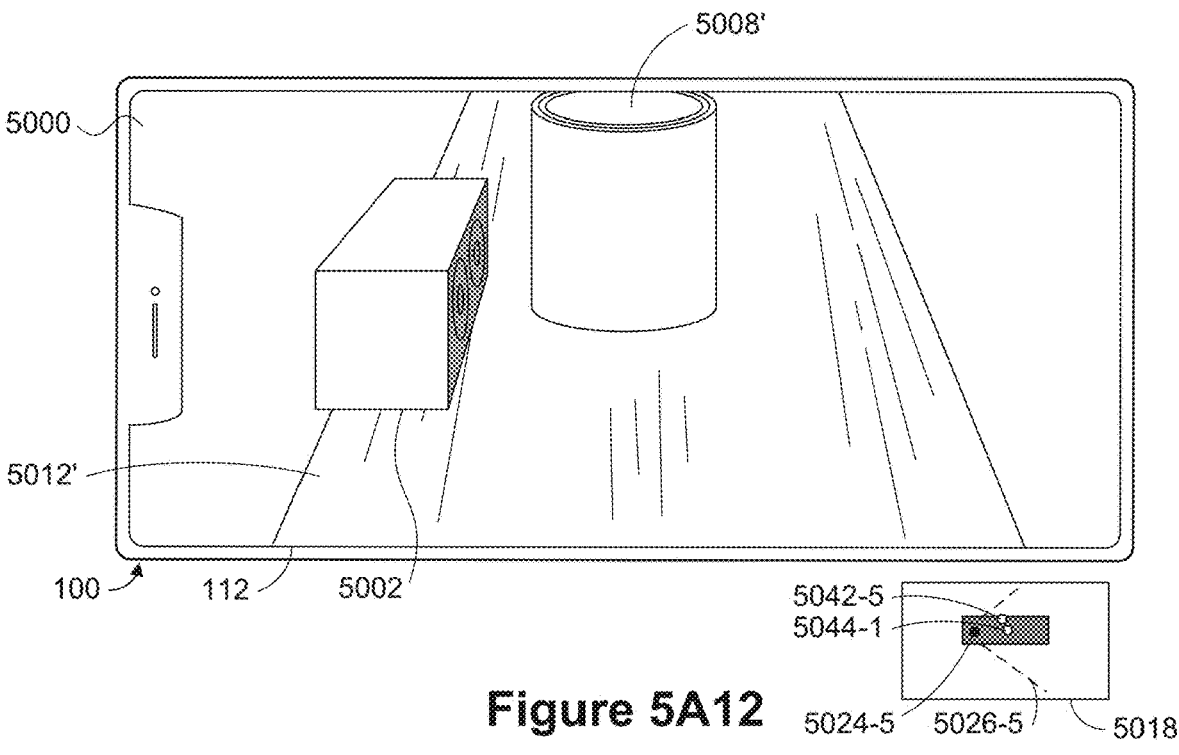
Figure 5A12

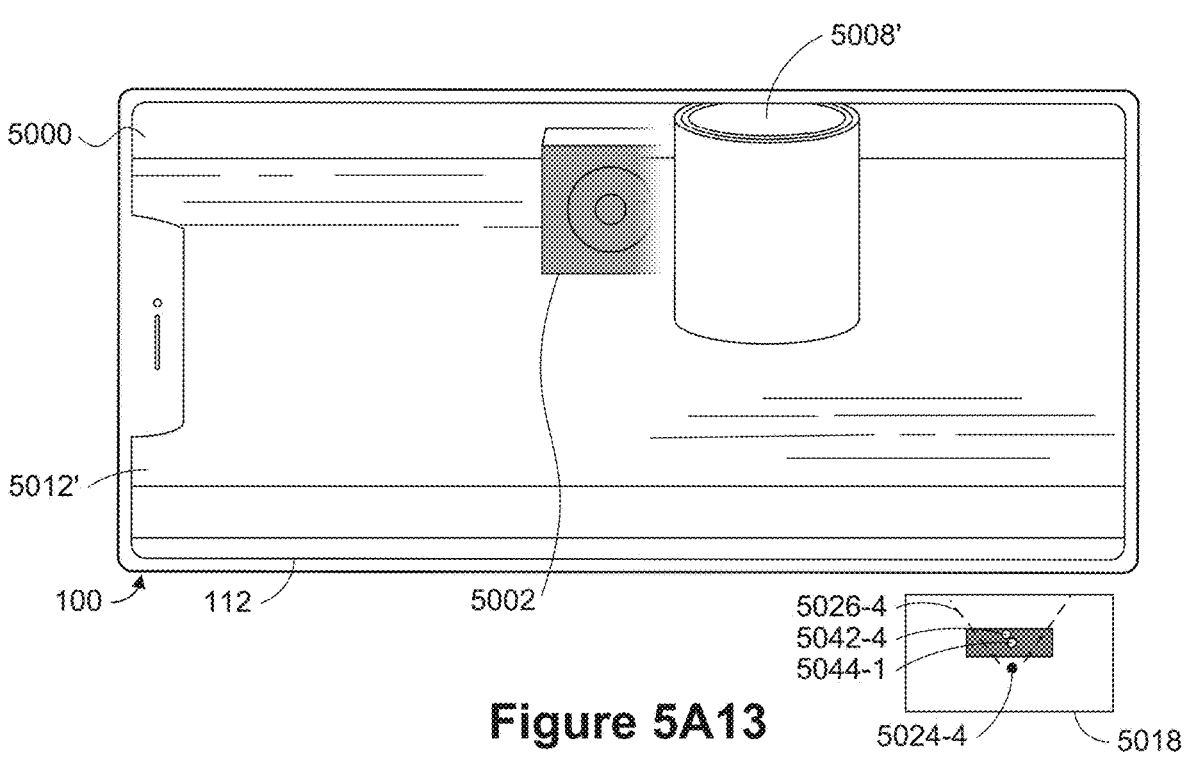
Figure 5A13
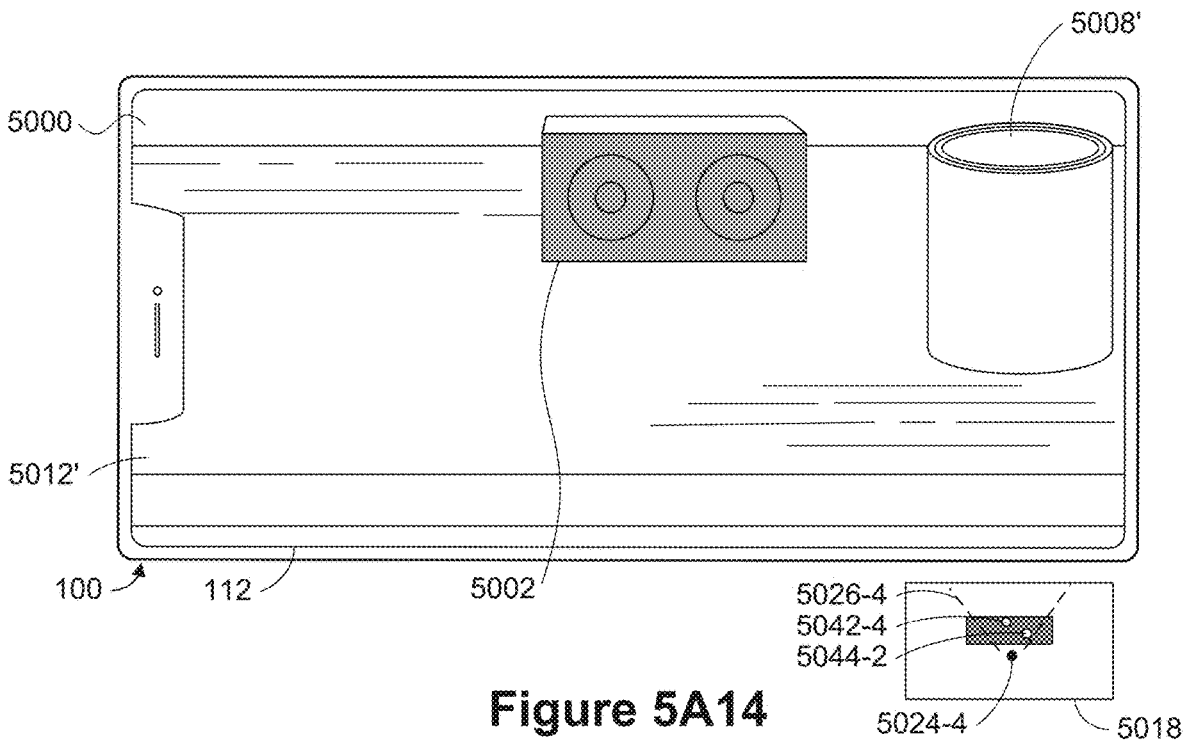
Figure 5A14

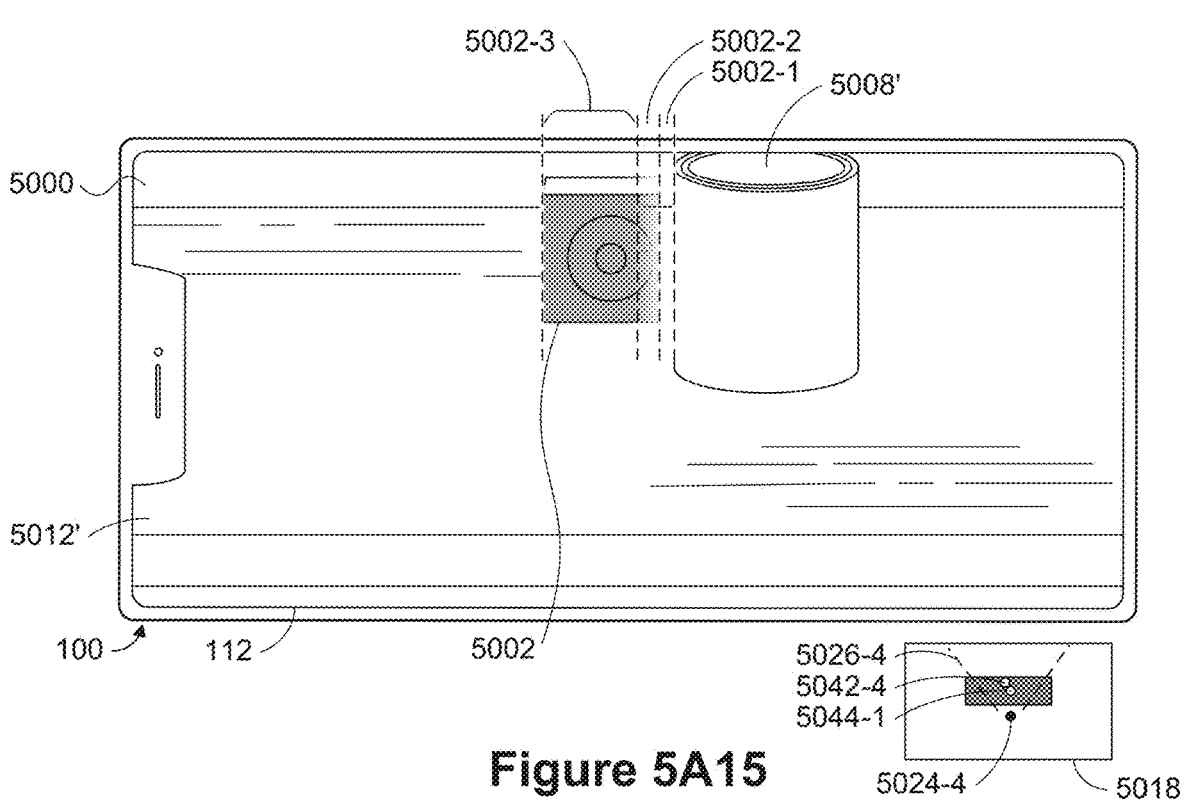
Figure 5A15
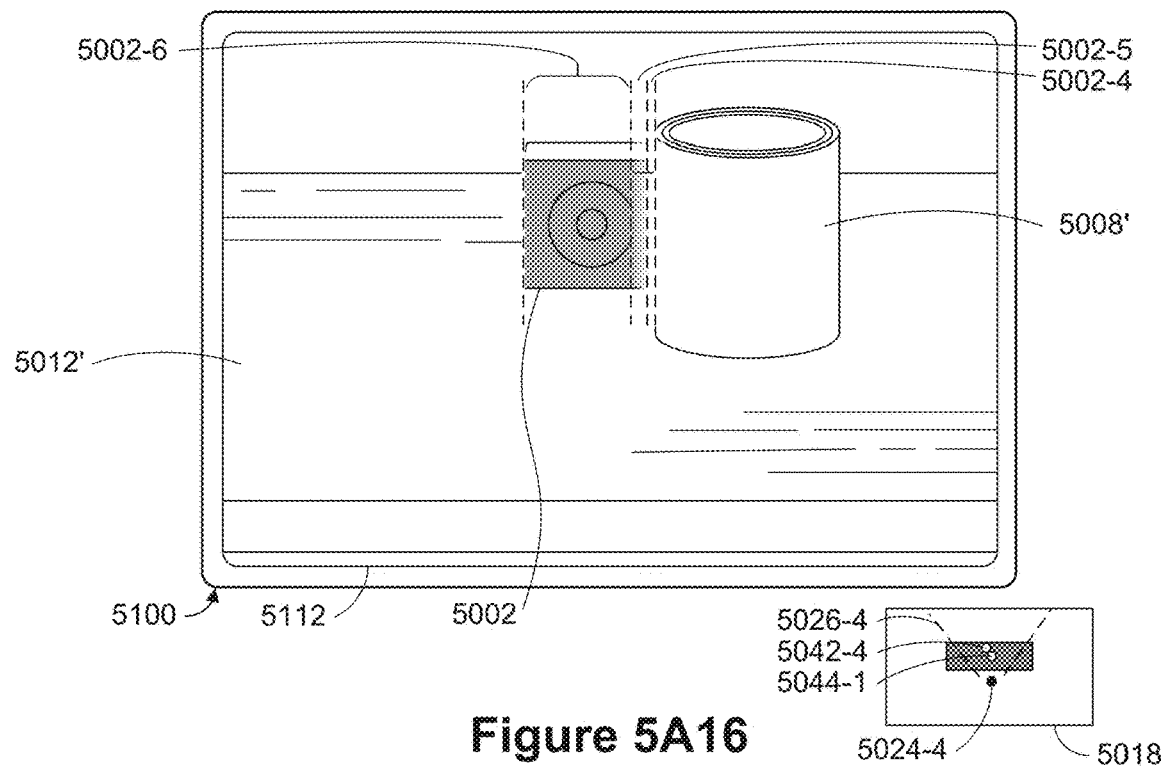
Figure 5A16

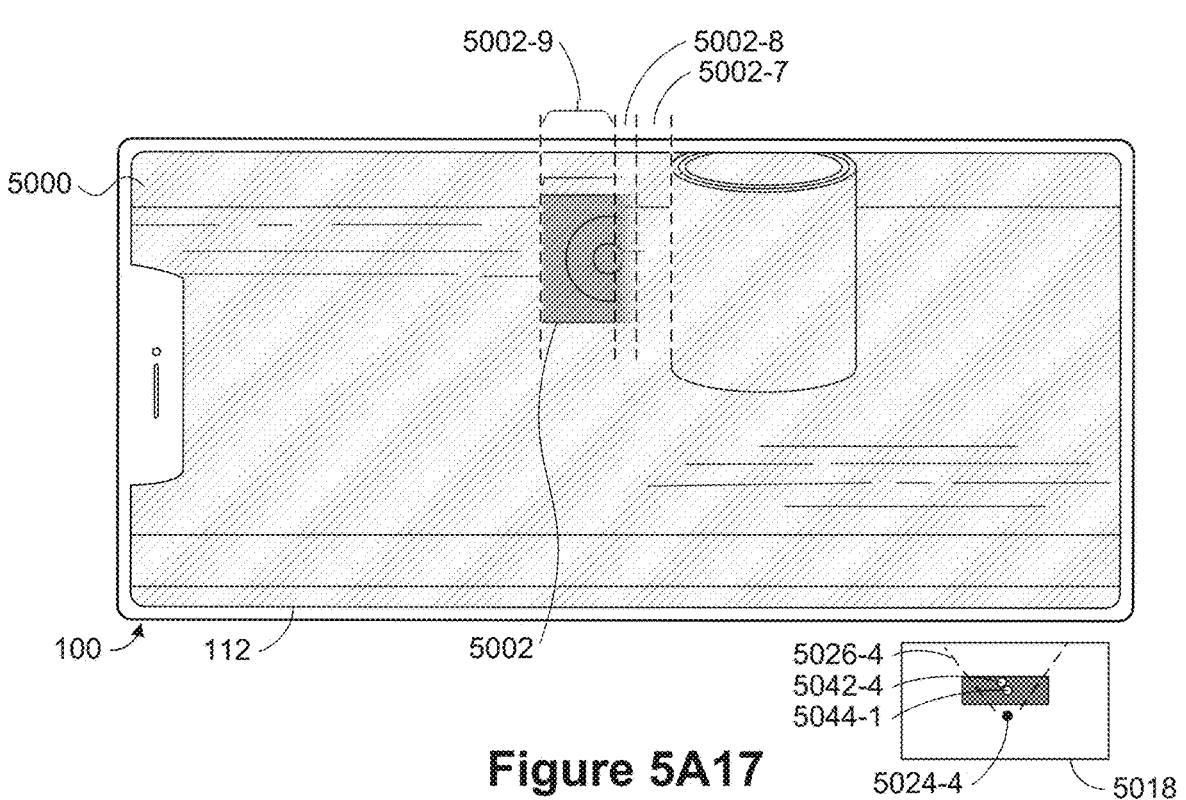
Figure 5A17
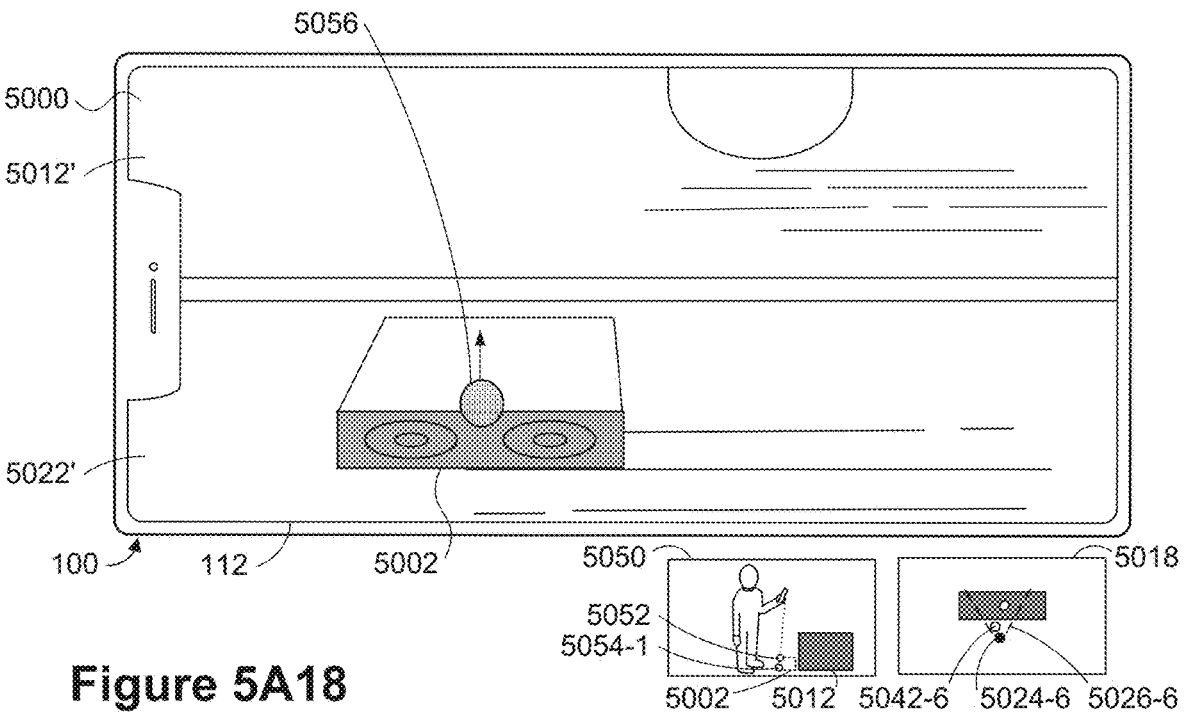
Figure 5A18

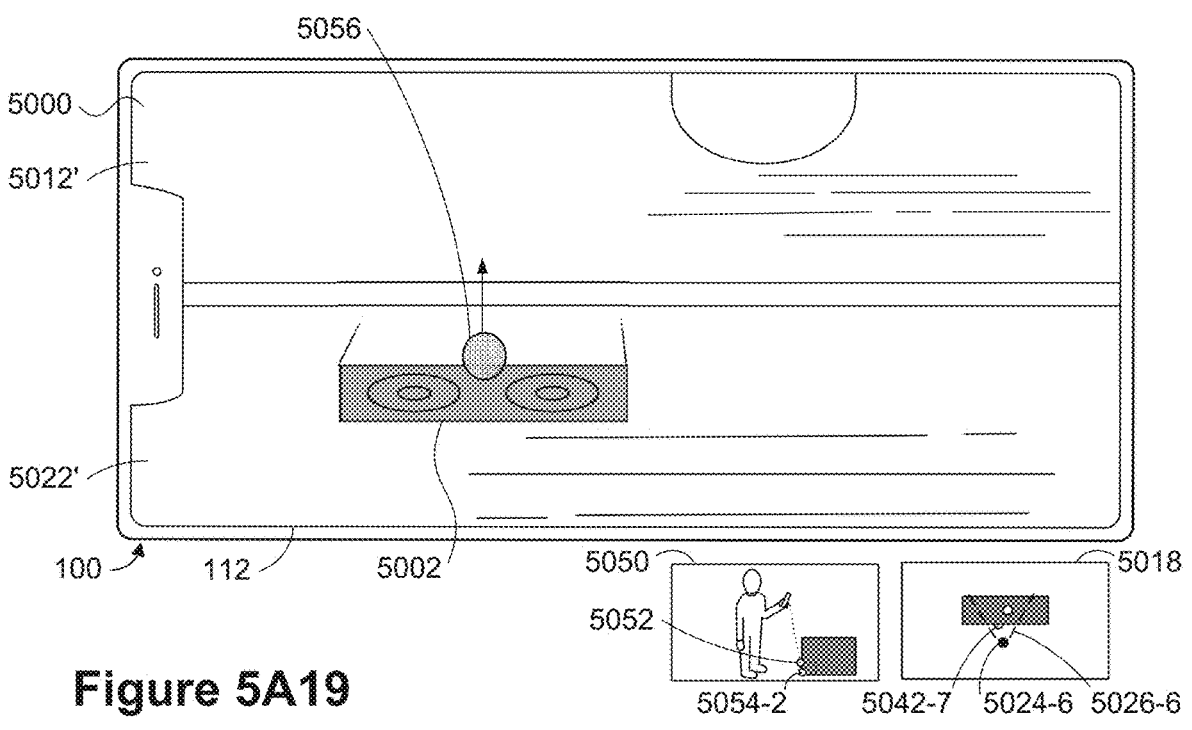
Figure 5A19
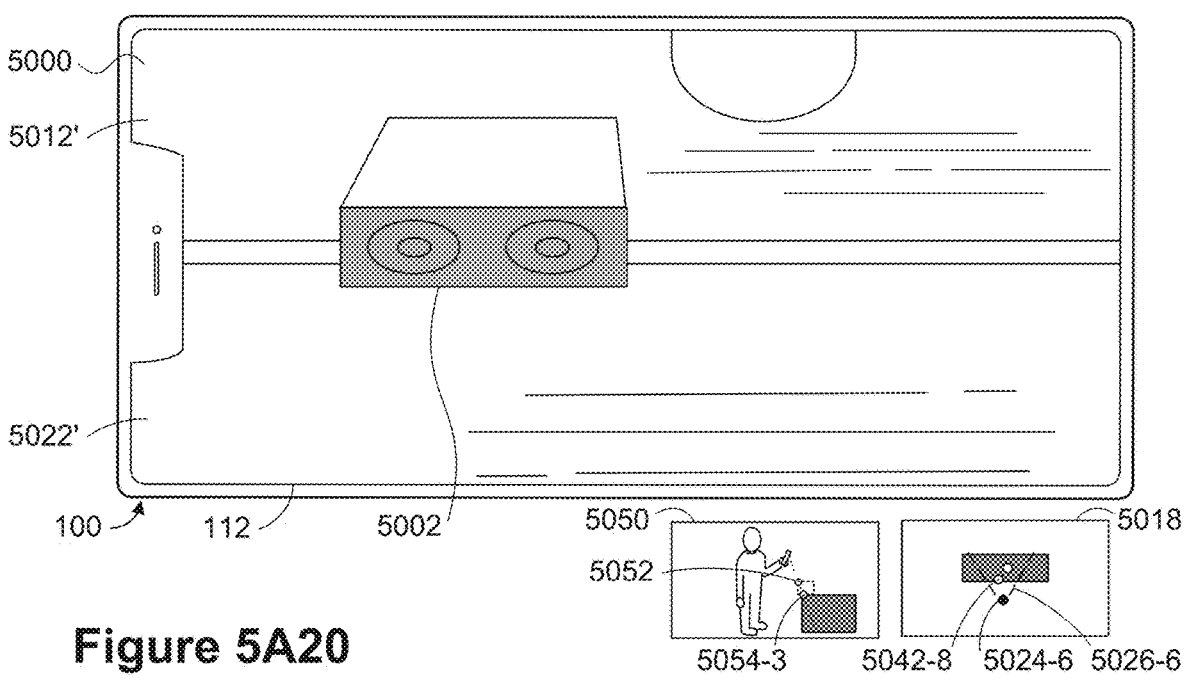
Figure 5A20

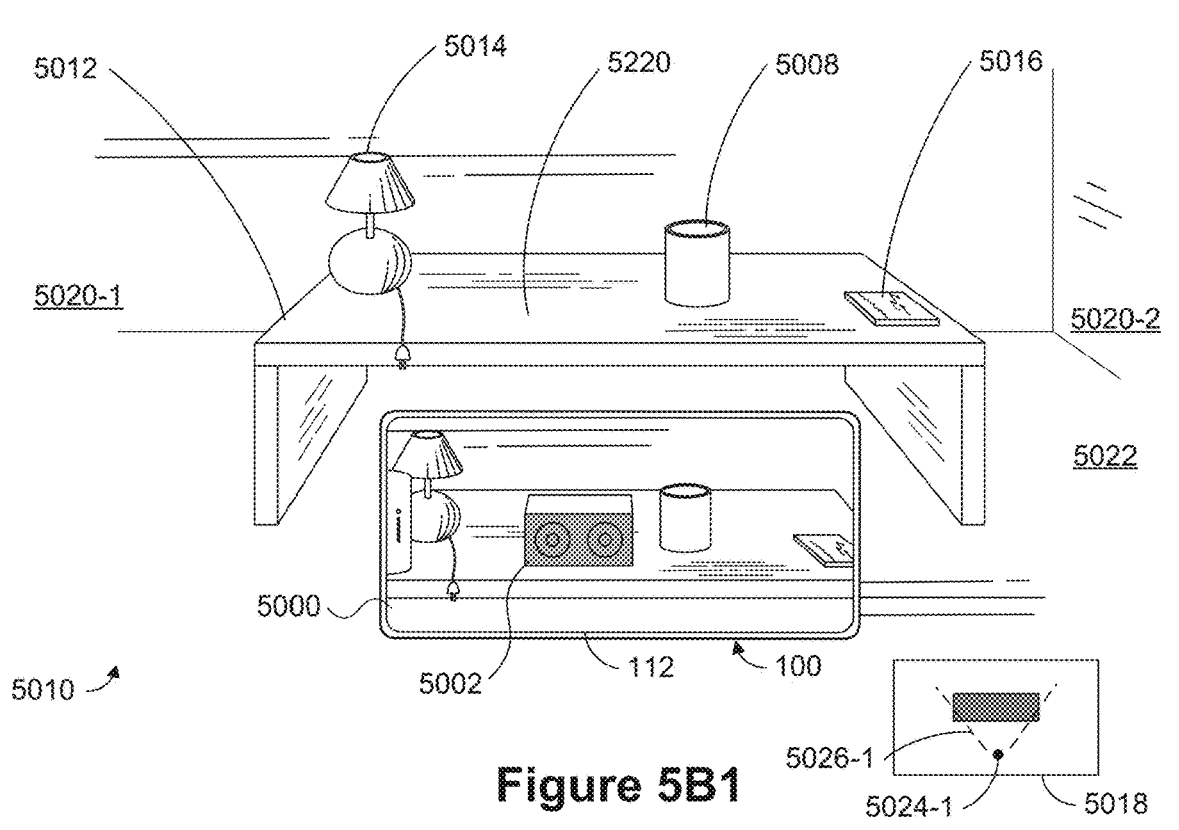
Figure 5B1
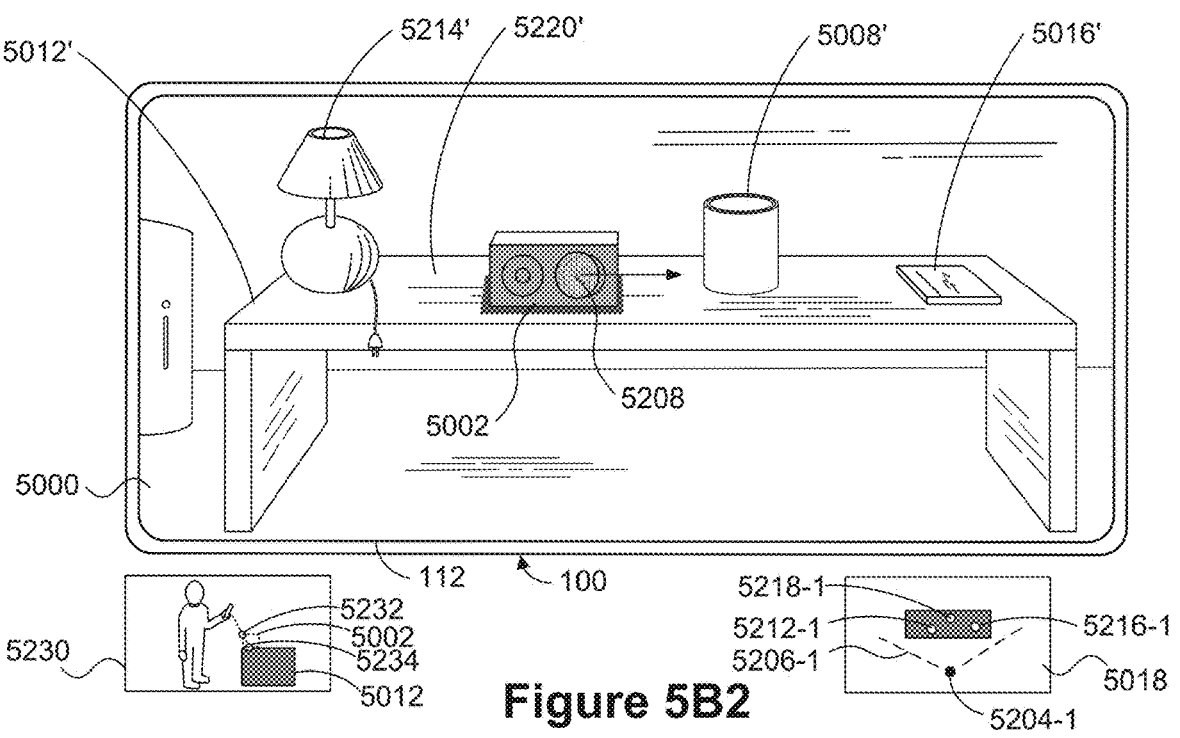
Figure 5B2

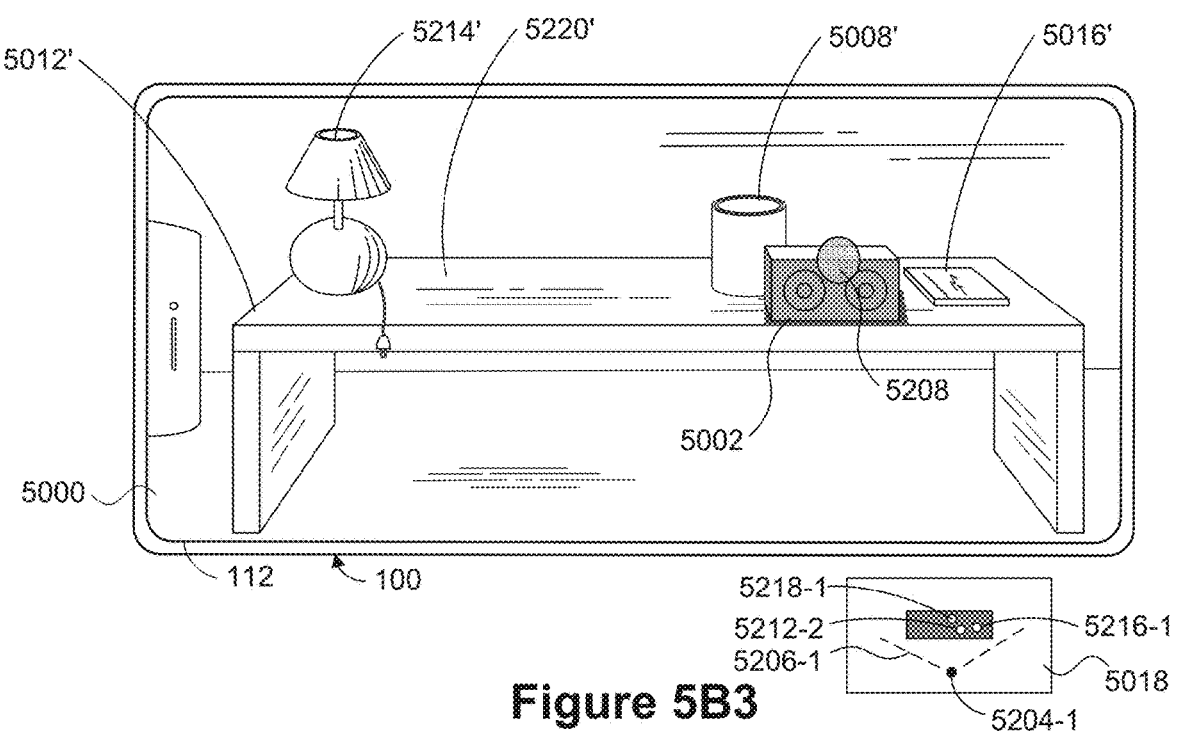
Figure 5B3
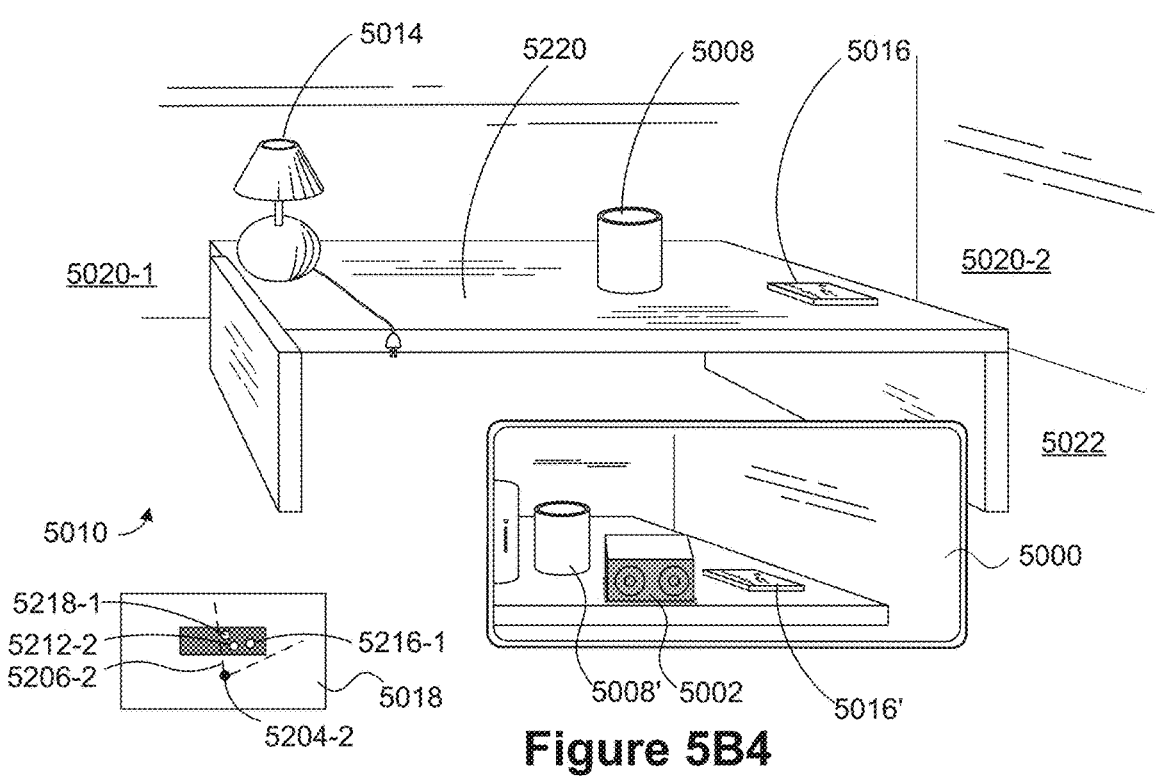
Figure 5B4

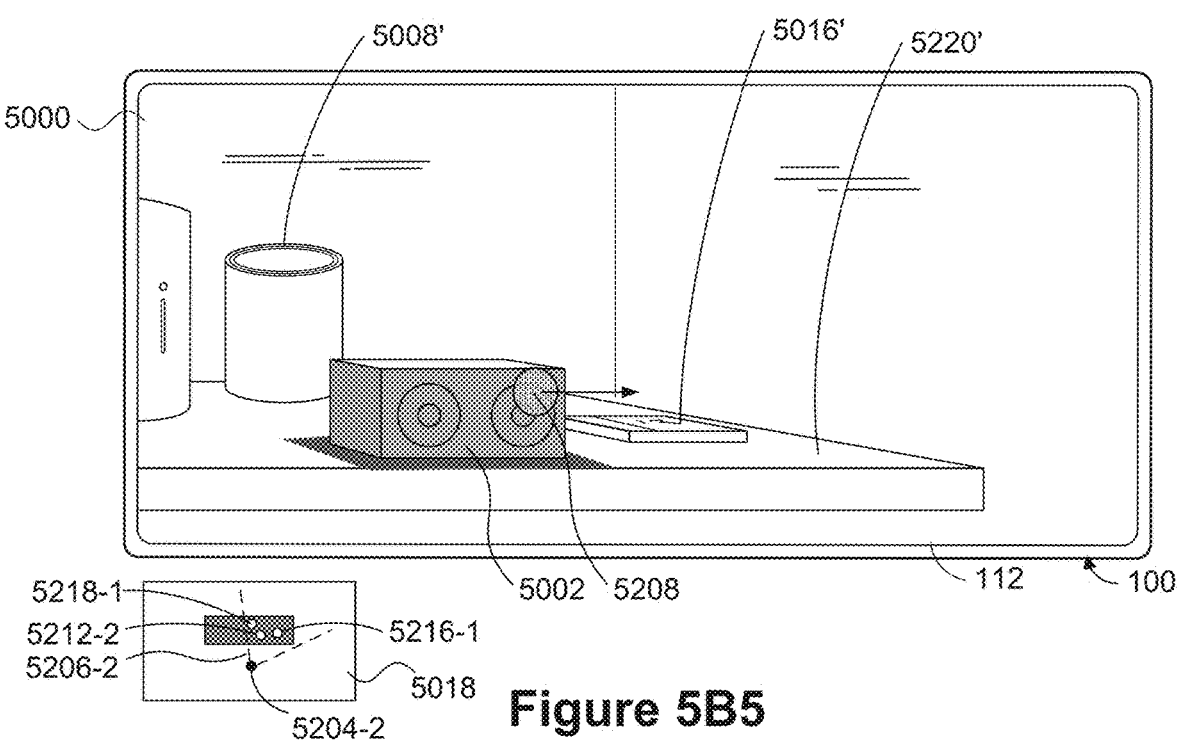
Figure 5B5
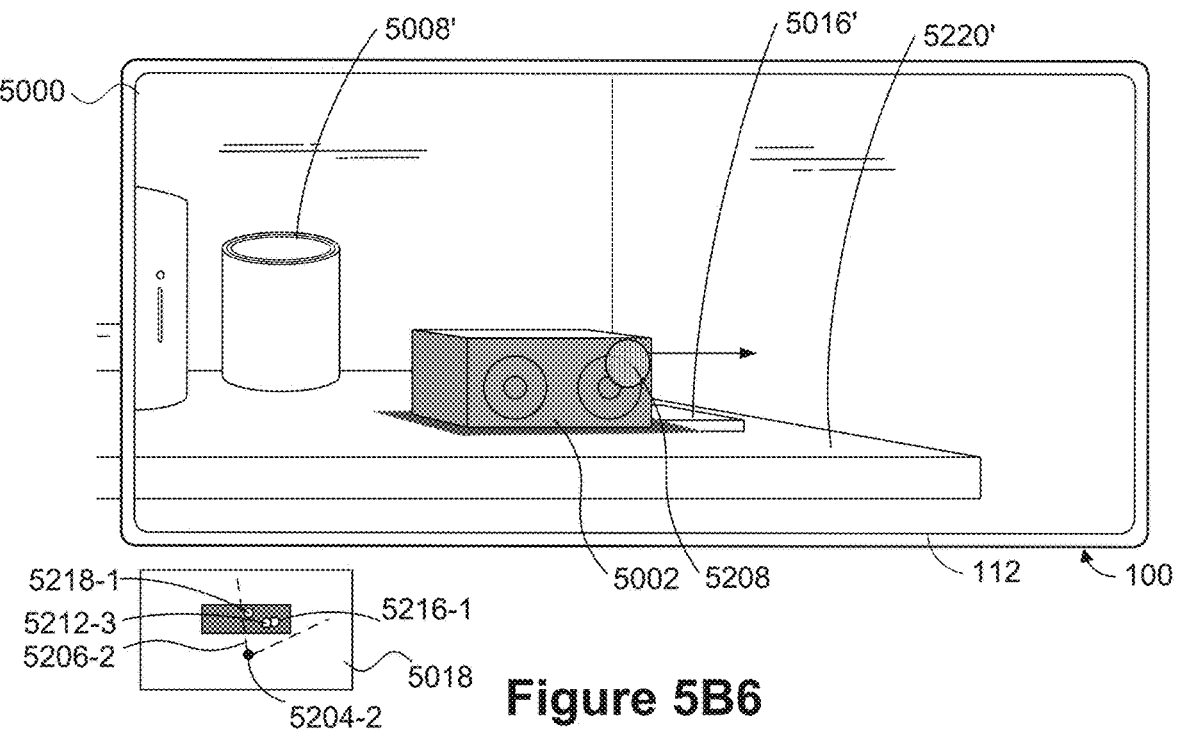
Figure 5B6

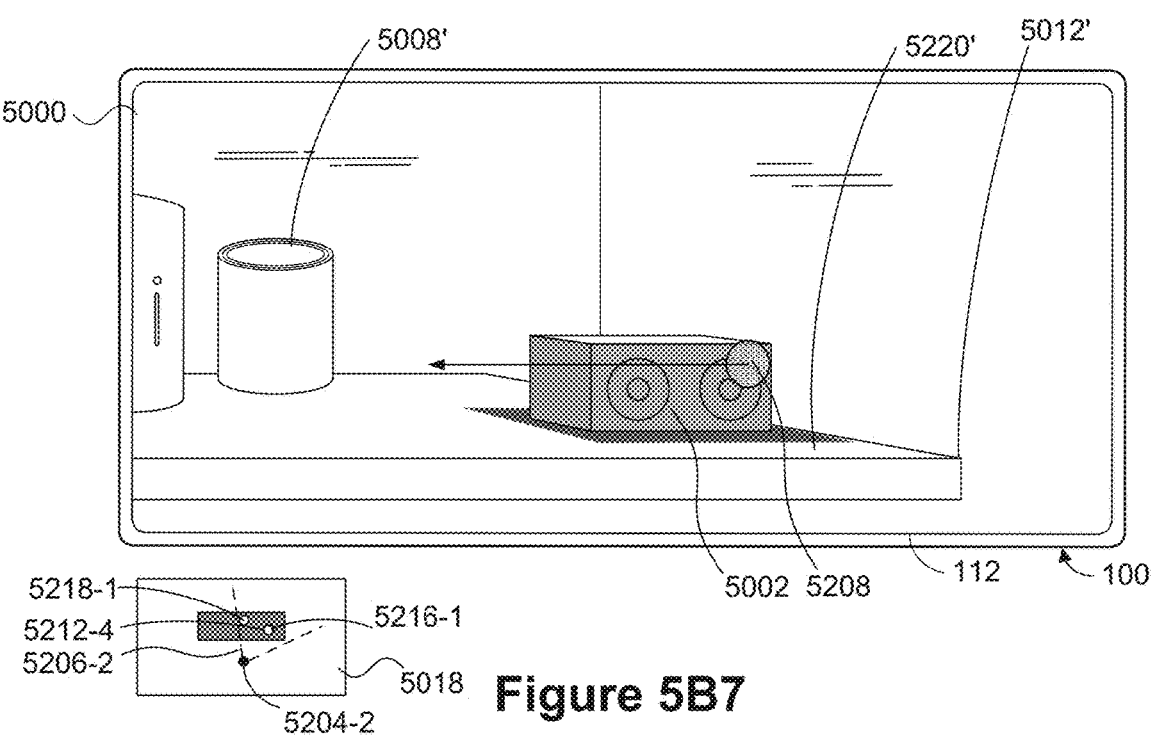
Figure 5B7
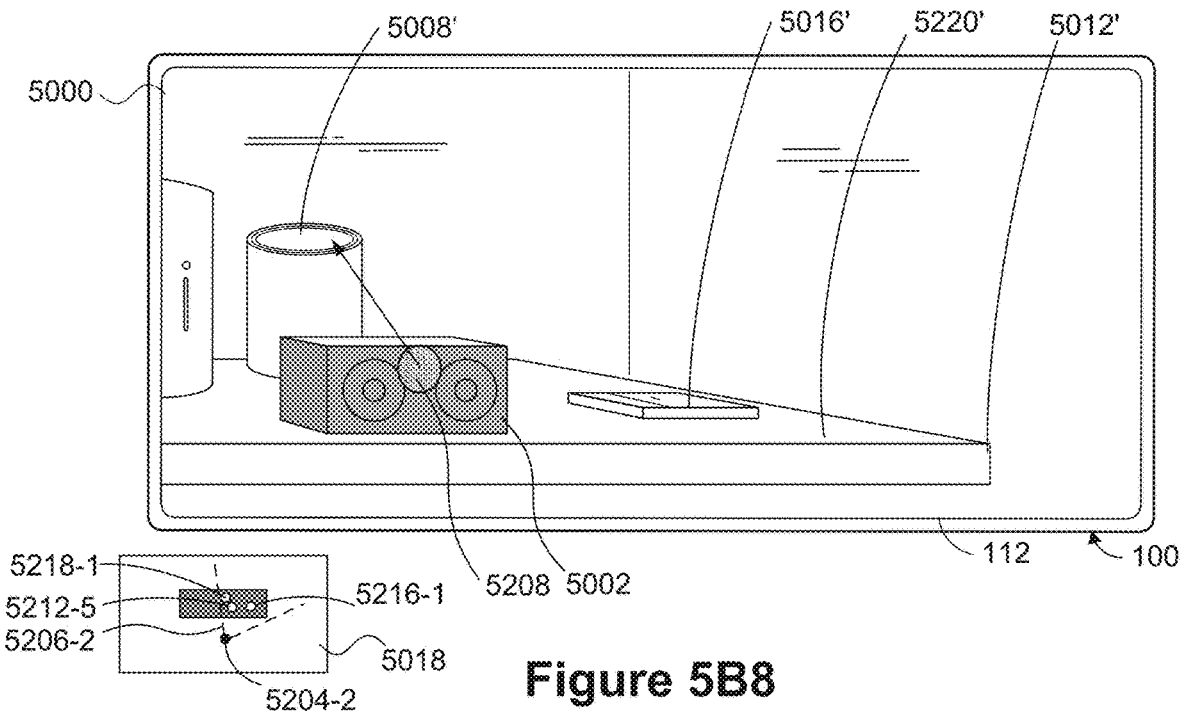
Figure 5B8

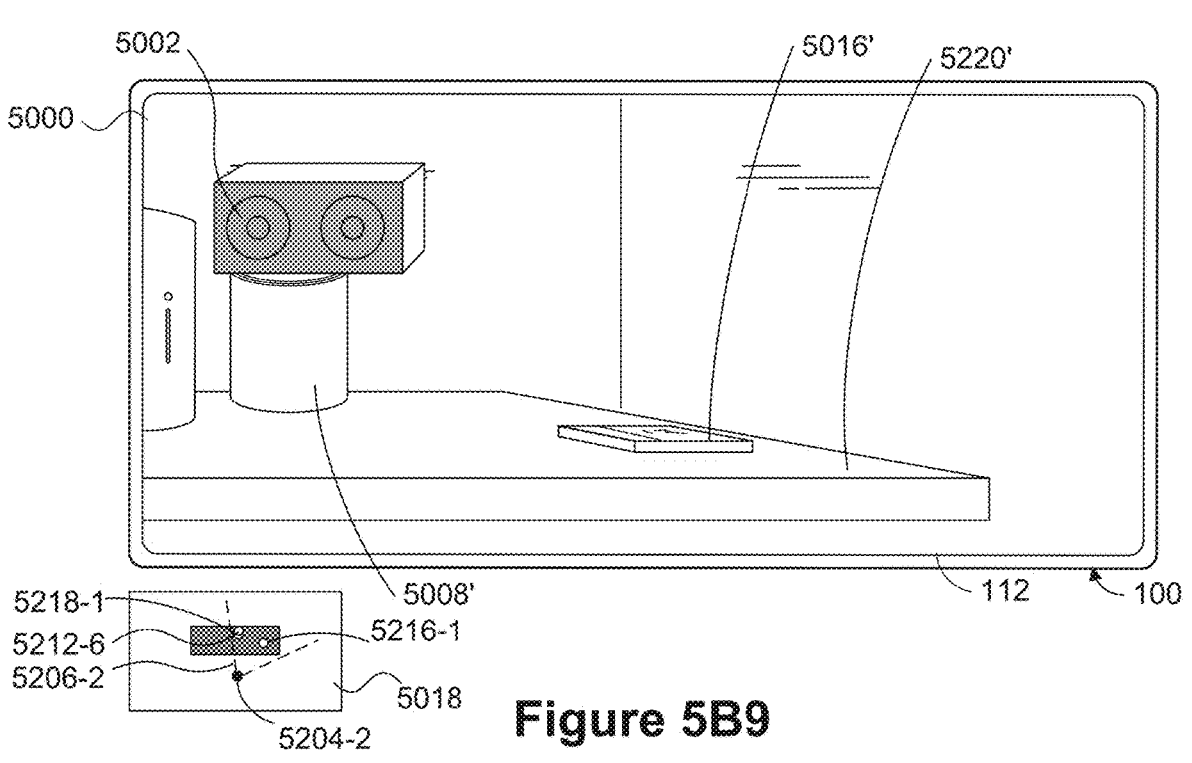
Figure 5B9
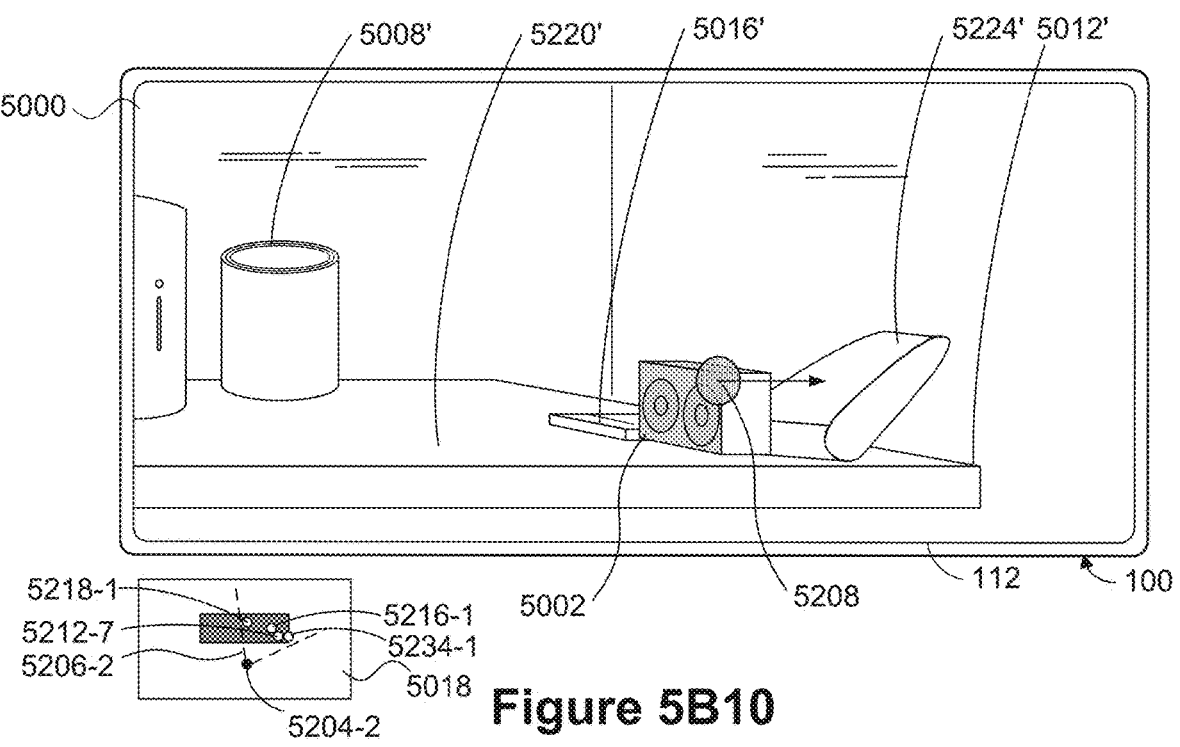
Figure 5B10

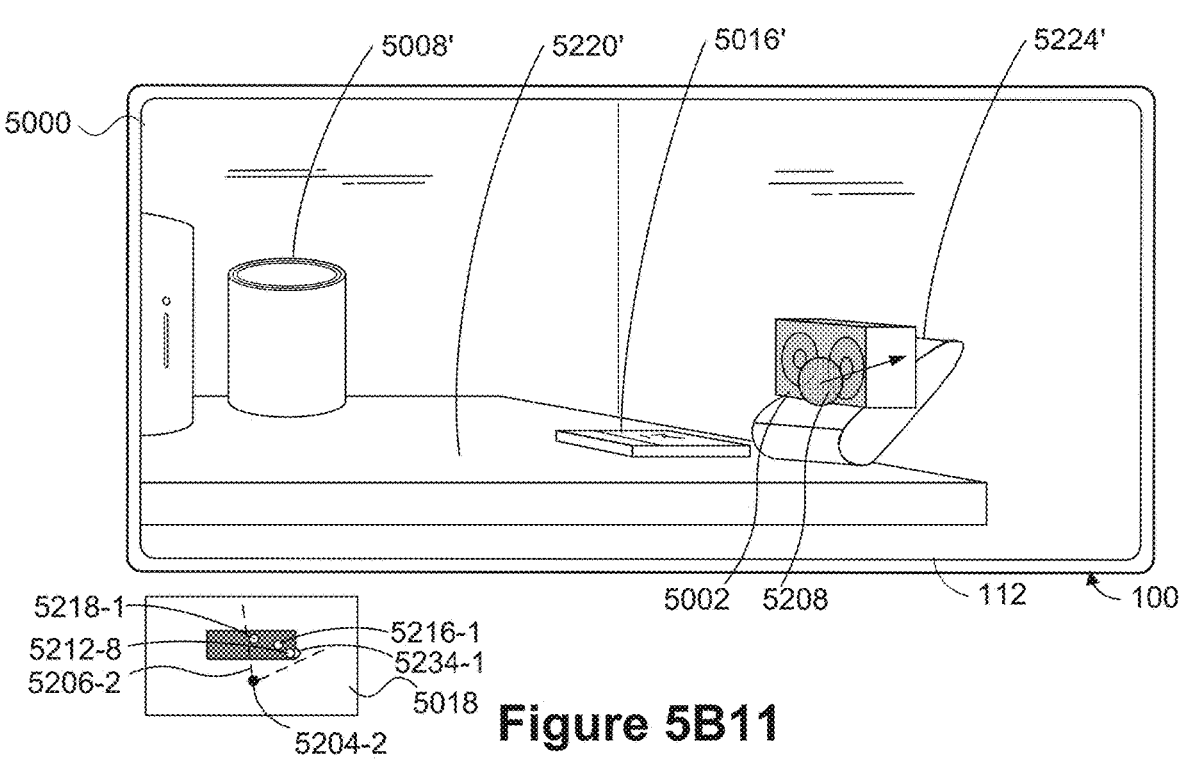
Figure 5B11
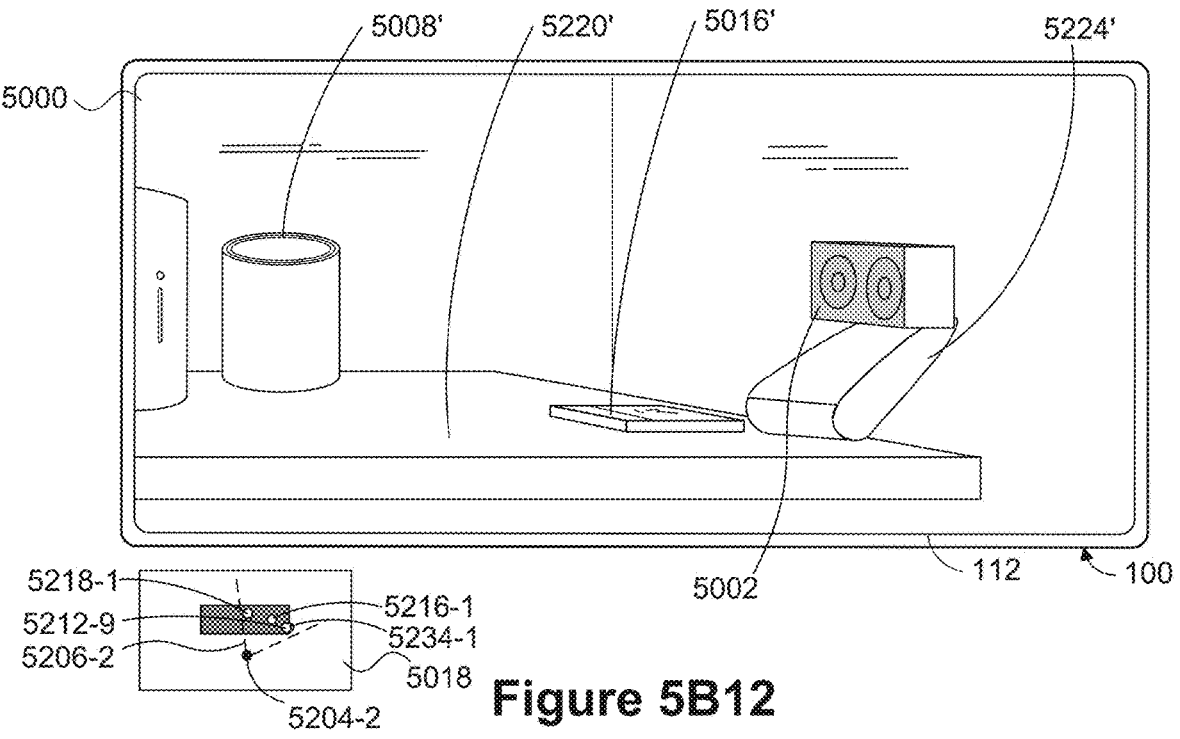
Figure 5B12

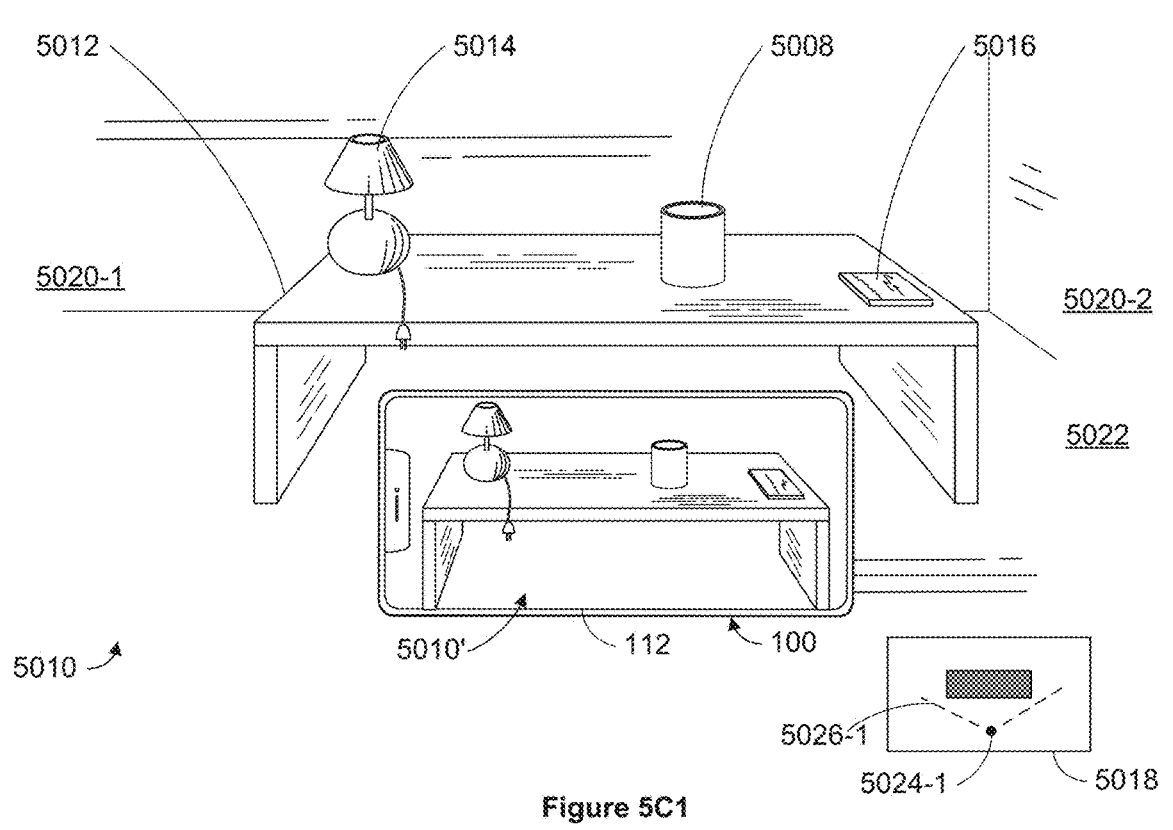
Figure 5C1
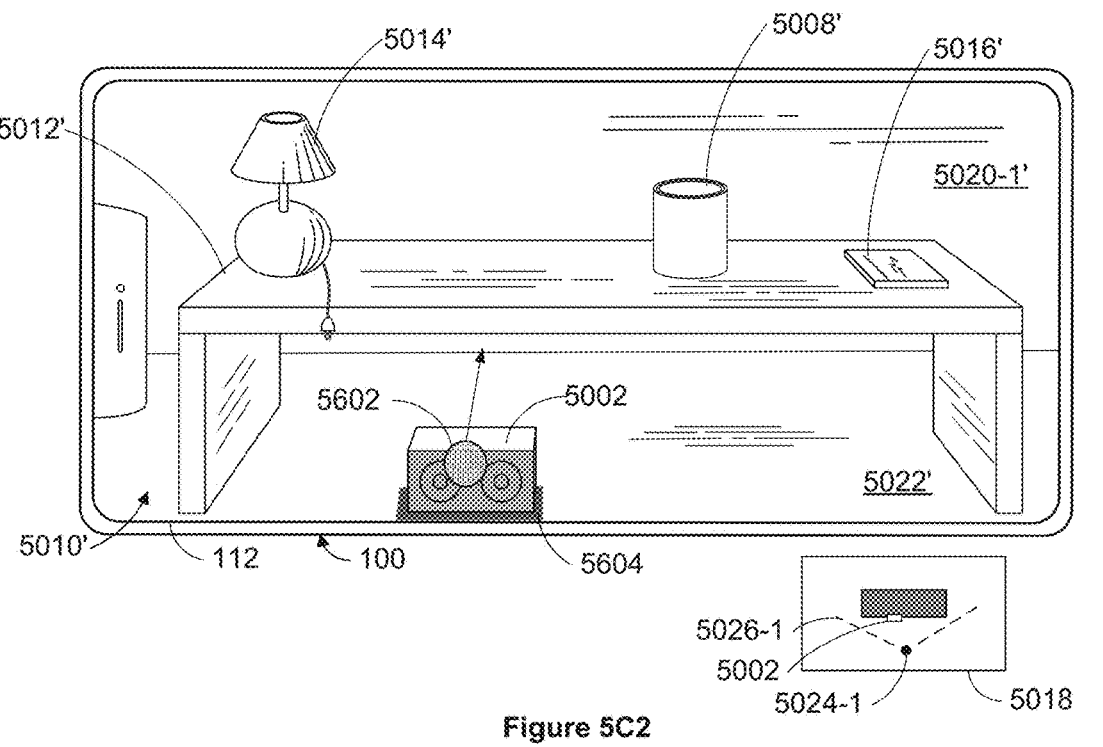
Figure 5C2

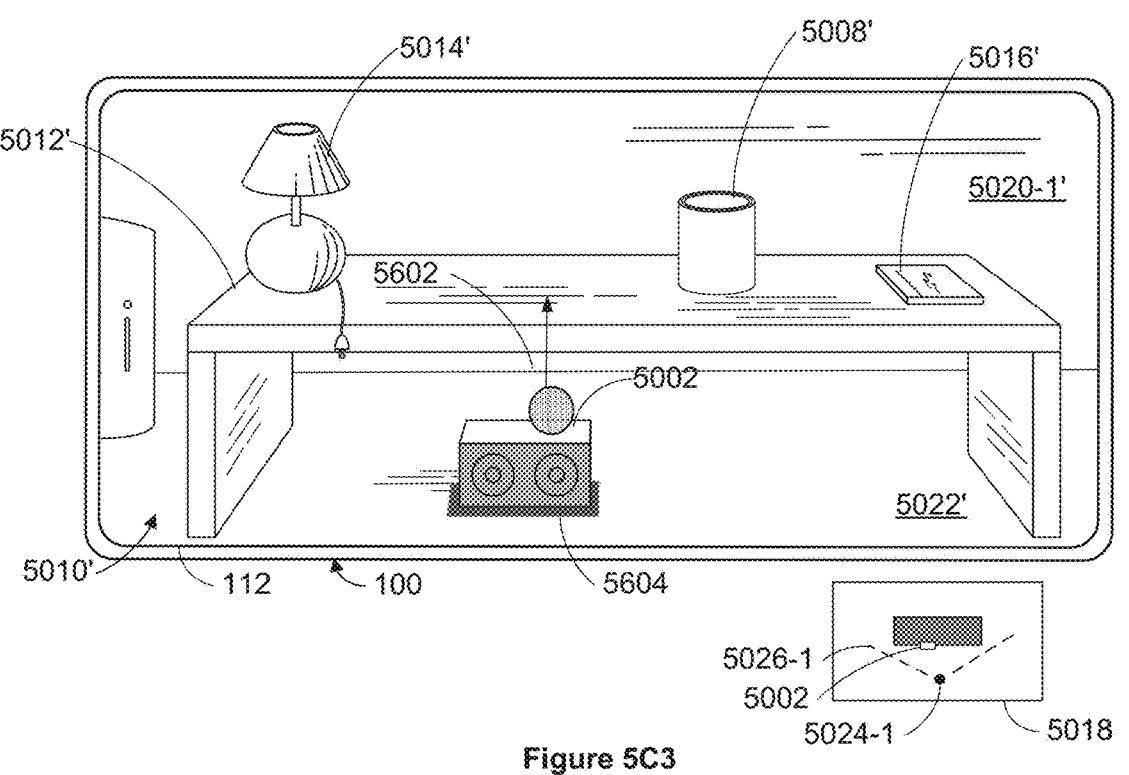
Figure 5C3
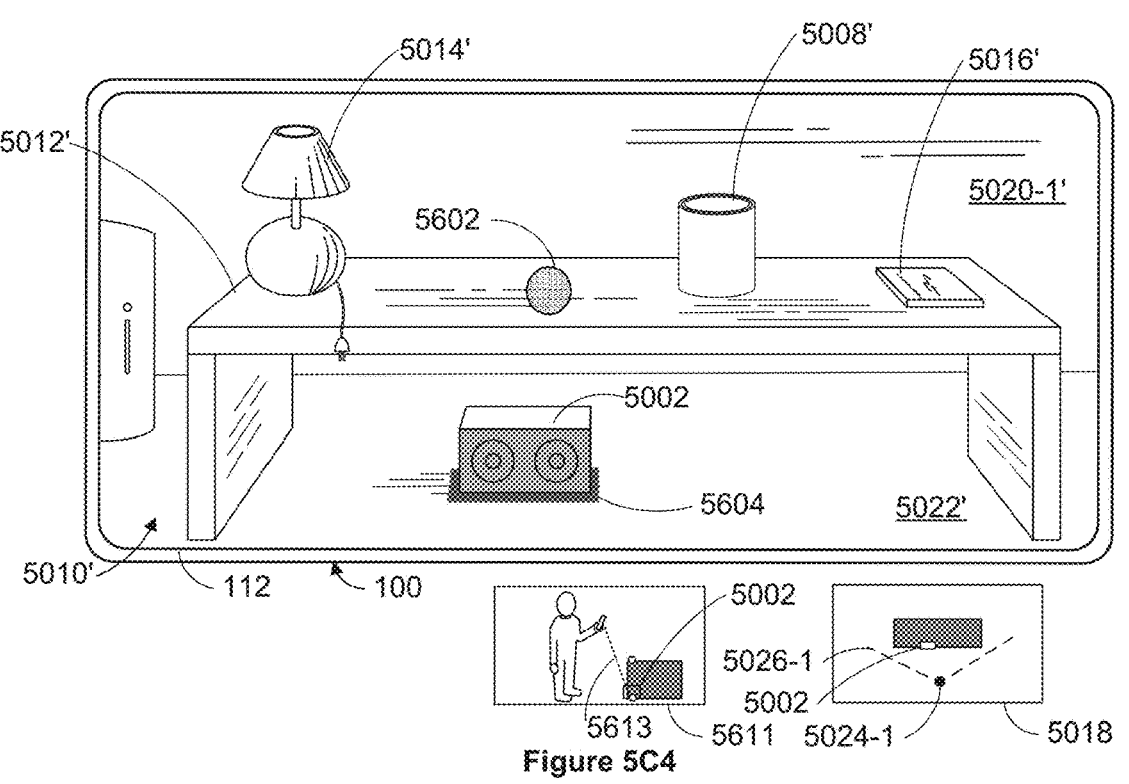
Figure 5C4

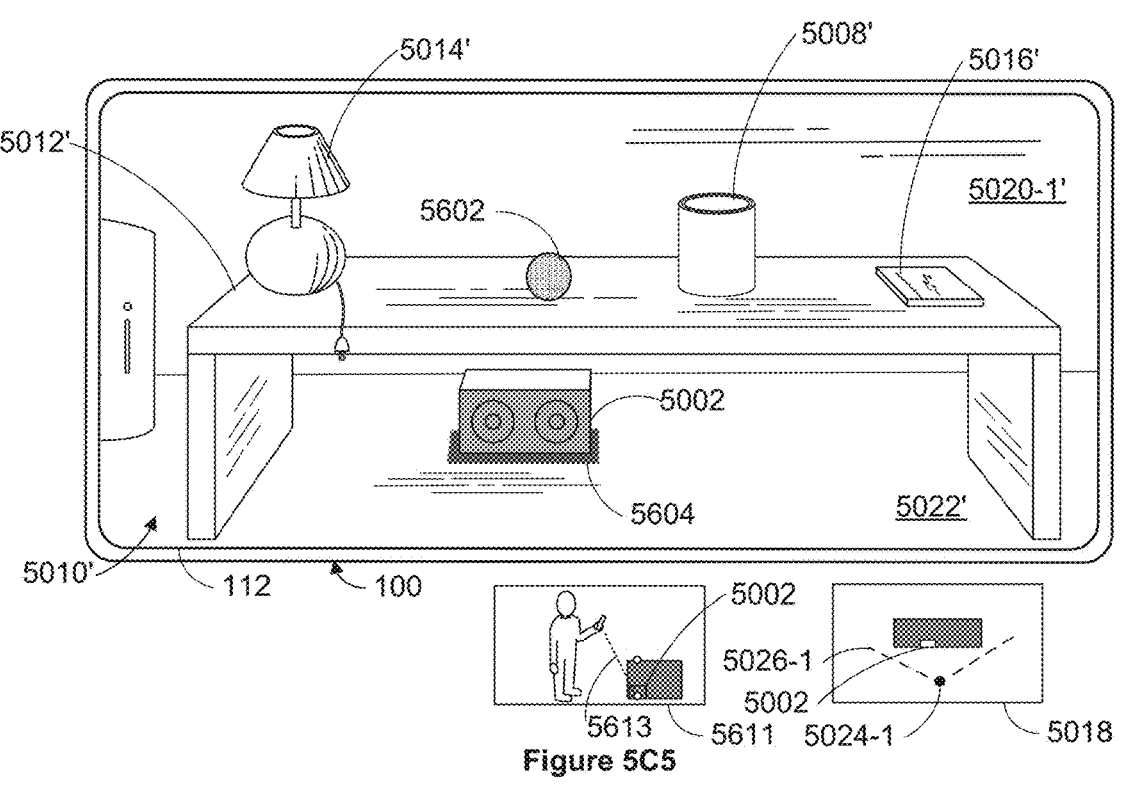
Figure 5C5
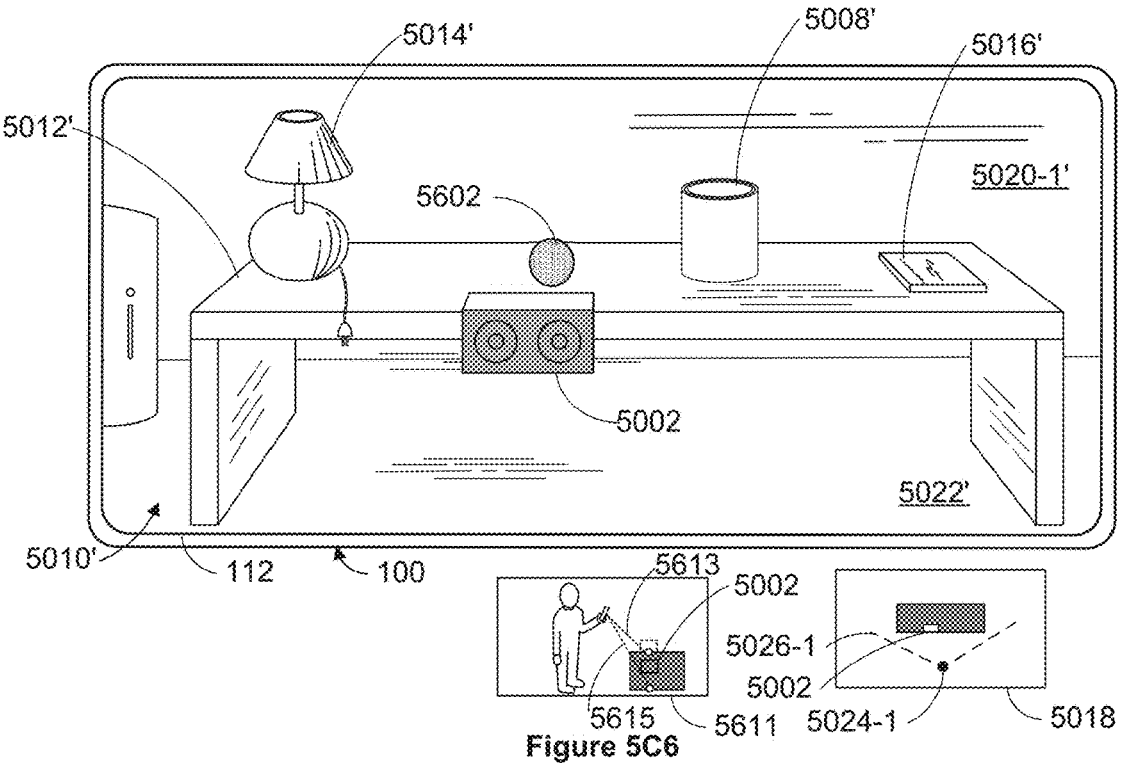
Figure 5C6

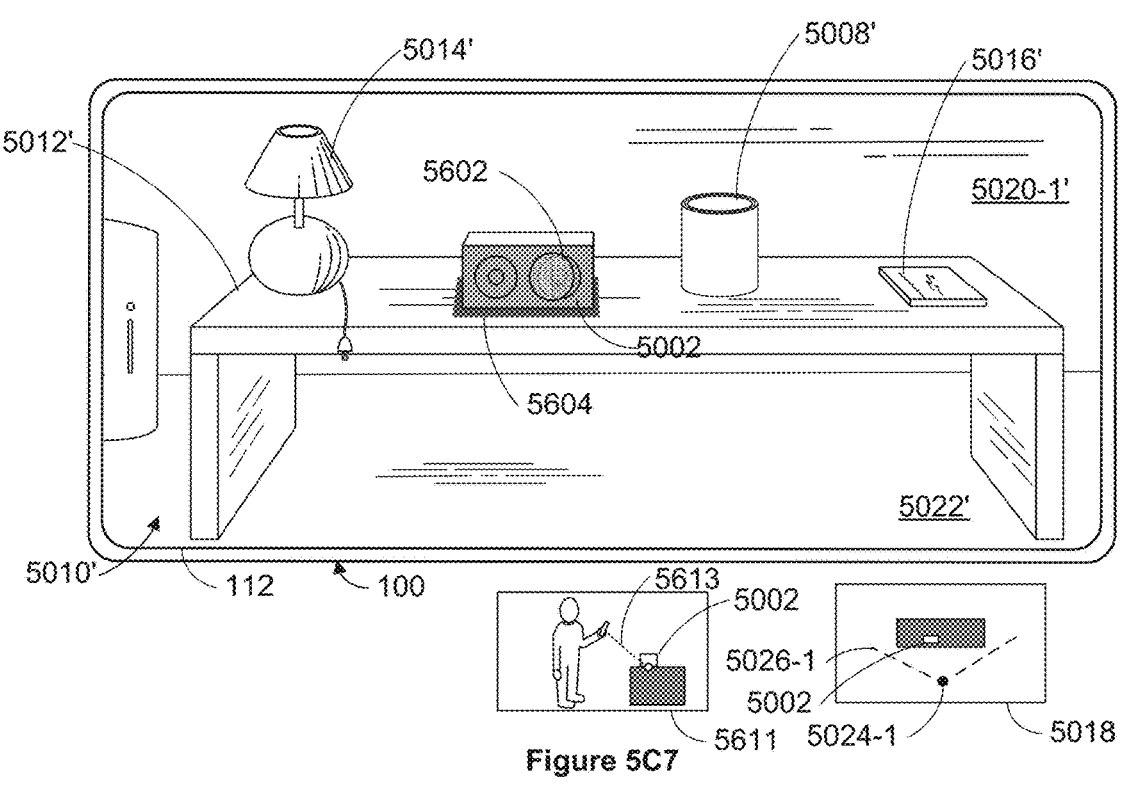
Figure 5C7
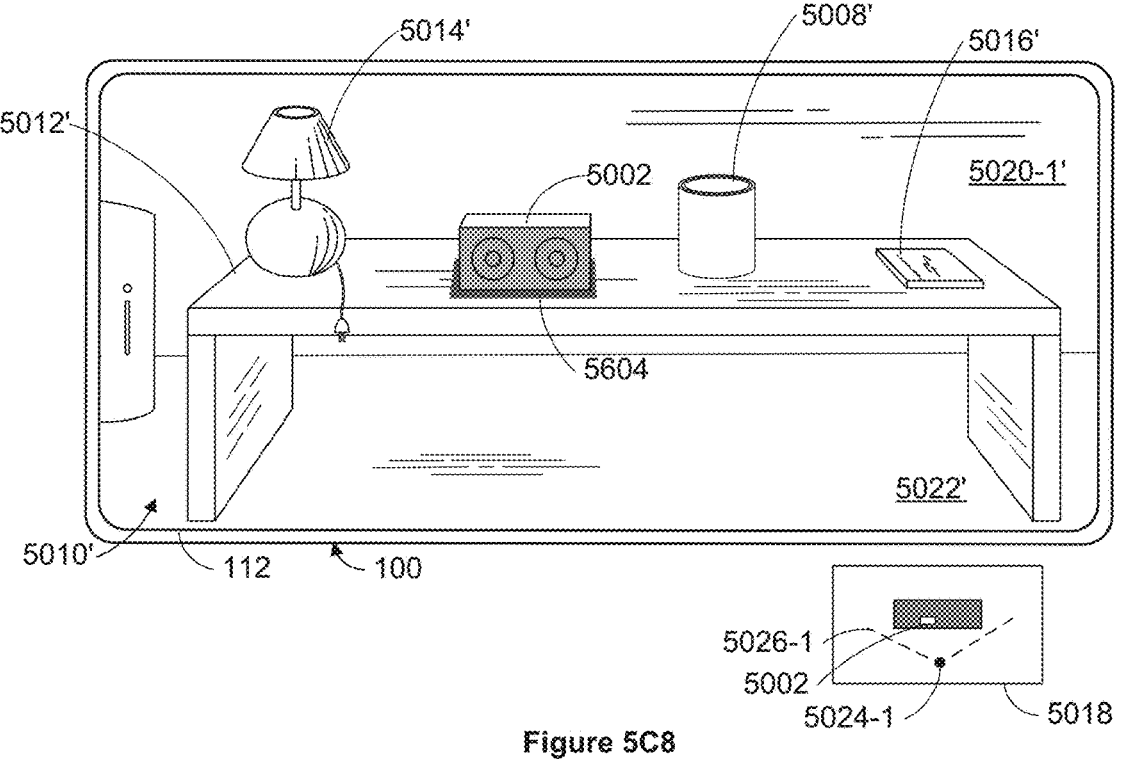
Figure 5C8

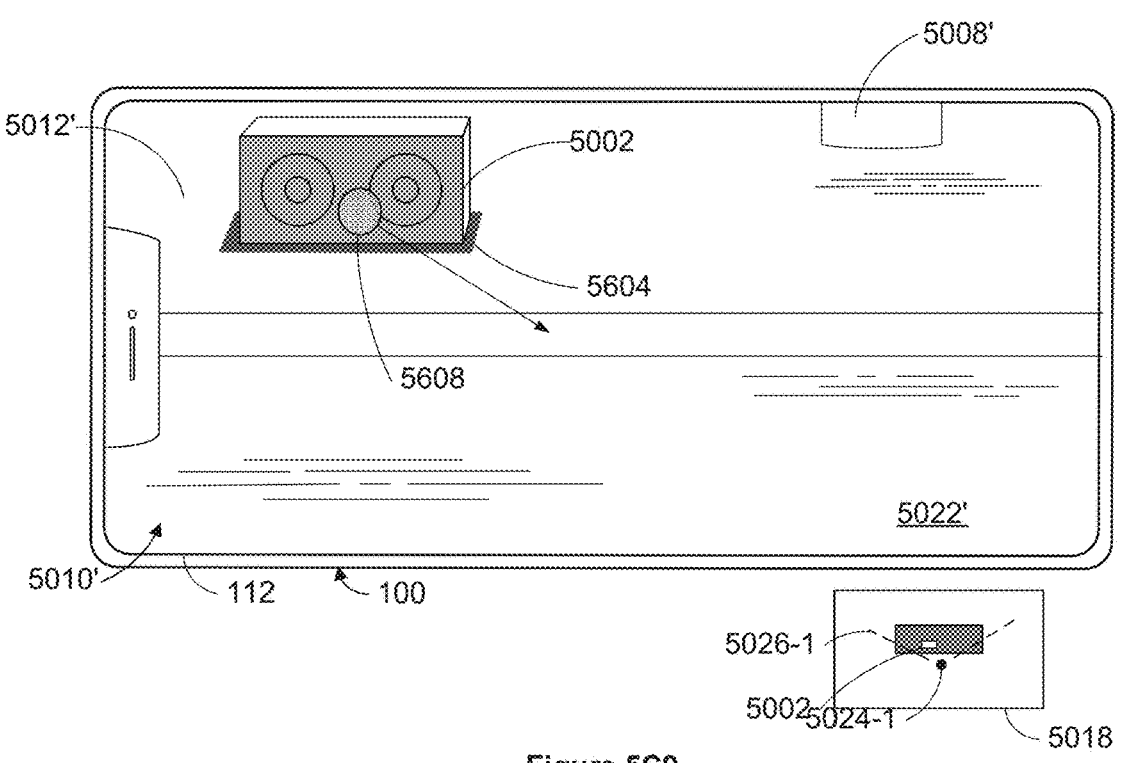
Figure 5C9
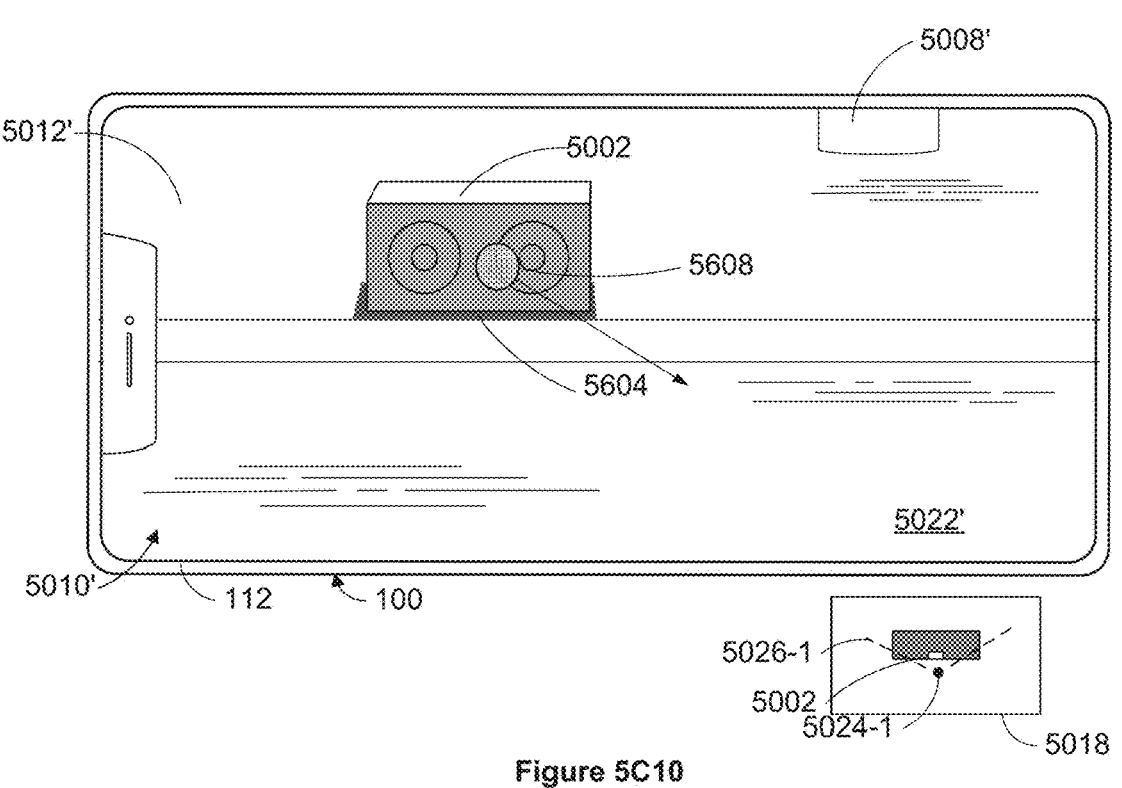
Figure 5C10

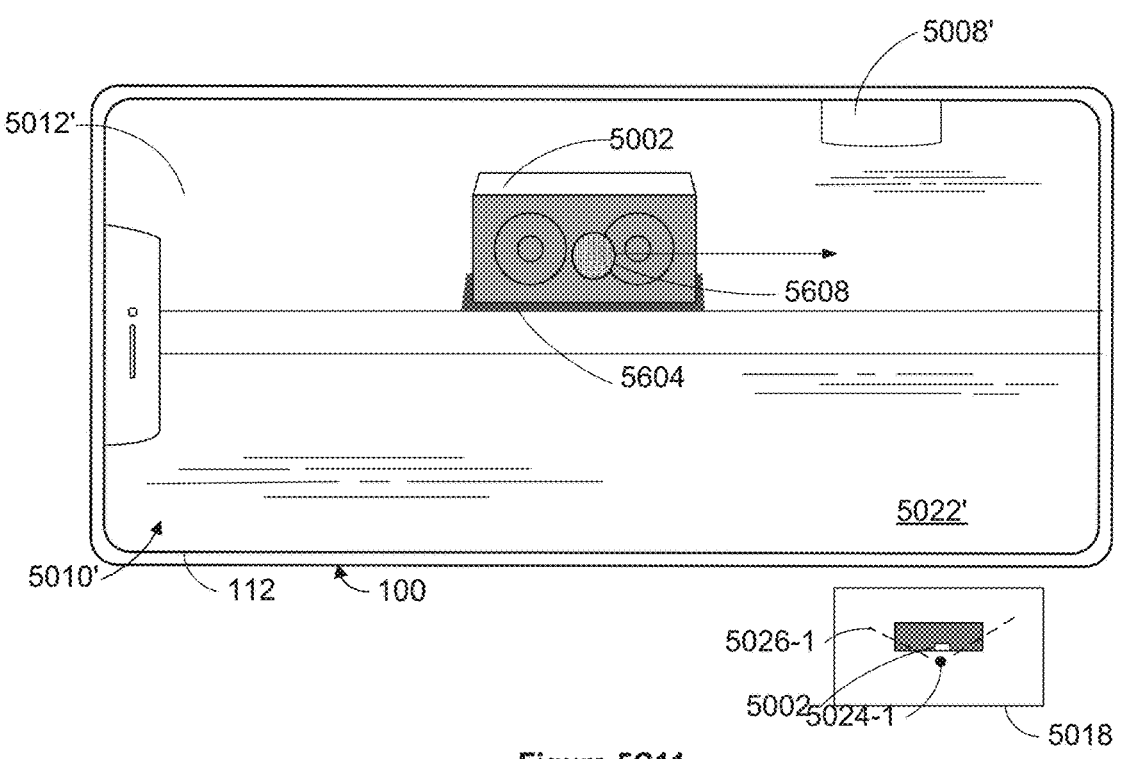
Figure 5C11
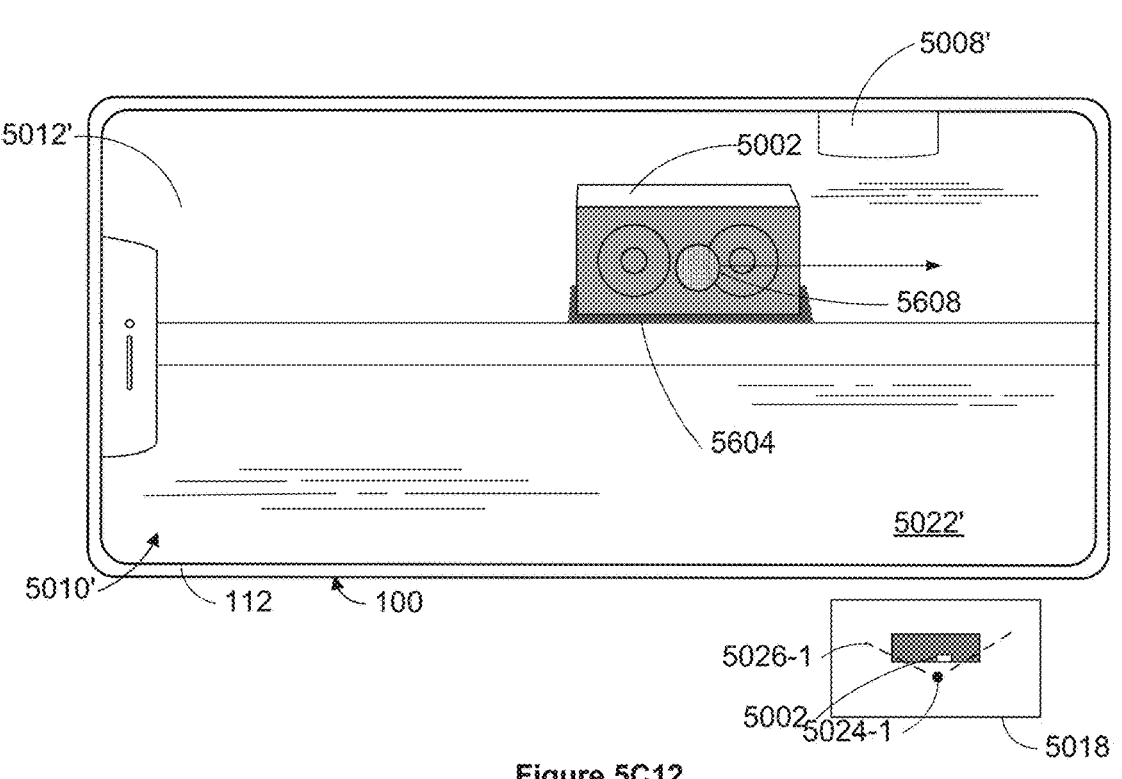
Figure 5C12

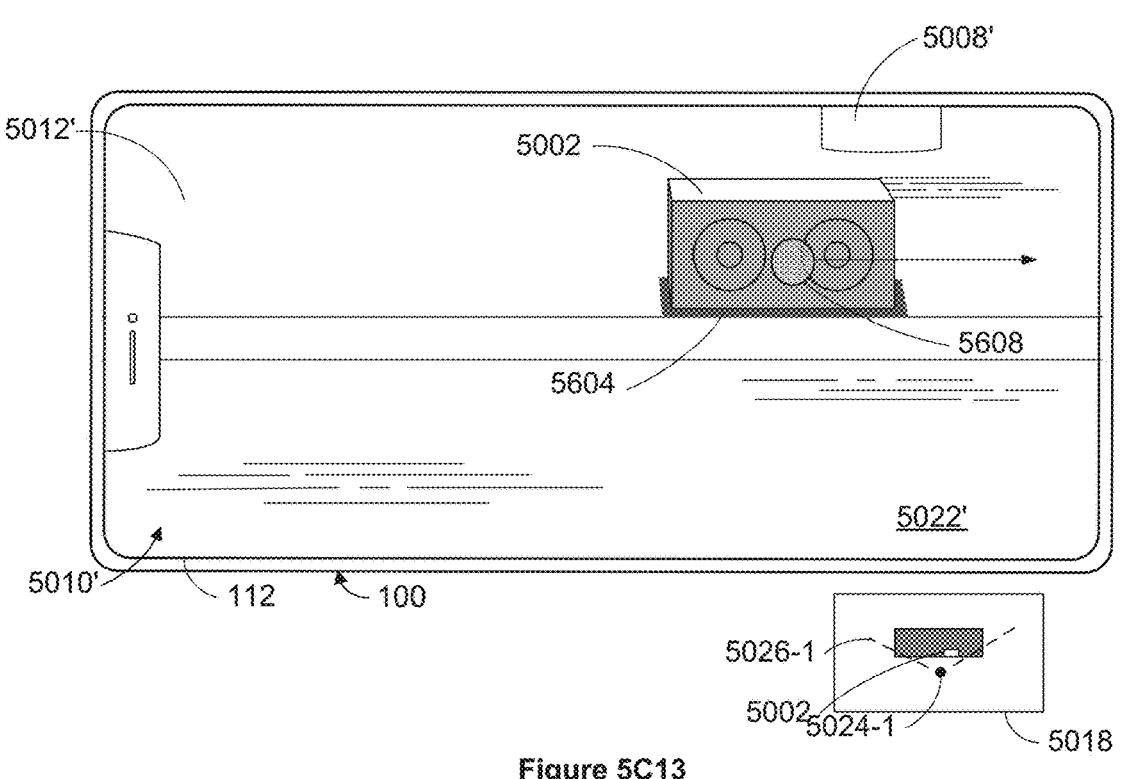
Figure 5C13
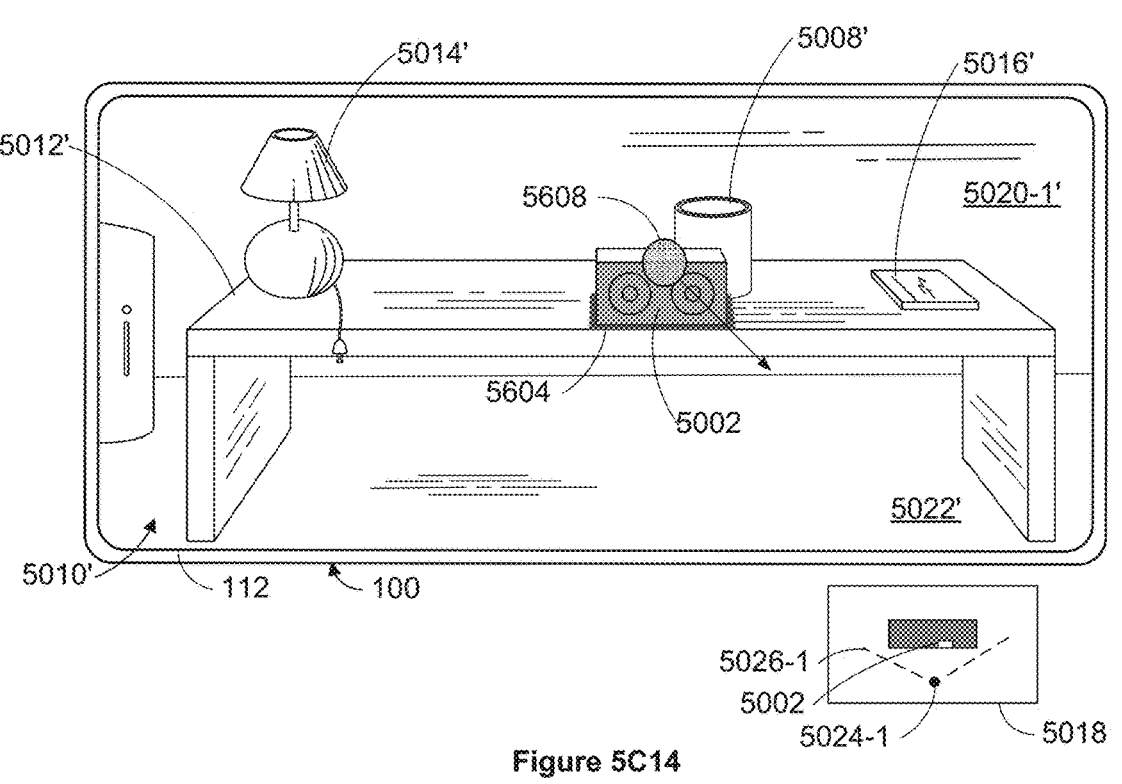
Figure 5C14

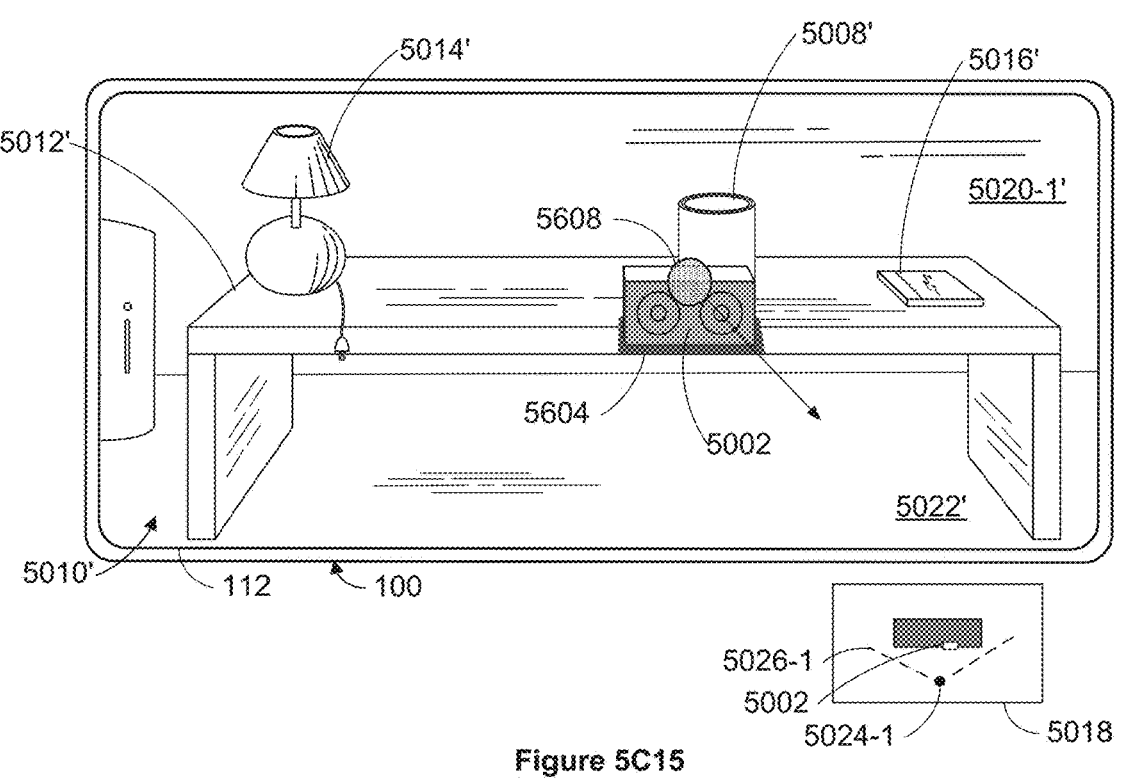
Figure 5C15
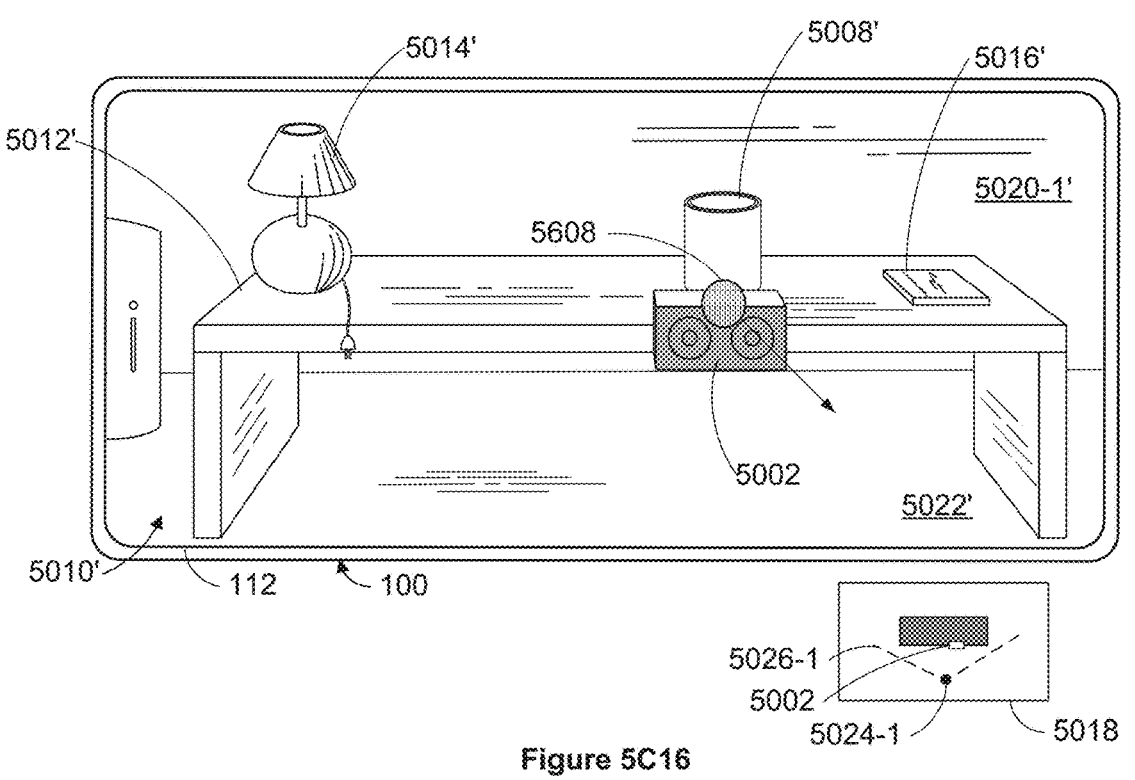
Figure 5C16

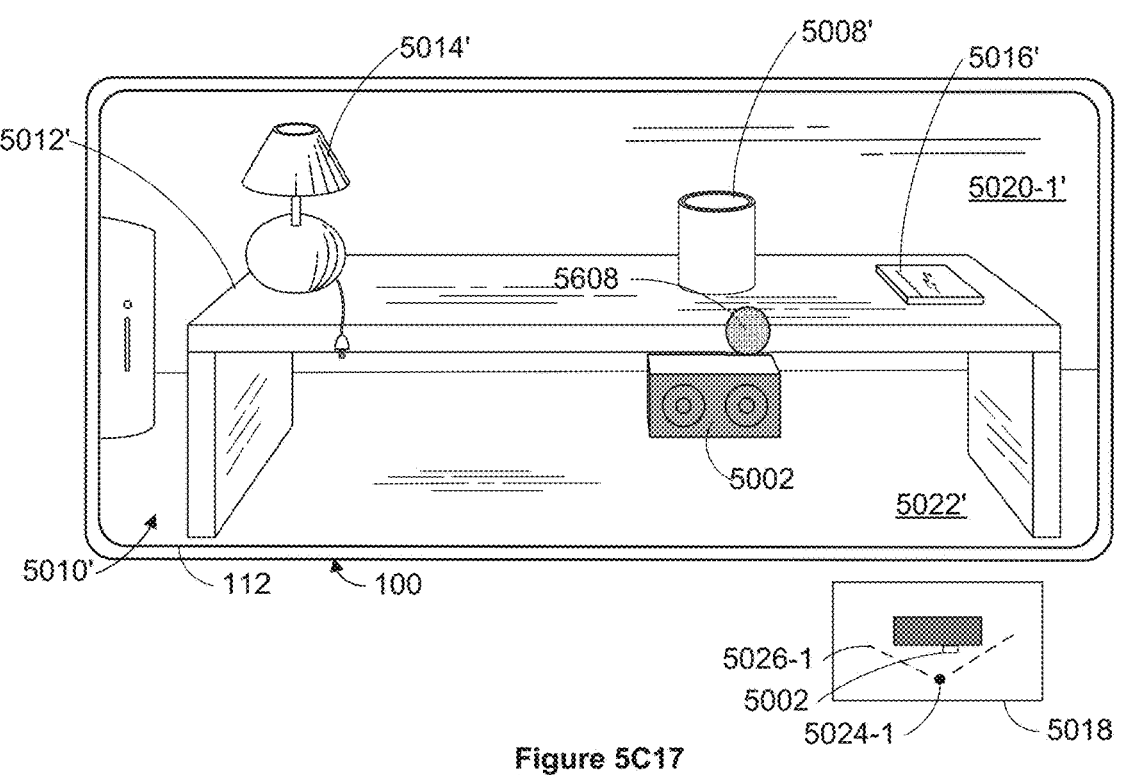
Figure 5C17
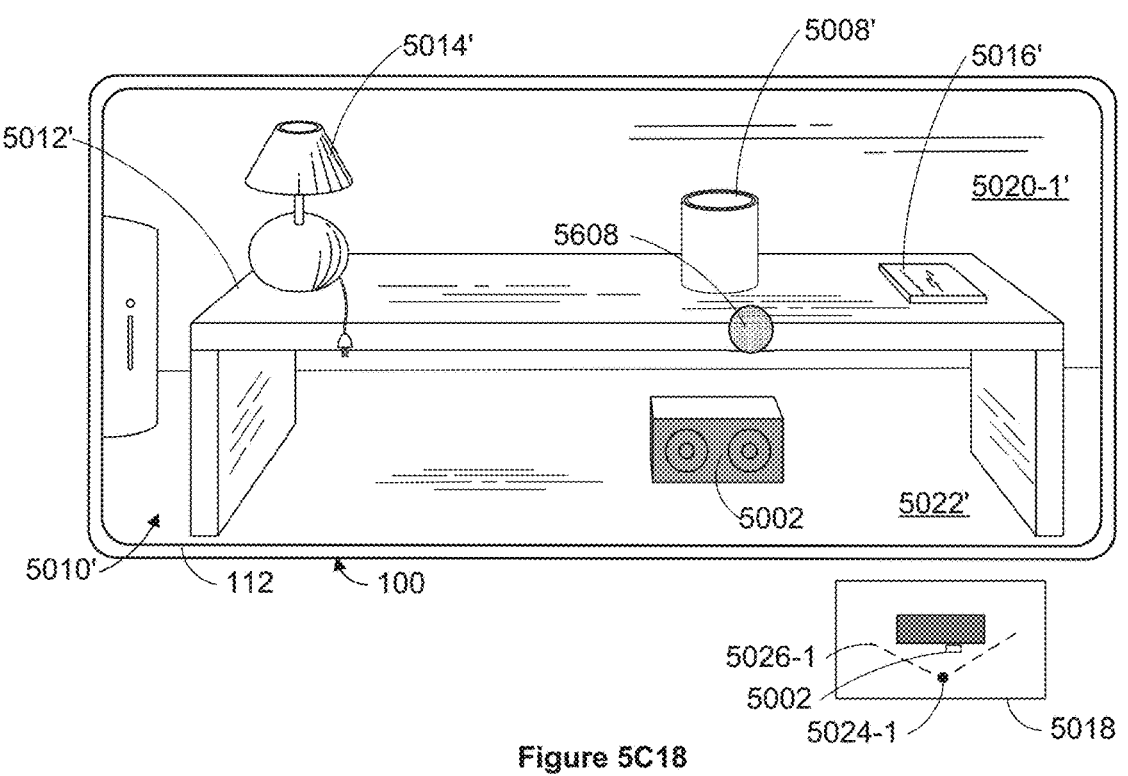
Figure 5C18

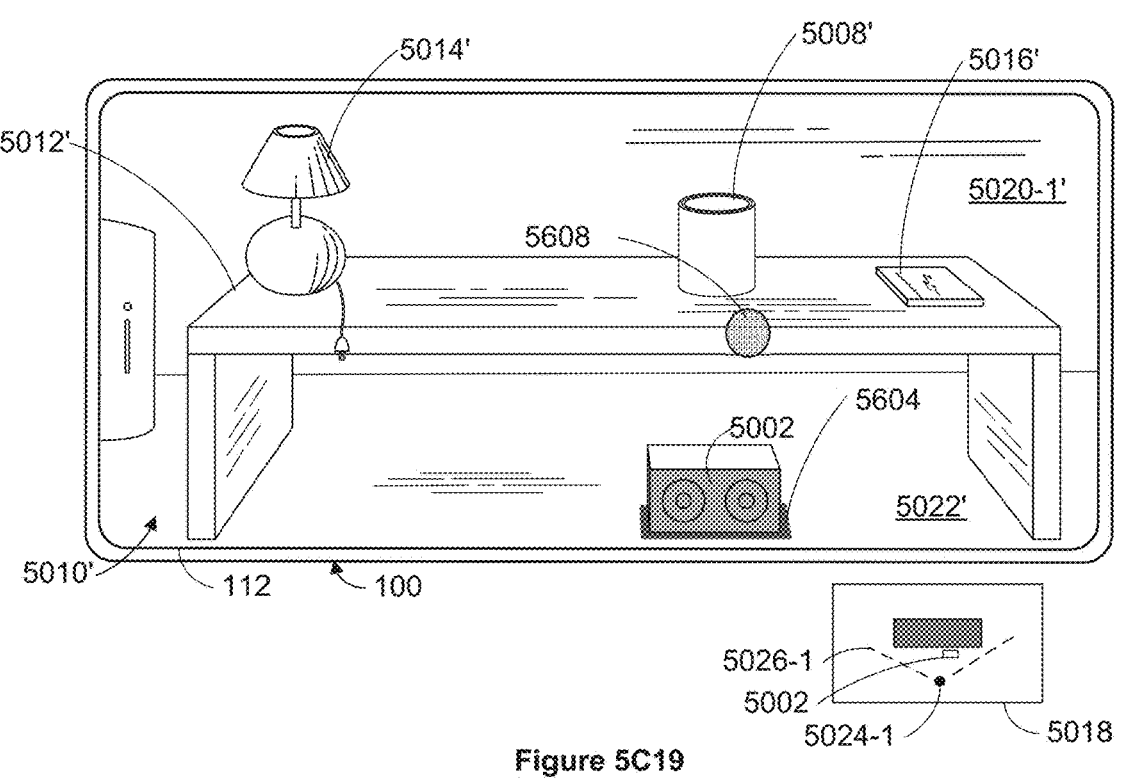
Figure 5C19
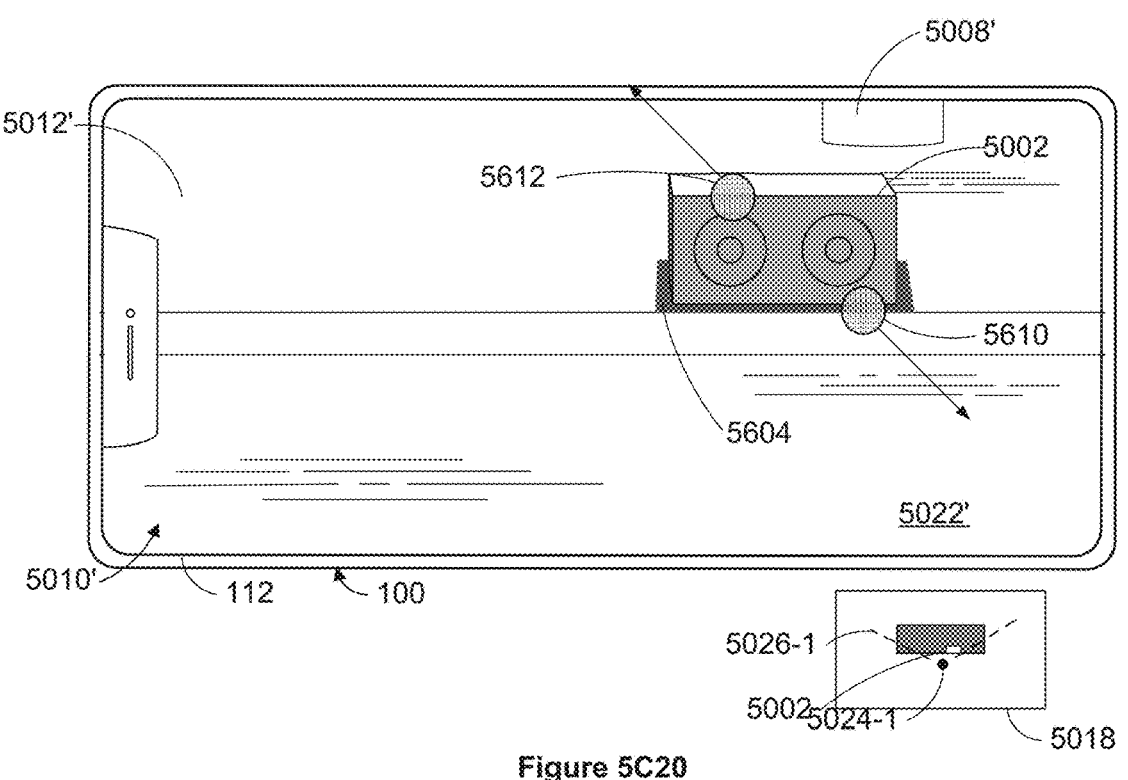
Figure 5C20

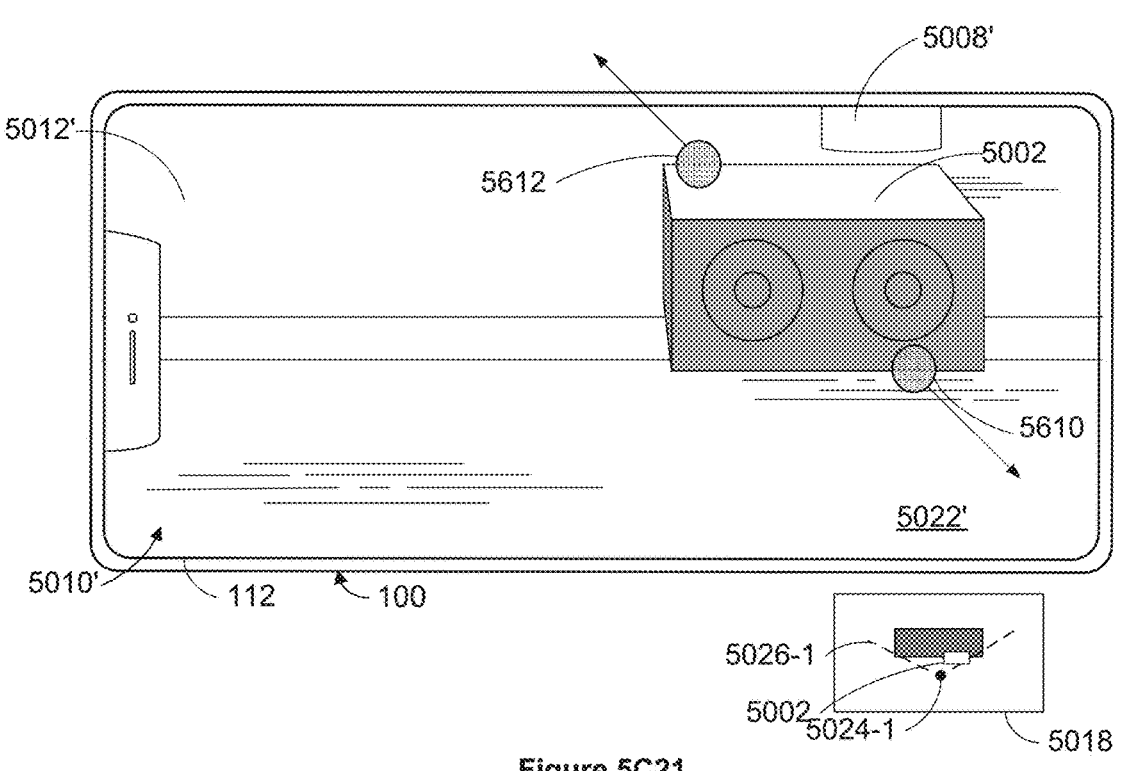
Figure 5C21
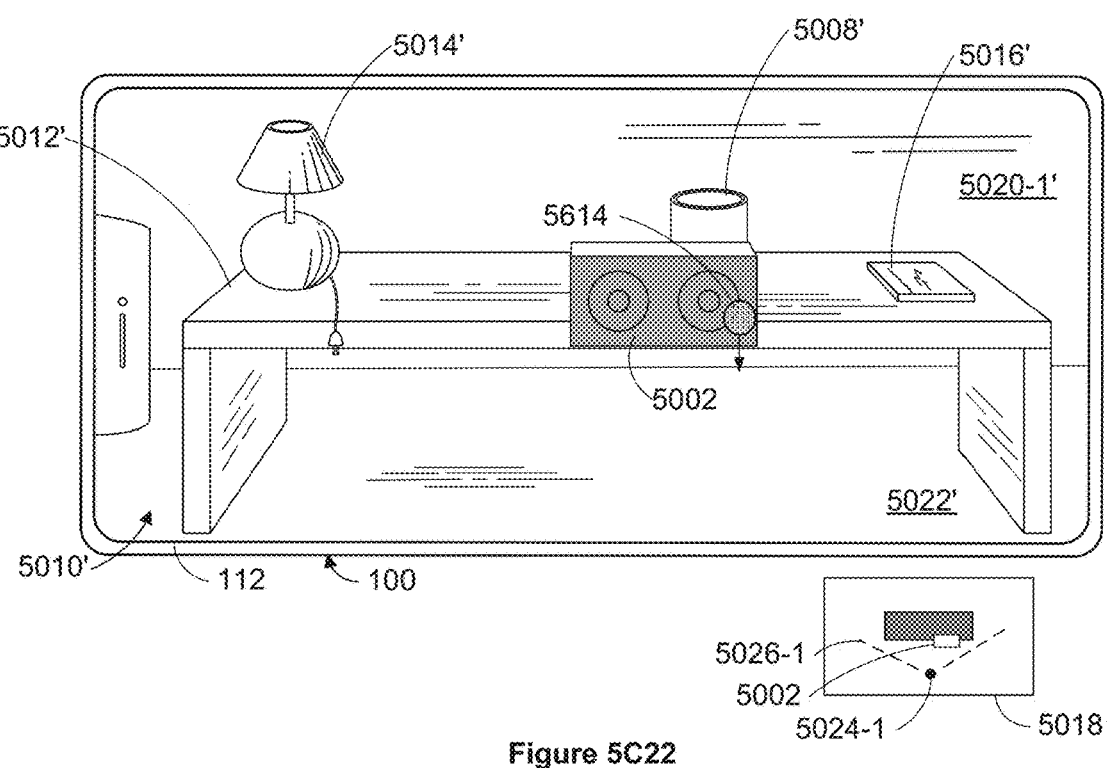
Figure 5C22

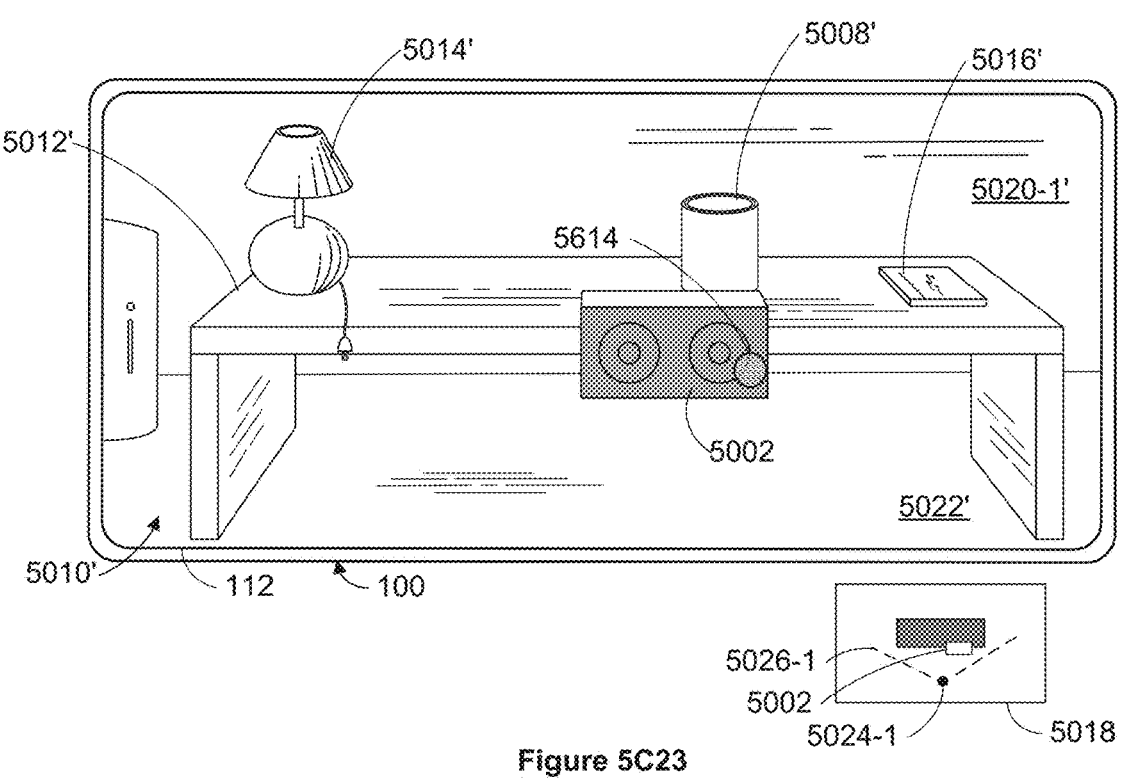
Figure 5C23
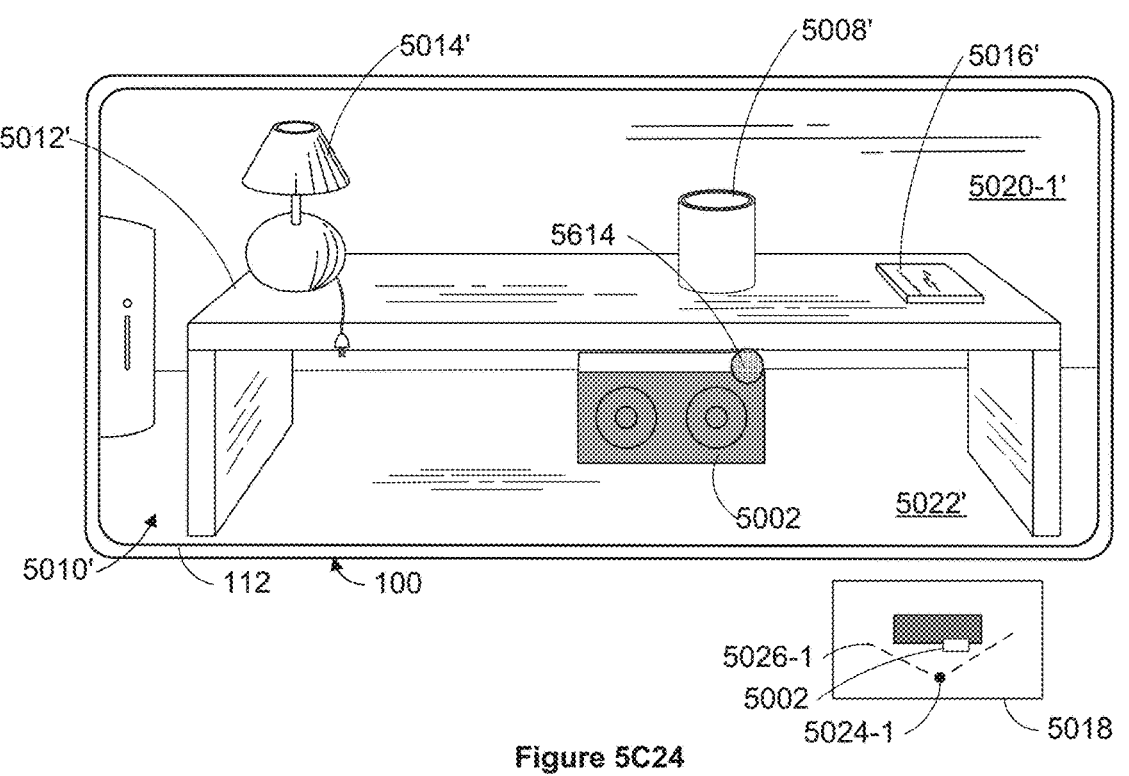
Figure 5C24

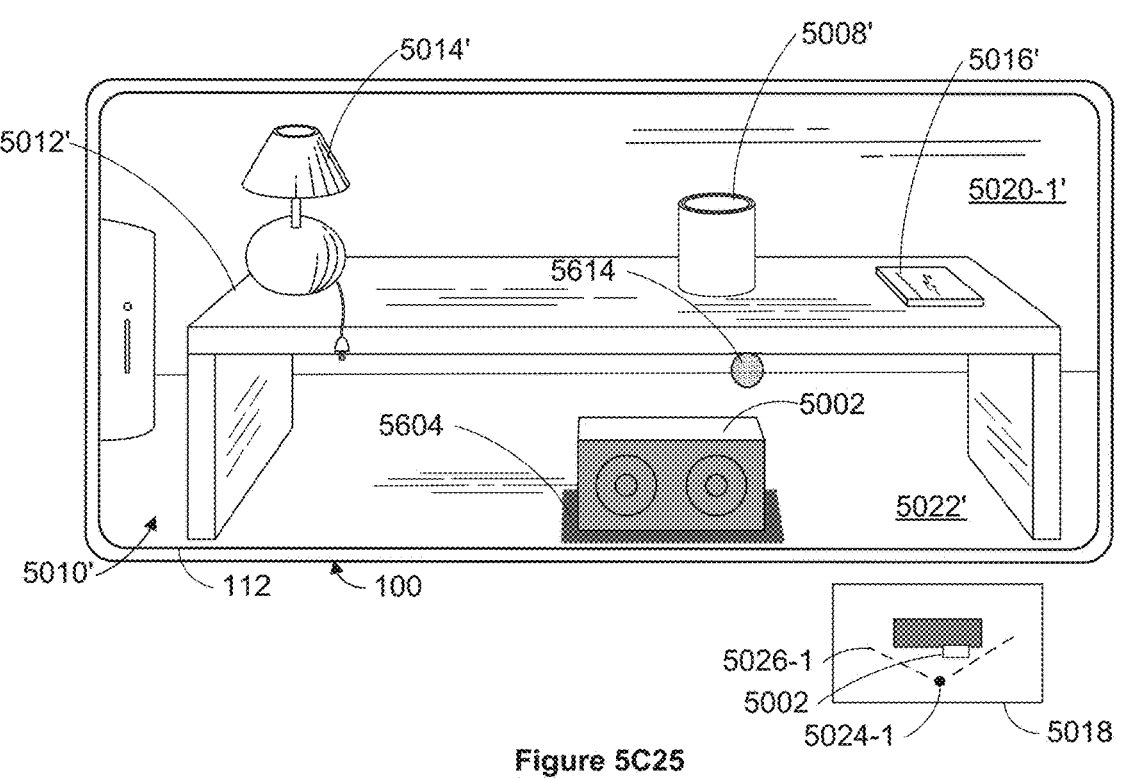
Figure 5C25
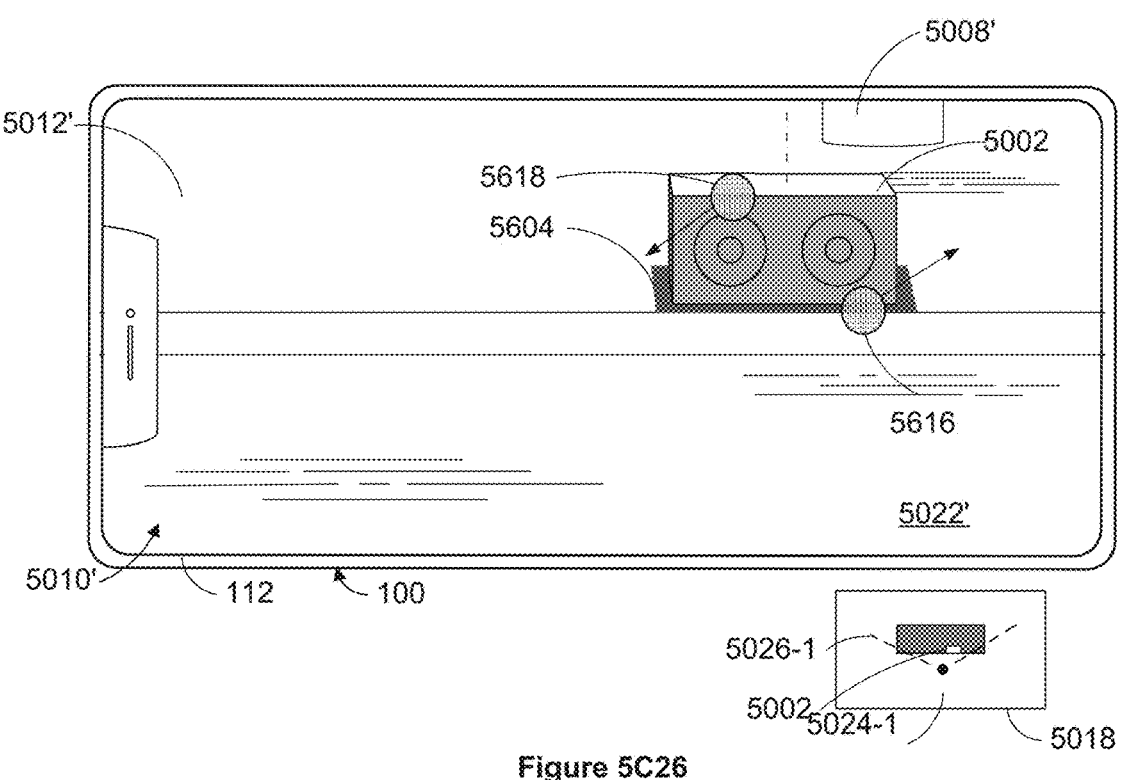
Figure 5C26

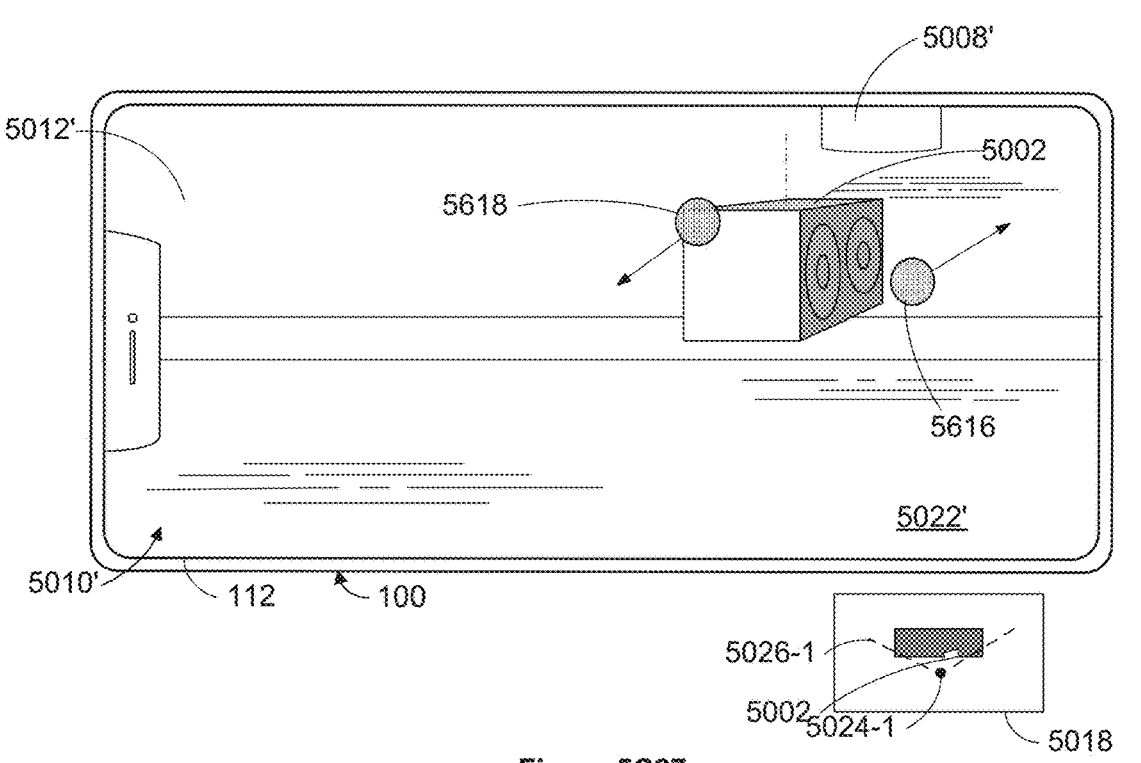
Figure 5C27
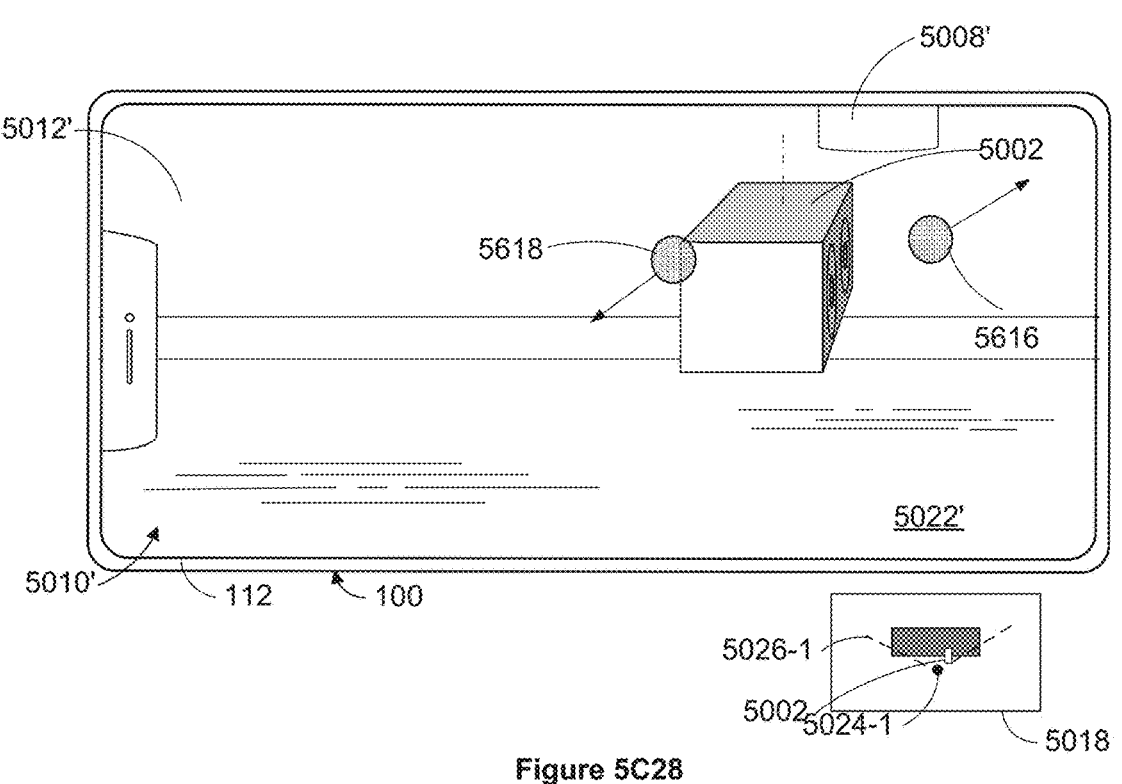
Figure 5C28

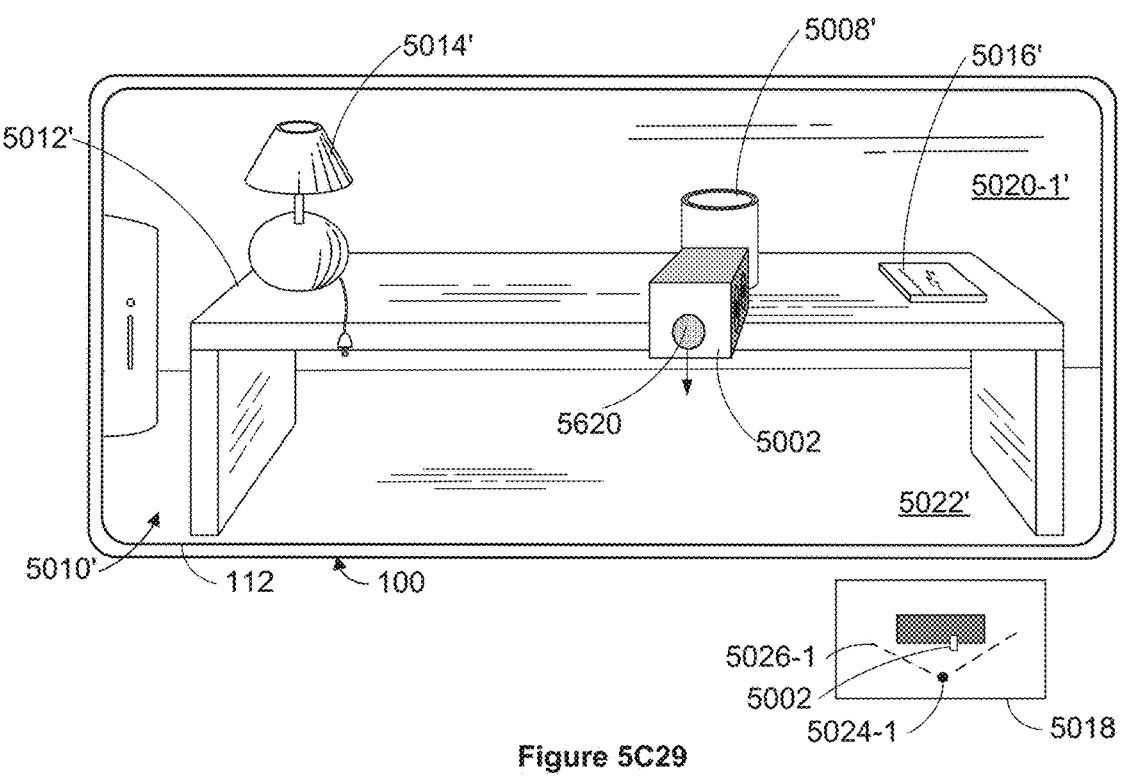
Figure 5C29
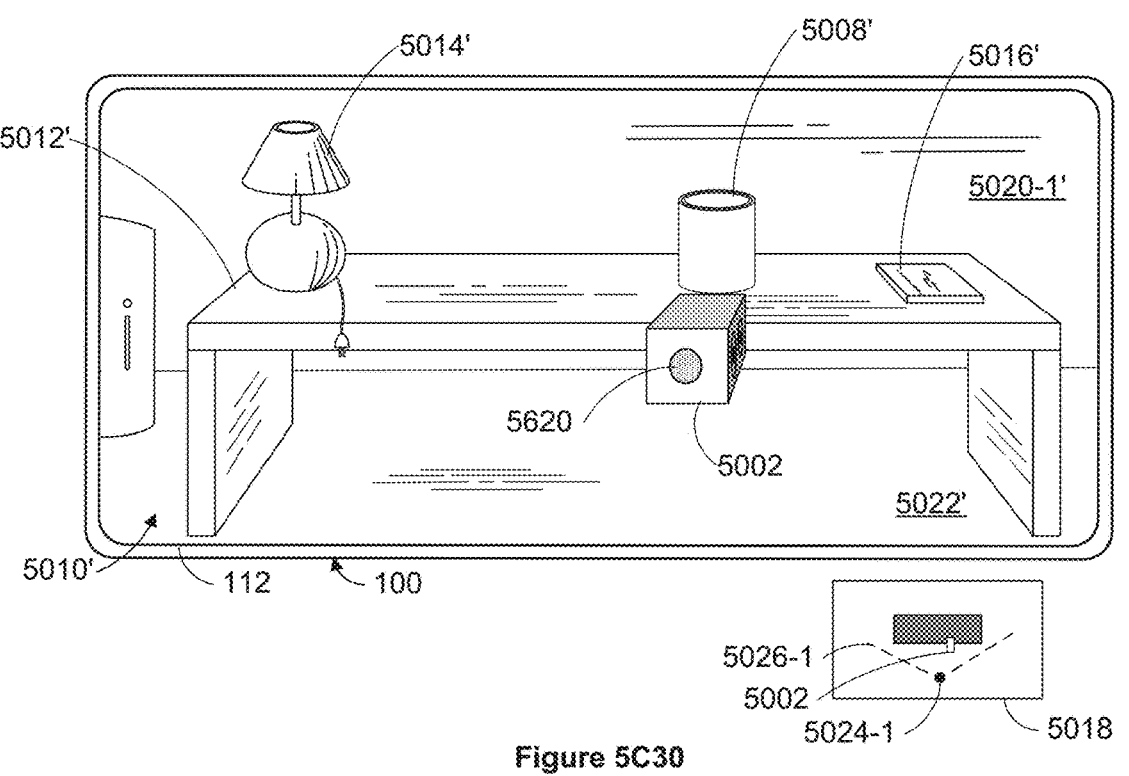
Figure 5C30

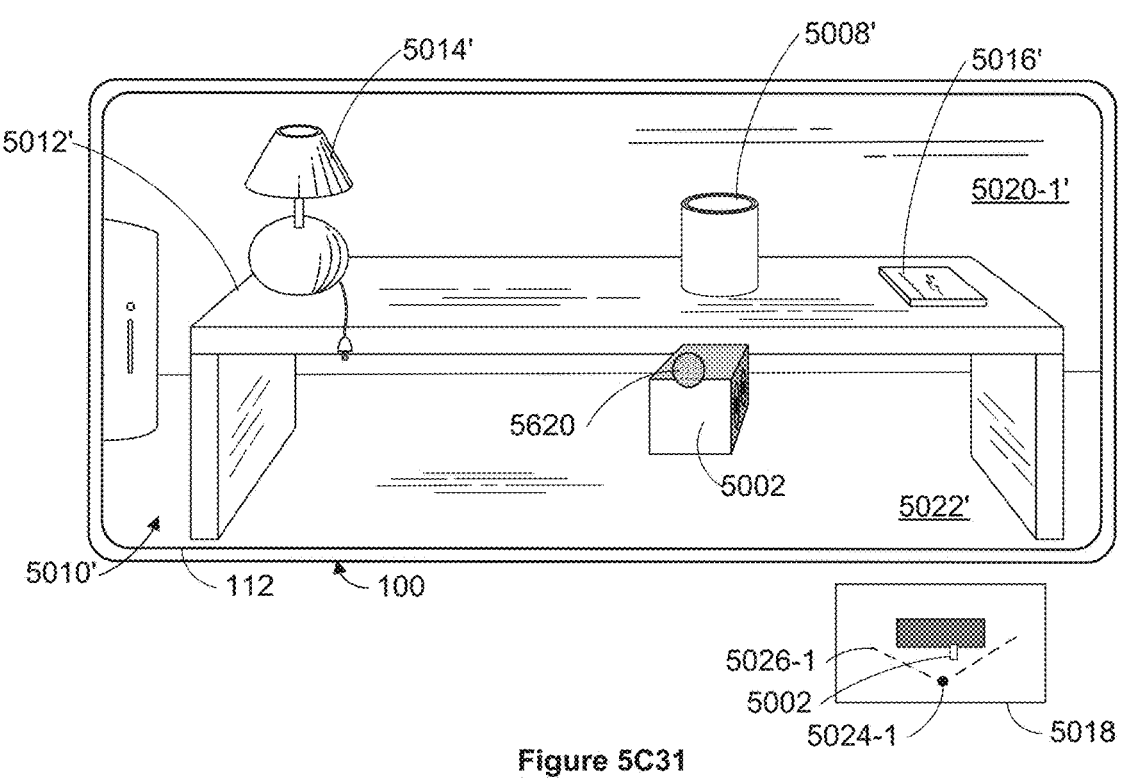
Figure 5C31
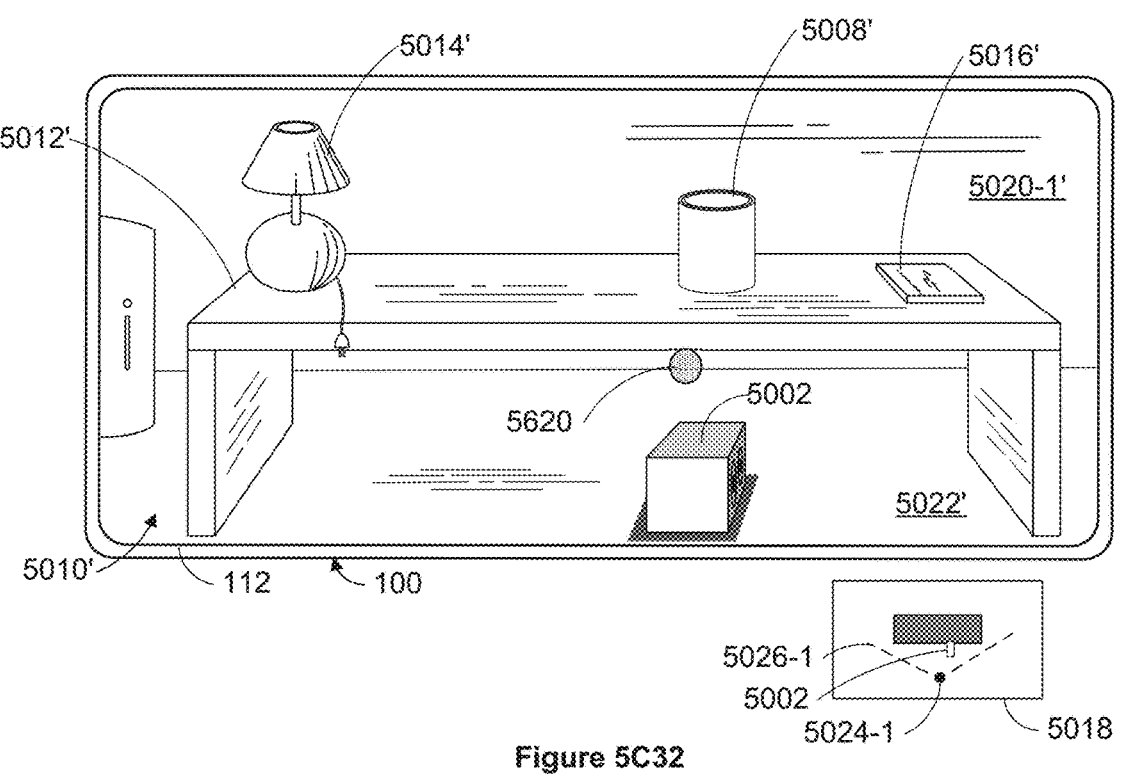
Figure 5C32

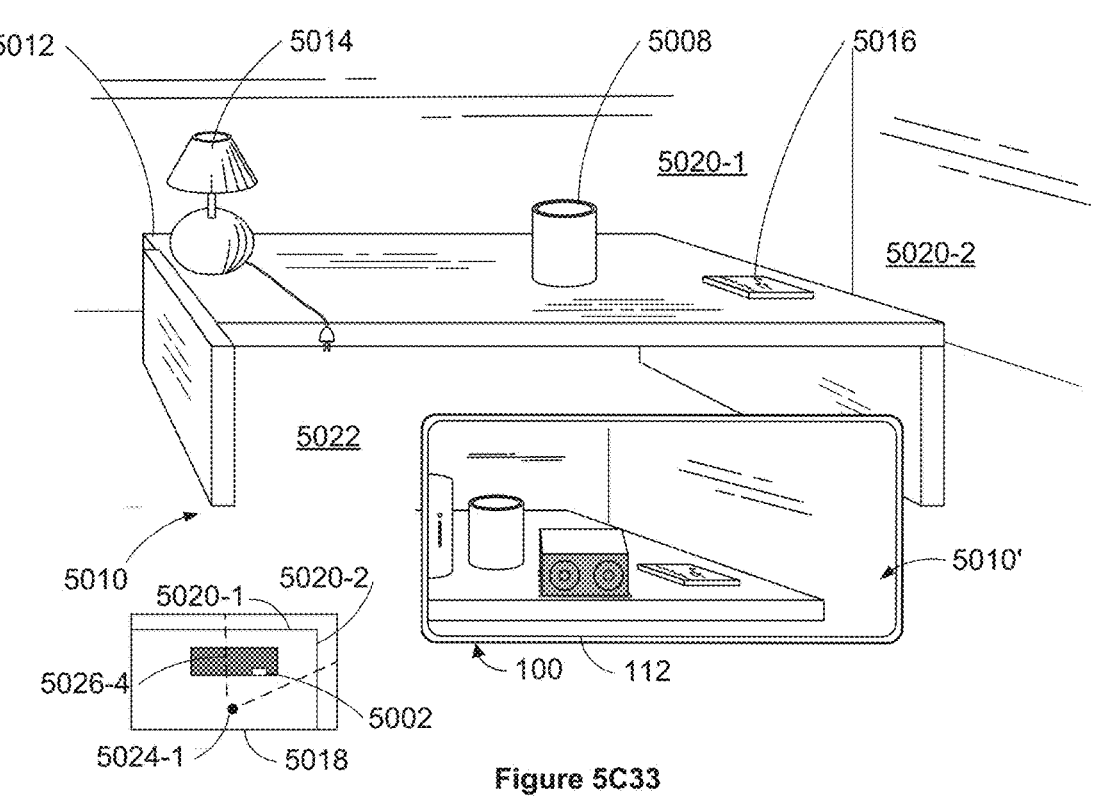
Figure 5C33
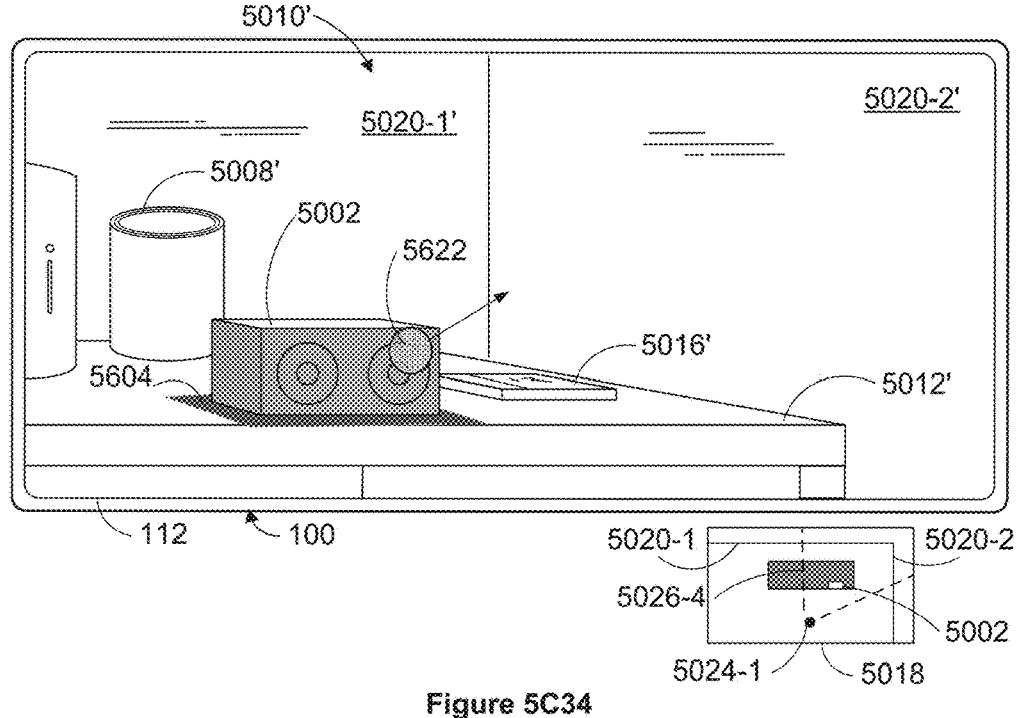
Figure 5C34

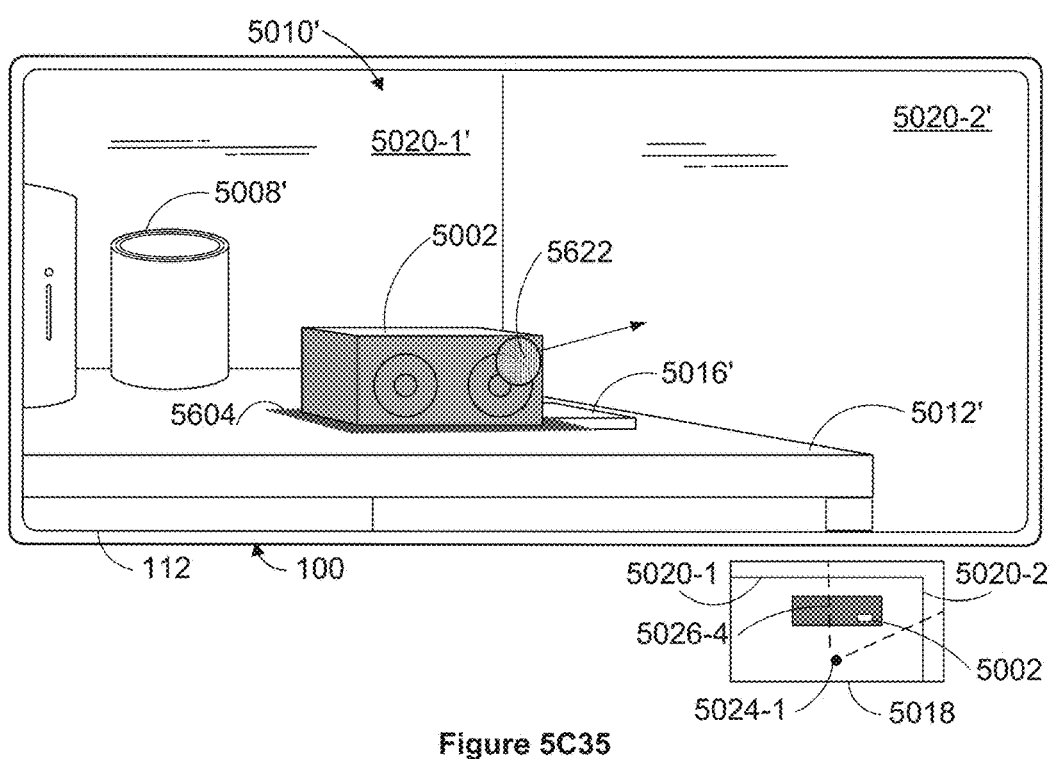
Figure 5C35
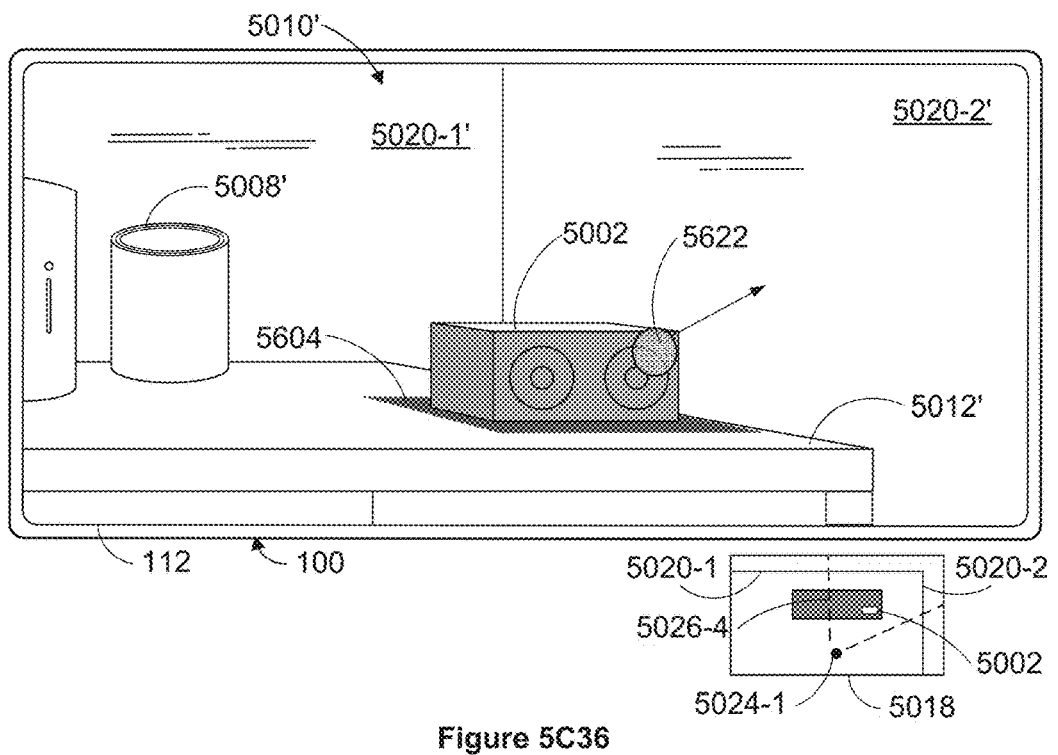
Figure 5C36

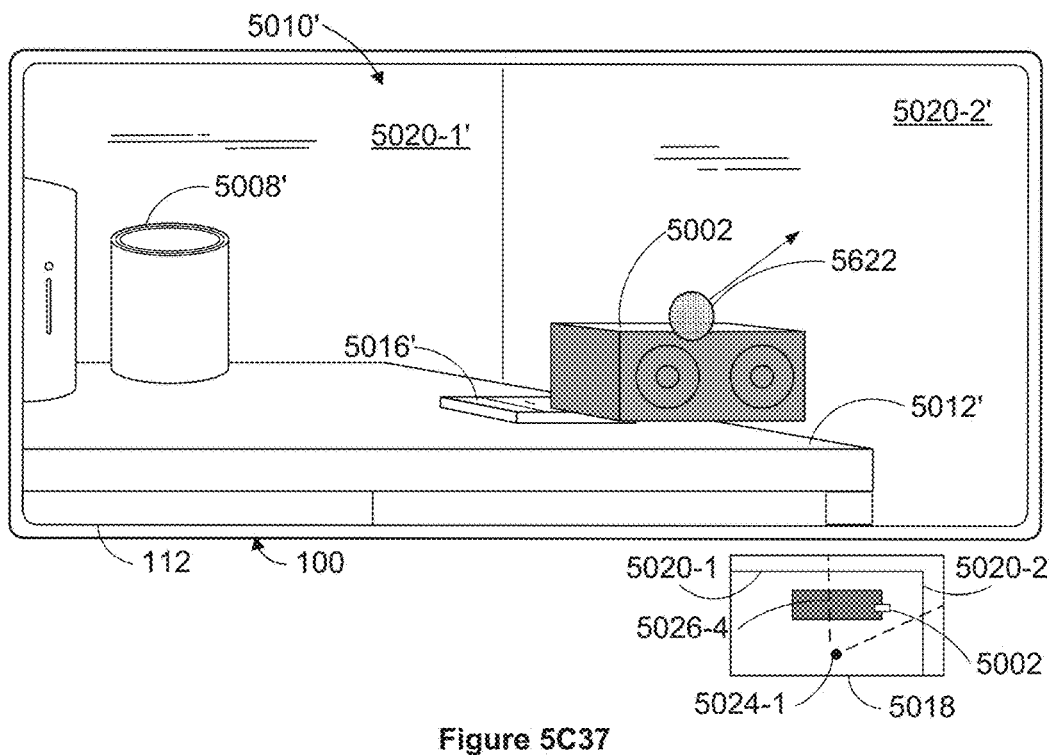
Figure 5C37
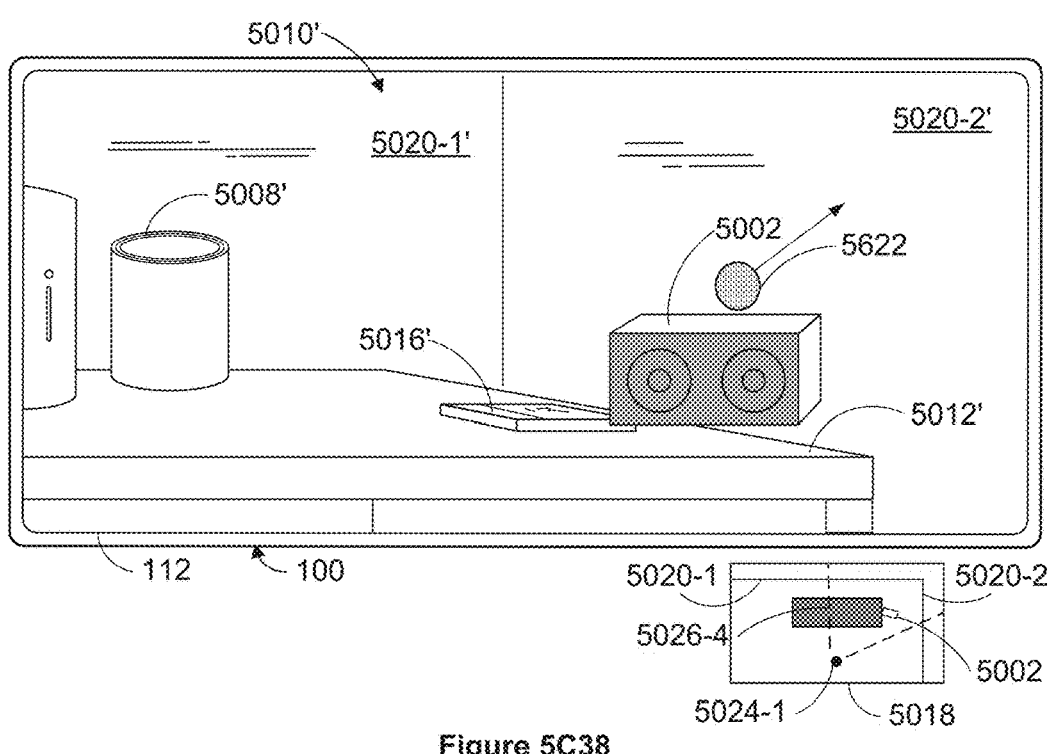
Figure 5C38

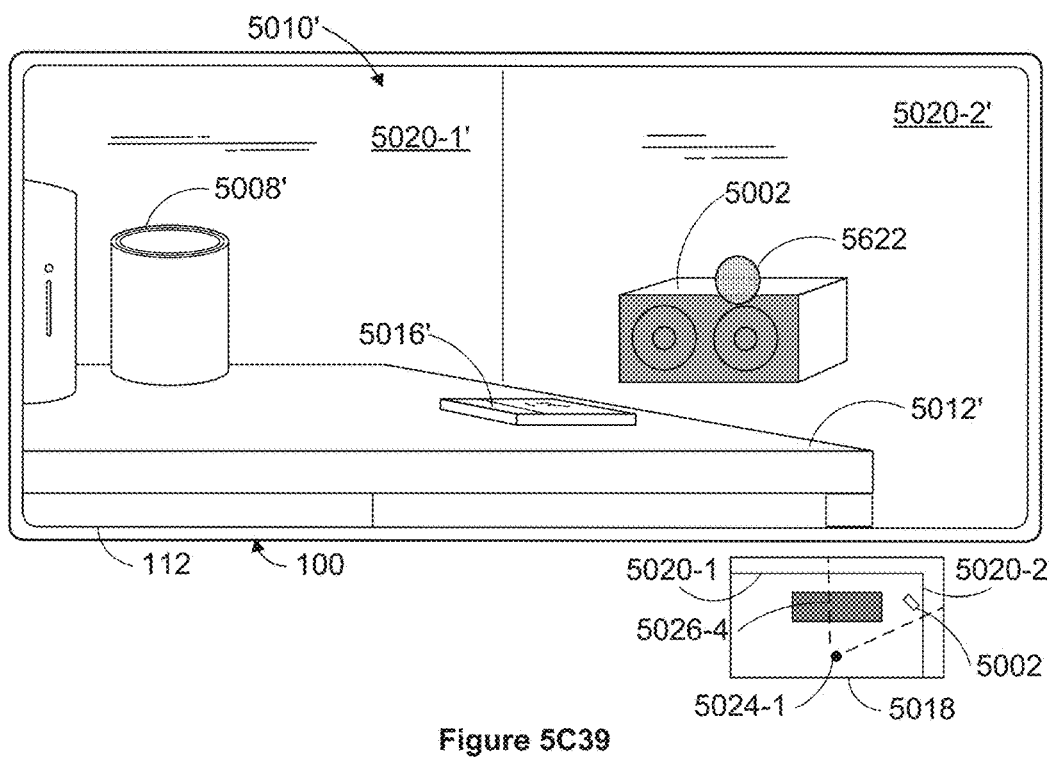
Figure 5C39
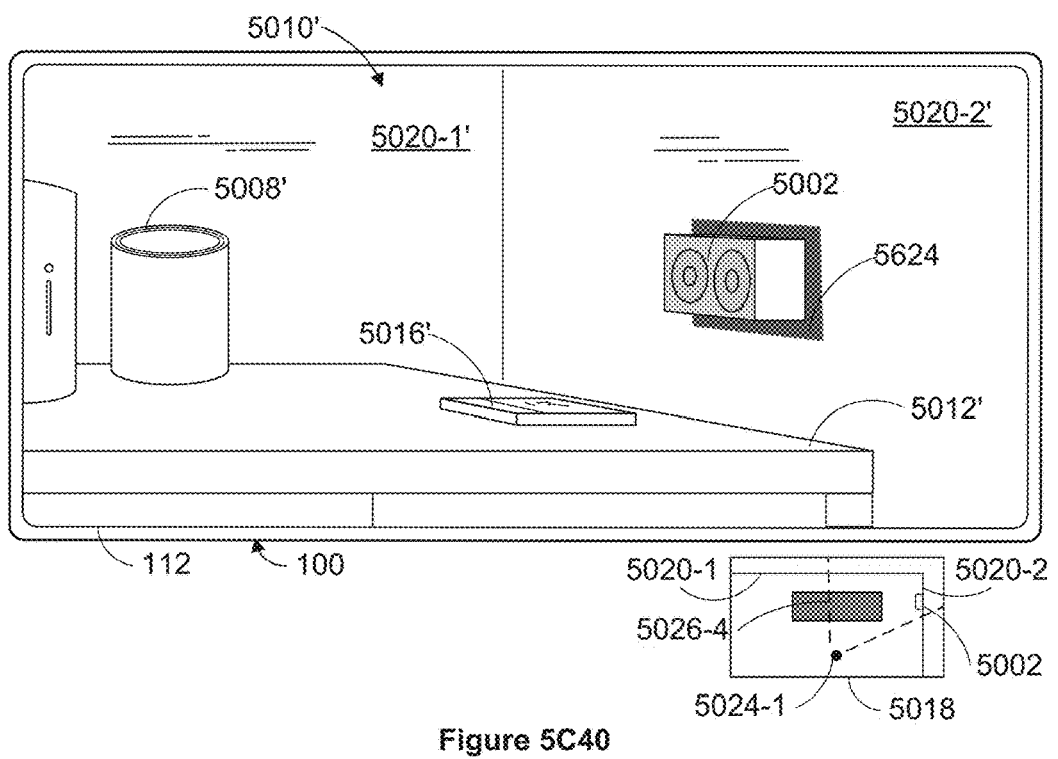
Figure 5C40

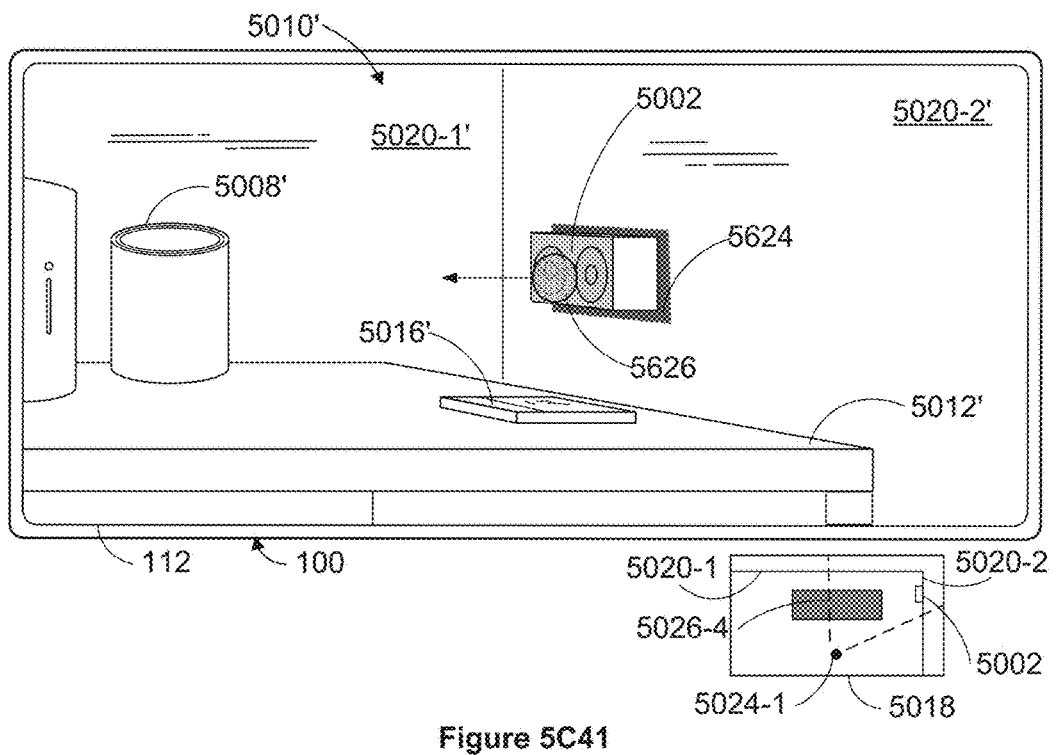
Figure 5C41
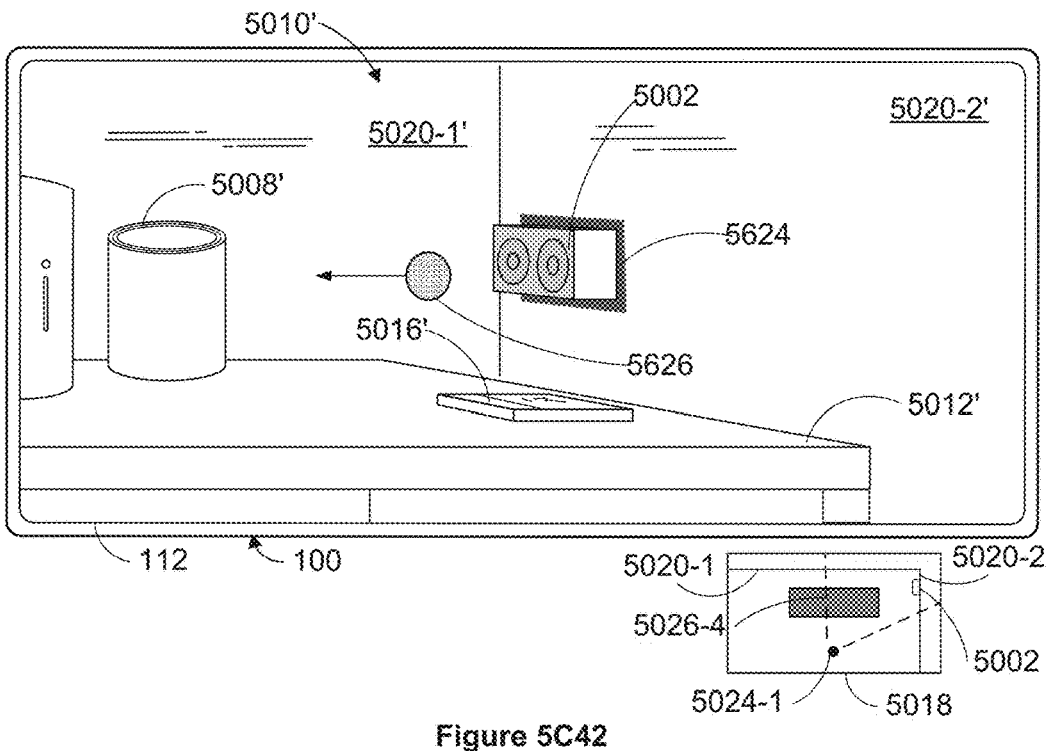
Figure 5C42

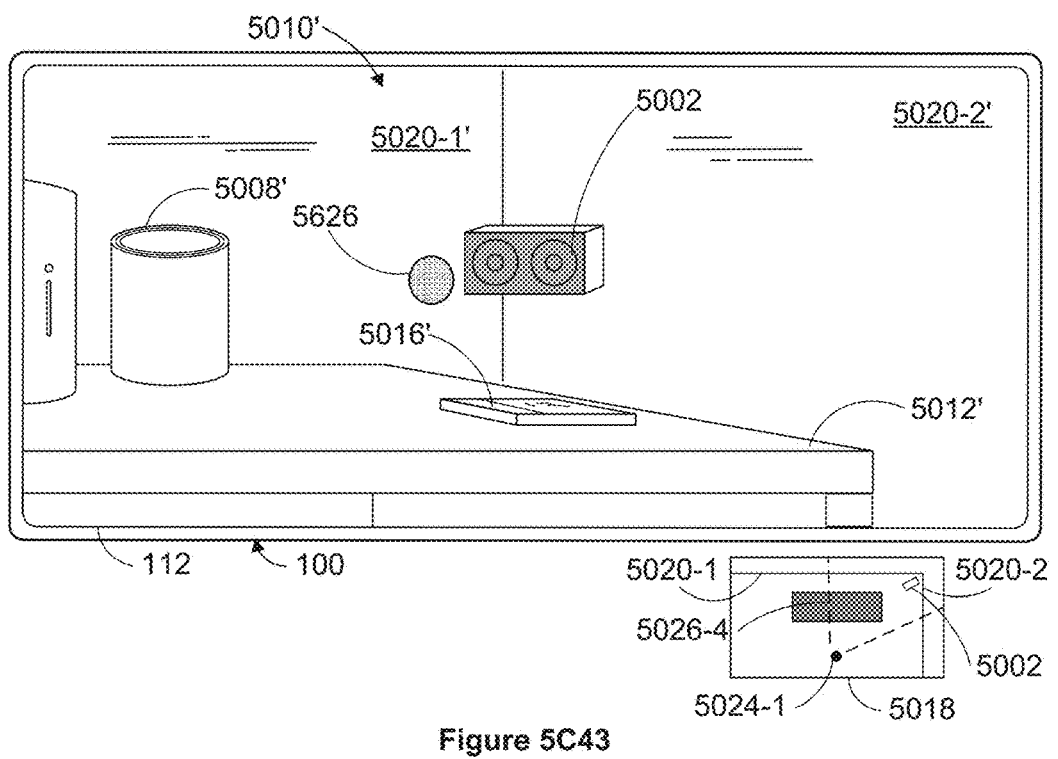
Figure 5C43
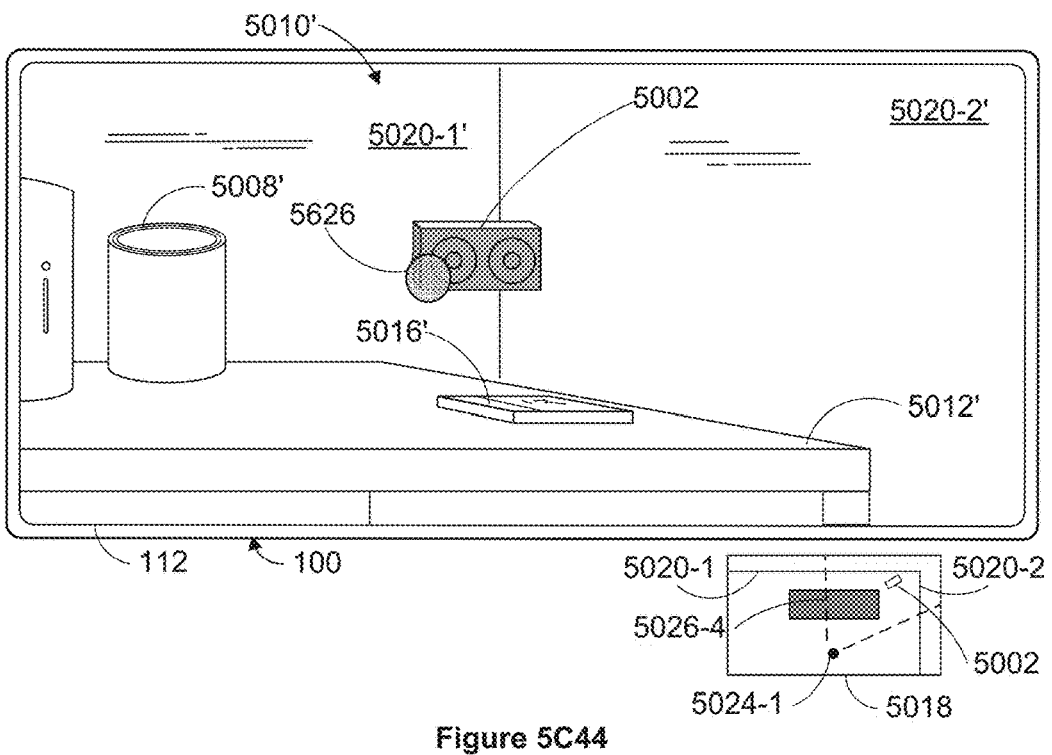
Figure 5C44

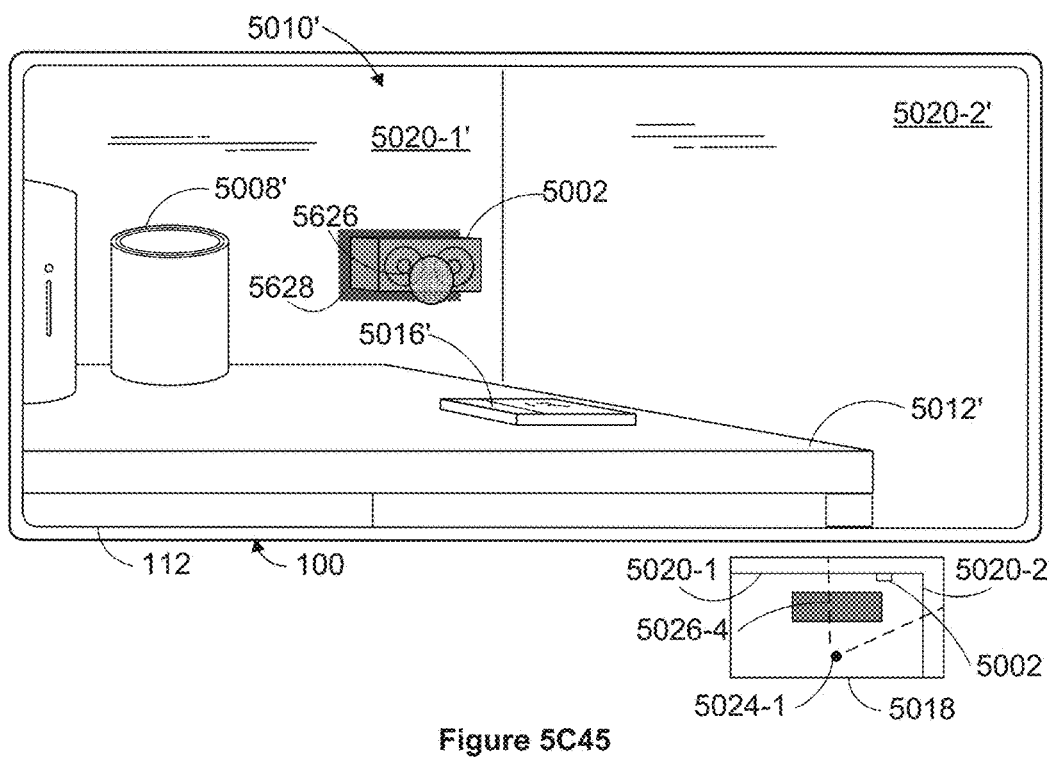
Figure 5C45
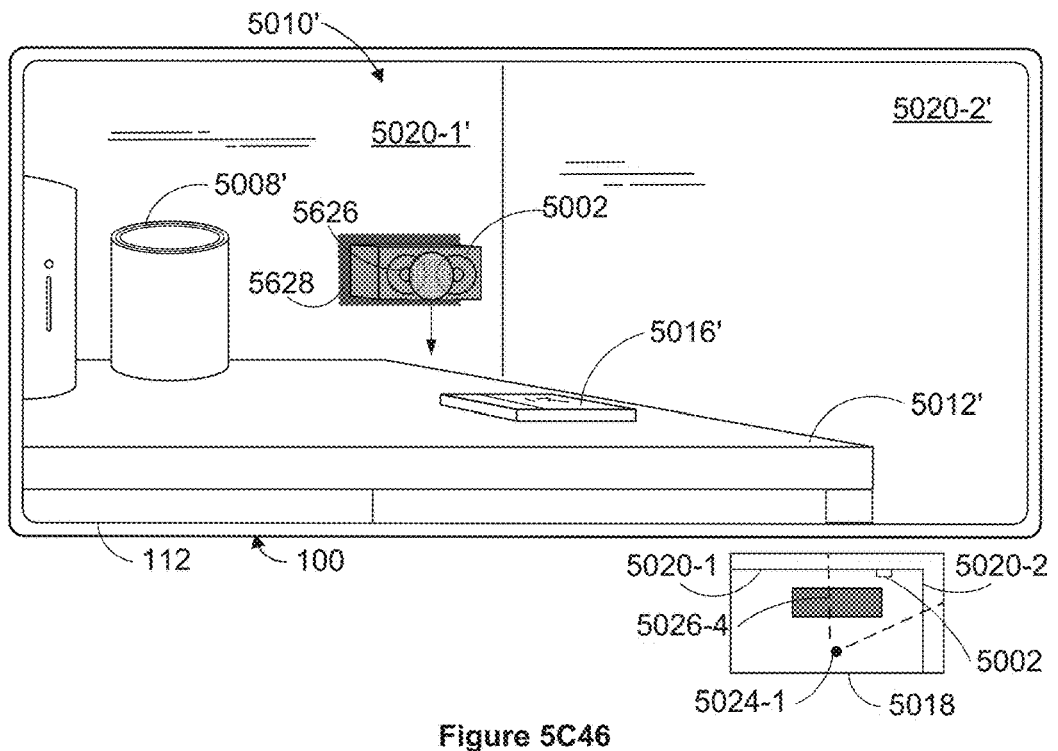
Figure 5C46

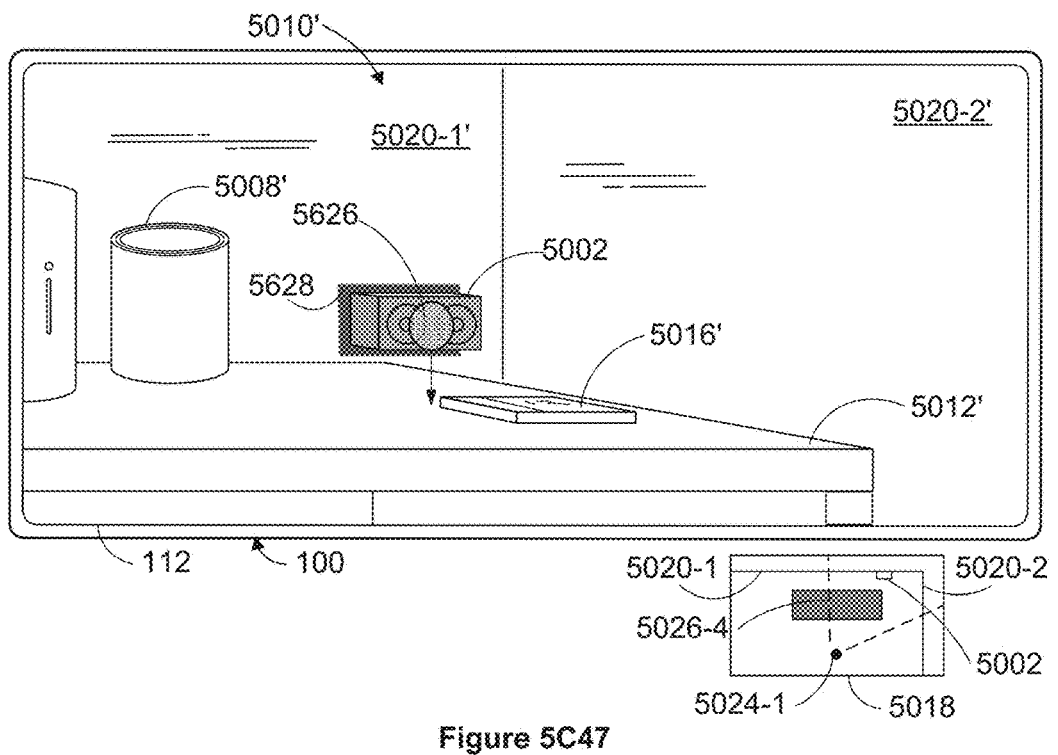
Figure 5C47
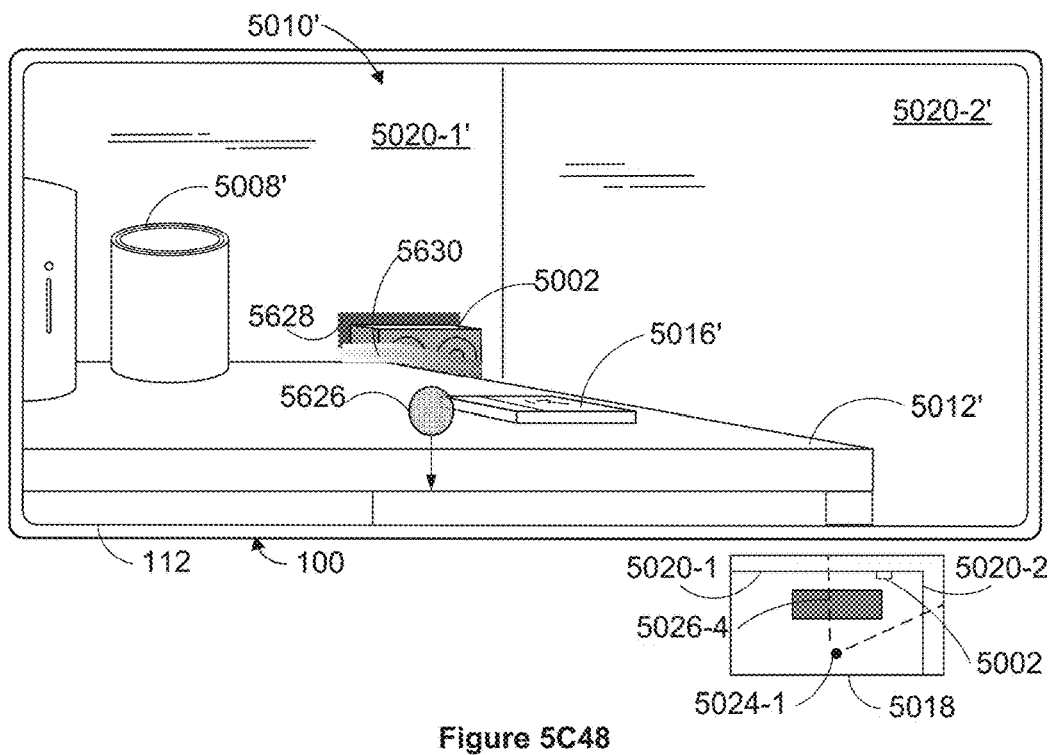
Figure 5C48

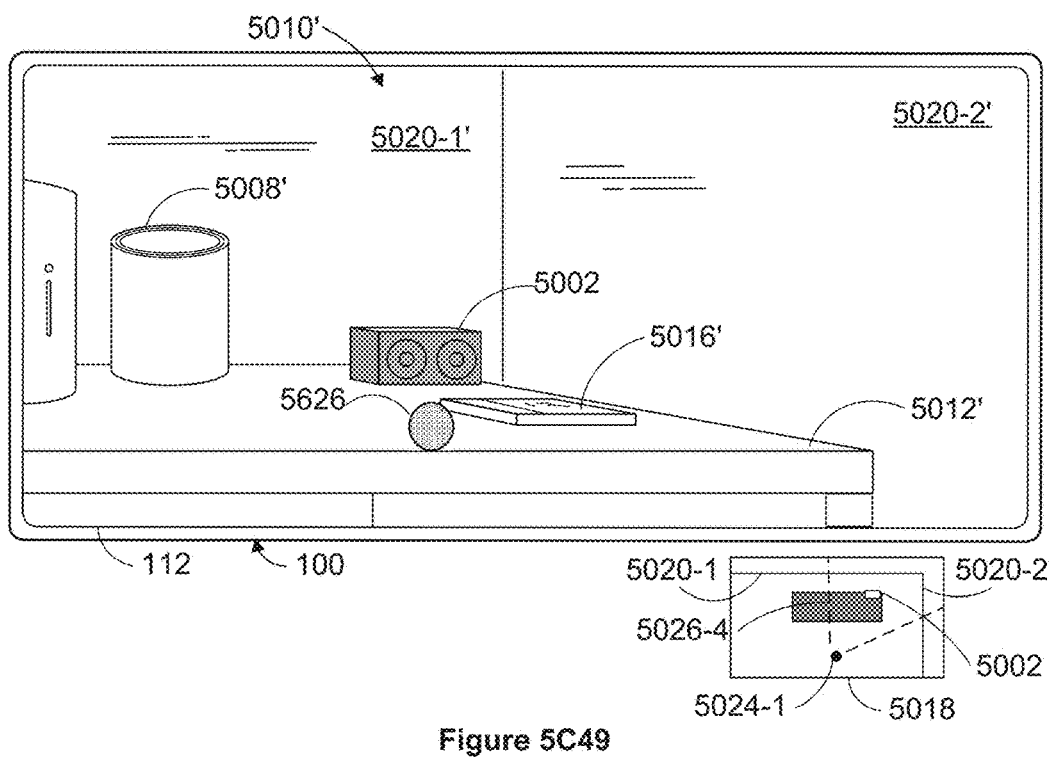
Figure 5C49
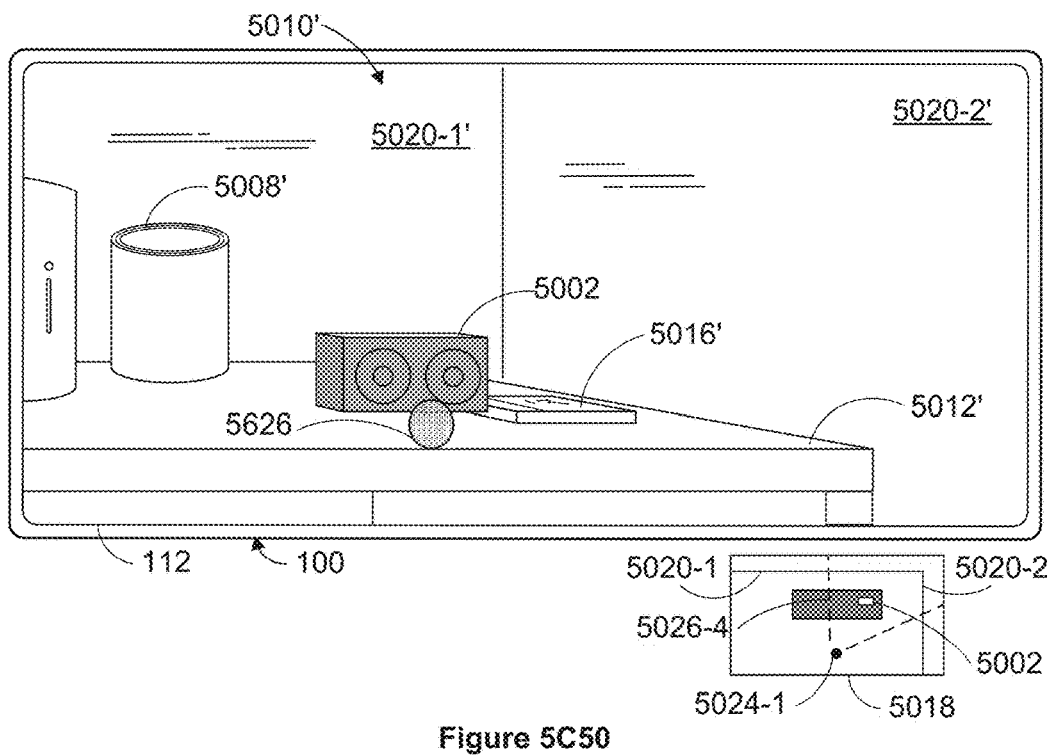
Figure 5C50

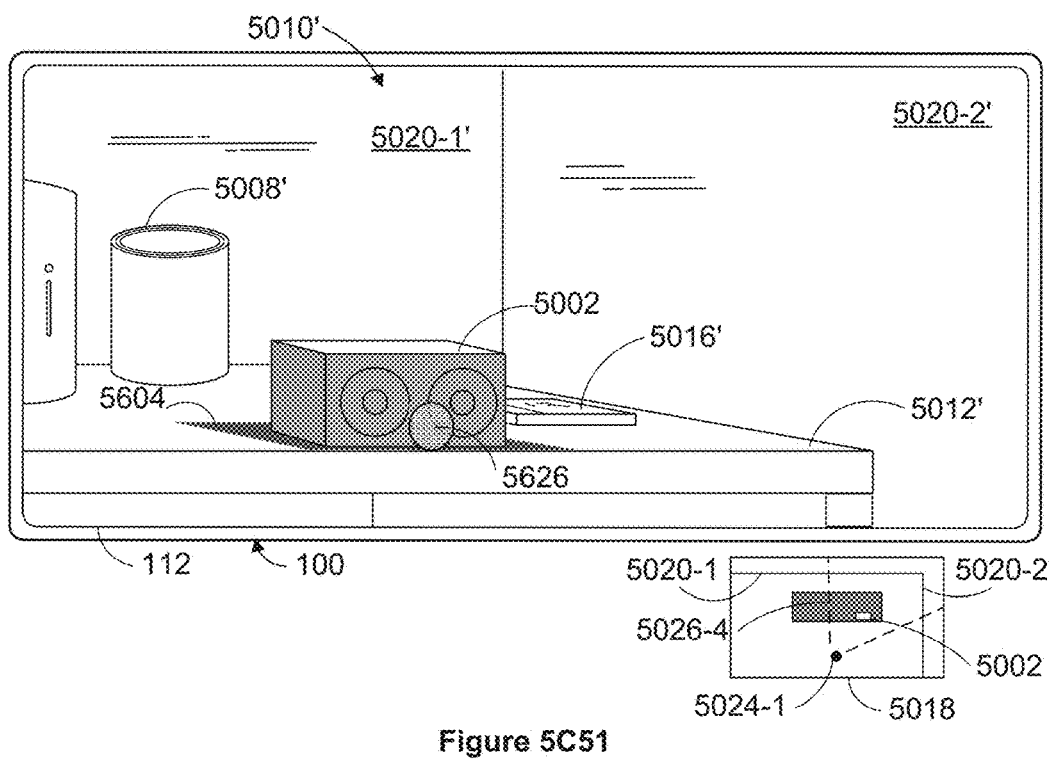
Figure 5C51
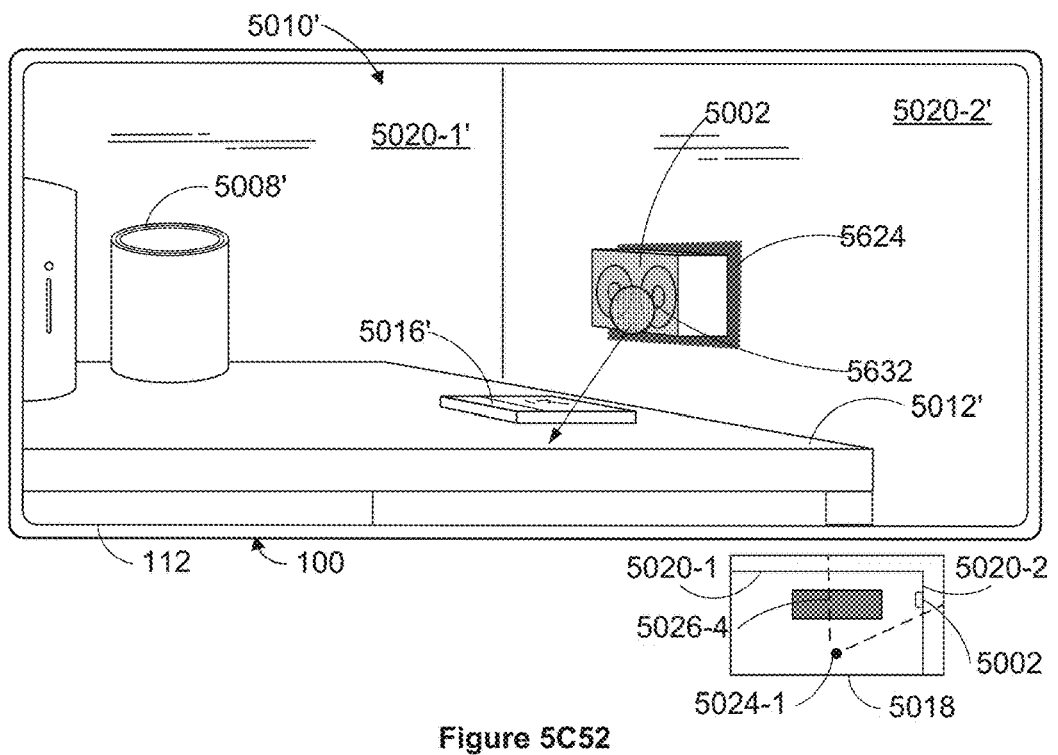
Figure 5C52

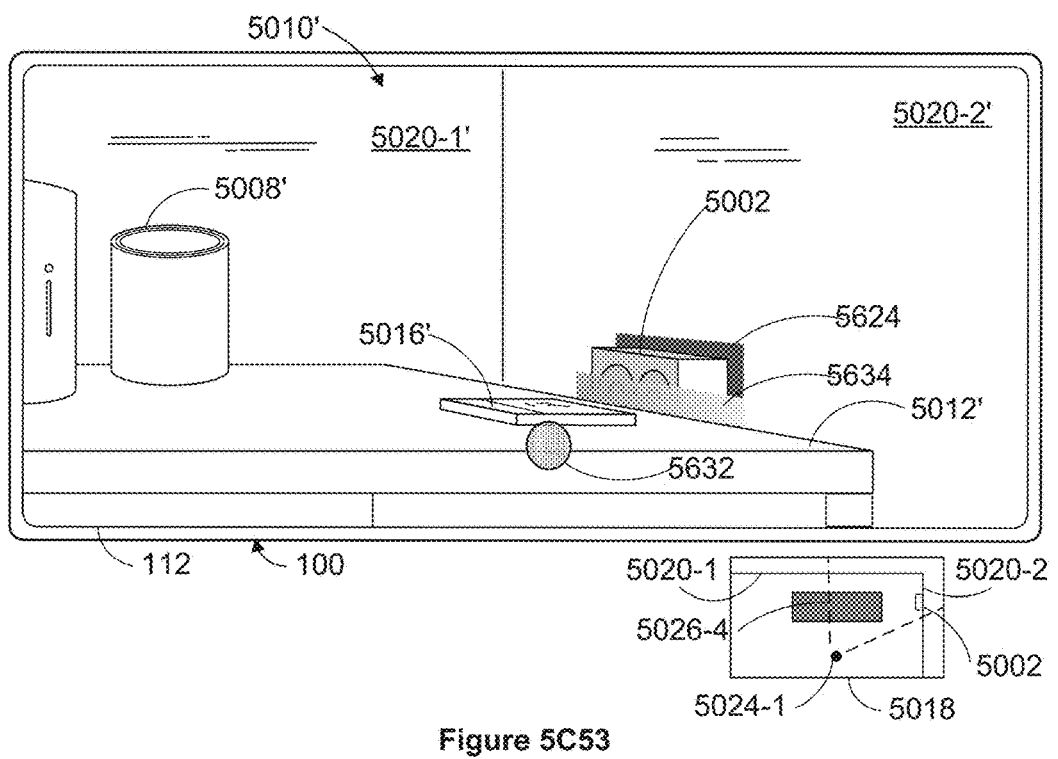
Figure 5C53
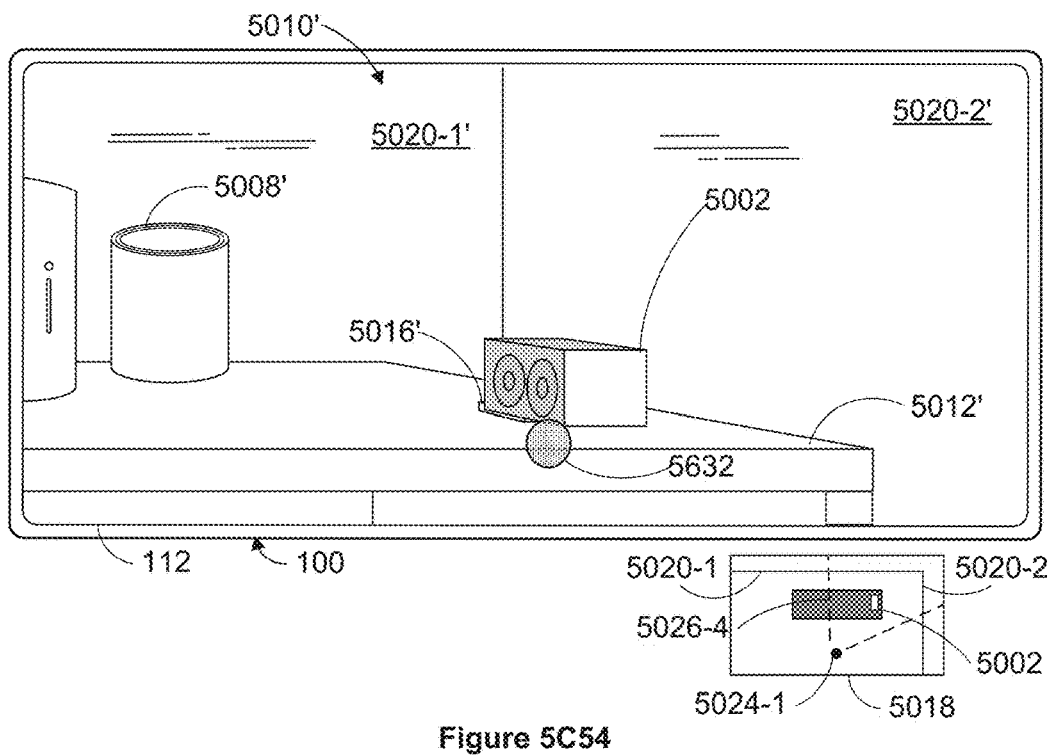
Figure 5C54

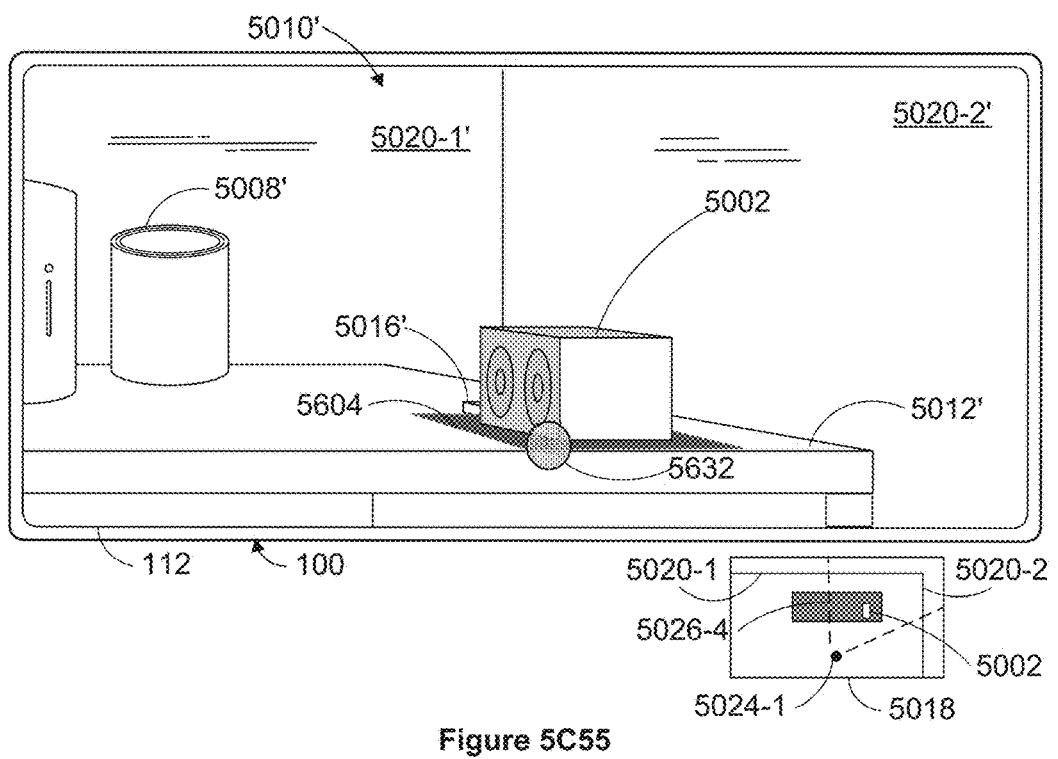
Figure 5C55
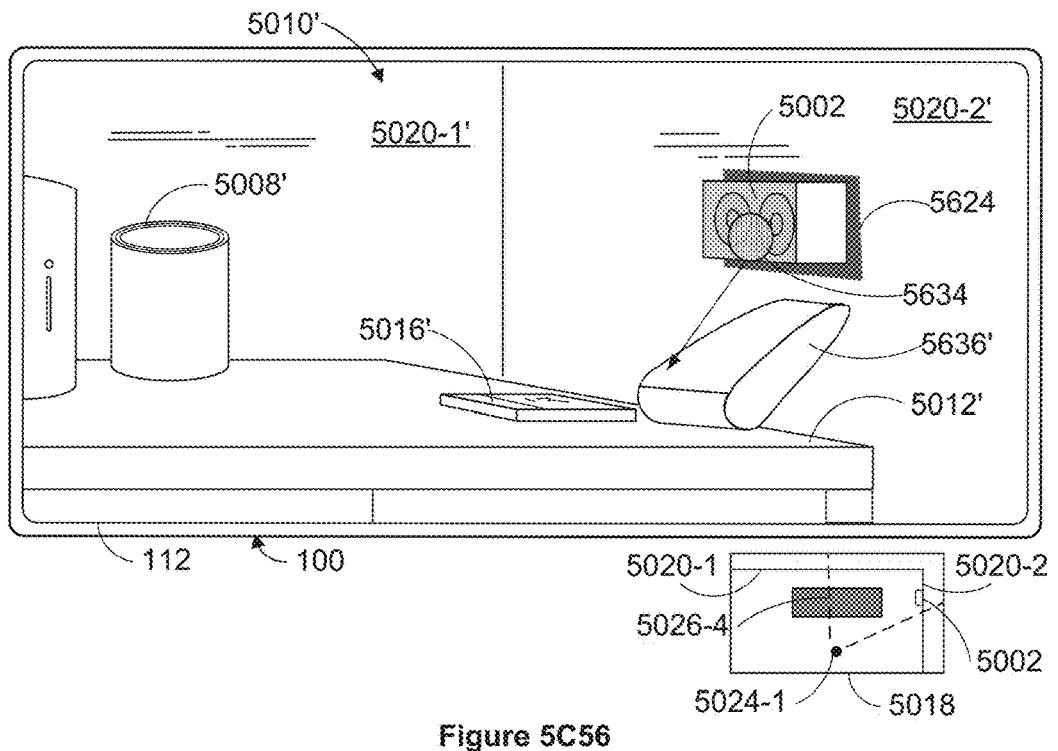
Figure 5C56

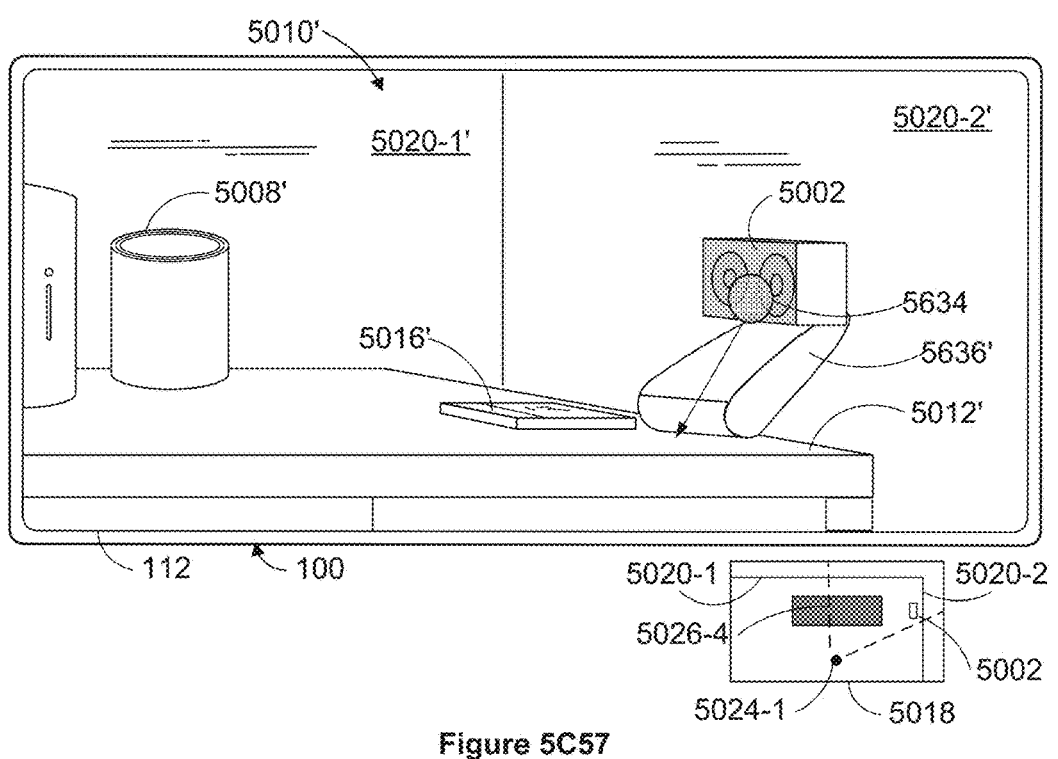
Figure 5C57
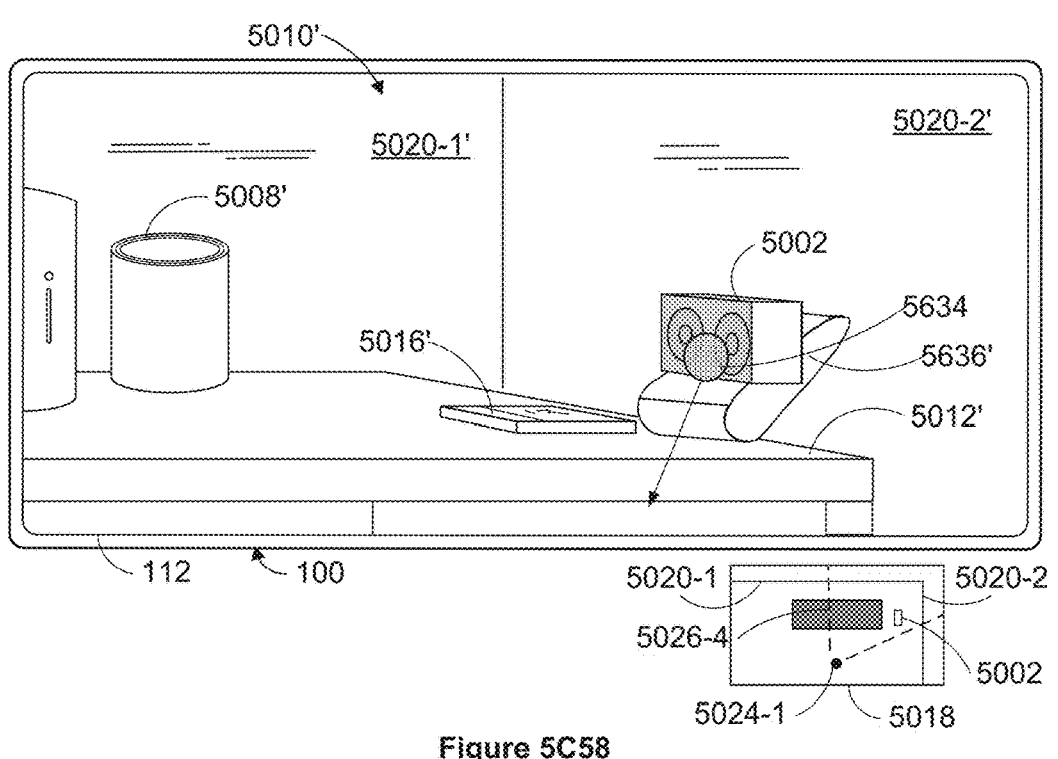
Figure 5C58

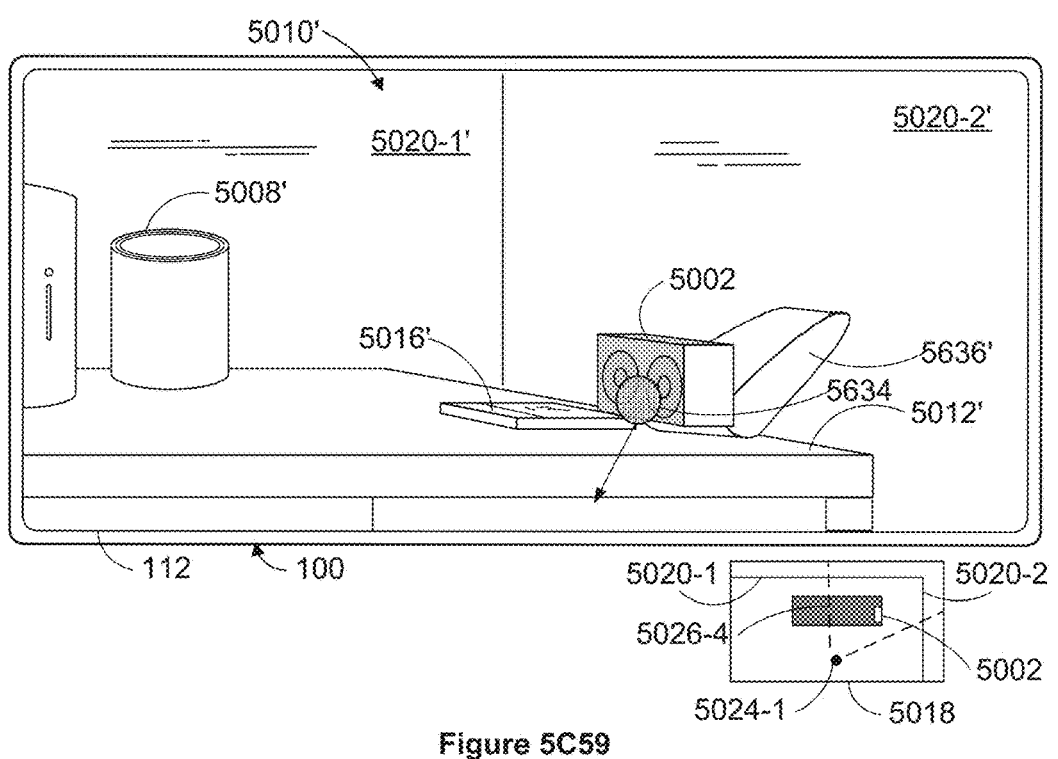
Figure 5C59
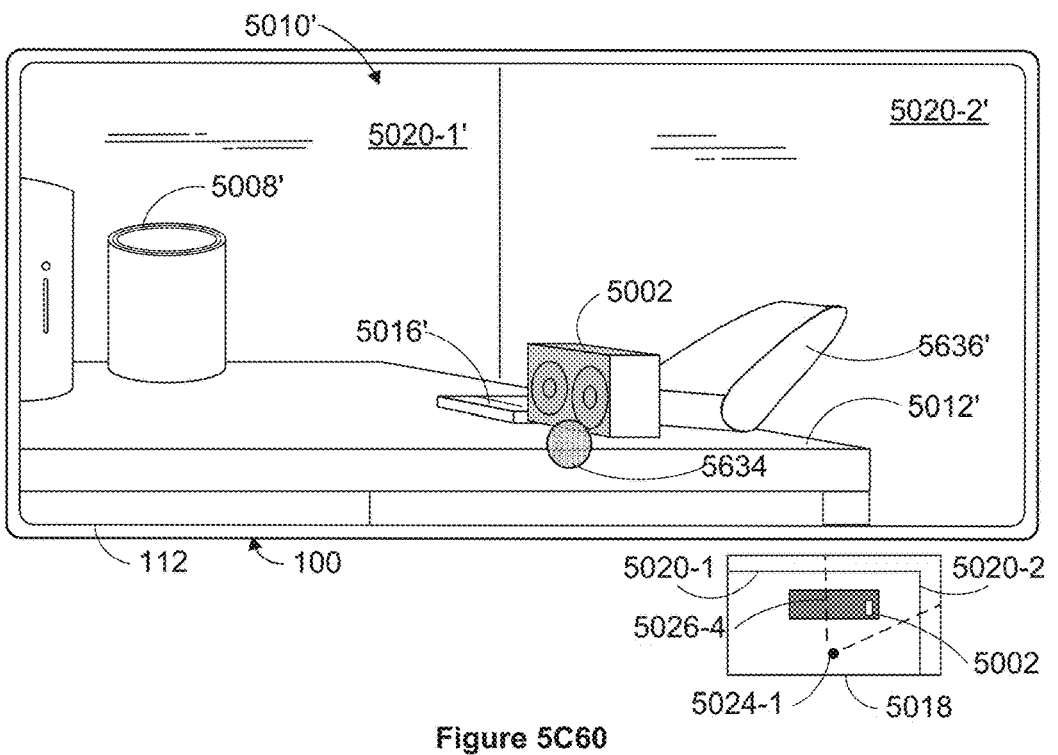
Figure 5C60

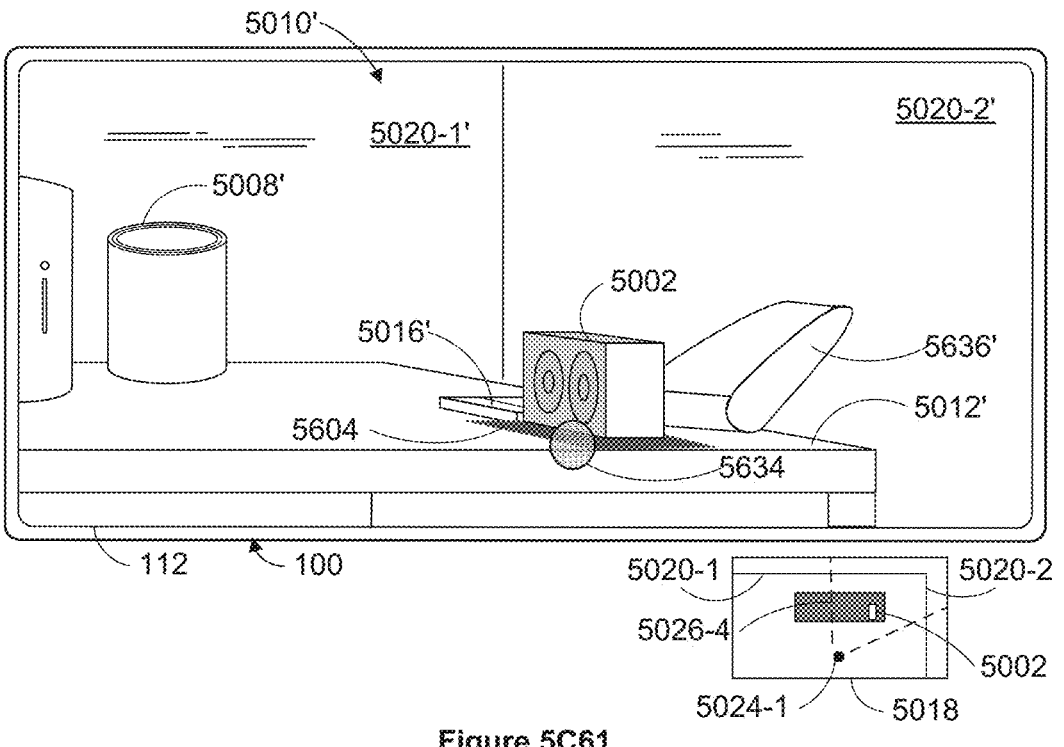
Figure 5C61

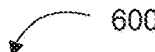
600

602 Display, via the display generation component, a representation of a field of view of the one or more cameras. The field of view includes a physical object in a physical environment, and the representation of the field of view of the one or more cameras includes a representation of the physical object.

604 Receive one or more inputs corresponding to a request to display the representation of the field of view with the physical object at a first pose in the physical environment, a virtual object at a simulated second pose in the physical environment, and the one or more cameras at a third pose in the physical environment 606 In response to receiving the one or more inputs, in accordance with a determination that a first portion of the virtual object corresponds to physical space in the physical environment that is occluded by the physical object in the physical environment:

608 Display the representation of the physical object

610 Forgo displaying the first portion of the virtual object

612 In accordance with a determination that a second portion of the virtual object corresponds to physical space in the physical environment that is not occluded, display the second portion of the virtual object, including visually deemphasizing a displayed first region of the second portion of the virtual object relative to a displayed second region of the second portion of the virtual object

Figure 6A

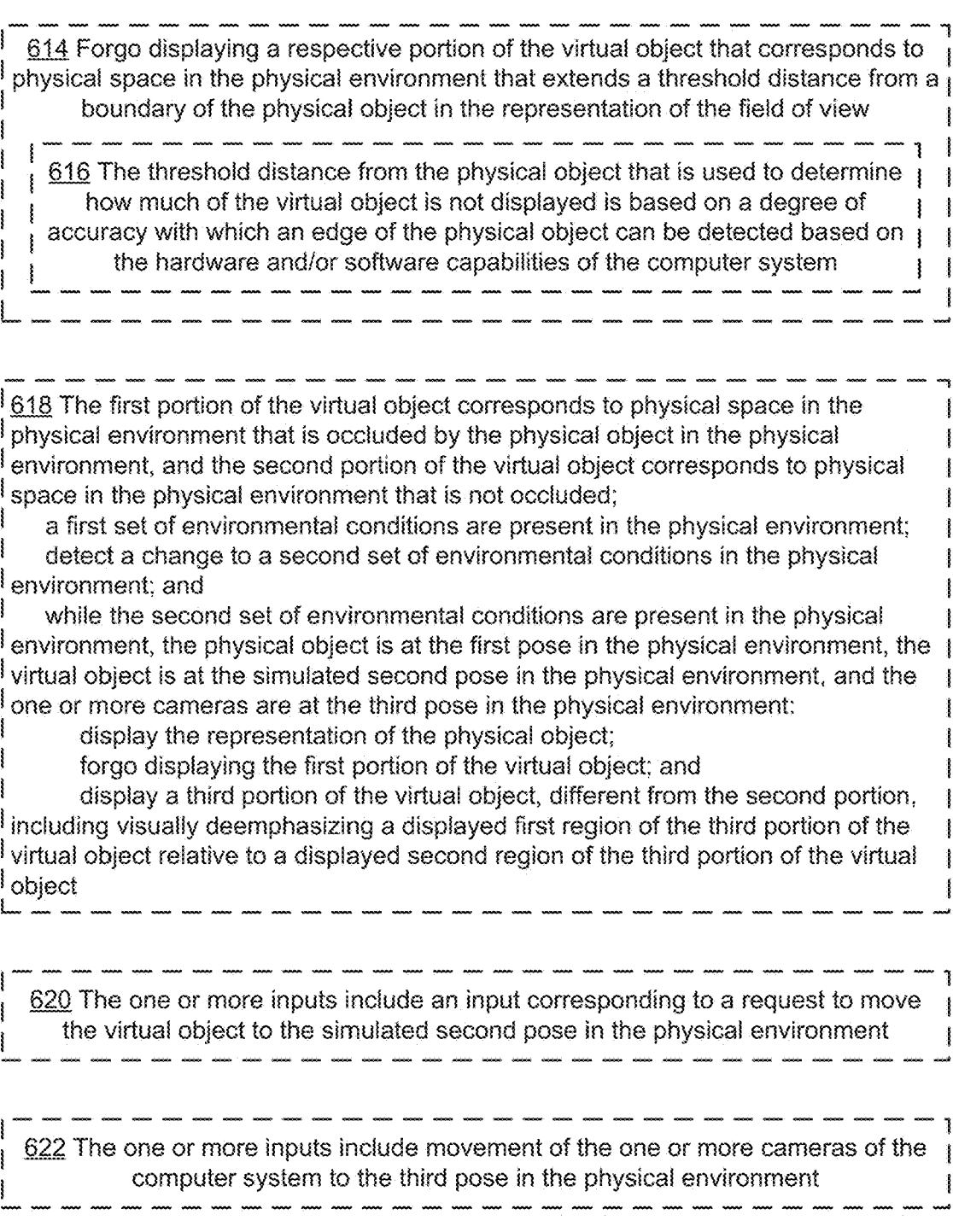

614 Forgo displaying a respective portion of the virtual object that corresponds to physical space in the physical environment that extends a threshold distance from a boundary of the physical object in the representation of the field of view 616 The threshold distance from the physical object that is used to determine how much of the virtual object is not displayed is based on a degree of accuracy with which an edge of the physical object can be detected based on the hardware and/or software capabilities of the computer system 618 The first portion of the virtual object corresponds to physical space in the physical environment that is occluded by the physical object in the physical environment, and the second portion of the virtual object corresponds to physical space in the physical environment that is not occluded;
   a first set of environmental conditions are present in the physical environment;
   detect a change to a second set of environmental conditions in the physical environment; and
   while the second set of environmental conditions are present in the physical environment, the physical object is at the first pose in the physical environment, the virtual object is at the simulated second pose in the physical environment, and the one or more cameras are at the third pose in the physical environment:
      display the representation of the physical object;
      forgo displaying the first portion of the virtual object; and
      display a third portion of the virtual object, different from the second portion, including visually deemphasizing a displayed first region of the third portion of the virtual object relative to a displayed second region of the third portion of the virtual object 620 The one or more inputs include an input corresponding to a request to move the virtual object to the simulated second pose in the physical environment 622 The one or more inputs include movement of the one or more cameras of the computer system to the third pose in the physical environment 624 The one or more inputs include an update of a pose of the physical object to the first pose in the physical environment

Figure 6B

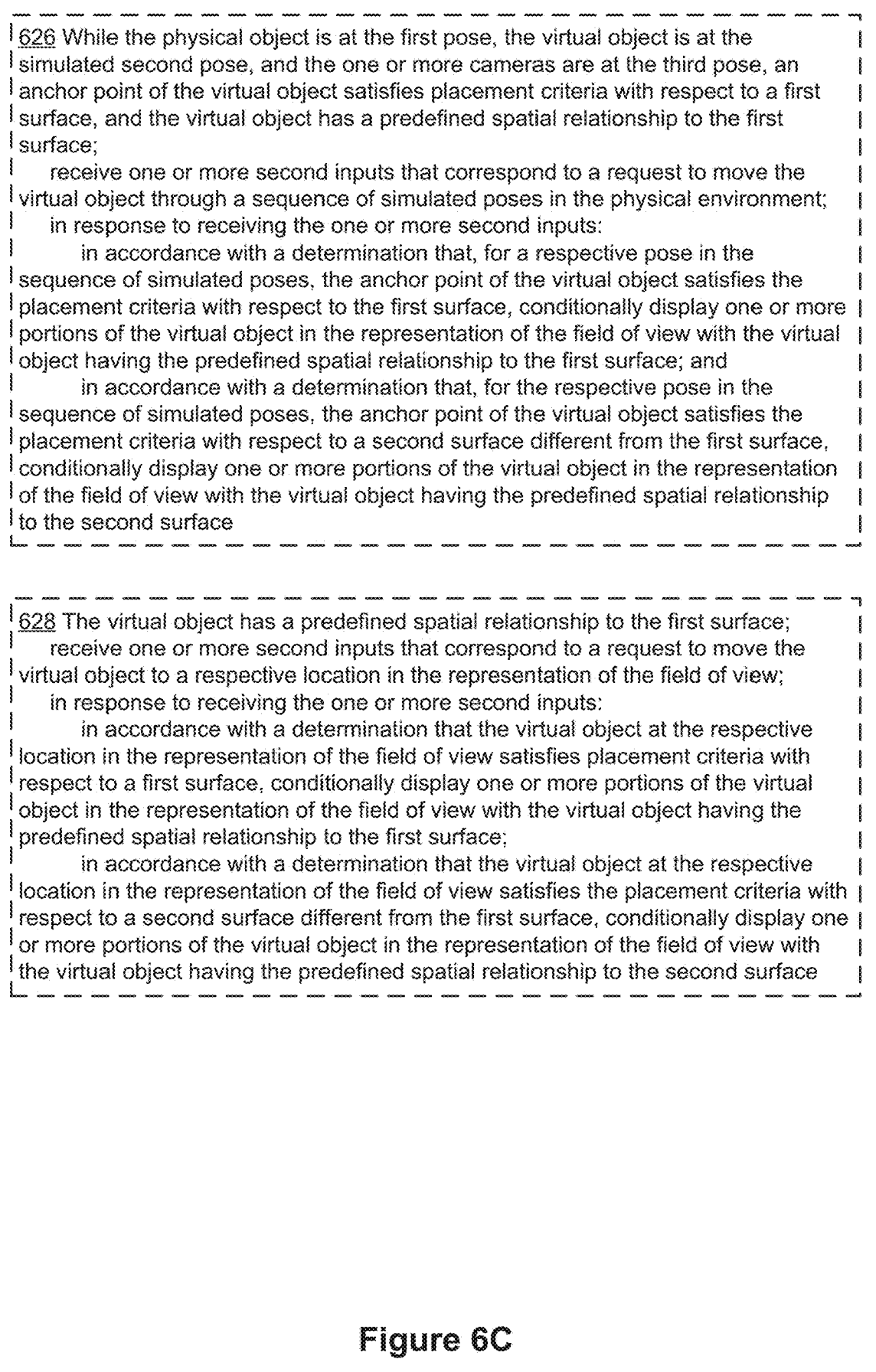

626 While the physical object is at the first pose, the virtual object is at the simulated second pose, and the one or more cameras are at the third pose, an anchor point of the virtual object satisfies placement criteria with respect to a first surface, and the virtual object has a predefined spatial relationship to the first surface;

receive one or more second inputs that correspond to a request to move the virtual object through a sequence of simulated poses in the physical environment;

in response to receiving the one or more second inputs:

in accordance with a determination that, for a respective pose in the sequence of simulated poses, the anchor point of the virtual object satisfies the placement criteria with respect to the first surface, conditionally display one or more portions of the virtual object in the representation of the field of view with the virtual object having the predefined spatial relationship to the first surface; and in accordance with a determination that, for the respective pose in the sequence of simulated poses, the anchor point of the virtual object satisfies the placement criteria with respect to a second surface different from the first surface, conditionally display one or more portions of the virtual object in the representation of the field of view with the virtual object having the predefined spatial relationship to the second surface 628 The virtual object has a predefined spatial relationship to the first surface;

receive one or more second inputs that correspond to a request to move the virtual object to a respective location in the representation of the field of view;

in response to receiving the one or more second inputs:

in accordance with a determination that the virtual object at the respective location in the representation of the field of view satisfies placement criteria with respect to a first surface, conditionally display one or more portions of the virtual object in the representation of the field of view with the virtual object having the predefined spatial relationship to the first surface;

in accordance with a determination that the virtual object at the respective location in the representation of the field of view satisfies the placement criteria with respect to a second surface different from the first surface, conditionally display one or more portions of the virtual object in the representation of the field of view with the virtual object having the predefined spatial relationship to the second surface

Figure 6C

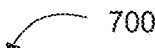

700

702 Display, via a display generation component of a computer system, a representation of a field of view of the one or more cameras, the field of view including a plurality of objects in a physical environment, the plurality of objects including a first physical object having a first surface, a second physical object positioned on the first surface, and a third physical object positioned on the first surface, wherein the second physical object extends from the first surface less than a threshold amount in a respective direction and the third physical object extends from the first surface more than the threshold amount in the respective direction;

704 The first surface of the first physical object is a substantially horizontal surface 706 The first surface of the first physical object is a substantially vertical surface, and the second physical object extends by less than the threshold amount from the first surface, along an axis normal to the first surface, to a portion of the second physical object distal the first surface, and the third physical object extends by more than the threshold amount from the first surface, along the axis normal to the first surface, to a portion of the third physical object distal the first surface 708 Receive one or more first user inputs that correspond to a request to place or move a first virtual object at or to a location in the representation of the field of view that corresponds to a physical location on or near the first surface of the first physical object

Figure 7A

710 In response to the one or more first user inputs:

712 In accordance with a determination that a representative position of the first virtual object in the physical environment coincides with a portion of the first surface that does not include other physical objects positioned on the first surface, display the first virtual object in the representation of the field of view with a predefined spatial relationship to a representation of the first surface 714 The representative position of the first virtual object in the physical environment comprises a position in the physical environment determined by casting a virtual ray from a view position associated with a user of the computer system though a predefined anchor point of the first virtual object to a surface in the physical environment 716 In accordance with a determination that the representative position of the first virtual object in the physical environment coincides with the second physical object positioned on the first surface, display the first virtual object in the representation of the field of view with the predefined spatial relationship to the representation of the first surface 718 In accordance with a determination that the representative position of the first virtual object in the physical environment coincides with the third physical object positioned on the first surface, display the first virtual object in the representation of the field of view as positioned on a representation of the third physical object, wherein in the representation of the field of view the representation of third physical object is positioned between a representation of the first physical object and the first virtual object

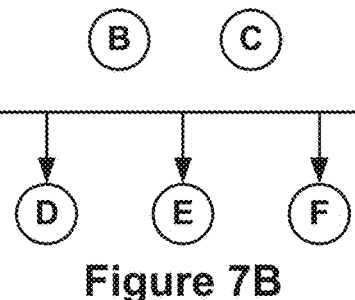

Figure 7B

720 In response to the one or more first user inputs, move the first virtual object in the representation of the field of view from a prior position on the first surface of the first physical object that does not include other physical objects to a new position on the first surface of the first physical object, the new position comprising the representative position of the first virtual object in the physical environment after moving the first virtual object in accordance with the one or more first user inputs 722 Moving the first virtual object in the representation of the field of view from the prior position on the first surface to the new position on the first surface of the first physical object includes, in accordance with a determination that the new position of the first virtual object in the physical environment coincides with the second physical object positioned on the first surface, displaying the first virtual object in the representation of the field of view with the predefined spatial relationship to the representation of the first surface while at the prior position on the first surface and with the same predefined spatial relationship to the representation of the first surface while at the new position on the first surface.

724 Moving the first virtual object in the representation of the field of view from the prior position on the first surface to the new position on the first surface of the first physical object includes, in accordance with a determination that in the representation of the field of view the new position of the first virtual object in the physical environment coincides with the third physical object positioned on the first surface, displaying the first virtual object in the representation of the field of view with an increased placement distance extending from the first surface while at the new position on the first surface relative to its placement distance extending from the first surface while at the prior position on the first surface

Figure 7C

738 Receive one or more second user inputs that correspond to a request to add or move a second virtual object at or to a location in the representation of the field of view that corresponds to a physical location on or near the first surface of the first physical object 740 In response to the one or more second user inputs:

742 In accordance with a determination that a representative position of the second virtual object in the physical environment coincides with a portion of the first surface that does not include other physical objects positioned on the first surface, display the second virtual object in the representation of the field of view with a predefined spatial relationship to a representation of the first surface 746 In accordance with a determination that the representative position of the second virtual object in the physical environment coincides with the second physical object positioned on the first surface, display the second virtual object in the representation of the field of view with the predefined spatial relationship to the representation of the first surface 748 In accordance with a determination that the representative position of the second virtual object in the physical environment coincides with the third physical object positioned on the first surface, display the second virtual object in the representation of the field of view as positioned on a representation of the third physical object, wherein in the representation of the field of view the representation of third physical object is positioned between a representation of the first physical object and the second virtual object

Figure 7E

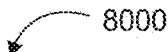 8000

<u>8002</u>
Display a first virtual object in a representation of a field of view of the one or more cameras, the field of view including a view of a portion of a physical environment, wherein the portion of the physical environment includes a first physical object and a second physical object different from the first physical object, the first virtual object is displayed at a first position that has a predefined spatial relationship to a representation of the first physical object in the representation of the field of view <u>8004</u>
While displaying the first virtual object at the first position with the predefined spatial relationship to the representation of the first physical object in the representation of the field of view, detect one or more first user inputs that correspond to a request to move the first virtual object relative to the first physical object <u>8006</u>
In response to detecting the one or more first user inputs:

<u>8008</u>
in accordance with a determination that the one or more first user inputs correspond a request to move the first virtual object from the first position, to a second position that has the predefined spatial relationship to the representation of the first physical object in the representation of the field of view, move the first virtual object with movements that correspond to the one or more first user inputs <u>8010</u>
in accordance with a determination that the one or more first user inputs correspond a request to move the first virtual object from the first position, to a third position that has the predefined spatial relationship to the representation of the second physical object in the representation of the field of view, move the first virtual object from the first position in the representation of the field of view to the third position in the representation of the field of view, including, displaying an animated transition between the first virtual object being displayed with the predefined spatial relationship to the representation of the first physical object to the first virtual object being displayed with the predefined spatial relationship to the second physical object, wherein the animated transition includes movement of the first virtual object that does not correspond to the one or more first inputs

Figure 8A

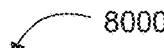 8000

8012
The one or more first inputs correspond a request to translate the first virtual object while maintaining the first virtual object at positions that have the predefined spatial relationship with the representation of the first physical object, without changing an orientation and/or size of the first virtual object

8014
While displaying the first virtual object at the third position with the predefined spatial relationship to the representation of the second physical object in the representation of the field of view, detect one or more second user inputs that correspond to a request to move the first virtual object relative to the second physical object; and in response to detecting the one or more second user inputs:

in accordance with a determination that the one or more second user inputs correspond a request to move the first virtual object from the third position, to a fourth position that has the predefined spatial relationship to the representation of the first physical object in the representation of the field of view, moving the first virtual object with movements that correspond to the one or more second user inputs

8016
In response to detecting the one or more second user inputs:

in accordance with a determination that the one or more second user inputs correspond a request to move the first virtual object from the third position, to a fifth position that has the predefined spatial relationship to the representation of the first physical object in the representation of the field of view, moving the first virtual object from the third position in the representation of the field of view to the fifth position in the representation of the field of view, including, displaying an animated transition between the first virtual object being displayed with the predefined spatial relationship to the representation of the second physical object to the first virtual object being displayed with the predefined spatial relationship to the first physical object, wherein the animated transition includes movement of the first virtual object that does not correspond to the one or more second inputs.

Figure 8B

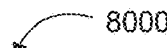 8000

---

8018
The determination that the one or more first user inputs correspond a request to move the first virtual object from the first position that has the predefined spatial relationship to the representation of the first physical object in the representation of the field of view to the third position that has the predefined spatial relationship to the representation of the second physical object in the representation of the field of view is made in accordance with a determination that a first condition for moving the first virtual object from the first position to the third position has been met and remains being met for at least a threshold amount of time

---

8020
The determination that the one or more first user inputs correspond a request to move the first virtual object from the first position to the third position is made in accordance with a determination that the one or more first inputs correspond to a first amount of movement of the first virtual object beyond a threshold location corresponding to the first physical object, and that the first amount of movement is greater than a preset threshold amount of movement

---

8022
The first physical object has a first surface, and the second physical object has a second surface, wherein the first surface and the second surface are at an angle relative to each other

---

8024
The animated transition includes a series of intermediate states in which an orientation of the first virtual object is unchanged relative to the physical environment in the representation of the field of view

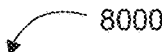 8000

8026
While displaying the first virtual object at the first position that has the predefined spatial relationship to the representation of the first physical object in the representation of the field of view, display a first simulated shadow of the first virtual object around a first portion of the first virtual object that is facing toward the first physical object; and
While displaying the first virtual object at the third position that has the predefined spatial relationship to the representation of the second physical object in the representation of the field of view, display a second simulated shadow of the first virtual object around a second portion of the first virtual object that is facing toward the second physical object, the second portion of the first virtual object being different from the first portion of the first virtual object 8028
Display the first virtual object at the first position and the second position that have the predefined spatial relationship to the representation of the first physical object includes displaying the first virtual object with a first portion of the first virtual object facing toward the first physical object, and
Display the first virtual object at the third position that has the predefined spatial relationship to the representation of the second physical object includes displaying the first virtual object with a second portion, different from the first portion, of the first virtual object facing toward the second physical object 8030
The first position and the second position have the predefined spatial relationship to a first surface of the first physical object, the third position has the predefined spatial relationship to a second surface of the second physical object, and the first surface and the second surface are substantially horizontal surfaces relative to the physical environment 8032
The animated transition includes a series of intermediate states in which an orientation of the first virtual object is unchanged relative to the physical environment in the representation of the field of view

Figure 8D

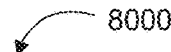 8000

8034
The first physical object corresponds to a first plane and the second physical object corresponds to a second plane that is at an angle to the first plane, and
    The computer system:
        in response to the one or more first inputs, in accordance with a determination that the one or more first user inputs correspond a request to move the first virtual object from the first position to the third position that has the predefined spatial relationship to the representation of the second physical object in the representation of the field of view, changes an orientation of the first virtual object from a first orientation to a second orientation different from the first orientation 8036
    While displaying of the first virtual object at the third position that has the predefined spatial relationship to the representation of the second physical object in the representation of the field of view and with the second orientation relative to the second physical object, detect one or more third user inputs that correspond to a request to move the first virtual object relative to the representation of the field of view; and
        In response to detecting the one or more third user inputs:
            in accordance with a determination that the one or more third user inputs correspond a request to move the first virtual object from the third position to a fifth position that has the predefined spatial relationship to the representation of the first physical object in the representation of the field of view, move the first virtual object from the third position in the representation of the field of view to the fifth position in the representation of the field of view, wherein the first virtual object is displayed at the fifth position in the representation of the field of view with the second orientation, without changing the orientation of the first virtual object

Figure 8E

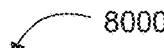
8000

8038

The portion of the physical environment further includes a third physical object that is different from the first physical object and the second physical object, and The computer system:

in response to detecting the one or more first user inputs:

in accordance with a determination the one or more first user inputs correspond a request to move the first virtual object from the first position to a sixth position that has the predefined spatial relationship to the representation of the third physical object in the representation of the field of view, moves the first virtual object from the first position in the representation of the field of view to the sixth position in the representation of the field of view while maintaining an existing orientation of the first virtual object

8040

While displaying the first virtual object in the representation of the field of view, detect one or more fourth user inputs that correspond to a request to resize and/or rotate the first virtual object relative to the representation of the field of view; and In response to detecting the one or more fourth user inputs:

maintain display of the first virtual object at the first position in the representation of the field of view with a different size and/or a different orientation selected in accordance with the one or more fourth user inputs

Figure 8F

SYSTEMS, METHODS, AND GRAPHICAL USER INTERFACES FOR DISPLAYING AND MANIPULATING VIRTUAL OBJECTS IN AUGMENTED REALITY ENVIRONMENTS

RELATED APPLICATIONS

This application is a continuation of U.S. patent application Ser. No. 17/202,233, filed Mar. 15, 2021, which claims priority to U.S. Provisional Application Ser. No. 62/991,062, filed Mar. 17, 2020, which is incorporated herein in its entirety.

TECHNICAL FIELD

This relates generally to computer systems for augmented and/or virtual reality, including but not limited to electronic devices for displaying and manipulating virtual objects within augmented reality environments.

BACKGROUND

The development of computer systems for augmented and/or virtual reality has increased significantly in recent years. Augmented reality environments are useful for visualizing virtual or modeled objects at different locations and orientations within a physical environment, by improving the modeling of the physical environment and by changing the appearance of the virtual object to indicate different spatial relationships with the physical environment. But conventional methods of displaying and manipulating virtual objects within augmented reality environments are cumbersome, inefficient, and limited. In some cases, conventional methods of visualizing and manipulating virtual objects within a physical environment fail to omit portions of virtual objects that should appear occluded by other objects in the environment, or fail to account for uncertainty in determining the boundaries of the occluding objects. In some cases, conventional methods of visualizing virtual objects in a physical environment are overly sensitive to physical objects that are fairly thin relative to the surfaces on which they are placed. In some cases, conventional methods of visualizing virtual objects in a physical environment display instability and flickering of virtual object when the virtual object is moved across different surfaces, or the intermediate states are not displayed at all. In addition, conventional methods take longer than necessary, thereby wasting energy. This latter consideration is particularly important in battery-operated devices.

SUMMARY

Accordingly, there is a need for computer systems with improved methods and interfaces for displaying and manipulating virtual objects within augmented reality environments. Such methods and interfaces optionally complement or replace conventional methods for displaying and manipulating virtual objects within augmented reality environments. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for augmented and/or virtual reality are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, in addition to augmented and/or virtual reality-based modeling and visualization functions, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system having a display generation component and one or more cameras. The method includes displaying, via the display generation component, a representation of a field of view of the one or more cameras. The field of view includes a physical object in a physical environment, and the representation of the field of view of the one or more cameras includes a representation of the physical object. The method includes receiving one or more inputs corresponding to a request to display the representation of the field of view with the physical object at a first pose in the physical environment, a virtual object at a simulated second pose in the physical environment, and the one or more cameras at a third pose in the physical environment. The method includes, in response to receiving the one or more inputs, in accordance with a determination that a first portion of the virtual object corresponds to physical space in the physical environment that is occluded by the physical object in the physical environment: displaying the representation of the physical object; forgoing displaying the first portion of the virtual object; and, in accordance with a determination that a second portion of the virtual object corresponds to physical space in the physical environment that is not occluded, displaying the second portion of the virtual object, including visually deemphasizing a displayed first region of the second portion of the virtual object relative to a displayed second region of the second portion of the virtual object.

In accordance with some embodiments, a method of positioning or moving a virtual object in an augmented reality environment, performed at (e.g., by) a computer system having (or in communication with) a display generation component, an input device, and one or more cameras, includes displaying, via the display generation component, a representation of a field of view of the one or more cameras, the field of view including a plurality of objects in a physical environment. The plurality of objects includes a first physical object having a first surface, a second physical object positioned on the first surface, and a third physical object positioned on the first surface. The second physical object extends from the first surface less than a threshold amount in a respective direction and the third physical object extends from the first surface more than the threshold amount in the respective direction. The method includes receiving one or more first user inputs that correspond to a request to place or move a first virtual object at or to a location in the representation of the field of view that corresponds to a physical location on or near the first surface of the first physical object. In response to the one or more first user inputs, in accordance with a determination that a representative position of the first virtual object in the physical environment coincides with a portion of the first surface that does not include other physical objects positioned on the first surface, the computer system displays the first virtual object in the representation of the field of view with a predefined spatial relationship to a representation of the first surface. In response to the one or more first user inputs, in accordance with a determination that the representative position of the first virtual object in the physical environment coincides with the second physical object positioned on the first surface, the computer system displays the first virtual object in the representation of the field of view with the predefined spatial relationship to the representation of the first surface (e.g., the same predefined spatial relationship as the one used when the position of the first virtual object in the physical environment coincides with a portion of the first surface that does not include other physical objects positioned on the first surface). Further, in response to the one or more first user inputs, in accordance with a determination that the representative position of the first virtual object in the physical environment coincides with the third physical object positioned on the first surface, the computer system displays the first virtual object in the representation of the field of view as positioned on a representation of the third physical object, wherein in the representation of the field of view the representation of third physical object is positioned between a representation of the first physical object and the first virtual object.

In accordance with some embodiments, a method is performed at a computer system having a display generation component, an input device, and one or more cameras, the method including: displaying a first virtual object in a representation of a field of view of the one or more cameras, the field of view including a view of a portion of a physical environment, wherein the portion of the physical environment includes a first physical object and a second physical object different from the first physical object, the first virtual object is displayed at a first position that has a predefined spatial relationship to a representation of the first physical object in the representation of the field of view; while displaying the first virtual object at the first position with the predefined spatial relationship to the representation of the first physical object in the representation of the field of view, detecting one or more first user inputs that correspond to a request to move the first virtual object relative to the first physical object; and in response to detecting the one or more first user inputs: in accordance with a determination that the one or more first user inputs correspond a request to move the first virtual object from the first position, to a second position that has the predefined spatial relationship to the representation of the first physical object in the representation of the field of view, moving the first virtual object with movements that correspond to the one or more first user inputs; and in accordance with a determination that the one or more first user inputs correspond a request to move the first virtual object from the first position, to a third position that has the predefined spatial relationship to the representation of the second physical object in the representation of the field of view, moving the first virtual object from the first position in the representation of the field of view to the third position in the representation of the field of view, including, displaying an animated transition between the first virtual object being displayed with the predefined spatial relationship to the representation of the first physical object to the first virtual object being displayed with the predefined spatial relationship to the second physical object, wherein the animated transition includes movement of the first virtual object that does not correspond to the one or more first inputs.

In accordance with some embodiments, a computer system includes (and/or is in communication with) a display generation component (e.g., a display, a projector, a head-mounted display, a heads-up display, or the like), one or more cameras (e.g., video cameras that continuously, or repeatedly at regular intervals, provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, cause the computer system to perform or cause performance of the operations of any of the methods described herein. In accordance with some embodiments, a graphical user interface on a computer system that includes (and/or is in communication with) a display generation component, one or more cameras, one or more input devices, optionally one or more pose sensors, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes (and/or is in communication with) a display generation component, one or more cameras, one or more input devices, optionally one or more pose sensors, optionally one or more sensors to detect intensities of contacts with the touch-sensitive surface, optionally one or more tactile output generators, and means for performing or causing performance of the operations of any of the methods described herein. In accordance with some embodiments, an information processing apparatus, for use in a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, includes means for performing or causing performance of the operations of any of the methods described herein.

Thus, computer systems that have (and/or are in communication with) a display generation component, one or more cameras, one or more input devices, optionally one or more pose sensors, optionally one or more sensors to detect intensities of contacts with the touch-sensitive surface, and optionally one or more tactile output generators, are provided with improved methods and interfaces for displaying and manipulating virtual objects within augmented reality environments, thereby increasing the effectiveness, efficiency, and user satisfaction with such computer systems. Such methods and interfaces may complement or replace conventional methods for displaying and manipulating virtual objects within augmented reality environments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1B is a block diagram illustrating example components for event handling in accordance with some embodiments.

FIG. 3A is a block diagram of an example multifunction device with a display and a touch-sensitive surface in accordance with some embodiments.

FIGS. 3B-3C are block diagrams of example computer systems in accordance with some embodiments.

FIG. 4B illustrates an example user interface for a multifunction device with a touch-sensitive surface that is separate from the display in accordance with some embodiments.

FIGS. 5A1-5A20 illustrate example user interfaces for displaying virtual objects to indicate occlusion by or proximity to physical objects, in accordance with some embodiments.

FIGS. 5B1-5B12 illustrate example user interfaces for positioning and moving virtual objects in an augmented reality environment, in accordance with some embodiments.

FIGS. 5C1-5C61 illustrate example user interfaces for interacting with an augmented reality environments (e.g., dragging virtual objects on and across different types of surfaces), in accordance with some embodiments.

FIGS. 6A-6C are flow diagrams of a process for displaying virtual objects to indicate occlusion by or proximity to physical objects, in accordance with some embodiments.

FIGS. 7A-7E are flow diagrams of a process for displaying virtual objects in an augmented reality environment as one or more of the objects are moved over the surface of a first physical object to various locations, including the locations of various physical objects on that surface, in accordance with some embodiments.

FIGS. 8A-8F are flow diagrams of a process for interacting with an augmented reality environments (e.g., dragging virtual objects on and across different types of surfaces), in accordance with some embodiments.

DESCRIPTION OF EMBODIMENTS

Figure 1A:
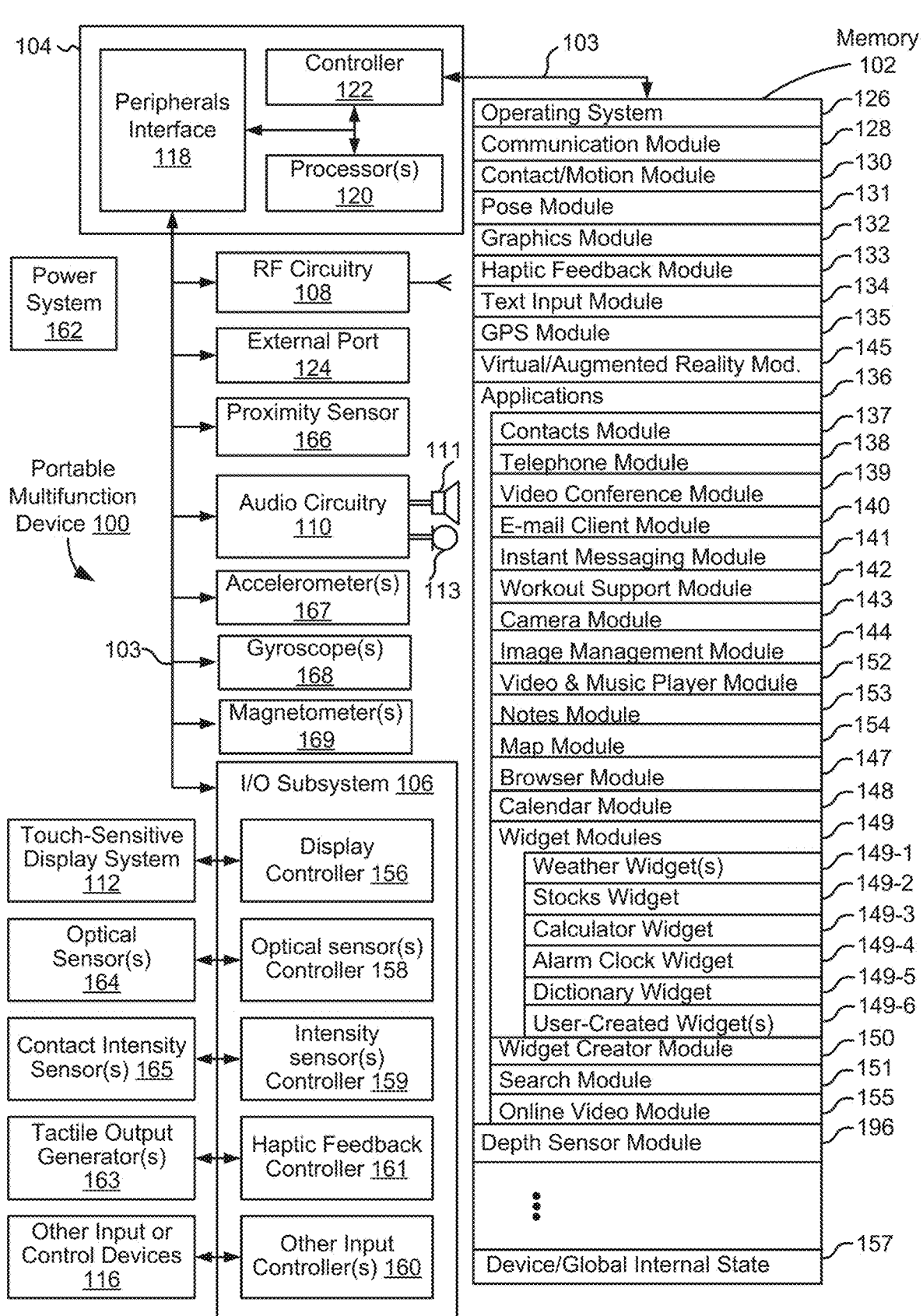
FIG. 1A is a block diagram illustrating a portable multifunction device with a touch-sensitive display in accordance with some embodiments.

As noted above, augmented reality environments are useful for visualizing virtual or modeled objects at different locations and orientations within a physical environment, by improving the modeling of the physical environment and by changing the appearance of the virtual object to indicate different spatial relationships with the physical environment. Conventional methods of displaying and manipulating virtual objects within augmented reality environments are often limited in functionality. In some cases, conventional methods of visualizing and manipulating virtual objects within a physical environment fail to omit portions of virtual objects that should appear occluded by other objects in the environment, or fail to account for uncertainty in determining the boundaries of the occluding objects. In some cases, conventional methods of visualizing virtual objects in a physical environment are overly sensitive to physical objects that are fairly thin relative to the surfaces on which they are placed. In some cases, conventional methods of visualizing virtual objects in a physical environment display instability and flickering of virtual object when the virtual object is moved across different surfaces, or the intermediate states are not displayed at all. The embodiments disclosed herein provide an intuitive way for a user to visualize and manipulate virtual objects in a physical environment (e.g., by providing more intelligent and sophisticated functionality, by enabling the user to perform different operations in the augmented reality environment with fewer inputs, and/or by simplifying the user interface). Additionally, the embodiments herein provide improved feedback that better illustrate spatial relationships and interactions between virtual objects and the physical environment and objects therein, to help the user better visualize the virtual objects in the physical environment, and to provide the user with information about the operations, such as operations to manipulate the virtual objects, being performed.

The systems, methods, and GUIs described herein improve user interface interactions with augmented and/or virtual reality environments in multiple ways. For example, they make it easier to visualize and manipulate virtual objects within augmented reality environments, by improving the modeling of the physical environment and by changing the appearance of the virtual object to indicate different spatial relationships with the physical environment.

Below, FIGS. 1A-1B, 2, and 3A-3C provide a description of example devices. FIGS. 4A-4B, 5A1-5A20, 5B1-5B12, and 5C1-5C61 illustrate example user interfaces for displaying and manipulating virtual objects within augmented reality environments. FIGS. 6A-6C illustrate a flow diagram of a method of displaying virtual objects to indicate occlusion by or proximity to physical objects. FIGS. 7A-7E illustrate a flow diagram of a method of displaying virtual objects in an augmented reality environment as one or more of the objects are moved over the surface of a first physical object to the locations of various physical objects on that surface. FIGS. 8A-8F illustrate a flow diagram of a method of interacting with an augmented reality environments (e.g., dragging virtual objects on and across different types of surfaces). The user interfaces in FIGS. 5A1-5A20, 5B1-5B12, and 5C1-5C61 are used to illustrate the processes in FIGS. 6A-6C, 7A-7E, and 8A-8F.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Computer systems for augmented and/or virtual reality include electronic devices that produce augmented and/or virtual reality environments. Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad) that also includes, or is in communication with, one or more cameras.

In the discussion that follows, a computer system that includes an electronic device that has (and/or is in communication with) a display and a touch-sensitive surface is described. It should be understood, however, that the computer system optionally includes one or more other physical user-interface devices, such as a physical keyboard, a mouse, a joystick, a wand controller, and/or cameras tracking the position of one or more features of the user such as the user's hands.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electro-mechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the pose (e.g., position and orientation or attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's pose (e.g., location and/or attitude).

Operating system 126 (e.g., iOS, Android, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the pre-defined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Pose module 131, in conjunction with accelerometers 167, gyroscopes 168, and/or magnetometers 169, optionally detects pose information concerning the device, such as the device's pose (e.g., roll, pitch, yaw and/or position) in a particular frame of reference. Pose module 131 includes software components for performing various operations related to detecting the position of the device and detecting changes to the pose of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments virtual reality, features. Virtual/augmented reality module 145 facilitates superposition of virtual content, such as a virtual user interface object, on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the pose of at least a portion of a computer system (e.g., a pose of a display device that is used to display the user interface to a user of the computer system).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;
  search module 151;
  video and music player module 152, which is, optionally, made up of a video player module and a music player module;
  notes module 153;
  map module 154;
  online video module 155; and/or
  depth sensor module 196.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module z141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

In conjunction with camera module 143, depth sensor module 196 includes executable instructions for capturing depth information about a physical environment. In some embodiments, depth sensor module 196 operates in conjunction with camera module 143 to provide depth information of a physical environment. In some embodiments, virtual/augmented reality module 145 operates in conjunction with camera module 143 and/or depth sensor module 196 to generate a three-dimensional model of a physical environment based on captured visual and/or depth information, and to enable a user to add virtual objects to and manipulate virtual objects within the three-dimensional model, to simulate placement and modification of virtual objects within the physical environment.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current pose (e.g., position and orientation) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 2A:
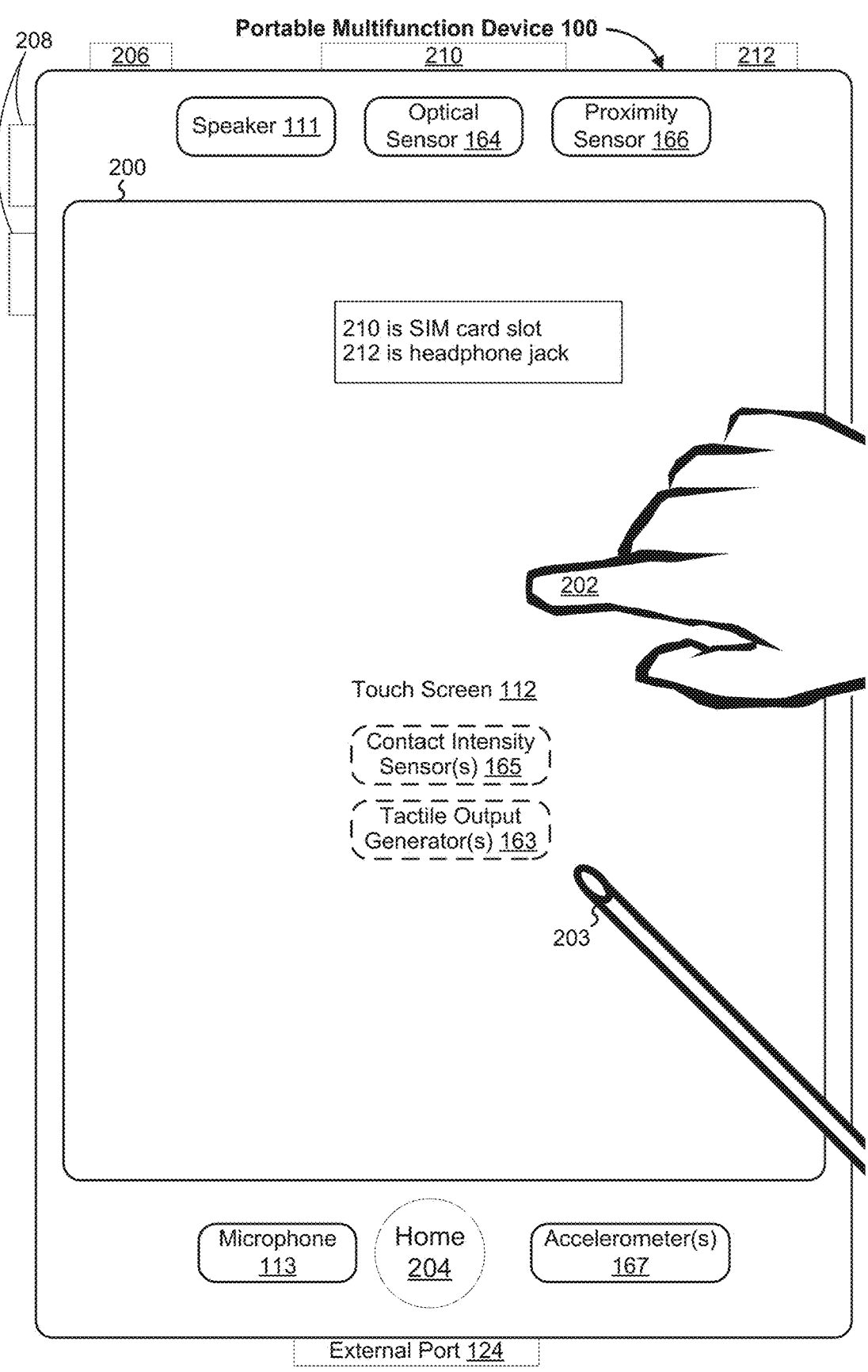
FIG. 2A illustrates a portable multifunction device having a touch screen in accordance with some embodiments.

FIG. 2A illustrates a portable multifunction device 100 (e.g., a view of the front of device 100) having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

Figure 2B:
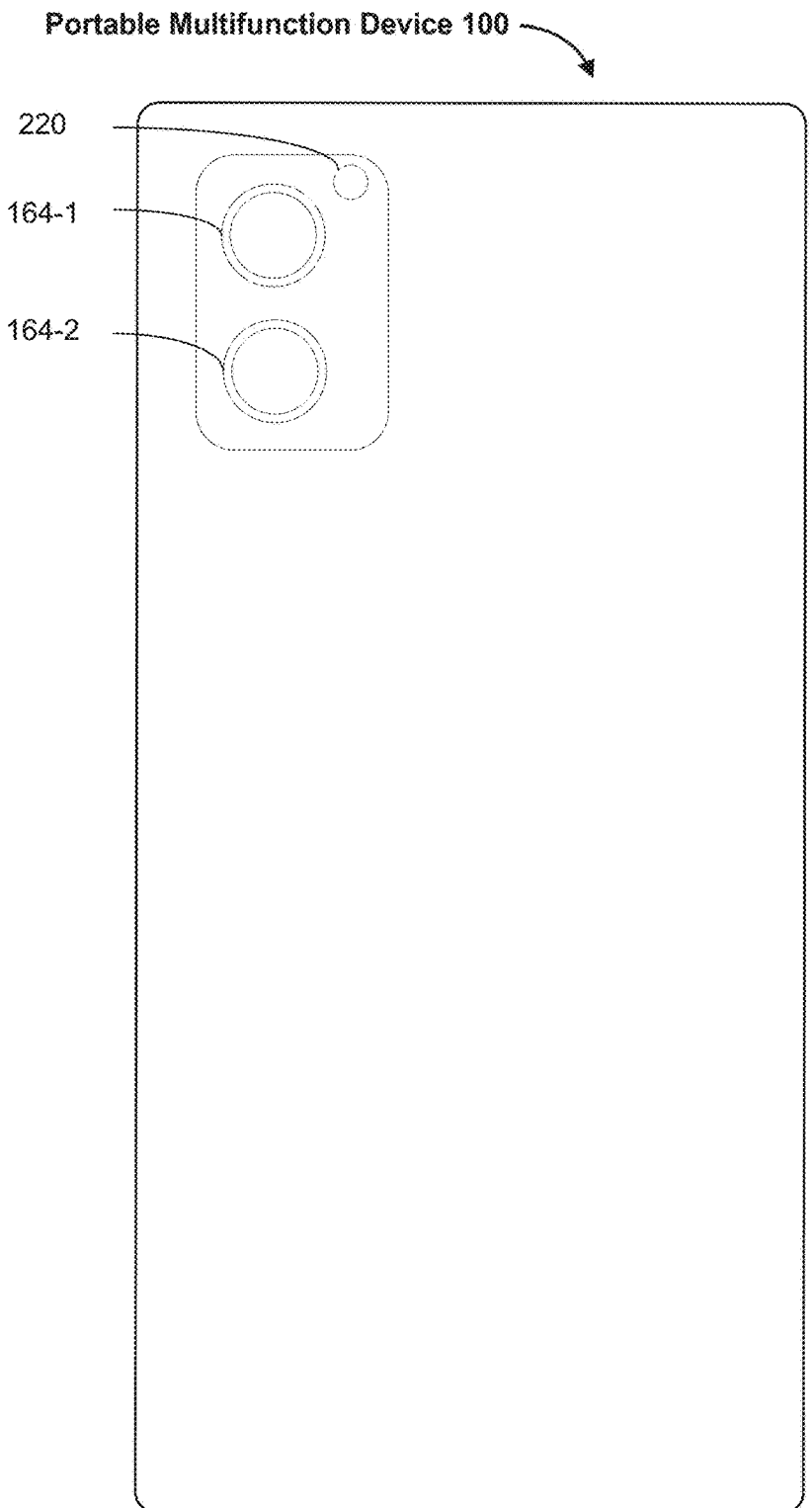
FIG. 2B illustrates a portable multifunction device having optical sensors and a depth sensor in accordance with some embodiments.

FIG. 2B illustrates a portable multifunction device 100 (e.g., a view of the back of device 100) that optionally includes optical sensors 164-1 and 164-2, and depth sensor 220 (e.g., a three-dimensional scanner or time-of-flight sensor). When optical sensors (e.g., cameras) 164-1 and 164-2 concurrently capture a representation of a physical environment (e.g., an image or a video), the portable multifunction device can determine depth information from the disparity between the information concurrently captured by the optical sensors (e.g., disparities between the captured images). Depth information provided by (e.g., image) disparities determined using optical sensors 164-1 and 164-2 may lack accuracy, but typically provides high resolution. To improve the accuracy of depth information provided by the disparity between images, depth sensor 220 is optionally used in conjunction with optical sensors 164-1 and 164-2. In some embodiments, depth sensor 220 emits a waveform (e.g., light from a light emitting diode (LED) or a laser), and measures the time it takes for the reflection(s) of the waveform (e.g., light) to return back to depth sensor 220. Depth information is determined from the measured time it takes for the light to return back to depth sensor 220. A depth sensor typically provides high accuracy (e.g., accuracy of 1 cm or better with respect to measured distances or depths), but may lack high resolution (e.g., depth sensor 220 optionally has a resolution that is one quarter of the resolution of optical sensors 164, or less than one quarter of the resolution of optical sensors 164, or one sixteenth of the resolution of optical sensors 164, or less than one sixteenth of the resolution of optical sensors 164). Therefore, combining depth information from a depth sensor with depth information provided by (e.g., image) disparities determined using optical sensors (e.g., cameras) provides a depth map that is both accurate and has high resolution.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to analogous sensors described above with reference to FIG. 1A, and optionally a depth sensor 220 described above with reference to FIG. 2B). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3C:
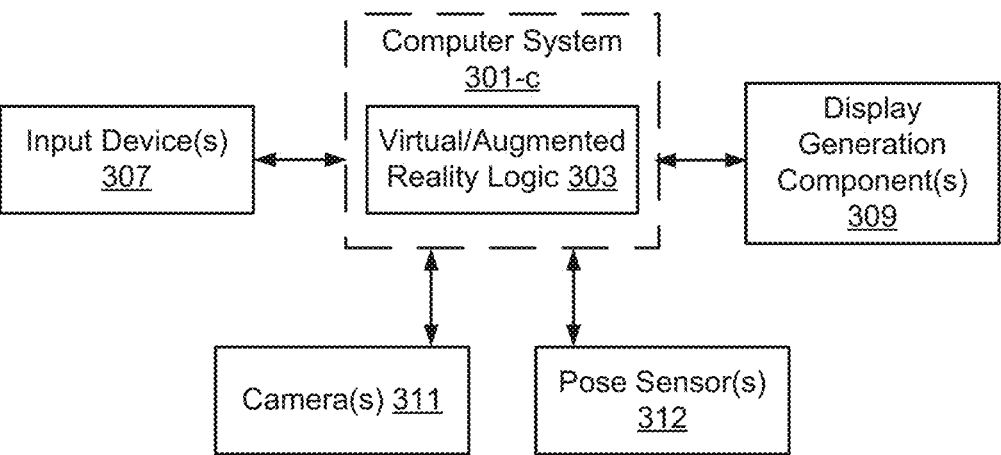

FIGS. 3B-3C are block diagrams of example computer systems 301 in accordance with some embodiments.

In some embodiments, computer system 301 includes and/or is in communication with:

input device(s) (302 and/or 307, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands);

virtual/augmented reality logic 303 (e.g., virtual/augmented reality module 145);

display generation component(s) (304 and/or 308, e.g., a display, a projector, a head-mounted display, a heads-up display, or the like) for displaying virtual user interface elements to the user;

camera(s) (e.g., 305 and/or 311) for capturing images of a field of view of the device, e.g., images that are used to determine placement of virtual user interface elements, determine a pose of the device, and/or display a portion of the physical environment in which the camera(s) are located; and pose sensor(s) (e.g., 306 and/or 311) for determining a pose of the device relative to the physical environment and/or changes in pose of the device.

In some computer systems, camera(s) (e.g., 305 and/or 311) include a depth sensor (e.g., depth sensor 220, FIG. 2B) for capturing depth information as described above with reference to FIG. 2B.

In some computer systems (e.g., 301-a in FIG. 3B), input device(s) 302, virtual/augmented reality logic 303, display generation component(s) 304, camera(s) 305; and pose sensor(s) 306 are all integrated into the computer system (e.g., an electronic device such as portable multifunction device 100 in FIGS. 1A-1B or device 300 in FIG. 3 such as a smartphone or tablet).

In some computer systems (e.g., 301-b), in addition to integrated input device(s) 302, virtual/augmented reality logic 303, display generation component(s) 304, camera(s) 305; and pose sensor(s) 306, the computer system is also in communication with additional devices that are separate from the computer system, such as separate input device(s) 307 such as a touch-sensitive surface, a wand, a remote control, or the like and/or separate display generation component(s) 308 such as virtual reality headset or augmented reality glasses that overlay virtual objects on a physical environment.

In some computer systems (e.g., 301-c in FIG. 3C), the input device(s) 307, display generation component(s) 309, camera(s) 311; and/or pose sensor(s) 312 are separate from the computer system and are in communication with the computer system. In some embodiments, other combinations of components in computer system 301 and in communication with the computer system are used. For example, in some embodiments, display generation component(s) 309, camera(s) 311, and pose sensor(s) 312 are incorporated in a headset that is either integrated with or in communication with the computer system.

In some embodiments, all of the operations described below with reference to FIGS. 5A1-5A20, 5B1-5B12, and 5C1-5C61 are performed on a single computing device with virtual/augmented reality logic 303 (e.g., computer system 301-a described below with reference to FIG. 3B). However, it should be understood that frequently multiple different computing devices are linked together to perform the operations described below with reference to FIGS. 5A1-5A20, 5B1-5B12, and 5C1-5C61 (e.g., a computing device with virtual/augmented reality logic 303 communicates with a separate computing device with a display 450 and/or a separate computing device with a touch-sensitive surface 451). In any of these embodiments, the computing device that is described below with reference to FIGS. 5A1-5A20, 5B1-5B12, and 5C1-5C61 is the computing device (or devices) that contain(s) the virtual/augmented reality logic 303. Additionally, it should be understood that the virtual/augmented reality logic 303 could be divided between a plurality of distinct modules or computing devices in various embodiments; however, for the purposes of the description herein, the virtual/augmented reality logic 303 will be primarily referred to as residing in a single computing device so as not to unnecessarily obscure other aspects of the embodiments.

In some embodiments, the virtual/augmented reality logic 303 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on a display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the virtual/augmented reality logic 303).

In some embodiments, both a display and a touch-sensitive surface are integrated with the computer system (e.g., 301-*a* in FIG. 3B) that contains the virtual/augmented reality logic 303. For example, the computer system may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2A).

In some embodiments, a touch-sensitive surface is integrated with the computer system while a display is not integrated with the computer system that contains the virtual/augmented reality logic 303. For example, the computer system may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computer system may be a portable multifunction device 100 (e.g., a smartphone, PDA, tablet computer, etc.) with a touch screen (e.g., 112 in FIG. 2A) connected (via wired or wireless connection) to a separate display (e.g., a computer monitor, television, etc.).

In some embodiments, a display is integrated with the computer system while a touch-sensitive surface is not integrated with the computer system that contains the virtual/augmented reality logic 303. For example, the computer system may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computer system may be a portable multifunction device 100 (e.g., a smartphone, PDA, tablet computer, etc.) with a touch screen (e.g., 112 in FIG. 2A) connected (via wired or wireless connection) to a separate touch-sensitive surface (e.g., a remote touchpad, another portable multifunction device with a touch screen serving as a remote touchpad, etc.).

In some embodiments, neither a display nor a touch-sensitive surface is integrated with the computer system (e.g., 301-*c* in FIG. 3C) that contains the virtual/augmented reality logic 303. For example, the computer system may be a stand-alone computing device 300 (e.g., a set-top box, gaming console, etc.) connected (via wired or wireless connection) to a separate touch-sensitive surface (e.g., a remote touchpad, a portable multifunction device, etc.) and a separate display (e.g., a computer monitor, television, etc.).

In some embodiments, the computer system has an integrated audio system (e.g., audio circuitry 110 and speaker 111 in portable multifunction device 100). In some embodiments, the computing device is in communication with an audio system that is separate from the computing device. In some embodiments, the audio system (e.g., an audio system integrated in a television unit) is integrated with a separate display. In some embodiments, the audio system (e.g., a stereo system) is a stand-alone system that is separate from the computer system and the display.

Attention is now directed towards embodiments of user interfaces ("UI") that are, optionally, implemented on portable multifunction device 100.

Figure 4A:
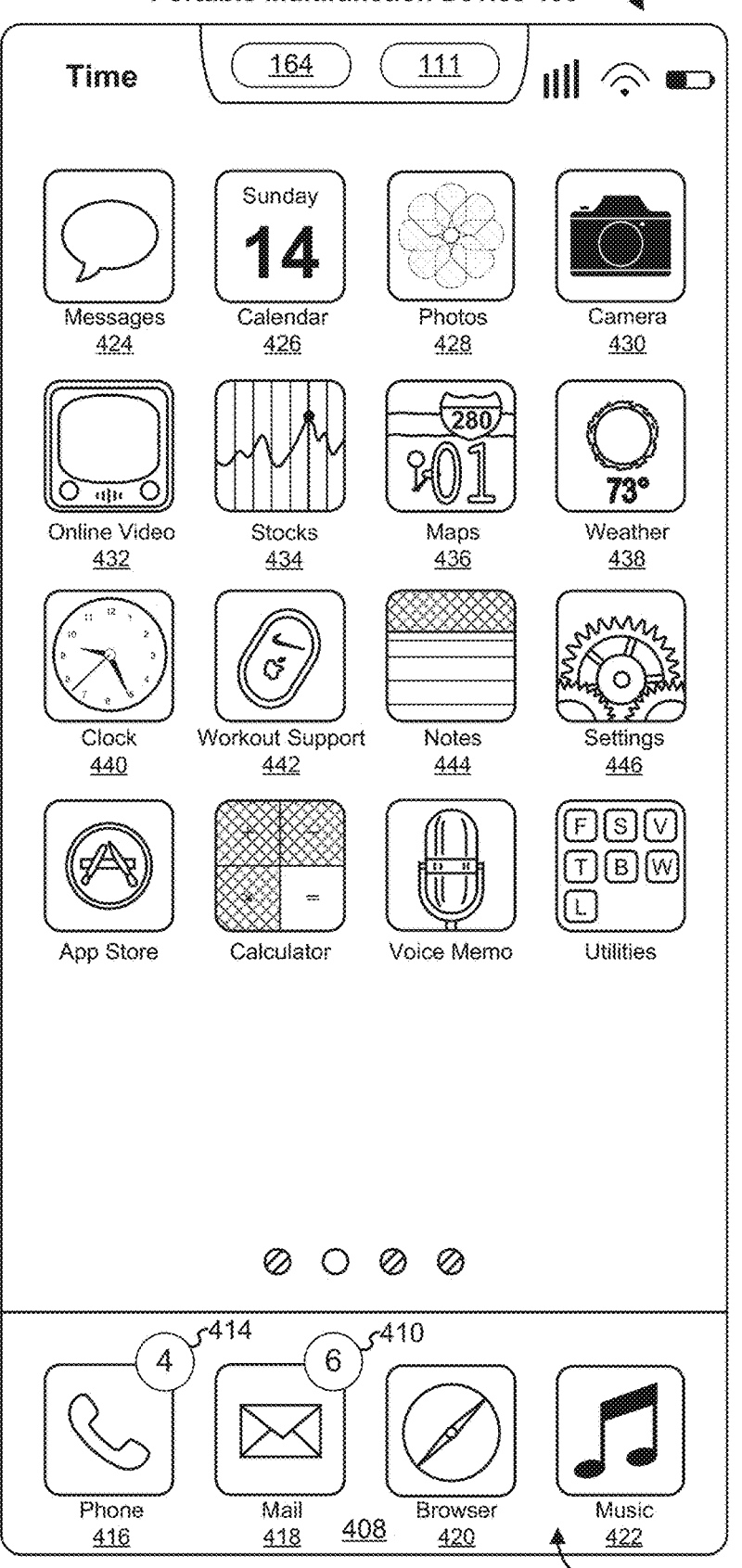
FIG. 4A illustrates an example user interface for a menu of applications on a portable multifunction device in accordance with some embodiments.
Figure 7D:
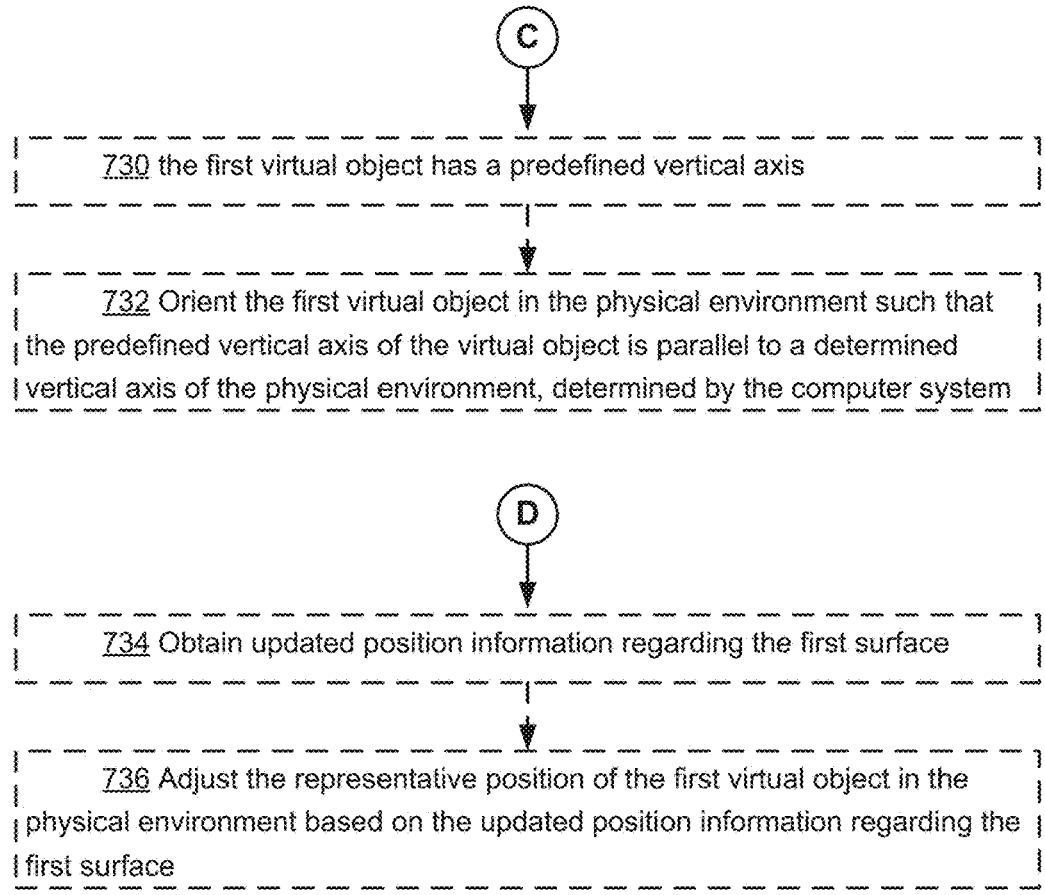

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, labeled "Music"; and
Icons for other applications, such as:
  Icon 424 for IM module 141, labeled "Messages";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Maps";
  Icon 438 for weather widget 149-1, labeled "Weather";
  Icon 440 for alarm clock widget 149-4, labeled "Clock";
  Icon 442 for workout support module 142, labeled "Workout Support";
  Icon 444 for notes module 153, labeled "Notes"; and
  Icon 446 for a settings application or module, labeled "Settings," which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input, movement of the device or of one or more cameras of the device relative to a surrounding physical environment, or changes in the physical environment detected based on updates in visual and/or depth information about the physical environment). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple input devices of a particular type are, optionally, used simultaneously, or multiple input devices of different types are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on a computer system (e.g., an electronic device such as portable multifunction device 100 (FIG. 1A) or device 300 (FIG. 3A), or computer system 301 (FIGS. 3B-3C)) that includes (and/or is in communication with) a display generation component (e.g., a display, a projector, a head-mounted display, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, and optionally one or more tactile output generators.

FIGS. 5A1-5A20, 5B1-5B12, and 5C1-5C61 illustrate example user interfaces for displaying and manipulating virtual objects within augmented reality environments in accordance with some embodiments. The user interfaces in these figures are used to illustrate the processes described below, including the processes in FIGS. 6A-6C, 7A-7E, and 8A-8F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate input device, such as touch-sensitive surface 451, in response to detecting the contacts on the touch-sensitive surface 451 while displaying the user interfaces shown in the figures on the display 450, along with a focus selector.

FIGS. 5A1-5A20 illustrate example user interfaces for displaying virtual objects to indicate occlusion by or proximity to physical objects in accordance with some embodiments.

FIG. 5A1 illustrates virtual object 5002 displayed in an example object visualization user interface 5000 on touchscreen 112 of device 100. In some embodiments, object visualization user interface 5000 includes mode control 5004 that indicates a current display mode of object visualization user interface 5000. In some embodiments, mode control 5004 includes object viewing mode button 5004-1 (e.g., labeled "Object") that corresponds to a mode for viewing a virtual object in isolation, and augmented reality viewing mode button 5004-2 (e.g., labeled "AR") that corresponds to a mode for viewing the virtual object in place in an augmented reality environment that includes a representation of a portion of a physical environment that is in the field of view of one or more cameras of device 100. Activation of object viewing mode button 5004-1 transitions object visualization user interface 5000 to (or maintains the user interface in) the corresponding object viewing mode, whereas activation of augmented reality viewing mode button 5004-2 transitions object visualization user interface 5000 to the corresponding augmented reality viewing mode. In FIG. 5A1, object viewing mode button 5004-1 is highlighted, indicating that object visualization user interface 5000 is currently in the object viewing mode.

FIG. 5A2 illustrates input 5006 (e.g., a tap input) detected on touchscreen 112 at a location corresponding to augmented reality viewing mode button 5004-2. In response to input 5006, object visualization user interface 5000 is transitioned to the augmented reality viewing mode, as shown in FIG. 5A3.

FIG. 5A3 illustrates object visualization user interface 5000 in the augmented reality viewing mode, displayed on touchscreen 112 of device 100. Device 100 is located in physical environment 5010. Physical environment 5010 includes wall 5020-1, wall 5020-2, and floor 5022, as well as table 5012, lamp 5014, can 5008, and magazine 5016. Lamp 5014, can 5008, and magazine 5016 are placed on table 5012. A portion of physical environment 5010 (e.g., which includes a portion of table 5012, lamp 5014, can 5008, and a portion of magazine 5016) is in the field of view of one or more cameras of device 100. Inset 5018 is a top-down schematic view of physical environment 5010 and indicates camera location 5024-1, the current location of the one or more cameras of device 100 in FIG. 5A3, as well as camera field of view 5026-1, the current field of view of the one or more cameras of device 100 in FIG. 5A3. Based on the field of view of the one or more cameras, device 100 displays, in the augmented reality viewing mode of object visualization user interface 5000, a representation of the portion of physical environment 5010 that is in the field of view of the one or more cameras of device 100, including representations of table 5012, lamp 5014, can 5008, and magazine 5016. In addition, virtual object 5002 is displayed in object visualization user interface 5000 and is displayed in the representation of the field of view to appear as though placed in physical environment 5010 on table 5012, even though virtual object 5002 does not physically exist in physical environment 5010.

In the example shown in FIG. 5A3, controls of object visualization user interface 5000, such as mode control 5004, are omitted for simplicity and in order to show more of the augmented reality environment. However, one of ordinary skill will appreciate that, in some embodiments, one or more controls of object visualization user interface 5000 remain displayed when object visualization user interface 5000 transitions from one display mode (such as the object viewing mode) to another display mode (such as the augmented reality viewing mode).

FIG. 5A4 illustrates that the view of physical environment 5010 in object visualization user interface 5000 is a live view representation that is updated as device 100 moves (or more specifically, as the one or more cameras of device 100 move, as well as being updated in accordance with changes in physical environment 5010 even while the one or more cameras of device 100 remain stationary). In FIG. 5A4, device 100 and its one or more cameras have moved relative to physical environment 5010, as indicated by current camera location 5024-2 and current camera field of view 5026-2 in inset 5018. Accordingly, object visualization user interface 5000 displays an updated representation of the field of view of the one or more cameras with a different perspective of physical environment 5010, including representations of a different portion of table 5012, lamp 5014, and can 5008, and without including a representation of magazine 5016, which is not in camera field of view 5026-2.

FIG. 5A5 illustrates three-dimensional model 5028 of physical environment 5010 that is used by device 100, typically in combination with a representation of the field of view of the one or more cameras (captured, for example, using one or more optical sensors such as optical sensors 164 (FIG. 1A)) to display the augmented reality viewing mode of object visualization user interface 5000. Three-dimensional model 5028 is not generally displayed to the user, and is illustrated in FIG. 5A5 as an example of how device 100 interprets physical environment 5010 in accordance with some embodiments. In some embodiments, three-dimensional model 5028 is generated (e.g., by device 100) based on depth information about physical environment (e.g., captured using one or more depth sensors such as depth sensor 220 (FIG. 2B)). Three-dimensional model 5028 models surfaces and/or planes of objects in physical environment 5010 that are (or were) in the field of view of the one or more cameras. In the example in FIG. 5A5, the portion of three-dimensional model 5028 that is represented on device 100 corresponds to the portion of physical environment 5010 that is in camera field of view 5026-2, and includes: surface 5030-1 modeling wall 5020-1, surface 5032 modeling floor 5022, surface 5034 modeling lamp 5014, plane 5036 modeling the side panel surface of table 5012, plane 5038 modeling the top surface of table 5012, and surface 5040 modeling can 5008.

In some embodiments, surfaces that are detected as being substantially flat (e.g., with less than a threshold amount of surface variation, such as less than 10%, less than 5%, less than 2%, etc.) are classified as planes, such as plane 5028 and plane 5030. In some embodiments, classification of a substantially flat surface as a plane also requires that the surface be substantially horizontal (e.g., within 0.5, 1, or 2 degrees of being parallel to the horizon) or vertical (e.g., within 0.5, 1, or 2 degrees of being perpendicular to the horizon). In some embodiments, surface 5026 and surface 5032 are irregular and classified as surfaces rather than planes. In some embodiments, as shown in FIG. 5A5, detected surfaces of physical objects extend at least some distance from the boundaries of the corresponding physical objects. For example, the neck of lamp 5014 is narrower than the neck region of surface 5026 representing lamp 5014. In some embodiments, this is dependent on the degree of accuracy and consistency with which device 100 (e.g., a depth sensor of device 100) is able to determine surfaces in the surrounding physical environment.

FIG. 5A6 illustrates that the live view representation of physical environment 5010 in object visualization user interface 5000 has been updated in accordance with movement of device 100 (including its one or more cameras) to one end of table 5012, to camera location 5024-3 with camera field of view 5026-3 as indicated in inset 5018.

FIG. 5A7 illustrates a representation of the field of view of the one or more cameras of device 100 while the one or more cameras are at camera location 5024-4 and have camera field of view 5026-4, as indicated in inset 5018. The representation of the field of view displayed in object visualization user interface 5000 in FIG. 5A7 includes representation 5012' of table 5012 and representation 5008' of can 5008. Inset 5018 indicates that can 5008 is at physical location 5044-1 on table 5012, and that virtual object 5002 is at a location in object visualization user interface 5000 that corresponds to physical location 5042-1 on table 5012 (e.g., virtual object is not physically present in physical environment 5010, but is displayed to simulate placement at physical location 5042-1). FIG. 5A7 omits physical environment 5010 in the background of device 100 for simplicity and in order to show a larger view of device 100 and the user interface displayed on device 100. FIG. 5A7 also shows input 5046 (e.g., a drag input) at a location on touchscreen 112 that corresponds to virtual object 5002. Input 5046 includes a contact and movement of the contact toward the right as indicated by the arrow in FIG. 5A7.

FIG. 5A8 illustrates that, in response to input 5046 in FIG. 5A7, virtual object 5002 has been moved in object visualization user interface 5000 to a location that corresponds to physical location 5042-2 as indicated in inset 5018. From the perspective of the one or more cameras at camera location 5024-4, if virtual object 5002 were a physical object at physical location 5042-2, virtual object 5002 would occlude a portion of can 5008. Accordingly, the portion of representation 5008' that corresponds to the portion of can 5008 that would be occluded is not displayed in object visualization user interface 5000 (e.g., virtual object 5002 is displayed over that portion of representation 5008' of can 5008). FIG. 5A8 also shows that input 5046 includes further movement upward and toward the left as indicated by the arrow in FIG. 5A8. Input 5046 in FIG. 5A8 may be a continuation of input 5046 in FIG. 5A7 or a different input (e.g., a subsequent input detected after detecting liftoff of input 5046 in FIG. 5A7).

FIG. 5A9 illustrates that, in response to input 5046 in FIG. 5A8, virtual object 5002 has been moved in object visualization user interface 5000 to a location that corresponds to physical location 5042-3 as indicated in inset 5018. From the perspective of the one or more cameras at camera location 5024-4, if virtual object 5002 were a physical object at physical location 5042-3, a portion of virtual object 5002 would be occluded by can 5008. Accordingly, representation 5008' of can 5008 is displayed, and the portion of virtual object 5002 that would be occluded is not displayed in object visualization user interface 5000. In addition, in accordance with some embodiments, a first portion 5002-1 of virtual object 5002 that is within a threshold distance (e.g., that corresponds to physical space that is within the threshold distance) from the boundary of can 5008 is not displayed, and a second portion 5002-2 of virtual object 5002 is gradually faded as it extends from a third portion 5002-3 toward first portion 5002-1 of virtual object 5002. FIG. 5A9 also shows that input 5046 (e.g., a continuation of input 5046 in FIG. 5A8 or a different input) includes movement of the contact toward the right as indicated by the arrow in FIG. 5A9.

FIG. 5A10 illustrates that, in response to input 5046 in FIG. 5A8, virtual object 5002 has been moved in object visualization user interface 5000 to a location that corresponds to physical location 5042-4 as indicated in inset

5018. From the perspective of the one or more cameras at camera location 5024-4, if virtual object 5002 were a physical object at physical location 5042-3, a larger portion of virtual object 5002 would be occluded by can 5008 in FIG. 5A9 than in FIG. 5A10. Accordingly, representation 5008' of can 5008 is displayed, and the (larger) portion of virtual object 5002 that would be occluded is not displayed in object visualization user interface 5000. In addition, in accordance with some embodiments, first portion 5002-1 of virtual object 5002 that is within the threshold distance (e.g., that corresponds to physical space that is within the threshold distance) from the boundary of can 5008 is not displayed, and second portion 5002-2 of virtual object 5002 is gradually faded as it extends from third portion 5002-3 toward first portion 5002-1 of virtual object 5002. It is noted that first portion 5002-1 in FIG. 5A10 corresponds to a different portion of virtual object 5002 than first portion 5002-1 in FIG. 5A9, since virtual object 5002 has been moved between FIGS. 5A9 and 5A10, and similarly for second portion 5002-2 and third portion 5002-3.

FIG. 5A11 illustrates that device 100 (including its one or more cameras) has moved to one end of table 5012 such that the one or more cameras are at camera location 5024-5 with camera field of view 5026-5, while virtual object 5002 remains (e.g., in a virtual sense) at physical location 5042-4, and while can 5008 remains at physical location 5044-1, as indicated in inset 5018. FIG. 5A11 illustrates the corresponding representation of the field of view of the one or more cameras as displayed in object visualization user interface 5000. The representation of the field of view displayed in object visualization user interface 5000 in FIG. 5A11 includes representation 5012' of table 5012 and representation 5008' of can 5008. If virtual object 5002 were a physical object, no portion of virtual object 5002 would be occluded by can 5008, and no portion of can 5008 would be occluded by virtual object 5002, from the perspective of the one or more cameras at camera location 5024-5. However, due to uncertainty in determining the boundaries of can 5008, in some embodiments one or more portions of virtual object 5002 that are near (e.g., within a threshold distance of) representation 5008' of can 5008 are omitted and/or faded. Accordingly, FIG. 5A11 illustrates that first portion 5002-1 of virtual object 5002 that is within the threshold distance (e.g., that corresponds to physical space that is the threshold distance) from the boundary of can 5008 is not displayed, and a second portion 5002-2 of virtual object 5002 is gradually faded as it extends from a third portion 5002-3 toward first portion 5002-1 of virtual object 5002. FIG. 5A10 also shows input 5048 (e.g., a drag input) at a location on touchscreen 112 that corresponds to virtual object 5002. Input 5048 includes a contact and movement of the contact toward the left as indicated by the arrow in FIG. 5A11.

FIG. 5A12 illustrates that, in response to input 5048, virtual object 5002 has been moved in object visualization user interface 5000 to a location that corresponds to physical location 5042-5 as indicated in inset 5018. If virtual object 5002 were a physical object, no portion of virtual object 5002 would be occluded by can 5008, and no portion of can 5008 would be occluded by virtual object 5002, from the perspective of the one or more cameras at camera location 5024-5. In addition, in FIG. 5A12, virtual object 5002 is beyond the region of uncertainty in determining the boundaries of can 5008. Accordingly, virtual object 5002 in FIG. 5A12 is displayed without omitting or fading any portions of virtual object 5002 that should be visible from the perspective of the one or more cameras at camera location 5024-5.

FIG. 5A13 illustrates an alternate transition from FIG. 5A11 (e.g., without input 5048 being detected). In FIG. 5A13, device 100 (including its one or more cameras) has moved back to camera location 5024-4 with camera field of view 5026-4, while virtual object 5002 remains (e.g., in a virtual sense) at physical location 5042-4, and while can 5008 remains at physical location 5044-1, as indicated in inset 5018. FIG. 5A13 illustrates that virtual object 5002 is redisplayed with the same occluded appearance as in FIG. 5A10 (e.g., the portion of virtual object 5002 which should appear occluded by can 5008 is not displayed in object visualization user interface 5000, first portion 5002-1 of virtual object 5002 that is within the threshold distance from the boundary of can 5008 is not displayed, and second portion 5002-2 of virtual object 5002 is gradually faded as it extends from third portion 5002-3 toward first portion 5002-1 of virtual object 5002). The occluded appearance of virtual object 5002 in FIG. 5A13 is a result of movement of the one or more cameras of device 100 to a position such that the physical space in physical environment 5010 that corresponds to virtual object 5002 should appear at least partially occluded.

FIG. 5A14 illustrates that can 5008 has been moved toward the left, away from the physical space corresponding to virtual object 5002, to physical location 5044-2, as indicated in inset 5018 and reflected by the location of representation 5008' of can 5008 in object visualization user interface 5000. The one or more cameras of device 100 remain at camera location 5024-4 with camera field of view 5026-4. If virtual object 5002 were a physical object at physical location 5042-4, no portion of virtual object 5002 would be occluded by can 5008 at physical location 5044-2, and no portion of can 5008 would be occluded by virtual object 5002, from the perspective of the one or more cameras at camera location 5024-4. Accordingly, virtual object 5002 in FIG. 5A14 without omitting or fading any portions of virtual object 5002 that should be visible from the perspective of the one or more cameras at camera location 5024-4.

FIG. 5A15 illustrates that can 5008 has been moved back to physical location 5044-1, as indicated in inset 5018 and reflected by the location of representation 5008' of can 5008 in object visualization user interface 5000. FIG. 5A15 illustrates that virtual object 5002 is redisplayed with the same occluded appearance as in FIGS. 5A10 and (e.g., the portion of virtual object 5002 which should appear occluded by can 5008 is not displayed in object visualization user interface 5000, first portion 5002-1 of virtual object 5002 that is within the threshold distance from the boundary of can 5008 is not displayed, and second portion 5002-2 of virtual object 5002 is gradually faded as it extends from third portion 5002-3 toward first portion 5002-1 of virtual object 5002). The occluded appearance of virtual object 5002 in FIG. 5A15 is a result of movement of a physical object (e.g., can 5008) to a location such that the physical space in physical environment 5010 that corresponds to virtual object 5002 should appear at least partially occluded.

FIG. 5A16 is similar to FIG. 5A15, except that a different device, device 5100, is being used to display object visualization user interface 5000. In the example of FIG. 5A16, device 5100 has better (e.g., more accurate, higher resolution, and/or faster, etc.) optical and/or depth sensors than device 100, and device 5100 is able to determine the boundaries of physical objects in physical environment 5010, such as can 5008, with greater accuracy and precision than device 100. Accordingly, a smaller threshold distance from the boundary of can 5008 is used in determining which portion of virtual object 5002 to omit, as indicated by portion 5002-4 of virtual object 5002 (FIG. 5A16) being smaller than portion 5002-1 of virtual object 5002 (FIG. 5A15). In addition, in some embodiments, a smaller portion of virtual object 5002 is faded, as indicated by portion 5002-5 of virtual object 5002 (FIG. 5A16) being smaller than portion 5002-2 of virtual object 5002 (FIG. 5A15). As a result, displayed portion 5002-6 of virtual object 5002 (FIG. 5A16) is larger than displayed portion 5002-3 of virtual object 5002 (FIG. 5A15), because smaller portions of virtual object 5002 are displayed with the occlusion effect.

FIG. 5A17 is similar to FIG. 5A15, except that lighting in physical environment 5010 has been dimmed. With the reduced lighting, device 100 is not able to determine the boundaries of physical objects in physical environment 5010, such as can 5008, with as much accuracy as in FIG. 5A15. Accordingly, a larger threshold distance from the boundary of can 5008 is used in determining which portion of virtual object 5002 to omit, as indicated by portion 5002-7 of virtual object 5002 (FIG. 5A17) being larger than portion 5002-1 of virtual object 5002 (FIG. 5A15). In addition, in the example in FIG. 5A17, the portion of virtual object 5002 that is faded, as indicated by portion 5002-8 of virtual object 5002 (FIG. 5A17), is the same as portion 5002-2 of virtual object 5002 (FIG. 5A15). As a result, displayed portion 5002-9 of virtual object 5002 (FIG. 5A17) is smaller than displayed portion 5002-3 of virtual object 5002 (FIG. 5A15), because larger portions of virtual object 5002 are displayed with the occlusion effect. In some embodiments, the portion of virtual object 5002 that is faded under reduced lighting is larger than the portion of virtual object 5002 that is faded under increased lighting.

FIG. 5A18 illustrates a representation of the field of view of the one or more cameras of device 100 while the one or more cameras are at camera location 5024-6 and have camera field of view 5026-6, as indicated in inset 5018. Virtual object 5002 is at a location in object visualization user interface 5000 that corresponds to physical location 5042-6 on floor 5022 (FIG. 5A4) in front of table 5012, as indicated in inset 5018. In some embodiments, displaying virtual object 5002 with respect to representation 5022' of floor 5022 so as to appear as if positioned on floor 5022 in front of table 5012 (rather than on table 5012, for example) is performed in accordance with a determination that the location of virtual object in the representation of the field of view of the one or more cameras corresponds to a location in physical space that corresponds to floor 5022. In some embodiments, determination that the location of virtual object in the representation of the field of view of the one or more cameras corresponds to a location in physical space that corresponds to floor 5022 includes determining a virtual ray that extends from device 100 (or, more specifically, from the one or more cameras of device 100) and passes through a point in physical space that corresponds to an anchor point on virtual object 5002 (e.g., if virtual object 5002 were a physical object). The first surface (e.g., physical surface) that the virtual ray intersects is the surface on which virtual object appears to be displayed. For example, as shown in inset 5050 in FIG. 5A18, the virtual ray from device 100 and passing through point 5052 (corresponding to an anchor point that is along the top front edge of virtual object 5002) intersects point 5054-1 on floor 5022, so virtual object 5002 is displayed in object visualization user interface 5000 (e.g., with respect to representation 5022' of floor 5022) so as to appear positioned on floor 5022. One of ordinary skill will recognize that different anchor points on a virtual object may be used, such as a point on (e.g., a center of) a bottom surface or plane of the virtual object, a point on (e.g., a center of) a rear surface or plane of the virtual object, a center of gravity (e.g., in a virtual sense) of the virtual object, etc.

FIG. 5A18 also shows input 5056 (e.g., a drag input) at a location on touchscreen 112 that corresponds to virtual object 5002. Input 5056 includes a contact and movement of the contact upward as indicated by the arrow in FIG. 5A18.

FIG. 5A19 illustrates that, in response to input 5056 in FIG. 5A18, virtual object 5002 has been moved in object visualization user interface 5000 to a location that corresponds to physical location 5042-7 on floor 5022 partially underneath table 5012, as indicated in insets 5018 and 5050. From the perspective of the one or more cameras at camera location 5024-6, if virtual object 5002 were a physical object at physical location 5042-7, a portion of virtual object 5002 would be occluded by table 5012. Accordingly, representation 5012′ of table 5012 is displayed, and the portion of virtual object 5002 that would be occluded is not displayed in object visualization user interface 5000. In addition, virtual object 5002 is displayed with a similar occluded appearance as described herein (e.g., with reference to FIGS. 5A9-5A10). For example, the portion of virtual object 5002 that corresponds to physical space that is occluded by table 5012 is not displayed. In addition, optionally, a first back portion of virtual object 5002 that is within a threshold distance (e.g., that corresponds to physical space that, based on the line of sight of the one or more cameras, is within the threshold distance) from the boundary of table 5012 is not displayed. Optionally, also, a second portion of virtual object 5002 (e.g., adjacent to the first back portion) is gradually faded as it extends from a third front portion of virtual object 5002 toward the first back portion of virtual object 5002.

In FIG. 5A19, virtual object 5002 is displayed so as to appear to remain on floor 5022. In some embodiments, displaying virtual object 5002 with respect to representation 5022′ of floor 5022 so as to appear as if positioned on floor 5022 and partially underneath table 5012 (rather than on table 5012, for example) is performed in accordance with determinations as described herein with reference to FIG. 5A18. For example, as shown in inset 5050 in FIG. 5A19, the virtual ray from device 100 and passing through point 5052 (corresponding to the anchor point of virtual object 5002) intersects point 5054-2 on floor 5022, so virtual object 5002 is displayed in object visualization user interface 5000 (e.g., with respect to representation 5022′ of floor 5022 and representation 5012′ of table 5012) so as to appear positioned on floor 5022. FIG. 5A19 also shows that input 5056 (e.g., a continuation of input 5056 in FIG. 5A18 or a different input) includes movement of the contact upward as indicated by the arrow in FIG. 5A19.

FIG. 5A20 illustrates that, in response to input 5056 in FIG. 5A19, virtual object 5002 has been moved in object visualization user interface 5000 to a location that corresponds to physical location 5042-8 on table 5012, as indicated in insets 5018 and 5050. From the perspective of the one or more cameras at camera location 5024-6, if virtual object 5002 were a physical object at physical location 5042-8, virtual object 5002 would occlude a portion of table 5012. Accordingly, the portion of representation 5012′ that corresponds to the portion of table 5012 that would be occluded is not displayed in object visualization user interface 5000 (e.g., without the occlusion effect described herein with reference to virtual objects such as virtual object 5002).

In addition, in FIG. 5A20, virtual object 5002 is displayed so as to appear placed on table 5012. In some embodiments, displaying virtual object 5002 with respect to representation

5012′ of table 5012 so as to appear as if positioned on table 5012 (rather than on floor 5022, for example) is performed in accordance with determinations as described herein with reference to FIGS. 5A18-5A19. For example, as shown in inset 5050 in FIG. 5A20, the virtual ray from device 100 and passing through point 5052 (corresponding to the anchor point of virtual object 5002) intersects point 5054-3 on table 5012 first (e.g., before intersecting a point on floor 5022), so virtual object 5002 is displayed in object visualization user interface 5000 (e.g., with respect to representation 5012′ of table 5012) so as to appear positioned on table 5012, slightly overhanging the front edge of table 5012.

FIGS. 5B1-5B12 illustrate example user interfaces for displaying virtual objects in an augmented reality environment with a predefined spatial relationship to a first surface of a first object, and to other objects on the first surface, as inputs from a user cause one or more of the virtual objects to move to various locations on the first surface, in accordance with some embodiments.

FIG. 5B1, which is substantially the same as FIG. 5A3, illustrates object visualization user interface 5000 (sometimes called an augmented reality user interface) in the augmented reality viewing mode, displayed on touchscreen 112 of device 100. Device 100 is located in physical environment 5010. Physical environment 5010 includes wall 5020-1, wall 5020-2, and floor 5022, as well as table 5012 (sometimes herein called the first physical object), lamp 5014, can 5008 (sometimes herein called the third physical object), and magazine 5016 (sometimes herein called the second physical object). Lamp 5014, can 5008, and magazine 5016 are placed on a first surface 5220 of table 5012. A portion of physical environment 5010 (e.g., which includes a portion of table 5012, lamp 5014, can 5008, and a portion of magazine 5016) is in the field of view of one or more cameras of device 100. Inset 5018 is a top-down schematic view of physical environment 5010 and indicates camera location 5204-1, which is the current location of the one or more cameras of device 100 in FIG. 5B1, as well as camera field of view 5206-1, which is the current field of view of the one or more cameras of device 100 in FIG. 5B1. Based on the field of view of the one or more cameras, device 100 displays, in the augmented reality viewing mode of object visualization user interface 5000, a representation of the portion of physical environment 5010 that is in the field of view of the one or more cameras of device 100, including representations of table 5012, lamp 5014, can 5008, and magazine 5016. In addition, virtual object 5002 (sometimes herein called a first virtual object) is displayed in object visualization user interface 5000 and is displayed in the representation of the field of view to appear as though placed in physical environment 5010 on table 5012, even though virtual object 5002 does not physically exist in physical environment 5010.

In the example shown in FIG. 5B1, controls of object visualization user interface 5000, such as mode control 5004 (FIG. 5A1), are omitted for simplicity and in order to show more of the augmented reality environment. However, one of ordinary skill will appreciate that, in some embodiments, one or more controls of object visualization user interface 5000 remain displayed when object visualization user interface 5000 transitions from one display mode (such as the object viewing mode) to another display mode (such as the augmented reality viewing mode). Alternatively, or in addition, one or more controls of object visualization user interface 5000 are displayed in response to one or more predefined user inputs (e.g., one or more predefined gesture performed using a contact on the touch sensitive surface 112), in accordance with some embodiments.

While user inputs cannot move physical objects in the field of view of the one or more cameras, of course, device 100 responds to user inputs (e.g., user inputs on touchscreen 112 of device 100, or user voice commands received by device 100) by moving and changing the orientation or pose of virtual objects relative to the representations of physical objects. Device 100 also responds to certain user inputs (e.g., user-caused changes in location and orientation or pose of one or more cameras of device 100, such as user-caused movements of device 100 itself) by changing the field of view (e.g., the field of view 5206-1 indicated in inset 5018, FIG. 5B1), a representation of which is displayed on touch-screen 112 of device 100.

FIG. 5B2 illustrates a representation of the field of view of the one or more cameras of device 100 while the one or more cameras are at camera location 5204-1 and have camera field of view 5206-1, as indicated in inset 5018. The representation of the field of view displayed in object visualization user interface 5000 includes representation 5012' of table 5012, representation 5008' of can 5008, and representation 5016' of magazine 5016. Inset 5018 indicates that magazine 5016 is at physical location 5216-1 on table 5012, that can 5008 is at physical location 5218-1 on table 5012, and that virtual object 5002 is at a location in object visualization user interface 5000 that corresponds to physical location 5212-1 on table 5012 (e.g., virtual object is not physically present in physical environment 5010, but is displayed to simulate placement at physical location 5212-1). FIG. 5B2 omits physical environment 5010 in the background of device 100 for simplicity and in order to show a larger view of device 100 and the user interface displayed on device 100. FIG. 5B2 also shows input 5208 (e.g., a drag input) at a location on touchscreen 112 that corresponds to virtual object 5002. Input 5208 includes a contact and movement of the contact toward the right as indicated by the arrow.

In FIG. 5B2, the representative position (e.g., a simulated position) of the virtual object 5002 in the physical environment 5010 (FIG. 5B1) coincides with a portion of the first surface 5220 (e.g., shown as a representation 5220' of the first surface 5220 in FIG. 5B2) that does not include other physical objects positioned on the first surface 5220. Device 100, in accordance with a determination that the representative position (e.g., simulated position) of the virtual object 5002 in the physical environment coincides with a portion of the first surface that does not include other physical objects positioned on the first surface, displays the virtual object 5002 in the representation of the field of view (in a computer generated augmented reality environment, for example a three dimensional environment generated by the computer system, which is displayed on a display of device 100 as in object visualization user interface 5000) with a predefined spatial relationship to a representation of the first surface. For example, in some embodiments, the predefined spatial relationship to the representation of the first surface is that the virtual object is positioned by the device 100 on the representation of the first surface, or directly on the representation of the first surface.

In this example, the representative position of the virtual object 5002 is on a virtual plane that is determined by the device 100 in the representation of the field of view of the one or more cameras to correspond to the first surface 5220 of the first physical object 5012 (table 5012), based on sensor measurements (e.g., by a depth sensor of device 100) of locations on the first surface of the first physical object.

In some embodiments, all positions of the virtual objects displayed in object visualization user interface 5000 are positions in a three dimensional environment generated by the device 100.

In some embodiments, determining that the location of virtual object in the representation of the field of view of the one or more cameras corresponds to a location in physical space that corresponds to the first surface 5220 of a first physical object 5012 includes determining a terminus of, or intersection point of, a virtual ray that extends from a position associated with device 100 (e.g., from a camera of the one or more cameras of device 100, or from the position of a user of device 100) and passes through a point in physical space that corresponds to an anchor point on virtual object 5002 (e.g., if virtual object 5002 were a physical object). In some embodiments, or in some circumstances, the first surface (e.g., physical surface) that the virtual ray intersects is the surface on which virtual object appears to be displayed. For example, as shown in inset 5230 in FIG. 5B2, a virtual ray that extends from device 100 through a point 5232 (e.g., corresponding to an anchor point that, in this example, is on a front edge, such as the center of a front edge, of the first virtual object 5002) intersects point 5234 on the first surface 5022 of the first physical object (table 5012). As a result, device 100 displays virtual object 5002 at a position corresponding to point 5234 in object visualization user interface 5000 (e.g., with respect to representation 5220' of the first surface 5220) that is on, or appears in object visualization user interface 5000 to be on, the first surface 5220. One of ordinary skill will recognize that different anchor points on a virtual object may be used, such as a point on (e.g., a center of) a top surface or bottom surface or plane of the virtual object, a point on (e.g., a center of) a rear surface or plane of the virtual object, a center of gravity (e.g., in a virtual sense) of the virtual object, etc.

FIG. 5B3 illustrates a representation of the field of view of the one or more cameras of device 100 after the device 100 has responded to the input 5208 in FIG. 5B2 by moving the virtual object 5002 in the field of view to a new location in object visualization user interface 5000 that corresponds to physical location 5212-2 on table 5012, in front and to the right of the location 5218-1 of can 5008 and to the left of location 5216-1 of magazine 5016. Device 100, in accordance with a determination that the representative position (e.g., simulated position) of the virtual object 5002 in the physical environment, as shown in FIG. 5B3, coincides with a portion of the first surface that does not include other physical objects positioned on the first surface, displays the virtual object 5002 in the representation of the field of view with the predefined spatial relationship to a representation 5220' of the first surface, as discussed above with reference to FIG. 5B2.

FIG. 5B4 illustrates a representation of a changed field of view of the one or more cameras of device 100 after the user of device 100 has changed the pose (e.g., position and orientation) of the one or more cameras of device 100 to be closer to table 5012 and rotated so as to include only a right hand portion of table 5012 in the field of view, as indicated by camera location 5204-2 and camera field of view 5206-2 in inset 5018. In FIG. 5B4, virtual object 5008 remains at the same or approximately the same location, relative to table 5012, as in FIG. 5B3.

FIG. 5B5 is similar to FIG. 5B3 in that it illustrates a representation of the field of view of the one or more cameras of device 100 after the device 100 has responded to the input 5208 in FIG. 5B2 and the change in position and orientation or pose in FIG. 5B4. Virtual object 5002 remains at a location in object visualization user interface 5000 that corresponds to physical location 5212-2 on table 5012, in front and to the right of the location 5218-1 of can 5008 and to the left of the location 5216-1 of magazine 5016. FIG. 5B5 omits physical environment 5010 in the background of device 100 for simplicity and in order to show a larger view of device 100 and the user interface displayed on device 100. Device 100, in accordance with a determination that the representative position (e.g., simulated position) of the virtual object 5002 in the physical environment, as shown in FIG. 5B5, coincides with a portion of the first surface that does not include other physical objects positioned on the first surface, displays the virtual object 5002 in the representation of the field of view with the predefined spatial relationship to a representation 5220' of the first surface, as discussed above with reference to FIG. 5B2.

FIG. 5B5 also shows input 5208 (e.g., a drag input) at a location on touchscreen 112 that corresponds to virtual object 5002. Input 5208 includes a contact and movement of the contact toward the right as indicated by the arrow in FIG. 5B5.

FIG. 5B6 illustrates a representation of the field of view of the one or more cameras of device 100 after the device 100 has responded to the input 5208 in FIG. 5B5 by moving the virtual object 5002 in the field of view to a new location in object visualization user interface 5000 that corresponds to physical location 5212-3 on table 5012, partially overlapping or partially on top of the location 5216-1 of magazine 5016.

In FIG. 5B6, the representative position (e.g., a simulated position) of the virtual object 5002 in the physical environment 5010 (FIG. 5B1) coincides with a portion of the magazine 5016 on first surface 5220 (e.g., shown as representation of magazine 5106' and first surface 5220' in FIG. 5B6). Device 100, in accordance with a determination that the representative position (e.g., simulated position) of the first virtual object 5002 in the physical environment coincides with a physical object (e.g., a low-height object, such as magazine 5016) that is positioned on the first surface and extends from the first surface (e.g., along an axis normal to the first surface 5022, which in this example would be a vertical axis) less than a threshold amount in a respective direction, displays the virtual object 5002 in the representation of the field of view with the predefined spatial relationship (e.g., the same predefined spatial relationship described above with reference to FIG. 5B2) to the representation 5220' of the first surface.

FIG. 5B6 also shows input 5208 (e.g., a drag input) at a location on touchscreen 112 that corresponds to virtual object 5002. Input 5208 includes a contact and movement of the contact toward the right as indicated by the arrow in FIG. 5B6.

FIG. 5B7 illustrates a representation of the field of view of the one or more cameras of device 100 after the device 100 has responded to the input 5208 in FIG. 5B6 by moving the virtual object 5002 in the field of view to a new location in object visualization user interface 5000 that corresponds to physical location 5212-4 on table 5012, fully overlapping or on top of the location 5216-1 of magazine 5016.

In FIG. 5B7, the representative position (e.g., a simulated position) of the virtual object 5002 in the physical environment 5010 (FIG. 5B1) coincides with magazine 5016 on first surface 5220 (e.g., shown as representation of magazine 5106' and first surface 5220' in FIG. 5B6). Device 100, in accordance with a determination that the representative position (e.g., simulated position) of the virtual object 5002 in the physical environment coincides with a physical object (e.g., a low-height object, such as magazine 5016) that is positioned on the first surface and extends from the first surface (e.g., along an axis normal to the first surface 5022, which in this example would be a vertical axis) less than a threshold amount in a respective direction, displays the virtual object 5002 in the representation of the field of view with the predefined spatial relationship (e.g., the same predefined spatial relationship described above with reference to FIG. 5B2) to the representation 5220' of the first surface. Thus, because the second physical object extends from the first surface by less than the threshold amount, the displayed location of the virtual object 5002 relative to the representation 5220' of the first surface is not affected by, or is not adjusted to take into account, the presence of the second physical object (e.g., magazine 5016) at the same location on the first surface as the virtual object 5002.

FIG. 5B7 also shows input 5208 (e.g., a drag input) at a location on touchscreen 112 that corresponds to virtual object 5002. Input 5208 includes a contact and movement of the contact toward the left as indicated by the arrow in FIG. 5B7.

FIG. 5B8 illustrates a representation of the field of view of the one or more cameras of device 100 after the device 100 has responded to the input 5208 in FIG. 5B7 by moving the virtual object 5002 in the field of view to a new location in object visualization user interface 5000 that corresponds to physical location 5212-5 on table 5012, in front of and slightly offset from the location 5218-1 of cup 5018. In FIG. 5B8 there are no physical objects positioned between the virtual object 5002 of the first surface 5220 of table 5012. Device 100, in accordance with a determination that the representative position (e.g., simulated position) of the virtual object 5002 in the physical environment, as shown in FIG. 5B8, coincides with a portion of the first surface 5220 that does not include other physical objects positioned on the first surface 5220, displays the first virtual object 5002 in the representation of the field of view with the predefined spatial relationship to a representation 5220' of the first surface, as discussed above with respect to FIG. 5B2.

FIG. 5B8 also shows input 5208 (e.g., a drag input) at a location on touchscreen 112 that corresponds to virtual object 5002. Input 5208 includes a contact and movement of the contact toward the cup 5008 on table 5012, as indicated by the arrow in FIG. 5B8.

FIG. 5B9 illustrates a representation of the field of view of the one or more cameras of device 100 after the device 100 has responded to the input 5208 in FIG. 5B8 by moving the virtual object 5002 in the field of view to a new location in object visualization user interface 5000 that corresponds to physical location 5212-6 on top of cup 5008. In FIG. 5B9, the cup 5008 extends from the first surface 5220 by more than the threshold amount, and is positioned between the virtual object 5002 and the first surface 5220 of table 5012. Device 100, in accordance with a determination that the representative position (e.g., simulated position) of the virtual object 5002 in the physical environment, as shown in FIG. 5B9, coincides with a physical object (e.g., cup 5008) that is positioned on the first surface 5220 and extends from the first surface more than the threshold amount in the respective direction, displays the virtual object 5002 in the representation of the field of view as positioned on a representation of the physical object, wherein in the representation of the field of view the representation of physical object (e.g., representation 5008' of cup 5008) is positioned between a representation of the first physical object (table 5012) and the virtual object 5002. In some embodiments, the virtual object 5002, as displayed in object visualization user interface 5000, has the predefined spatial relationship to a portion of the physical object such that the virtual object 5002 appears to rest on the physical object, such as on a plane detected on the physical object or on a mesh (e.g., a three-dimensional mesh generated by the device in response, at least in part, to depth information obtained from a depth sensor of device 100) that is determined to represent an extent of the physical object based on sensor measurements by the device.

FIG. 5B10 illustrates a representation of the field of view of the one or more cameras of device 100 after an additional physical object has been placed on table 5012, and virtual object 5002 has been moved to a position near the representation 5224' of the additional physical object in object visualization user interface 5000. The new position of the virtual object 5002 corresponds to physical location 5212-7 on the first surface 5220 of table 5012. Device 100, in accordance with a determination that the representative position (e.g., simulated position) of the first virtual object 5002 in the physical environment, as shown in FIG. 5B10, coincides with a portion of the first surface 5220 that does not include other physical objects positioned on the first surface 5220, displays the first virtual object 5002 in the representation of the field of view with the predefined spatial relationship to a representation 5220' of the first surface, as discussed above with respect to FIG. 5B2.

FIG. 5B10 also shows input 5208 (e.g., a drag input) at a location on touchscreen 112 that corresponds to virtual object 5002. Input 5208 includes a contact and movement of the contact toward the right, toward the representation 5224' of the additional physical object, as indicated by the arrow in FIG. 5B10.

FIG. 5B11 illustrates a representation of the field of view of the one or more cameras of device 100 after the device 100 has responded to the input 5208 in FIG. 5B10 by moving the virtual object 5002 in the field of view to a new location in object visualization user interface 5000 that corresponds to physical location 5212-8 on top of the additional physical object, shown by representation 5224' in FIG. 5B11. In FIG. 5B11, the additional physical object extends from the first surface 5220 by more than the threshold amount, and is positioned between the virtual object 5002 and the first surface 5220 of table 5012. Device 100, in accordance with a determination that the representative position (e.g., simulated position) of the first virtual object 5002 in the physical environment coincides with a physical object that is positioned on the first surface and extends from the first surface 5220 more than the threshold amount in the respective direction (e.g., a direction normal to the first surface), displays the first virtual object 5002 in the representation of the field of view as positioned on a representation 5224' of the additional physical object, wherein in the representation of the field of view the representation 5224' of the additional physical object is positioned between a representation 5012' of the first physical object (table 5012) and the virtual object 5002, as shown in FIG. 5B11. In some embodiments, the first virtual object 5002, as displayed in object visualization user interface 5000, has the predefined spatial relationship to a portion of the additional physical object such that the virtual object 5002 appears to rest on that portion of the additional physical object.

FIG. 5B11 also shows input 5208 (e.g., a drag input) at a location on touchscreen 112 that corresponds to virtual object 5002. Input 5208 includes a contact and movement of the contact toward the right, toward another portion of the representation 5224' of the additional physical object, as indicated by the arrow in FIG. 5B11.

FIG. 5B12 illustrates a representation of the field of view of the one or more cameras of device 100 after the device 100 has responded to the input 5208 in FIG. 5B11 by moving the virtual object 5002 in the field of view to a new location in object visualization user interface 5000 that corresponds to physical location 5212-9 on top a higher portion of the additional physical object than shown in FIG. 5B11. The additional physical object is shown by representation 5224' in FIG. 5B12. As in FIG. 5B11, in FIG. 5B12 the additional physical object extends from the first surface 5220 by more than the threshold amount, and is positioned between the virtual object 5002 and the first surface 5220 of table 5012. Device 100, in accordance with a determination that the representative position (e.g., simulated position) of the first virtual object 5002 in the physical environment coincides with a physical object that is positioned on the first surface and extends from the first surface 5220 more than the threshold amount in the respective direction (e.g., a direction normal to the first surface), displays the first virtual object in the representation of the field of view as positioned on a representation of the additional physical object. In the representation of the field of view, the representation 5224' of the additional physical object is positioned between a representation of the first physical object (table 5012) and extends from the first surface 5220 more than the threshold amount in the respective direction (e.g., a direction normal to the first surface 5220 of the first physical object 5012). The first virtual object 5002 is displayed in the representation of the field of view as positioned on a representation 5224' of the additional physical object, and the representation of the field of view the representation 5224' of the additional physical object is positioned between a representation 5012' of the first physical object (table 5012) and the virtual object 5002. In some embodiments, the first virtual object 5002, as displayed in object visualization user interface 5000, has the predefined spatial relationship to a portion of the additional physical object such that the virtual object 5002 appears to rest on that portion of the additional physical object.

FIGS. 5C1-5C61 illustrate example user interfaces for interacting with virtual objects in an augmented reality environment (e.g., moving the virtual objects across different surfaces) in accordance with some embodiments.

FIG. 5C1 illustrates object visualization user interface 5000 in the augmented reality viewing mode, displayed on touchscreen 112 of device 100. Device 100 is located in physical environment 5010. Physical environment 5010 includes wall 5020-1, wall 5020-2, and floor 5022, as well as table 5012, lamp 5014, can 5008, and magazine 5016. Lamp 5014, can 5008, and magazine 5016 are placed on a horizontal surface of table 5012. The horizontal surface of table 5012 is substantially parallel to the surface of floor 5022. Walls 5020-1 and 5020-2 are substantially vertical surfaces that are at an angle to each other (e.g., an obtuse angle, an acute angle, a right angle, etc.), and are substantially perpendicular to the surfaces of table 5012 and floor 5022. Lamp 5014, can 5008, magazine 5016 have different heights above the horizontal surface of table 5012. A portion of physical environment 5010 (e.g., which includes a portion of table 5012, lamp 5014, can 5008, and a portion of magazine 5016) is in the field of view of one or more cameras of device 100. Inset 5018 is a top-down schematic view of physical environment 5010 and indicates camera location 5024-1, the current location of the one or more cameras of device 100 in the corresponding Figure (e.g., FIG. 5C1), as well as camera field of view 5026-1, the current field of view of the one or more cameras of device 100 in the corresponding Figure (e.g., FIG. 5C1). Based on the field of view of the one or more cameras, device 100 displays, in the augmented reality viewing mode of object visualization user interface 5000, a representation of the portion of physical environment 5010 (e.g., representation 5010') that is in the field of view of the one or more cameras of device 100, including respective representations of table 5012, lamp 5014, can 5008, and magazine 5016. FIG. 5C1 shows the camera view of the portion of the physical environment captured by the one or more cameras of device 100 before any virtual object is inserted into the augmented reality environment (e.g., in response to selection of a virtual object in an object selection user interface, in response to activation of an affordance to place a selected virtual object into the augmented reality view, etc.).

As described in other portions of the present disclosure, the representation of the physical environment shown in the augmented reality viewing mode is optionally a still or live view of the physical environment captured within the field of view of the cameras of the device, in accordance with some embodiments. In some embodiments, a computer-generated three-dimensional model (or pseudo-three-dimensional model) of the physical environment is generated based on the image data and depth data collected from sensors located in the physical environment. In some embodiments, the three-dimensional model (or pseudo-three-dimensional model) of the physical environment includes representations of physical objects at locations in the model that correspond to the actual locations and geometries of the physical objects. For example, in some embodiments, the horizontal surfaces of table 5012 and floor 5022 are represented by corresponding horizontal planes in the model, while walls 5020-1 and 5020-2 are represented by corresponding vertical planes in the model. Other surfaces and objects in the physical environment that are not substantially planar are optionally represented by mesh surfaces or point clouds that are distinct from the plane representations. In some embodiments, planar surfaces that are not at substantially right angles to the orientation of the physical environment are represented by meshes or point clouds as well, and exhibit behaviors that are more similar to curved surfaces, as opposed to planes such as walls, floors, table tops, etc., in the same physical environment. An example three-dimensional model 5028 of physical environment 5010 is illustrated in FIG. 5A5, in accordance with some embodiments. In some embodiments, as planes and surfaces are detected in the physical environment, visual indications of the location and shapes of the planes and surfaces are overlaid on the camera view to provide feedback to the user about the characterization of the planes and surfaces that have been detected and recognized by the device. In some embodiments, surfaces that are detected as being substantially flat (e.g., with less than a threshold amount of surface variation, such as less than 10%, less than 5%, less than 2%, etc.) are classified as planes, such as planes corresponding to the surfaces of table 5012, floor 5022, wall 5020-1, and wall 5020-2. In some embodiments, surfaces that are irregular and/or slanted relative to the physical environment are classified as mesh surfaces rather than planes, such as mesh surface corresponding to surface of cushion 5036 (e.g., representation 5036' of which is shown in FIG. 5C59). In some embodiments, there are much uncertainties and difficulties in characterizing the boundaries of physical objects and the visual boundaries between physical objects, and as a result, the representations of the physical objects in the three-dimensional model do not have shapes and boundaries that match exactly to the shape and boundaries of the actual physical objects. This is particularly true for the case of surfaces that are at different depths from the user that share a visual boundary but not physical boundaries, such as the visual boundaries between a horizontal table surface and a vertical wall that is behind the table but separated from the table, between a horizontal table surface and a horizontal floor surface that is some distance below the table surface, etc. The visual boundaries of these surfaces are more challenging to define also because the number of geometric constraints that can be used to constrain the calculation is more limited, in contrast to the case where two planar surfaces actually intersect with each other to form a straight corner. The following user interface interactions illustrate visual feedback provided in response to user inputs that correspond requests to move a virtual object (e.g., virtual object 5002) within the augmented reality environment on different types of surfaces (e.g., substantially horizontal planes, substantially vertical planes, mesh surfaces, etc.) and between different types of surfaces (e.g., between substantially horizontal surfaces, between substantially vertical surfaces, from horizontal surface to vertical surface, from vertical surface to horizontal surface, from one surface to a new surface and then back to the known surface, from a plane to a mesh, etc.). In some scenarios, the visual feedback is generated based on a direct manipulation interaction model, where the movement of the virtual object corresponds to the user inputs and the characterizations of the physical surfaces in the three-dimensional model of the physical environment. In some scenarios, the visual feedback includes animated transitions that are based on end states of the virtual object, and includes at least some movements of the virtual object that do not correspond to the user inputs and the characterizations of the physical surfaces in the three-dimensional model of the physical environment. The animated transition provides an efficient and quick way of generating the movement of the virtual object when the inaccuracies and instabilities of the three-dimensional model would produce visual artifacts and flickering of the virtual object during the requested movement between different surfaces. In some embodiments, input hysteresis is implemented to improve stability of the visual feedback, reduce flickering of the virtual object near the visual boundaries, and reduce the computational load and complexity resulted from the model uncertainties at the visual boundaries between surfaces when the inputs move the virtual object across the visual boundaries. In some embodiments, a virtual object optionally has different anchor surfaces/planes/points for different types of surfaces, and are optionally rotated when transitioning between different types of surfaces such that the correct anchor surface/plane/point is placed on or at the landing surface. In some embodiments, such rotation is only made when necessary. For example, the virtual object is optionally permitted to rotate about an axis that is perpendicular to the underlying surface, and thus can be displayed with more than one orientation when anchored by such an axis. Therefore, when the virtual object is moved away from the current surface to another surface that is perpendicular to the current surface, it is optionally rotated such that the correct anchor surface of the virtual object is facing toward the new surface. When the virtual object is brought back onto the previous surface, no rotation of the virtual object is necessary as its old anchor surface is still in the correct orientation to land on the old surface. Other details of moving objects on different surfaces and between different surfaces are provided in FIGS. 5C2-5C61 and FIGS. 8A-8F and accompanying descriptions.

FIG. 5C2 illustrates that the view of physical environment 5010 in object visualization user interface 5000 is a live view representation 5010' that is updated as device 100 moves (or more specifically, as the one or more cameras of device 100 move, as well as being updated in accordance with changes in physical environment 5010 even while the one or more cameras of device 100 remain stationary). As shown in FIG. 5C2, representation 5010' of the physical environment includes representation 5012' of table 5012, representation 5022' of floor 5022, representation 5020-1' of wall 5020-1, representation 5014' of lamp 5014, representation 5008' of can 5008, representation 5016' of magazine 5016. The positions of the representations 5012', 5022', 5020-1', 5014', 5008', 5016' in the representation 5010' of the physical environment correspond to the locations of their corresponding physical objects in the physical environment, and positions on the surfaces are represented in the three-dimensional model of the physical environment and are used to constrain the placement location, orientation, and movement of the virtual object placed into the augmented reality environment based on the physical environment. In FIG. 5C2, virtual object 5002 is placed on a plane corresponding to floor 5022. The displayed size and position of virtual object is calculated based on the intrinsic size of the virtual object relative to the size of the physical environment and the simulated position of the virtual object in the three-dimensional model of the physical environment, and the simulated position is on the plane corresponding to floor 5022. In some embodiments, simulated shadow 5604 is generated and displayed around an anchor surface of virtual object 5002 (e.g., for the floor 5022, the anchor surface of virtual object 5002 is the bottom surface of virtual object 5002). The front surface of virtual object 5002 is noted by the two sets of circles facing the viewer. In some embodiments, simulated shadow 5604 represents a contact shadow cast by virtual object 5002 on floor 5022. In some embodiments, the contact shadow is generated on a simulated surface that is inserted between the underlying floor plane and the bottom surface of virtual object 5002. In some embodiments, the simulated surface has a predefined spatial relationship (e.g., on or a predefined distance away from) to the underlying floor plane and a predefined spatial relationship (e.g., on or a predefined distance away from) to the anchor surface of virtual object 5002. In some embodiments, for different anchor surfaces of the same virtual object (e.g., bottom surface, back surface, left surface, etc.), the contact shadow is displayed on a simulated surface that is different amount of distances from the virtual object and/or the underlying support surface (e.g., the floor, the wall, the table, etc.). In some embodiments, displaying the simulated shadow on the simulated surface, e.g., as opposed to the representation of the underlying physical surface, provides more visual stability and reduces computation complexity and load for generating and updating the simulated shadow as the object moves along the representation of the underlying physical surface.

As shown in FIG. 5C2-5C7, one or more upward drag inputs (e.g., a continuous swipe input by a single continuously maintained contact 5602 on touch-screen 112, or a series of consecutive swipe inputs by several different contacts) is detected on touch-screen 112, that correspond to a request to move virtual object 5002 from a location on floor 5022 to a location on table 5012. In FIGS. 5C2-5C7, inset 5018 shows a schematic top view of the scene, with relative positions of virtual object 5002 and table 5012 represented as a small white rectangle and a large gray rectangle, respectively. The field of view 5026-1 and the camera location 5024-1 are also illustrated in the same inset to show the orientation of table 5012 and virtual object 5002 relative to the viewer.

As shown in FIG. 5C2, virtual object 5002 is displayed at a position on representation 5022' of the floor in the representation 5010' of physical environment that corresponds to a respective position on floor 5022 in the physical environment, when an upward drag input by contact 5602 detected on virtual object 5002. In FIGS. 5C3-5C4, in response to the upward drag input by contact 5602, virtual object 5002 moves away from the viewer (e.g., away from camera location 5024-1) on representation 5022' of floor 5022, where movement and current positions of virtual object 5002 are calculated based on movement of contact 5602 (e.g., movement distance, speed, direction, and/or path, etc. of the virtual object 5002 is directly based on movement distance, speed, direction, and/or path, etc. of the contact 5602). In FIG. 5C4, another inset 5611 shows a schematic side view of the scene in which vertical locations of virtual object 5002 and table 5012 are indicated by relative positions of the small white rectangle and the large gray rectangle, respectively. A small white circle located at the bottom center of virtual object 5002 in inset 5611 is used to indicate a special characteristic point that is used to determine the position of virtual object in the view. For example, a dotted line that connects the location of the camera and the characteristic point of the virtual object is used to determine a plane for placing the virtual object, in accordance with some embodiments. If a virtual ray is cast from the camera through the characteristic point, the plane that first intersects with the virtual ray is the plane on which the virtual object should be placed. In the scenario shown in FIG. 5C4, the intersecting plane is still the floor 5022, and virtual object 5002 is still displayed on the representation 5022' of floor 5022. Another small circle on the table top in inset 5611 indicates the location of contact 5602 which directly corresponds to the current location of the characteristic point at the bottom of virtual object 5002, in accordance with some embodiments. Up to this point, the criteria for moving virtual object 5002 from floor 5022 to table 5012 have not been met.

In FIG. 5C5, movement of contact 5604 reached to a portion of the display 112 that corresponds to representation 5012' of table 5012. In some embodiments, in response to detecting that a condition for moving the virtual object from the floor 5022 to the table 5012 has been met (e.g., the contact 5602 has crossed the visual boundary between floor 5022 and table 5012, the contact 5602 is within the representation 5012' of table 5012 and/or is at least a threshold distance away from the edge of the representation 5012'), the device further determines whether the input for dragging the virtual object is maintained such that the condition remains to be met for at least a threshold amount of time in order to determine whether the criteria for moving virtual object from floor 5022 to table 5012 are met. In some embodiments, in accordance with a determination that contact 5602 is located more than a predefined threshold distance away from an edge of representation 5012' within the representation 5012', the device determines that the criteria for moving virtual object 5002 from floor 5022 to table 5012 are met. As shown in inset 5611 in FIG. 5C5, when virtual object 5002 is tucked under table 5022 by a threshold amount of distances due to prior movement of contact 5602, contact 5602 moves further upward and crosses a threshold position on representation 5012' of table 5012, but virtual object 5022 remains at a threshold position on representation 5022' of floor 5022 without following the movement of the contact 5602. Then, in accordance with a determination that the criteria for moving virtual object 5002 from floor 5022 to table 5012 are met (e.g., due to further movement of the contact 5602 or due to passage of a threshold amount of time), the device determines a landing position of virtual object 5002 on the representation 5012' of table 5012, e.g., optionally based on the location of input by contact 5602 at the time that the criteria are met. As shown in FIGS. 5C5-5C7, the device generates and displays an animated transition that shows the movement of virtual object 5002 from the threshold position on representation 5022' of floor 5022 to the landing position on representation 5012' of table 5012. As shown in FIG. 5C6, the appearance of virtual object 5002 during the animated transition, including display position, displayed orientation, and displayed size of the virtual object, is independent of the properties of the input detected during the animated transition. For example, as shown in FIG. 5C6, during the animated transition showing virtual object 5002 moving from the floor 5022 to the table 5012, contact 5602 is substantially stationary. In some embodiments, once the criteria for moving virtual object 5002 from floor 5022 to table 5012 are met, contact 5602 does not need to be maintained on touch screen 112 for the virtual object to land on table 5012 at the end of the animated transition. As shown in inset 5611 in FIG. 5C6, virtual object moves upward from the threshold position on the representation 5022' of floor 5022 to the landing position (e.g., small dashed rectangle on top of the table shows the final state of virtual object 5002 on table 5012) determined based on the location of contact 5602 on representation 5012' of table 5012, and the intermediate states of the virtual object are generated based on the appearance of virtual object 5002 at the threshold position on representation 5022' of floor 5022 and the appearance of virtual object 5002 at the landing position on representation 5012 of table 5012, such that the transition is fast and smooth, and without artifacts caused by the uncertainties in the visual boundary between the floor plane and the table plane in the three-dimensional model of the physical environment. In FIG. 5C7, virtual object 5002 is displayed at the landing position on representation 5012' of table 5012 at the end of the animated transition. In some embodiments, as shown in FIG. 5C7, simulated shadow 5604 is displayed around a predefined anchor surface (e.g., the bottom surface) of virtual object 5002 once virtual object 5002 is displayed at the landing position on the representation 5012' of table 5012. In some embodiments, for the same type of surfaces (e.g., horizontal planes), the anchor plane of virtual object remain unchanged, and the simulated shadow (e.g., simulated shadow 5604) is displayed on the same simulated surface inserted between the anchor surface of the virtual object and the underlying surface (e.g., plane of table 5012) that is facing toward the anchor surface of the virtual object. In FIG. 5C7, inset 5611 shows virtual object 5002 being displayed at the landing position at the top of table 5012. In some embodiments, the landing position of virtual object 5002 on table 5012 is at a slightly different depth from the viewer than the threshold position of virtual object 5002 on floor 5022, due to the different viewing perspective of the camera toward these two positions, and as a result, the appearance of the virtual object is adjusted accordingly based on the three-dimensional model of the physical environment and the intrinsic size of the virtual object relative to the size of the physical environment.

FIG. 5C8 shows virtual object at a position on the top of the representation 5012' of table 5012, e.g., after being dragged up from floor 5022, as being originally placed on table 5022, or after being brought down from other surfaces (e.g., walls 5020-1, 5020-2, etc.), in accordance with some embodiments. FIG. 5C9 shows a closer view of virtual object 5002 at the same position on the representation 5012' of table 5012. Inset 5018 in FIG. 5C9 shows that the camera location 5024-1 is closer to table 5012 as compared to that shown in FIG. 5C8. In FIGS. 5C9-5C10, another set of one or more drag inputs (e.g., a continuous swipe input by a single continuously maintained contact 5608 on touch-screen 112, or a series of consecutive swipe inputs by several different contacts) is detected on touch-screen 112, that correspond to a request to move virtual object 5002 from one location on table 5012 to another location on table 5012. In FIGS. 5C9-5C13, inset 5018 shows the relative positions of virtual object 5002 and table 5012 change in accordance with the movement of contact 5608 (e.g., with positions, speed, and directions of the movement of virtual object correspond to the positions, speed, and directions of the movement of contact 5608 throughout the movement of contact 5608). In FIGS. 5C9-5C10, virtual object 5002 is dragged closer to the viewer in response to a downward swipe input by contact 5608. In FIGS. 5C10-5C13, virtual object 5002 is dragged rightward in response to a rightward swipe by contact 5608. The display position of virtual object 5002 remains fixed relative to the location of contact 5608 on touch-screen 112 during the movement on the plane of table 5012, in accordance with some embodiments.

FIG. 5C14 shows a zoomed out view of the same scene with virtual object 5002 displayed at the same location on the representation 5012' of table 5012 as that shown in FIG. 5C13. The displayed size and viewing angle of virtual object 5002 and the representation 5010' of the physical environment are adjusted due to the change in camera location, as shown in inset 5018 in FIGS. 5C13 and 5C14, in accordance with some embodiments. In FIGS. 5C14-5C19, one or more drag inputs (e.g., continuation of the continuous swipe input by the single continuously maintained contact 5608 on touch-screen 112, or a series of consecutive swipe inputs by several different contacts) are detected on touch-screen 112. Initially, as shown in FIGS. 5C14 and 5C15, the criteria for moving virtual object from table 5012 to floor 5022 are not yet met, virtual object 5002 continues to move in a direction toward the viewer in response to the movement of contact 5608. A portion of virtual object 5002 appears to move off the plane of table 5012, while another portion of virtual object 5002 remains at a position on the plane of table 5012. In some embodiments, simulated shadow 5604 continues to be displayed around the anchor surface (e.g., the bottom surface) of virtual object 5002, even though the plane of table 5012 does not extend fully underneath the anchor surface of virtual object 5002. In other words, the simulated shadow is displayed on the simulated surface that is attached to the bottom surface of virtual object 5002. Providing the simulated surface on which to cast the simulated contact shadow helps to avoid the issues and visual instabilities of casting the shadow directly on the representation of the edge of the table in the three-dimensional model of the physical environment. FIG. 5C16 shows that once virtual object is moved outside of the plane of table 5012, simulated shadow 5604 ceases to be displayed.

In FIGS. 5C16-5C19, once the criteria for moving virtual object 5002 from table 5012 to floor 5022 are met (e.g., based on contact moving past a threshold position by more than a threshold distance, and/or based on the contact moving past a threshold position for more than a threshold amount of time, etc.), the device generates and displays an animated transition that includes a series of intermediate states of virtual object 5002 that are based on the end states of virtual objects 5002 at a threshold position on the representation 5012' of table 5012 and a landing position on representation 5022' of floor 5022, and that are independent of the location and movement of contact detected during the display of the animated transition. For example, as shown in FIGS. 5C17 and 5C18, the intermediate states of virtual object 5002, including the displayed position, size, orientation, etc. of virtual object 5002 are computer-generated graphical images (e.g., with graphically interpolated points, without regard to the geometry information of the physical environment in the three-dimensional model of the physical environment and/or without regard to the location and movement of contact 5608) that visually link the two end states of virtual object 5002 on the table and on the floor. In some embodiments, as shown in FIGS. 5C16-5C19, contact 5608 does not move during movement of virtual object 5002 during the animated transition, and optionally, contact 5608 needs not be maintained after the animated transition is started. As shown in FIG. 5C19, the landing position of virtual object 5002 on the representation of floor 5022 is not necessarily at the same depth as the threshold position of virtual object 5002 on the representation of table 5012, due to the different viewing perspective of the camera toward the two positions (e.g., as illustrated by the different positions of virtual object 5002 shown in inset 5018 in FIGS. 5C16-5C19).

FIGS. 5C20-5C21 illustrate that, in some embodiments, virtual object 5002 does not change planes when being resized in response to one or more inputs that correspond to a request to resize virtual object 5002. As shown in FIG. 5C20, a depinch input by contacts 5610 and 5612 (e.g., movement of two concurrently detected contacts 5610 and 5612 moving away from each other from locations corresponding to virtual object 5002 on touch screen 112) is detected while virtual object 5002 is sitting near the edge of representation 5012' of table 5012. In response to detecting the depinch input, the device expands the intrinsic size of virtual object 5002 relative to the size of the physical environment according to the movement of contacts 5010 and 5012. As a result, the displayed size of virtual object 5002 is expanded relative to the representation 5010' of the physical environment (e.g., relative to the representation 5012' of table 5012), even though the anchor position of virtual object 5002 remains unchanged during the resizing (e.g., expansion) of virtual object 5002. As shown in inset 5018 in FIG. 5C21, the size of virtual object 5002 is larger as compared to that shown in FIG. 5C20, for example. In addition, as shown in FIG. 5C21, a portion of virtual object 5002 is extended outside of the boundary of the horizontal plane of table 5012. In the state shown in FIG. 5C21, virtual object 5002 is located at the threshold position for moving to floor 5022 because a virtual ray cast from the camera location to the characteristic position on the bottom surface of virtual object would first intersect with the plane of the floor, however, because the virtual object arrived at this state as a result of a resize request, the virtual object is maintained on the plane of the table, in accordance with some embodiments.

In FIG. 5C22 which shows the same state of virtual object 5022 on the representation 5012' of table 5012 from a farther camera location, another input (e.g., a small downward drag input by contact 5614) is detected, and the animated transition showing movement of virtual object 5002 from the threshold position on the representation 5012' of table 5012 to the landing position on the representation 5022' of floor 5022. In this scenario, the requirement of input hysteresis is optionally bypassed, and a small and quick downward swipe that do not meet the normal threshold distance and/or time requirement of the input hysteresis would cause the transition to occur. In this example, as shown in FIGS. 5C22-5C25, the device generates and displays an animated transition that shows a plurality of intermediate states of virtual object 5002 moving from the threshold position on the representation 5012' of table 5012 to the landing position on the representation 5022' of floor 5022. The intermediate states are optionally calculated graphically based on the appearances (e.g., display size, orientation, position, etc.) of virtual object 5002 at the two end states on the table and on the floor, respectively, without regard to the location and characteristics of the input that triggered the movement of the virtual object from the table to the floor. In FIG. 5C25, once virtual object 5002 is displayed at the landing position on the representation 5022' of floor 5022, simulated shadow 5604 is displayed around the anchor surface of virtual object 5002 again.

FIGS. 5C26-5C28 illustrate that, in some embodiments, virtual object 5002 does not change planes when being rotated around an axis that passes through and that is substantially perpendicular to the anchor surface of the virtual object or the underlying support surface (e.g., plane of table 5012) in response to one or more inputs that correspond to a request to rotate virtual object 5002. In some embodiments, a change in orientation of virtual object is constrained by its supporting surface and the virtual object will only rotate around an axis that is perpendicular to the anchor surface of the virtual object and/or to the underlying support surface. For example, the virtual object only rotates around the axis, but does not tilt relative to the axis, under the influence of a user input. As shown in FIG. 5C26, a rotation input by contacts 5616 and 5618 (e.g., movement of two concurrently detected contacts 5616 and 5618 moving in opposite directions away a line connecting the two contacts detected at locations corresponding to virtual object 5002 on touch screen 112) is detected while virtual object 5002 is sitting near the edge of representation 5012' of table 5012. In response to detecting the rotation input, the device rotates virtual object 5002 on the plane of table 5012 (e.g., with the anchor surface of virtual object 5002 remaining parallel to the plane of table 5012) about a vertical central axis that passes through the center of the virtual object 5002 according to the movement of contacts 5016 and 5018. As a result, the virtual object 5002 is rotated relative to the representation 5010' of the physical environment (e.g., relative to the representation 5012' of table 5012), even though the anchor position of virtual object 5002 remains unchanged during the rotation of virtual object 5002. As shown in inset 5018 in FIG. 5C28, the virtual object 5002 is rotated by 90 degrees and is now facing rightward, for example. In addition, as shown in FIG. 5C28, a portion of virtual object 5002 is extended outside of the boundary of the horizontal plane of table 5012. In the state shown in FIG. 5C28, virtual object 5002 is located at the threshold position for moving to floor 5022 because a virtual ray cast from the camera location to the characteristic position on the bottom surface of virtual object would first intersect with the plane of the floor, however, because the virtual object arrived at this state as a result of a rotation request, the virtual object is maintained on the plane of the table, in accordance with some embodiments.

In FIG. 5C29 which shows the same state of virtual object 5022 on the representation 5012' of table 5012 from a farther camera location, another input (e.g., a small downward drag input by contact 5620) is detected, and the animated transition showing movement of virtual object 5002 from the threshold position on the representation 5012' of table 5012 to the landing position on the representation 5022' of floor 5022. In this scenario, the requirement of input hysteresis is optionally bypassed, and a small and quick downward swipe that do not meet the normal threshold distance and/or time requirement of the input hysteresis would cause the transition to occur. In this example, as shown in FIGS. 5C29-5C32, the device generates and displays an animated transition that shows a plurality of intermediate states of virtual object 5002 moving from the threshold position on the representation 5012' of table 5012 to the landing position on the representation 5022' of floor 5022. The intermediate states are optionally calculated graphically based on the appearances (e.g., display size, orientation, position, etc.) of virtual object 5002 at the two end states on the table and on the floor, respectively, without regard to the location and characteristics of the input that triggered the movement of the virtual object from the table to the floor. In FIG. 5C32, once virtual object 5002 is displayed at the landing position on the representation 5022' of floor 5022, simulated shadow 5604 is displayed around the anchor surface of virtual object 5002 again.

FIG. 5C33 illustrates another view of physical environment 5010 in object visualization user interface 5000. As shown in FIG. 5C33, representation 5010' of the physical environment includes representation 5012' of a corner of table 5012, representation 5020-1' of wall 5020-1, representation 5020-2' of wall 5020-2, representation 5008' of can 5008, and representation 5016' of magazine 5016. The positions of the representations 5012', 5020-1', 5020-2', 5008' and 5016' in the representation 5010' of the physical environment correspond to the locations of their corresponding physical objects in the physical environment. In some embodiments, positions on the surfaces are represented in the three-dimensional model of the physical environment and are used to constrain the placement location, orientation, and movement of the virtual object placed into the augmented reality environment based on the physical environment. In FIG. 5C33, virtual object 5002 is placed on a plane corresponding to table 5012. The displayed size and position of virtual object is calculated based on the intrinsic size of the virtual object relative to the size of the physical environment and the simulated position of the virtual object in the three-dimensional model of the physical environment, and the simulated position is on the plane corresponding to table 5012. In some embodiments, simulated shadow 5604 is generated and displayed around an anchor surface of virtual object 5002 (e.g., for the table 5012, the anchor surface of virtual object 5002 is the bottom surface of virtual object 5002).

FIG. 5C34 shows a view of physical environment 5010 from a closer camera location, as indicated by inset 5018 in FIG. 5C34. In inset 5018 in FIG. 5C34, positions of walls 5020-1 and 5020-1 are indicated relative to the position of table 5012 (e.g., represented by the large gray rectangle). As shown in FIG. 5C34, the displayed position and appearance of virtual object 5002 is updated relative to those shown in FIG. 5C34 due to the changed camera location, even though the simulated position of virtual object 5002 in the three-dimensional model of the physical environment (e.g., relative to the detected plane of table 5012) remains unchanged in FIGS. 5C33 and 5C34.

In FIG. 5C34, a set of one or more drag inputs (e.g., a continuous swipe input by a single continuously maintained contact 5622 on touch-screen 112, or a series of consecutive swipe inputs by several different contacts) are detected at a location on touch screen 112 that correspond to the display location of virtual object 5002. In FIGS. 5C34-5C36, in accordance with the movement of contact 5622, the device moves virtual object 5002 on the plane of table 5012 without rotating the virtual object relative to the plane of table 5012. The intermediate states of virtual object 5002 (e.g., position, movement speed, movement direction, displayed orientation, displayed size, etc.) during the movement on the plane of table 5012 are determined based on the characteristics (e.g., position, speed, movement direction, etc. of contact 5622) of the drag inputs that are detected during this movement of the virtual object 5002.

In some embodiments, as shown in FIGS. 5C35-5C36, when the positions of virtual object 5002 correspond to the position of representation 5016' of magazine 5016, in accordance with a determination that magazine 5016 has a height that is below a threshold distance away from the plane of table 5012, the vertical display position of virtual object 5002 is not adjusted due to the presence of the representation 5016' of magazine 5016.

In FIGS. 5C37-5C40, as the one or more drag inputs (e.g., contact 5622 or other contacts in separate drag inputs) continue to move onto the representation 5020-2' of wall 5020-2, the device determines whether the criteria for moving virtual object 5002 from the substantially horizontal plane of table 5012 to the substantially vertical plane of wall 5020-2 are met. In FIG. 5C37, virtual object 5002 has extended outside of the plane of table 5012 and reached a threshold position for moving onto the plane of wall 5020-2, but has not met the requirement of input hysteresis (e.g., distance-based or time-based input hysteresis). In FIGS. 5C38-5C40, the criteria for moving virtual object 5002 from the substantially horizontal plane of table 5012 to the substantially vertical plane of wall 5020-2 have been met as a result of the detected inputs. In accordance with a determination that the criteria have been met, the device generates an animated transition that includes intermediate states of virtual object 5002 moving from the threshold position on the plane of table 5012 to a landing position on the plane of wall 5020-2 based on the appearance of the virtual object at the threshold position on the plane of table 5012 and the appearance of the virtual object at the landing position on the plane of wall 5020-2, without regard to the characteristics of the drag input (e.g., by contact 5622) that is detected during the display of the animated transition. In some embodiments, the animated transition is generated by graphically interpolating the visual appearances of the virtual object 5002 at the two end states on the planes of table 5012 and wall 5020-2, without regard to the actual and/or simulated geometries of the planes near the visual boundary between table 5012 and wall 5020-2 in the field of view of the camera. In some embodiments, the animated transition includes a rotation of virtual object that is based on the orientation of the substantially vertical plane of wall 5020-2, such that a new anchor surface (e.g., back surface of virtual object 5002) corresponding to the substantially vertical plane of wall 5020-2 will face toward the substantially vertical plane of wall 5020-2 once virtual object 5002 is displayed at the landing position on or at the substantially vertical plane of wall 5020-2. In some embodiments, if the new anchor surface of virtual object 5002 is already facing toward the substantially vertical plane of wall 5020-2 while virtual object 5002 is displayed at the threshold position on the substantially horizontal plane of table 5012, rotation of virtual object 5002 is not needed, and virtual object 5002 is moved the landing position on the plane of wall 5020-2 through pure translation without any rotation. In FIG. 5C40, when virtual object 5002 is displayed at the landing position on the substantially vertical plane of wall 5020-2, the new anchor surface of the virtual object (e.g., the back surface of virtual object 5002) corresponding to the substantially vertical plane of wall 5020-2 is facing toward the substantially vertical plane of wall 5020-2. In some embodiments, the landing position of virtual object 5002 is selected in accordance with the position of contact 5622 detected at the time that the criteria for moving virtual object onto the new plane are met. In some embodiments, simulated shadow 5624 is displayed around the new anchor surface (e.g., the back surface of virtual object 5002) that is facing toward the substantially vertical plane of wall 5020-2. In some embodiments, the simulated shadow is displayed on a simulated surface that is inserted between the new anchor surface of virtual object 5002 and the underlying vertical plane of wall 5020-2. In some embodiments, the simulated surface has a predefined distance away from the new anchor surface of virtual object 5002 and/or the underlying vertical plane of wall 5020-2. In some embodiments, the predefined distance is optionally different for different anchor surfaces of virtual object 5002. In FIGS. 5C37-5C39, inset 5018 shows movement and rotation of virtual object 5002 relative to the physical environment that does not correspond to the movement of the contact that triggered the switching of supporting planes (e.g., contact 5622 is not moving, or contact is not detected any more).

FIGS. 5C40-5C41 illustrate that, while virtual object 5002 is displayed at a position that has a predefined spatial relationship to the representation 5020-2' of wall 5020-2, another set of drag inputs (e.g., a continuous swipe input by a single continuously maintained contact 5626 on touchscreen 112, or a series of consecutive swipe inputs by several different contacts) are detected at locations on the touch screen 112 that correspond to the location of virtual object 5002. In response to the one or more drag inputs, the device moves virtual object on the representation 5020-2' of wall 5020-2 while maintaining the predefined spatial relationship between the position of the virtual object 5002 and the substantially vertical plane of wall 5020-2. Movement of virtual object 5002 is constrained by the substantially vertical plane of wall 5020-2 while being dragged along the substantially vertical plane of wall 5020-2 by contact 5626. In some embodiments, when virtual object 5002 is resized or rotated in accordance with a resize or rotation input, the anchor surface of virtual object 5002 (e.g., back surface of virtual object 5002) remain at or near, and parallel to the substantially vertical plane of wall 5020-2. In FIGS. 5C40-5C41, inset 5018 shows movement of virtual object 5002 in accordance with movement of contact 5626 on the representation 5020-2' of wall 5020-2.

In FIG. 5C42, as movement of contact 5626 continues leftward and crosses the visual boundary between representation 5020-2' of wall 5020-2 and representation 5020-1' of wall 5020-1, the criteria for moving virtual object from the plane of wall 5020-2 to the plane of wall 5020-1 is met. For example, in some embodiments, contact 5626 is within representation 5020-1' of wall 5020-1 by more than a threshold distance from the edge of representation 5020-1', and/or contact 5626 is within representation 5020-1' for more than a threshold amount of time. In accordance with a determination that the criteria for switching from the substantially vertical plane of wall 5020-2 to the substantially vertical plane of wall 5020-1 are met, the device generates and displays an animated transition linking the end states of virtual object 5002 on the two planes (e.g., the state shown in FIG. 5C42 and the state shown in FIG. 5C45). In some embodiments, the landing position of virtual object 5002 on the substantially vertical plane of wall 5020-1 is selected based on the location of contact 5026 detected at the time when the criteria for switching the supporting planes of the virtual object are met. In some embodiments, as shown in FIGS. 5C42-5C45, a plurality of intermediate states of virtual object 5002 are generated based on the appearances of virtual object 5002 in the states shown in FIGS. 5C42 and 5C45 respectively. In some embodiments, the intermediate states are generated by graphically interpolate the two appearances of virtual object 5002 and does not dependent on the actual or estimated geometries of the walls 5020-1 and 5020-2, and does not depend on the location or other characteristics of the input detected during the time that the animated transition is displayed (e.g., the contact 5626 is stationary, or is no longer detected). In some embodiments, the intermediate states include rotation of virtual object such that the anchor surface of virtual object 5002 (e.g., back surface of virtual object 5002) will face toward the new supporting surface (e.g., the substantially vertical plane of wall 5020-1) once virtual object 5002 lands on the new supporting surface. In some embodiments, a different simulated shadow (e.g., simulated shadow 5628) is optionally displayed around the anchor surface of virtual object 5002 when virtual object 5002 is displayed on the substantially vertical plane of wall 5020-1, replacing the previous simulated shadow 5624 for the substantially vertical plane of wall 5020-2. In some embodiments, the simulated shadow 5028 optionally has a different spatial relationship relative to the underlying plane from those of the simulated shadows 5604 and 5624. In FIGS. 5C42-5C45, inset 5018 shows the movement (e.g., translation) and rotation of virtual object 5002 relative to the physical environment. In some embodiments, the threshold position and landing position of virtual object 5002 on the substantially vertical planes of wall 5020-2 and 5020-1 are more than a threshold distance from the visual boundary between the two walls. In some embodiments, the actual and simulated geometries of the walls near the visual boundary are not used in the calculation of the intermediate states of virtual object 5002 when virtual object moves from one plane to the other plane. As a result, computation load is reduced and visual stability of virtual object 5002 during the transition between the planes is improved.

FIGS. 5C46-4C47 illustrate that, while virtual object 5002 is displayed at a position with a predefined spatial relationship to the substantially vertical plane of wall 5020-1, additional drag inputs (e.g., a continuous swipe input by a single continuously maintained contact 5626 on touchscreen 112, or a series of consecutive swipe inputs by several different contacts) are detected on virtual object 5002. In response to the movement, virtual object 5002 moves on the substantially plane of wall 5020-1 in accordance with the movement of the drag inputs (e.g., movement of contact 5626) while the predefined spatial relationship is maintained. The movement of virtual object 5002 is constrained by the substantially vertical plane of wall 5020-1, such that the anchor surface is always facing toward the substantially vertical plane of wall 5020-1.

In FIG. 5C48, as virtual object is dragged downward along the substantially vertical plane of wall 5020-1, a portion of virtual object 5002 is visually occluded by representation 5012 of table 5012. In some embodiments, in addition to the portion of virtual object 5002 that is directly blocked by the representation of table 5012, additional portions of virtual object 5002 are also replaced with either semi-transparent versions 5630 of the camera view at corresponding positions or not displayed (e.g., to reduce visual flickering due to uncertainty of the boundaries in the three-dimensional model of the physical environment). In FIG. 5C48, the criteria for moving virtual object 5002 from the substantially vertical plane of wall 5020-1 to the substantially horizontal plane of table 5012 are met (e.g., due to the contact 5626 being detected more than a threshold distance away from the visual boundary of representation 5012' of table 5012 and/or the contact 5626 being detected within the visual boundary of representation 5022' for more than a threshold amount of time), and accordingly, the device generates and displays an animated transition linking the states of virtual object 5002 at the threshold position on the representation 5020-1' shown in FIG. 5C48 and at the landing position on the representation 5012' shown in FIG. 5C51. In some embodiments, the intermediate states of virtual object 5002 shown during the animated transition are generated based on visual interpolation and/or translation of virtual object 5002 that are independent of the movement of the drag inputs detected during the display of the animated transition (e.g., contact 5626 is not moving, or no longer detected). As shown in FIGS. 5C48-5C51, the landing position of virtual object 5002 is selected based on the location of contact 5626 at the time when the criteria for switching planes for virtual object 5002 are met. In some embodiments, virtual object 5002 is not rotated when landing on the substantially horizontal plane of table 5012. Inset 5018 in FIGS. 5C49-5C51 show the translation of virtual object 5002 relative to the representation of the physical environment during the animated transition.

FIGS. 5C52-5C55 are similar to FIGS. 5C46-5C51, except that the one or more drag inputs (e.g., a continuous swipe input by a single continuously maintained contact 5632 on touch-screen 112, or a series of consecutive swipe inputs by several different contacts) are detected on virtual object 5002 while virtual object 5002 is displayed at a position with a predefined spatial relationship to the substantially vertical plane of wall 5020-2. As shown in FIGS. 5C52-5C53, downward and leftward movement of contact 5632 causes downward movement of virtual object 5002 because movement of virtual object 5002 is constrained by the substantially vertical plane of wall 5020-1. In FIG. 5C53, a portion of virtual object 5002 is visually occluded by the representation 5012' of table 5012. Additional portions 5634 of virtual object 5002 are either not displayed or replaced by semi-transparent portions of corresponding portions of the camera view near the edge of table 5012. In FIG. 5C53, the criteria for moving virtual object 5002 onto the substantially horizontal plane of table 5012 are met (e.g., due to the contact 5632 being detected more than a threshold distance away from the visual boundary of representation 5012' of table 5012 and/or the contact 5632 being detected within the visual boundary of representation 5022' for more than a threshold amount of time). Accordingly, the device generates and displays an animated transition linking the states of virtual object 5002 at the threshold position on the representation 5020-2' shown in FIG. 5C53 and at the landing position on the representation 5012' shown in FIG. 5C55. In some embodiments, the intermediate states of virtual object 5002 shown during the animated transition are generated based on visual interpolation and/or translation of virtual object 5002 that are independent of the movement of the drag inputs detected during the display of the animated transition (e.g., contact 5632 is not moving, or no longer detected). As shown in FIGS. 5C53-5C55, the landing position of virtual object 5002 is selected based on the location of contact 5632 at the time when the criteria for switching planes for virtual object 5002 are met. In some embodiments, virtual object 5002 is not rotated when landing on the substantially horizontal plane of table 5012 (e.g., in contrast to the rotation required when moving virtual object from table 5012 to wall 5020-2 earlier in FIGS. 5C37-5C40). Inset 5018 in FIGS. 5C53-5C55 show the translation of virtual object 5002 relative to the representation of the physical environment during the animated transition. In the example scenarios shown in both FIGS. 5C49-5C51 and FIGS. 5C53-5C55, virtual object 5002 are not rotated relative to the physical environment, even though different anchor surfaces (e.g., back surface vs. bottom surface) are used before and after switching supporting planes.

FIGS. 5C56-5C61 illustrate visual feedback provided when moving virtual object 5002 from the substantially vertical plane of wall 5020-2 to a mesh surface (e.g., a slanted planar surface or a curved surface) of a cushion shown as representation 5636' in the representation 5010' of the physical environment, and then along the mesh surface to the substantially horizontal plane of table 5012. This is in contrast to the process shown in other Figures where virtual object directly transitions between different planes. As shown in FIG. 5C56, one or more drag inputs (e.g., a continuous swipe input by a single continuously maintained contact 5634 on touch-screen 112, or a series of consecutive swipe inputs by several different contacts) are detected on virtual object 5002 while virtual object 5002 is displayed at a position with a predefined spatial relationship to the substantially vertical plane of wall 5020-2. In FIGS. 5C57-5C59, in accordance with the movement of contact 5634, virtual object 5002 gradually moves along the mesh surface of representation 5636' toward representation 5012' of table 5012. The anchor surface or center of the anchor surface of virtual object maintains the predefined spatial relationship relative to the mesh surface of representation 5636' such that virtual object appears to glide along the mesh surface of representation 5636' continuously in accordance with the movement of contact 5534. In FIG. 5C60, the criteria for moving off the mesh surface 5036' and onto the substantially horizontal plane of table 5012 are met, and the device generates an animated transition to show the movement of virtual object 5002 from the threshold position at or near the visual boundary between the mesh surface 5636' and representation 5012' to the landing position on the substantially horizontal surface of table 5012. In some embodiments, as shown in FIGS. 5C57-5C59, virtual object 5002 maintains its orientation relative to the physical environment during movement from the substantially vertical plane of wall 5020-2 to the mesh surface 5636' and along the mesh surface 5636'. In FIGS. 5C59-5C61, virtual object 5002 maintains its orientation relative to the physical environment during movement from the mesh surface 5636' to the substantially horizontal plane of table 5012. In some embodiments, reverse movement from the horizontal plane of table 5012 to mesh surface 5036' does not cause changes in the orientation of virtual object 5002, and movement from mesh surface 5036' to the substantially vertical plane of wall 5020-2 may require rotation of virtual object if the orientation of virtual object does not allow the anchor surface of virtual object 5002 to face toward the substantially vertical plane of wall 5020-2.

Although different inputs by different contacts are shown in the above-referenced figures, it is to be understood that, in some embodiments, the device include instructions to evaluate a set of detected inputs based on various criteria, and in accordance with different determinations related to the current, prior, and/or projected states of the physical environment, the virtual object, and/or the inputs, the device performs different operations (e.g., update the field of view and the augmented reality environment) and provide corresponding visual feedback (e.g., different animated transitions, or direct manipulation of the virtual object). Other details of the interactions and user interfaces are described with respect to FIGS. 5A1-5A20, 5B1-5B12, and 5C1-5C61, and the processes described with respect to FIGS. 6A-6C, 7A-7E, and 8A-8E.

FIGS. 6A-6C are flow diagrams illustrating method 600 of displaying virtual objects to indicate occlusion by or proximity to physical objects in accordance with some embodiments. Method 600 is performed at a computer system (e.g., portable multifunction device 100 (FIG. 1A), device 300 (FIG. 3A), or computer system 301 (FIG. 3B)) that includes (and/or is in communication with) a display generation component (e.g., a hardware component that is part of or in communication with the computer system, and that is capable of producing a displayed user interface, such as a projector, a head-mounted display, a heads-up display, an LCD, OLED, LED, rear projection, or other display, or the like, where in some embodiments the display is touch sensitive, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), optionally one or more depth sensing devices such as depth sensors (e.g., depth sensor 220 (FIG. 2B)), optionally one or more input devices (e.g., touch screen 112 (FIG. 1A), touchpad 355 (FIG. 3A), or input device(s) 302 (FIGS. 3B-3C)), and optionally one or more pose sensors (e.g., pose module 131 (FIG. 1A)). Some operations in method 600 are, optionally, combined and/or the order of some operations is, optionally, changed.

As described herein, method 600 forgoes display of portions of a virtual object that correspond to physical space that, from the perspective of the computer system, is occluded by another object such as a physical object in the physical environment, so that the virtual object appears occluded by the other object, which provides improved visual feedback to the user as to the spatial location of the virtual object relative to the physical environment and other objects therein, and reduces the computational burden of rendering an environment by reducing the number and extent of objects in the environment that need to be rendered. In some cases, inaccuracies and/or unsteadiness in determining the boundaries of the occluding object result in visible imperfections and/or flickering at the occlusion boundary between the occluding object and the occluded object, particularly where the occluding object is a physical object and the occluded object is a virtual object. Progressively visually deemphasizing portions of an "occluded" virtual object (e.g., in a virtual sense, in that the virtual object should appear occluded) the closer each portion is to a boundary of a representation of an "occluding" physical object (which should appear to occlude the virtual object) reduces the amount of visible imperfections and/or flickering at the occlusion boundary, which provides the user with feedback that the occluding object is a physical object (e.g., whose boundaries are determined based on visual and/or depth information about the physical environment), that the occluded object is a virtual object (e.g., whose occlusion must be simulated), and about the spatial location of the occluding object relative to the physical object (e.g., that the virtual object is spatially behind or underneath the physical object) as well as indicating uncertainty in determining the boundary of the physical object. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

The computer system displays (602) displays, via the display generation component, a representation of a field of view of the one or more cameras (e.g., as described herein with reference to FIG. 5A3). The field of view includes a physical object (e.g., can 5008, FIG. 5A3) in a physical environment (e.g., physical environment 5010, FIG. 5A3), and the representation of the field of view of the one or more cameras includes a representation of the physical object (e.g., representation 5008' of can 5008, FIG. 5A7). In some embodiments, the representation of the field of view of the one or more cameras is updated over time based on changes in the field of view of the one or more cameras (e.g., the representation of the field of view is a live view that is updated based on changes in the physical environment that are within the field of view and/or based on movement of the one or more cameras that changes which portion of the physical environment is within the field of view).

The computer system receives (604) one or more inputs (e.g., input 5046 (FIG. 5A9), movement of the one or more cameras (FIGS. 5A11 and 5A13), or detected movement of can 5008 (FIGS. 5A14-5A15)) corresponding to a request to display the representation of the field of view with the physical object at a first pose in the physical environment, a virtual object (e.g., virtual object 5002 (FIG. 5A10)) at a simulated second pose in the physical environment, and (e.g., in accordance with, or from the perspective of) the one or more cameras at a third pose in the physical environment (e.g., the physical object is at least partially within the field of view of the one or more cameras, and the virtual object at least partially corresponds to physical space that is within the field of view of the one or more cameras). In some embodiments, a simulated pose of the virtual object is a pose, in the physical environment, at which the virtual object would be positioned if the virtual object were a physical object in the physical environment. In some embodiments, the simulated pose of the virtual object is a pose in a three-dimensional model of the physical environment (e.g., that is generated based on visual and/or depth information about the physical environment). In some embodiments, the pose of an object (virtual or physical) in the physical environment is different from a location at which a representation of the object is displayed in the representation of the field of view; the location (e.g., in the user interface) at which the representation of the object is displayed changes based on the camera location and field of view, whereas the pose (or simulated pose) of the object in the physical environment does not.

In response to receiving the one or more inputs (606), in accordance with a determination that a first portion of the virtual object corresponds to physical space in the physical environment that is occluded by the physical object in the physical environment (e.g., from the perspective of the one or more cameras) (e.g., determined based on a representation of a three-dimensional model of the physical environment that is optionally generated based on depth information indicative of the physical environment, captured using for example one or more depth sensors of the computer system), the computer system: displays (608) the representation of the physical object (e.g., representation 5008' of can 5008 (FIGS. 5A10, 5A13, and 5A15)); forgoes displaying (510) the first portion of the virtual object; and, in accordance with a determination that a second portion of the virtual object corresponds to physical space in the physical environment that is not occluded (e.g., by the physical object or any physical object in the physical environment, from the perspective of the one or more cameras), displays (612) the second portion of the virtual object (e.g., portions 5002-2 and 5002-3 of virtual object 5002 (FIG. 5A10)), including visually deemphasizing (e.g., fading, blurring, and/or darkening, etc.) a displayed first region (e.g., portion 5002-2 of virtual object 5002 (FIG. 5A10)) of the second portion of the virtual object relative to a displayed second region (e.g., portion 5002-3 of virtual object 5002 (FIG. 5A10)) of the second portion of the virtual object.

In some embodiments, in accordance with a determination that no portion of the virtual object corresponds to physical space in the physical environment that is occluded (e.g., by the physical object or any physical object in the physical environment, from the perspective of the one or more cameras), the system displays the virtual object (e.g., without forgoing displaying portions of the virtual object that are visible from the perspective of the one or more cameras) (e.g., as shown in and described with reference to FIGS. 5A7-5A8, and 5A14). In some embodiments, in accordance with a determination that the second portion of the virtual object corresponds to physical space in the physical environment that is occluded (e.g., by the physical object or any physical object in the physical environment, from the perspective of the one or more cameras), the system forgoes displaying the second portion of the virtual object.

In some embodiments, occlusion of the virtual object by the physical object refers to visual overlap in a displayed representation of the field of view but does not necessarily mean movement of the virtual object through positions that correspond to overlapping physical space (e.g., spatial overlap in three-dimensional space). For example, movement of the virtual object through locations in the representation of the field of view corresponding to simulated poses corresponding to space behind or underneath (e.g., at a different spatial depth from portions of) a physical object produces occlusion in the form of visual overlap between the virtual object and the representation of the physical object in the (e.g., two-dimensional) representation of the physical environment, even though the virtual object does not occupy (e.g., in a virtual sense) any of the same physical space occupied by any physical object in the physical environment. In some embodiments, regions of the virtual object (e.g., that are not occluded) are progressively deemphasized the closer each region of the virtual object is to (e.g., the boundary of) the representation of the physical object. One of ordinary skill will recognize that any number of regions (e.g., individual pixels, or even infinitesimally small regions) may be used to implement the progressive visual de-emphasis.

In some embodiments, the displayed first region is (e.g., immediately) adjacent to the boundary of the representation of the physical object or to the boundary, in the representation of the field of view, of the physical space that is occluded by the physical object. In some embodiments, the displayed second region is (e.g., immediately) adjacent to the boundary of the displayed first region and not (e.g., immediately) adjacent to the boundary of the representation of the physical object (e.g., based on a threshold distance extending beyond the physical object itself, as described herein with reference to operation 614). In some embodiments, the displayed first region is closer to the boundary of the representation of the physical object than the second region (e.g., a line segment from a point in the second region to a respective point along the boundary of the representation of the physical object passes through the first region). In some embodiments, when considering a line segment from a point in the second region, through the first region, to a respective point along the boundary of the representation of the physical object, a first point on the line segment that is closer to the respective point along the boundary is visually deemphasized relative to a second point on the line segment that is further from the respective point than the first point.

In some embodiments, the computer system forgoes displaying (614) a respective portion of the virtual object that corresponds to physical space in the physical environment that extends a threshold distance (e.g., a non-zero threshold distance) from a boundary of the physical object in the representation of the field of view (e.g., a portion of the virtual object that corresponds to physical space beyond the physical boundaries, such as edges and surfaces, of the physical object is at least partially not displayed). In some embodiments, the second portion of the virtual object includes a respective region (e.g., the first region, or a third region different from the first and second regions) that is adjacent to a boundary of the representation of the physical object in the representation of the field of view, and the method includes forgoing displaying the respective region. In some embodiments, the system displays the portion of the representation of the field of view that is adjacent to the boundary of the representation of the physical object (e.g., the portion of the representation of the field of view corresponding to the respective region of the virtual object) instead of the respective region of the virtual object. For example, as shown in and described with reference to FIG. 5A10, portion 5002-1 (which is different from portions 5002-2 and 5002-3) of virtual object 5002 that is adjacent to the boundary of representation 5008' of can 5008 and that corresponds to physical space within the threshold distance from the boundary of can 5008 is not displayed.

In some embodiments, where another physical object is partially occluded by the physical object, a representation of the portion of the other physical object that is adjacent to the boundary of the physical object and visible from the perspective of the one or more cameras is displayed without forgoing displaying or visually deemphasizing regions of the visible portion (e.g., the threshold distance is zero with respect to physical objects). In some embodiments, a virtual object "occludes," in a virtual sense, a portion of a physical object if the virtual object is displayed over or instead of the representation of the portion of the physical object, and the representations of non-occluded portions of the physical object, including portions immediately adjacent to boundaries of the virtual object, are displayed without any gap between the boundaries of the virtual object and the displayed portions of physical object and/or without progressively deemphasizing the displayed portions of the physical object.

Forgoing displaying portions of a virtual object that correspond to physical space extending beyond boundaries of physical objects compensates for uncertainty, due to inaccuracies and/or unsteadiness, in determining the boundaries of the physical objects and provides visual feedback to the user indicating such uncertainty in a manner that reduces the amount of visible imperfections and/or flickering at the object boundary. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

In some embodiments, the threshold distance from the physical object that is used to determine how much of the virtual object is not displayed is (616) based on a degree of accuracy with which an edge of the physical object can be detected based on the hardware and/or software capabilities of the computer system. In some embodiments, different threshold distances are used at different computer systems (e.g., with different hardware and/or software capabilities). For example, where method 600 is performed at a first computer system (e.g., device 5100 (FIG. 5A16)) with better hardware capabilities (e.g., more accurate and/or faster sensors or processors) and/or better software capabilities (e.g., faster algorithms), a smaller threshold distance is used (e.g., portion 5002-4 of virtual object 5002 (FIG. 5A16)) as compared to a different computer system (e.g., device 100 with portion 5002-1 of virtual object 5002 (FIG. 5A15)) with comparatively worse hardware capabilities (e.g., less accurate and/or slower sensors or processors) and/or comparatively worse software capabilities (e.g., slower algorithms).

Using different threshold distances from a physical object to determine how much of an "occluded" or nearby virtual object is not displayed strikes a balance between visualizing the virtual object in place in the physical environment and compensating for uncertainty, due to inaccuracies and/or unsteadiness, in determining the boundaries of the physical objects. For systems that can detect object boundaries more accurately, omitting or deemphasizing less of the virtual object (e.g., relative to systems that are not able to detect object boundaries as accurately) reduces the amount of visible imperfections and/or flickering at the object boundary while still displaying as much of the virtual object as possible. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

In some embodiments, the first portion of the virtual object corresponds (618) to physical space in the physical environment that is occluded by the physical object in the physical environment, and the second portion of the virtual object corresponds to physical space in the physical environment that is not occluded. In some embodiments, a first set of environmental conditions (e.g., lighting conditions, visibility, or any other conditions that may affect the accuracy and consistency with which the computer system obtains visual and/or depth information about the physical environment) are present in the physical environment (e.g., as shown in FIG. 5A15, in contrast to FIG. 5A17). In some embodiments, the computer system (e.g., after displaying the representation of the physical object, forgoing displaying the first portion of the virtual object, and displaying the second portion of the virtual object) detects a change to a second set of environmental conditions in the physical environment (e.g., different lighting conditions, visibility, or any other conditions that may affect the accuracy and consistency with which the computer system obtains visual and/or depth information about the physical environment, as shown in and described with reference to FIG. 5A17). In some embodiments, while the second set of environmental conditions are present in the physical environment, the physical object is at the first pose in the physical environment, the virtual object is at the simulated second pose in the physical environment, and the one or more cameras are at the third pose in the physical environment (e.g., nothing in the physical environment has moved or been moved, including the one or more cameras, and the virtual object is at the same simulated pose), the computer system: displays the representation of the physical object; forgoes displaying the first portion of the virtual object; and displays a third portion of the virtual object (e.g., portions 5002-8 and 5002-9 of virtual object 5002 (FIG. 5A17)), different from the second portion (e.g., the third portion is a superset of the second portion that includes the second portion and an additional portion of the virtual object, or the third portion is a subset of the second portion that includes less than all of the second portion of the virtual object), (optionally) including visually deemphasizing (e.g., fading, blurring, and/or darkening, etc.) a displayed first region (e.g., portion 5002-8 of virtual object 5002 (FIG. 5A17)) of the third portion of the virtual object relative to a displayed second region (e.g., portion 5002-9 of virtual object 5002 (FIG. 5A17)) of the third portion of the virtual object.

Stated another way, in some embodiments the threshold distance from the physical object that is used to determine how much of the virtual object is not displayed is based on environmental conditions in the physical environment (e.g., lighting conditions, visibility, or any other conditions that may affect the accuracy and consistency with which the computer system obtains visual and/or depth information about and models the physical environment). For example, the threshold distance that is used to determine the size of portion 5002-1 of virtual object 5002 (FIG. 5A15) is different from, and smaller than, the threshold distance that is used to determine the size of portion 5002-7 of virtual object 5002 (FIG. 5A17) under reduced lighting conditions. In some embodiments, the change in environmental conditions in the physical environment changes the amount by which the physical object occludes physical space in the physical environment. For example, a decrease in the amount of light in the physical environment and/or in visibility in the physical environment decreases the accuracy and consistency with which the computer system determines boundaries of physical objects in the physical environment, and the amount by which the physical object occludes virtual objects behind it is increased (e.g., to hide irregularities and/or unsteadiness in object boundaries determined by the computer system, for example due to errors, irregularities, discontinuities, and/or unsteadiness in visual and/or depth information about the physical environment, exacerbated by the decrease in visibility).

Changing the threshold distance, from a physical object, that is used to determine how much of an "occluded" or nearby virtual object is not displayed when a first set of environmental conditions changes to a second set of environmental conditions allows the system to adjust to changes in the degree of accuracy with which boundaries of physical objects can be determined while still compensating for uncertainty in the determined physical boundaries by forgoing displaying portions of the virtual object. When environmental conditions are such that the system can detect object boundaries more accurately, omitting or deemphasizing less of the virtual object (e.g., relative to when environmental conditions associated with less accuracy are present) reduces the amount of visible imperfections and/or flickering at the object boundary while still displaying as much of the virtual object as possible. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

In some embodiments, the one or more inputs include (620) an input (e.g., or one or more inputs) corresponding to a request to move the virtual object to the simulated second pose in the physical environment (e.g., an input to change the position of and/or rotate the virtual object, such as input 5046 (FIG. 5A9)). In some embodiments, placement of the virtual object at the simulated second pose in the physical environment is without regard to whether the location of the virtual object as displayed in the representation of the field of view changes further due to movement of the one or more cameras relative to the physical environment and corresponding updates to the representation of the field of view (e.g., as described herein with reference to FIG. 5A11).

Forgoing displaying portions of a virtual object that correspond to physical space extending beyond a boundary of a physical object, in response to an input that moves the virtual object to correspond to physical space that is occluded or within a threshold distance of the physical object, provides visual feedback to the user of the spatial location to which the virtual object is being moved and the relationship between that spatial location and the spatial locations of other objects, such as the physical object, while indicating uncertainty in determining the boundaries of the physical object. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

In some embodiments, the one or more inputs include (622) movement of the one or more cameras of the computer system to the third pose in the physical environment (e.g., movement of the one or more cameras of device 100, as shown in and described with reference to FIG. 5A13). In some embodiments, the movement of the one or more cameras is detected using one or more pose sensors (e.g., pose module 131, in conjunction with accelerometers 167, gyroscopes 168, and/or magnetometers 169 (FIG. 1A)) of the one or more cameras or of the computer system, based on changes in the field of view of the one or more cameras, or a combination thereof. In some embodiments, the movement of the one or more cameras cause the representation of the physical object, as well as the virtual object, to move in the representation of the field of view, resulting in changes in the amount by which one object occludes the other (e.g., even though the physical object remains at the first pose and the virtual object remains at the simulated second pose). For example, movement of the one or more cameras of device 100 from the location and field of view in FIG. 5A10 to changes the respective locations of virtual object 5002 and representation 5008' of can 5008 in the representation of the field of view, and also changes the amount of simulated occlusion of virtual object 5002 by can 5008.

Forgoing displaying portions of a virtual object that correspond to physical space extending beyond a boundary of a physical object, in response to an input that moves the one or more cameras relative to the physical object such that, from the perspective of the one or more cameras, the physical space corresponding to the virtual object is occluded by or within a threshold distance of the physical object, provides visual feedback to the user of the relative spatial locations of the virtual object (which has a simulated spatial location) and the spatial locations of other objects, such as the physical object, while indicating uncertainty in determining the boundary of the physical object. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

In some embodiments, the one or more inputs include (624) an update of a pose of the physical object to the first pose in the physical environment (e.g., or more generally, one or more detected changes in the physical environment that is included in the representation of the field of view) (e.g., detected movement of can 5008 as shown in and described with reference to FIGS. 5A14-5A15). In some embodiments, the update of the pose of the physical object is based on movement of the physical object detected via one or more optical and/or depth sensors of the computer system. In some embodiments, the update of the pose of the physical object is based on improved knowledge about the physical environment (even without movement of the physical object) detected via one or more optical and/or depth sensors of the computer system, including improved information about the pose of the physical object and/or improved information about the pose(s) of other objects adjacent to or nearby the physical object. In some embodiments, the one or more inputs include any combination (e.g., one, two, or all three) of the inputs described in operations 620, 622, and 624. In one example, the one or more inputs include movement of the virtual object to the simulated second pose, as well as movement of the one or more cameras to the third pose in the physical environment. In another example, the one or more inputs include movement of the virtual object to the simulated second pose and detected movement of the physical object (e.g., using one or more optical and/or depth sensors of the computer system) to the first pose in the physical environment, while the one or more cameras are at the third pose.

Forgoing displaying portions of a virtual object that correspond to physical space extending beyond a boundary of a physical object, in response to detecting movement of the physical object, relative to the physical space corresponding to the virtual object, to a location such that the physical object occludes or is within a threshold distance of a portion of the physical space corresponding to the virtual object, provides visual feedback to the user of the relative spatial locations of the virtual object (which has a simulated spatial location) and the spatial locations of other objects, such as the physical object, while indicating uncertainty in determining the boundary of the physical object. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

In some embodiments, while the physical object is at the first pose, the virtual object is at the simulated second pose, and the one or more cameras are at the third pose, an anchor point of the virtual object satisfies (626) placement criteria with respect to a first surface (e.g., a virtual or physical plane or surface), and the virtual object has a predefined spatial relationship to (e.g., is on or a respective distance from) the first surface (e.g., a predefined spatial relationship to (e.g., on) floor 5022, as shown in and described with reference to FIG. 5A18). In some embodiments, the computer system receives one or more second inputs (e.g., input 5056 (FIGS. 5A18-5A19)) that correspond to a request to move the virtual object through a sequence of simulated poses in the physical environment. In some embodiments, in response to receiving the one or more second inputs: in accordance with a determination that, for a respective pose in the sequence of simulated poses, the anchor point of the virtual object satisfies the placement criteria with respect to the first surface, the computer system conditionally displays one or more portions of the virtual object in the representation of the field of view with the virtual object having the predefined spatial relationship to the first surface (e.g., in FIG. 5A19, virtual object 5002 continues to appear displayed on representation 5022' of floor 5022). In some embodiments, in response to receiving the one or more second inputs: in accordance with a determination that, for the respective pose in the sequence of simulated poses, the anchor point of the virtual object satisfies the placement criteria with respect to a second surface (e.g., a virtual or physical plane or surface, such as the top surface of table 5012 (FIG. 5A20)) different from the first surface (e.g., and the virtual object does not satisfy the placement criteria with respect to the first surface), the computer system conditionally displays one or more portions of the virtual object in the representation of the field of view with the virtual object having the predefined spatial relationship to (e.g., placed on or the respective distance from) the second surface (e.g., in FIG. 5A20, virtual object 5002 appears displayed on representation 5012' of table 5012).

In some embodiments, the virtual object satisfies the placement criteria with respect to a respective surface when the respective surface is along the line of sight from the one or more cameras through the anchor point of the virtual object; stated another way, a virtual ray from the one or more cameras and passing through the point in physical space that corresponds to the anchor point of the virtual object intersects the respective surface (or would intersect physical space corresponding to the respective surface, if the respective surface is a virtual surface) before any other surface (ignoring surfaces of the virtual object), as described herein with reference to FIGS. 5A19-5A20. In some embodiments, the virtual object satisfies the placement criteria with respect to a respective surface when the virtual object extends underneath or behind the respective surface by a threshold distance. In some embodiments, the virtual object satisfies the placement criteria with respect to a respective surface when the virtual object is underneath or behind the respective surface such that a line that is normal to the respective surface and that passes through the anchor point intersects the respective surface at a point that is at least a threshold distance from an edge of the respective surface (e.g., when considering a shortest distance between the intersection point and any point along the edge of the respective surface). One of ordinary skill will recognize that numerous other placement criteria, such as those described herein with reference to method 8000, may be used to determine the surface on which a virtual object should be placed (or with which surface the virtual object should have the predefined spatial relationship).

In some embodiments, conditionally displaying one or more portions of the virtual object at a simulated pose, the virtual object having the predefined spatial relationship to a respective surface, includes forgoing displaying portions of the virtual object that correspond to physical space (e.g., if the virtual object were a physical object having the same pose) that is occluded by one or more other objects (e.g., virtual or physical) from the perspective of the one or more cameras, and/or displaying portions of the virtual object that correspond to physical space that is not obscured by any objects (e.g., virtual or physical) from the perspective of the one or more cameras, including progressively visually deemphasizing regions of displayed portions of the virtual object as described herein.

In response to a request to move the virtual object, determining which surface the virtual object should be displayed on (or with respect to), and conditionally displaying one or more portions of the virtual object with the virtual object having a predefined spatial relationship to the determined surface enables the user to better visualize the virtual object in place in the physical environment relative to different surfaces or planes in the physical environment, and provides visual feedback to the user of the uncertainty in determining the boundaries of any occluding or nearby physical objects. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

In some embodiments, the virtual object has (628) a predefined spatial relationship to the first surface (e.g., a predefined spatial relationship to (e.g., on) floor 5022, as shown in and described with reference to FIG. 5A18). In some embodiments, the computer system receives one or more second inputs (e.g., input 5056 (FIGS. 5A18-5A19)) that correspond to a request to move the virtual object to a respective location in the representation of the field of view. In some embodiments, in response to receiving the one or more second inputs: in accordance with a determination that the virtual object at the respective location in the representation of the field of view satisfies placement criteria (e.g., as described above with reference to operation 626) with respect to a first surface, the computer system conditionally displays one or more portions of the virtual object in the representation of the field of view with the virtual object having the predefined spatial relationship to the first surface (e.g., in FIG. 5A19, virtual object 5002 continues to appear displayed on representation 5022' of floor 5022); and, in accordance with a determination that the virtual object at the respective location in the representation of the field of view satisfies the placement criteria with respect to a second surface different from the first surface, the computer system conditionally displays one or more portions of the virtual object in the representation of the field of view with the virtual object having the predefined spatial relationship to the second surface (e.g., in FIG. 5A20, virtual object 5002 appears displayed on representation 5012' of table 5012).

In some embodiments, conditionally displaying one or more portions of the virtual object with the predefined spatial relationship to a respective surface or plane includes forgoing displaying portions of the virtual object that correspond to physical space (e.g., that would be occupied if the virtual object were a physical object) that is obscured by one or more other objects (e.g., virtual or physical) from the perspective of the one or more cameras, and/or displaying portions of the virtual object that correspond to physical space that is not obscured by any objects (e.g., virtual or physical) from the perspective of the one or more cameras, including progressively visually deemphasizing regions of displayed portions of the virtual object as described herein. In some embodiments, conditionally displaying one or more portions of the virtual object includes, in accordance with a determination that the virtual object corresponds to physical space that is not occluded, displaying the virtual object.

In response to a request to move the virtual object, determining which surface the virtual object should be displayed on (or with respect to), and conditionally displaying one or more portions of the virtual object with the virtual object having a predefined spatial relationship to the determined surface enables the user to better visualize the virtual object in place in the physical environment relative to different surfaces or planes in the physical environment, and provides visual feedback to the user of the uncertainty in determining the boundaries of any occluding or nearby physical objects. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 8000) are also applicable in an analogous manner to method 600 described above with respect to FIGS. 6A-6C. For example, the user interfaces, physical environments, physical objects, virtual objects, surfaces and planes, inputs, thresholds, visual de-emphasis, and predefined spatial relationships described above with reference to method 600 optionally have one or more of the characteristics of the user interfaces, physical environments, physical objects, virtual objects, surfaces and planes, inputs, thresholds, visual de-emphasis, and predefined spatial relationships described herein with reference to other methods described herein (e.g., methods 700 and 8000). For brevity, these details are not repeated here.

FIGS. 7A-7E are flow diagrams illustrating method 700 of placing or moving a virtual object in the representation of a physical environment, in accordance with some embodiments. Method 700 is performed at a computer system (e.g., portable multifunction device 100 (FIG. 1A), device 300 (FIG. 3A), or computer system 301 (FIG. 3B)) that includes (and/or is in communication with) a display generation component (e.g., a hardware component that is part of or in communication with the computer system, and that is capable of producing a displayed user interface, such as a projector, a head-mounted display, a heads-up display, an LCD, OLED, LED, rear projection, or other display, or the like, where in some embodiments the display is touch sensitive, such as touch screen 112 (FIG. 1A), display 340

(FIG. 3A), or display generation component(s) 304 (FIG. 3B)); one or more cameras (e.g., optical sensor(s) 164 (FIG. 1A) or camera(s) 305 (FIG. 3B)); optionally one or more depth sensing devices such as depth sensors (e.g., depth sensor 220 (FIG. 2B)); optionally one or more input devices; optionally one or more pose sensors for detecting a pose, or change in pose, of the one or more cameras or of the computer system; optionally one or more sensors to detect intensities of contacts with the touch-sensitive surface; and optionally one or more tactile output generators. Some operations in method 700 are, optionally, combined and/or the order of some operations is, optionally, changed.

As described below, method 700 provides a computationally efficient and intuitive way to position and move virtual objects, relative to physical objects, in an augmented reality user interface. Method 700 includes displaying a virtual object in a representation of a field of view of one or more cameras of a computer system (e.g., device 100), based on one or more user inputs for placing or moving the virtual object, such that the spatial relationship of the virtual object to various physical objects in the field of view is based, at least in part, on how far each of those objects extends from a first surface (e.g., in a direction perpendicular to the first surface) of a first physical object (e.g., the top surface of a table) in the field of view. By positioning the virtual object, in the representation of the field of view, with the same spatial relationship to the first surface, both when the virtual object is moved, in the representation of the field of view, to a portion of the first surface having no other physical objects positioned on the first surface, and when the virtual object is moved, in the representation of the field of view, to a portion of the first surface at which a second object is located, where the second object extends from the first surface by less than a threshold amount, the computational burden on the computer system is reduced.

Furthermore, the computational load that might otherwise be incurred when the computer system gains additional or improved information (e.g., using depth sensor 220) regarding the positions of the surface of the first object and the second object in three dimensional physical space is reduced because the virtual object continues to be displayed with the same spatial relationship to the first surface (e.g., the virtual object is displayed as though it is on or directly on the first surface, even if the second object is positioned between the virtual object and the first surface). On the other hand, when the virtual object is moved, via one or more user inputs, to the location of a third physical object (e.g., any third physical object) that extends from the first surface by more than the threshold amount, the virtual object is displayed in the representation of the field of view as being positioned on a representation of the third physical object. Thus, the computation resources for positioning the virtual object on the representation of another physical object on the first surface are reserved for situations in which the other physical object extends from the first surface by more than the threshold amount. Conserving computational resource in this way enhances the operability of the system (by providing faster results when less computational power is needed to position a virtual object in the representation of the field of view) and reduces power usage and improves battery life of the system by enabling the system to function quickly and efficiently.

The computer system displays (702), via the display generation component, a representation of a field of view of the one or more cameras, the field of view including a plurality of objects in a physical environment. The plurality of objects includes a first physical object (e.g., table 5002, FIG. 5B1) having a first surface (e.g., surface 5220, FIG. 5B1), a second physical object (e.g., magazine 5016, FIG. 5B1) positioned on the first surface, and a third physical object (e.g., cup 5008, FIG. 5B1) positioned on the first surface. The second physical object extends from the first surface less than a threshold amount in a respective direction and the third physical object extends from the first surface more than the threshold amount in the respective direction.

In some embodiments, the first surface of the first physical object is (704) a substantially horizontal (e.g., within 5 degrees, or 2 degrees, of horizontal) surface. For example, in some embodiments, the first surface is a substantially horizontal table top surface 5220, as shown in FIG. 5B1.

In some embodiments, the first surface of the first physical object is (706) a substantially vertical (e.g., within 5 degrees, or 2 degrees, of vertical) surface (e.g., the surface of a wall, such as wall 5020-1 or 5020-2, FIG. 5B1), and the second physical object (e.g., an unframed photo hanging on a wall) extends by less than the threshold amount from the first surface, along an axis normal to the first surface, to a portion of the second physical object distal the first surface, and the third physical object (e.g., a framed picture) extends by more than the threshold amount from the first surface, along the axis normal to the first surface, to a portion of the third physical object distal the first surface.

While performing method 700, the computer system receives (708) one or more first user inputs (e.g., input 5208, FIG. 5B2) that correspond to a request to place or move a first virtual object (e.g., virtual object 5002, FIG. 5B2) at or to a location in the representation of the field of view (e.g., object visualization user interface 5000, FIG. 5B2, sometimes called an augmented reality user interface) that corresponds to a physical location on or near the first surface (e.g., surface 5022) of the first physical object (e.g., table 5012).

In response (710) to the one or more first user inputs, in accordance with a determination, by the computer system, that a representative position of the first virtual object in the physical environment coincides with a portion of the first surface that does not include other physical objects positioned on the first surface (712), the computer system displays the first virtual object in the representation of the field of view with a predefined spatial relationship to a representation of the first surface. Examples of the resulting displayed representation of the first virtual object in the representation of the field of view are shown in FIGS. 5B2-5B5, 5B8 and 5B10.

In some embodiments, the representative position of the first virtual object in the physical environment is a position in the physical environment determined (714) by casting a virtual ray from a position associated with the computer system (e.g., a position of a camera of the computer system, or a position of a user of the computer system, as determined by a user-facing camera of the computer system) though a predefined anchor point of the first virtual object to a surface in the physical environment. An example of determining the position of a virtual object in this manner is described above with reference to inset 5230 in FIG. 5B2.

By determining the representative (e.g., simulated) position of a virtual object in the physical environment using virtual ray casting, the computational complexity of determining the representative position of the virtual object is reduced, which both speeds operation of the computer system and conserves battery power when the computer system is battery powered.

In response (710) to the one or more first user inputs, in accordance with a determination, by the computer system, that the representative position of the first virtual object in the physical environment coincides with the second physical object positioned on the first surface (716), the computer system displays the first virtual object in the representation of the field of view with the predefined spatial relationship to the representation of the first surface. In some embodiments, the determination made by the computer system is whether the first virtual object in the physical environment coincides with a physical object that is positioned on the first surface and extends from the first surface along an axis normal to the first surface 5022 (e.g., a vertical axis, normal to table surface 5022, in the example in FIGS. 5B6-5B7) less than a threshold amount in a respective direction. When that determination is made, the computer system displays the first virtual object (e.g., virtual object 5002, FIG. 5B6) in the representation of the field of view with the predefined spatial relationship (e.g., the same predefined spatial relationship described above with reference to FIG. 5B2) to the representation 5220' of the first surface. Examples of the resulting displayed representation of the first virtual object in the representation of the field of view are shown in FIGS. 5B6-5B7.

In response (710) to the one or more first user inputs, in accordance with a determination, by the computer system, that the representative position of the first virtual object in the physical environment coincides with the third physical object positioned on the first surface (718), the computer system displays the first virtual object in the representation of the field of view as positioned on a representation of the third physical object, wherein in the representation of the field of view the representation of the third physical object is positioned between a representation of the first physical object and the first virtual object. In some embodiments, the determination made by the computer system is whether the first virtual object in the physical environment coincides with a physical object (e.g., cup 5008, FIG. 5B9) that is positioned on the first surface and extends from the first surface more than the threshold amount in the respective direction. When that determination is made, the computer system displays the first virtual object in the representation of the field of view as positioned on a representation of the third physical object. In some embodiments, the first virtual object, as displayed in the representation of the field of view of the one or more cameras, has the predefined spatial relationship to a portion of the third physical object such that the virtual object appears to rest on the third physical object, such as on a plane detected on the physical object or on a mesh (as described above) that is determined to represent an extent of the third physical object based on sensor measurements by the computer system. Examples of the resulting displayed representation of the first virtual object in the representation of the field of view are shown in FIGS. 5B9 and 5B11-5B12.

In some embodiments or circumstances, in response to the one or more first user inputs, the computer system moves (720) the first virtual object in the representation of the field of view from a prior position on the first surface of the first physical object that does not include other physical objects (e.g., as shown in FIG. 5B5) to a new position on the first surface of the first physical object (e.g., as shown in FIG. 5B6). The new position is the representative position of the first virtual object in the physical environment after moving the first virtual object in accordance with the one or more first user inputs. In some embodiments, moving (720) the first virtual object in the representation of the field of view from the prior position on the first surface to the new position on the first surface of the first physical object includes (722), in accordance with a determination that the new position of the first virtual object in the physical environment coincides with the second physical object (e.g., magazine 5016, see FIGS. 5B5-5B6) positioned on the first surface, displaying the first virtual object in the representation of the field of view with the predefined spatial relationship to the representation of the first surface while at the prior position on the first surface and with the same predefined spatial relationship to the representation of the first surface while at the new position on the first surface.

By maintaining a virtual object at the same placement height or displacement relative to the first surface while the virtual object is moved, by one or more user inputs, from a prior position on the first surface to a new position that coincides with the second physical object positioned on the first surface, fewer computations are required to render the resulting augmented reality environment, which speeds operation, and computational power for rendering the resulting augmented reality environment is reduced, thereby conserving battery power when the computer system is battery powered.

In some embodiments, moving (720) the first virtual object in the representation of the field of view from the prior position on the first surface to the new position on the first surface of the first physical object includes (724), in accordance with a determination that in the representation of the field of view the new position of the first virtual object in the physical environment coincides with the third physical object (e.g., cup 5008, as shown in FIGS. 5B8-5B9) positioned on the first surface, displaying the first virtual object in the representation of the field of view with an increased placement distance extending from the first surface while at the new position on the first surface relative to its placement distance extending from the first surface while at the prior position on the first surface, an example of which is shown in FIG. 5B9.

In some embodiments, the first virtual object has (730) a predefined vertical axis, and the method includes orienting the first virtual object in the physical environment such that the predefined vertical axis of the virtual object is parallel to a determined vertical axis of the physical environment, determined by the computer system. For example, in FIGS. 5B2-5B12, the virtual object 5002 has a vertical axis that is parallel to a vertical axis of the physical environment, which is also parallel to an axis that is normal to the first surface 5022 of the first physical object (table 5012).

In some embodiments, while performing method 700, the computer system obtains (734) updated position information regarding (e.g., position information for) the first surface (e.g., using a depth sensor of the computer system), and adjusts the representative position of the first virtual object in the physical environment based on the updated position information regarding the first surface. As discussed above with reference to FIG. 5A5, in some embodiments the computer system generates a three-dimensional model of physical environment 5010 that is used by the computer, typically in combination with a representation of the field of view of the one or more cameras (captured, for example, using one or more optical sensors such as optical sensors 164 (FIG. 1A)) to display the augmented reality viewing mode of object visualization user interface 5000. The three-dimensional model, which may include position information regarding one or more surfaces of one or more physical objects (e.g., the first surface 5022 of table 5012, FIG. 5B2) is updated, over time, for example as the one or more cameras of the computer system are moved, or simply with the passage of time. As a result, in some embodiments, the computer system adjusts (e.g., using a smooth animation to avoid jolting changes) the representative position of the first virtual object in the physical environment based on the updated position information regarding the first surface.

In some embodiments or circumstances, the methodology described above is performed or repeated with respect to a second virtual object (738-748) that is distinct from the first virtual object. In particular, method 700 optionally includes receiving (738) receiving one or more second user inputs that correspond to a request to add or move a second virtual object at or to a location in the representation of the field of view that corresponds to a physical location on or near the first surface of the first physical object. In response (740) to the one or more second user inputs, in accordance with a determination (742), by the computer system, that the representative position of the second virtual object in the physical environment coincides with no physical objects positioned on the first surface, the computer system displays the second virtual object in the representation of the field of view with the predefined spatial relationship to the representation of the first surface.

Similarly, in response (740) to the one or more second user inputs, in accordance with a determination (746), by the computer system, that a representative position of the second virtual object in the physical environment coincides with the second physical object positioned on the first surface, the computer system displays the second virtual object in the representation of the field of view with the predefined spatial relationship to the representation of the first surface.

Further, in response (740) to the one or more second user inputs, in accordance with a determination (748), by the computer system, that the representative position of the second virtual object in the physical environment coincides with the third physical object positioned on the first surface, the computer system displays the second virtual object in the representation of the field of view as positioned on the representation of the third physical object, wherein the representation of the third physical object is positioned between the first physical object and the second virtual object.

It should be understood that the particular order in which the operations in FIGS. 7A-7E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 8000) are also applicable in an analogous manner to method 700 described above with respect to FIGS. 7A-7E. For example, the user inputs, a resulting displays of a representation of a field of view described above with reference to method 700 optionally have one or more of the characteristics of the user inputs and representations of a field of view described herein with reference to other methods described herein (e.g., methods 600 and 8000). For brevity, these details are not repeated here.

FIGS. 8A-8E are flow diagrams illustrating method 800 of interacting with an augmented reality environments (e.g., dragging a virtual object across different surfaces) in accordance with some embodiments. Method 8000 is performed at a computer system (e.g., portable multifunction device 100 (FIG. 1A), device 300 (FIG. 3A), or computer system 301 (FIG. 3B)) that includes (and/or is in communication with) a display generation component, one or more cameras, and one or more input devices, optionally one or more pose sensors, optionally one or more sensors to detect intensities of contacts with the touch-sensitive surface, and optionally one or more tactile output generators. Some operations in method 8000 are, optionally, combined and/or the order of some operations is, optionally, changed.

As described herein, method 8000 provides visual feedback for a user's request to move a virtual object in a representation of the field of view that includes a representation of a physical environment in different manners depending on whether or not the movement includes a transition between two different surfaces, and optionally, on the nature of the surfaces (e.g., between plane and mesh, between horizontal planes, between vertical planes, from horizontal plane to vertical plane, from vertical to horizontal plane, etc.), and/or, the order of the transition (e.g., transition to new surface that require rotation of the virtual object, transition back to a known surface that does not require rotation of the virtual object, etc.). For example, a virtual object can move along (e.g., translate, without rotation or resizing relative to the orientation and size of the physical environment) a surface (e.g., a preset first surface of a physical object for receiving/supporting a virtual object) while maintaining a fixed spatial relationship to a virtual or mathematical representation of the surface in a computer-generated model of the physical environment (e.g., with a preset anchor point or surface of the virtual object located at or on the representation of the surface). The virtual object can also move from one surface to another surface (e.g., surfaces of the same type (e.g., from plane to plane, or from mesh to mesh, etc.), surfaces of different types (e.g., plane to mesh, mesh to plane, etc.), surfaces of different orientations (e.g., vertical to horizontal, horizontal to vertical), etc.). In some embodiments, when there is no transition between surfaces, the movement of the virtual object is directly controlled by the user's inputs; but when there is a transition between surfaces, an animated transition is generated based on the end states of the virtual object on the two surfaces without regard to the user inputs detected during this transition, and the animated transition is displayed to bridge the states of the virtual object on the two surfaces. Using animated transitions calculated based on end states of the virtual object instead of calculating the intermediate states of the virtual object based on the computer-generated model of physical environment and the user inputs detected as the virtual object moves across the visual boundary between the two surfaces allow the movement of the virtual object to be generated without heavy computation, and without introducing artifacts resulted from the uncertainty in the computer-generated model of the physical environment at the visual boundary between surfaces in the physical environment. In addition, the smooth animated transition calculated based on the end states of the virtual object on the two surfaces reduces the distraction and flickering caused by the inaccuracies and/or unsteadiness in the boundaries of the surfaces in the computer-generated model of the physical environment. As such, the animated transition reduces the amount of visible imperfections and/or flickering at the visual boundary between physical surfaces. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the system by enabling the user to use the system more quickly and efficiently.

The method 8000 is performed at a computer system having a display generation component (e.g., a display, a projector, a heads up display or the like), an input device, (e.g., of one or more input devices, including a touch-sensitive surface, such as a touch-sensitive remote control, or a touch-screen display that also serves as the display generation component, a mouse, a stylus, a joystick, a wand controller, and/or cameras tracking the position of one or more features of the user such as the user's hands) and one or more cameras (and optionally one or more depth sensing devices). In method 8000, the computer system displays (8002) a first virtual object (e.g., a virtual chair, a virtual box, etc.) in a representation of a field of view of the one or more cameras, the field of view including a view of a portion of a physical environment (e.g., a portion of a room, a hall, an outdoor environment, etc., that is captured by the one or more cameras), wherein the portion of the physical environment includes a first physical object (e.g., a table, a first wall, a backpack, etc.) and a second physical object (e.g., the floor, a second wall, a cushion, etc.) different from the first physical object, the first virtual object is displayed at a first position (e.g., a first simulated position in a computer-generated three-dimensional dimensional model of the physical environment (e.g., a complete three-dimensional model, a combination of planes and meshes corresponding to the planes and surfaces in the physical environment, a pseudo-three-dimensional environment, a three-dimensional point cloud, etc.)) that has a predefined spatial relationship to a representation of the first physical object in the representation of the field of view (e.g., the first position is a position in the representation of the portion of the physical environment that corresponds to a first location on or at a preset first surface of the first physical object); In some embodiments, when the first virtual object is displayed at the first position with the predefined spatial relationship to the representation of the first physical object, the first virtual object is displayed at a first location with a preset anchor surface (e.g., a bottom surface, a back surface, etc.) of the first virtual object being located at, near, or a preset distance away from the location of the representation of a preset first surface (e.g., a top surface, a front surface, etc.) of the first physical object in a direction substantially perpendicular to the preset surface, etc. For example, in some embodiments, the computer system displays the first virtual object as though it were positioned at a detected location of the preset first surface that appears to be directly on the preset first surface (e.g., on a virtual plane that is determined by the device in the representation of the field of view of the one or more cameras to be at a location that the device selects as corresponding to the preset first surface of the first physical object based on sensor measurements of a location of the preset first surface of the first physical object). In some embodiments, a representation of a field of view is a still view or a live view representation. In some embodiments, if the representation is a live view representation, the representation is continually updated in accordance with changes occurring in the physical environment around the cameras and in accordance with movement of the cameras relative to the physical environment. In some embodiments, the computer system uses data received from image and depth sensors to generate a three-dimensional dimensional model of the physical environment (e.g., a complete three-dimensional model, a combination of planes and meshes corresponding to the planes and surfaces in the physical environment, a pseudo-three-dimensional environment, a three-dimensional point cloud, etc., and locations of planes and curved surfaces in the physical environment are estimated and represented in the computer-generated three-dimensional model of the physical environment. The visual appearance and display position of the first virtual object in the representation of the field of view of the cameras is determined based on a simulated position of the first virtual object in the computer-generated three-dimensional model, where the simulated position is calculated based on the predefined spatial relationship between the first virtual object and the virtual representation of the physical environment (e.g., the representations of planes and surfaces of the physical objects in the physical environment). In some embodiments, a respective virtual object has a first anchor plane/surface/point (e.g., bottom surface, bottom plane, center or edge of bottom surface, etc.) for a first type of surfaces (e.g., substantially horizontal surfaces, such as tabletops, desktops, floors, etc.), a second anchor plane/surface/point (e.g., back surface, back plane, back edge of bottom surface, center of back surface, etc.) for a second type of surfaces (e.g., substantially vertical surfaces, such as walls, windows, etc.), and, optionally, a third anchor plane/surface/point (e.g., center of back surface, center of bottom surface, front edge of bottom surface, bottom plane, bottom surface, etc.) for a third type of surfaces (e.g., slanted planes, curved surfaces, uneven surfaces, etc.) detected in the physical environment. Displaying the representation of the physical environment (e.g., representation 5010') including representation of physical objects with surfaces characterized as planes (e.g., representations 5012', 5020-1', 5020-2', etc.) and surfaces characterized as mesh surfaces (e.g., mesh surface 5636'), and displaying virtual object (e.g., virtual object 5002) are illustrated in FIGS. 5C1-5C61, for example. The computer-system, while displaying the first virtual object at the first position with the predefined spatial relationship to the representation of the first physical object in the representation of the field of view (e.g., at the position in the representation of the portion of the physical environment that corresponds to the first location on or at the preset first surface of the first physical object), detect (8004) one or more first user inputs that correspond to a request to move the first virtual object relative to the first physical object (e.g., detecting a drag input directed to the first virtual object that includes detecting movement of a contact from a first location on a touch-sensitive surface that corresponds to the first position to a second location on the touch-sensitive surface that corresponds to a second position in the representation of the physical environment; or detecting a gaze input that selects the first virtual object and moves the first virtual object relative to the representation of the physical environment; or detecting movement of the cameras while the first virtual object is selected, etc.). These inputs are illustrated, for example, in FIGS. 5C1-5C61, by respective sets of inputs provided using various contacts (e.g., contact 5602, 5608, 5610, 5612, 5614, 5616, 5618, 5620, 5622, 5626, 5632, 5634, etc.). In response to detecting the one or more first user inputs (8006): in accordance with a determination that the one or more first user inputs correspond a request to move the first virtual object from the first position, to a second position that has the predefined spatial relationship to the representation of the first physical object in the representation of the field of view (e.g., the second position is a position in the representation of the portion of the physical environment that corresponds to a second location on or at the preset first surface of the first physical object), the computer system moves (8008) the first virtual object with movements that correspond to the one or more first user inputs (e.g., by an amount (speed and/or distance) and/or in a direction that corresponds to an amount (speed and/or distance) and/or direction of movement of the one or more first user inputs) (e.g., the first virtual object appears to be dragged along the preset first surface of the first physical object by the one or more first user inputs, and the sequence of second positions and the final position of the first virtual object in the representation of the portion of the physical environment are selected in accordance with the one or more first user input (e.g., the first virtual object follows the first inputs (e.g., the gaze input, the drag input, the movement of the cameras, etc.) throughout the duration of the first inputs, as if directly manipulated by the first inputs)). In some embodiments, displaying the first virtual object at the second position with the predefined spatial relationship to the representation of the first physical object includes displaying the first virtual object at a second location with the preset anchor surface (e.g., a bottom surface, a back surface, etc.) of the first virtual object being located at, near, or a preset distance away from the location of the representation of the preset first surface (e.g., a top surface, a front surface, etc.) of the first physical object in a direction substantially perpendicular to the preset surface, etc.). In some embodiments, movement of the virtual object as constrained by a corresponding surface or plane and in accordance with the detected inputs are illustrated in FIGS. 5C2-5C4, 5C9-5C13, 5C34-5C36, 5C40-5C41, 5C46-5C48, 5C52-5C53, for example. In response to detecting the one or more first user inputs (8006): in accordance with a determination that the one or more first user inputs correspond a request to move the first virtual object from the first position, to a third position that has the predefined spatial relationship to the representation of the second physical object in the representation of the field of view (e.g., the third position is a position in the representation of the portion of the physical environment that corresponds to a third location on or at the preset first surface of the second physical object), the computer system moves (8010) the first virtual object from the first position in the representation of the field of view (e.g., including the representation of the portion of the physical environment) to the third position in the representation of the field of view, including, displaying an animated transition between the first virtual object being displayed with the predefined spatial relationship to the representation of the first physical object (e.g., at a threshold position on the first physical object for switching plane/surface) to the first virtual object being displayed with the predefined spatial relationship to the second physical object (e.g., at a landing position on the second physical object after switching plane/surface), wherein the animated transition includes movement of the first virtual object that does not correspond to the one or more first inputs (e.g., the animated transition is generated based on the final display location and appearance of the first virtual object that is selected in accordance with the one or more first user input, but the intermediate positions and appearances of the first virtual object displayed in the animated transition optionally do not vary (e.g., are optionally calculated based on the end states (e.g., the state at the moment when thresholds/criteria for switching plane/surface are met, and the starting state on the new plane/surface) of the virtual object only) when different inputs are used to achieve the same final state (e.g., the first virtual object being displayed at the third position)). The display of the animated transition are illustrated in FIGS. 5C5-5C7, 5C16-5C22-5C25, 5C29-5C32, 5C37-5C40, 5C42-5C45, 5C48-5C51, 5C53-5C55, for example. In some embodiments, when the first virtual object is displayed at the third position, the first virtual object is displayed with the preset anchor surface (e.g., a bottom surface, a back surface, etc.)

of the first virtual object being located at, near, or a preset distance away from the location of the representation of the preset first surface (e.g., a top surface, a front surface, etc.) of the second physical object in a direction substantially perpendicular to the preset first surface, etc. In some embodiments, the preset anchor surface of the first virtual object and the preset first surface of the physical object optionally vary for different physical objects (e.g., the first physical object, the second physical object, etc.).

In some embodiments, the one or more first inputs correspond to (8012) a request to translate the first virtual object while maintaining the first virtual object at positions that have the predefined spatial relationship with the representation of the first physical object, without changing an orientation and/or size of the first virtual object (e.g., the intrinsic size of the first virtual object is maintained relative to physical environment, even though the displayed orientation and size may seem different based on the different viewing perspectives and viewing distances associated with the field of view). This is illustrated in FIGS. 5C2-5C8, and 5C9-5C19, for example. This is also illustrated in FIGS. 5C33-5C40, 5C46-5C51, and 5C52-5C55, for example. In some embodiments, the first virtual object appears to move along the substantially planar surface of the first physical object without being rotated around a substantially vertical axis that passes through the anchor plane or surface of the first virtual object (e.g., the bottom plane for a virtual object that sits on a horizontal plane, the back plane for the virtual object that is attached to a vertical plane, etc.)). In some embodiments, the one or more first inputs includes a first portion of a continuous input that corresponds to a request to move the first virtual object from the first position to a first intermediate position, followed by a second portion of the continuous input that corresponds to a request to move the first virtual object from the first intermediate position to a second intermediate position in the representation of the portion of the physical environment, and in response to the one or more first inputs and in accordance with a determination that the first intermediate position and the second intermediate position both correspond to the first physical object, the computer system first moves the first virtual object from the first position to the first intermediate position in accordance with the first portion of the continuous input, and then moves the first virtual object from the first intermediate position to the second intermediate position in accordance with the second portion of the continuous input, while maintaining the predefined physical relationship (e.g., anchor plane/surface of the virtual object being at or near the preset first surface/plane of the physical object) between the first virtual object and the first physical object in the computer-generated model of the physical environment throughout the movement of the first virtual object from the first position to the first intermediate position, and then to the second intermediate position. The process continues onto other intermediate positions as additional portions of the continuous input is detected and until termination of the input is detected.

In some embodiments, while displaying the first virtual object at the third position with the predefined spatial relationship to the representation of the second physical object in the representation of the field of view, the computer system detects (8014) one or more second user inputs that correspond to a request to move the first virtual object relative to the second physical object (e.g., detecting a drag input directed to the first virtual object that includes detecting movement of a contact from a third location on a touch-sensitive surface that corresponds to the third position to a fourth location on the touch-sensitive surface that corresponds to a fifth position in the representation of the physical environment; or detecting a gaze input that selects the first virtual object and moves the first virtual object relative to the representation of the physical environment; or detecting movement of the cameras while the first virtual object is selected, etc.). In response to detecting the one or more second user inputs: in accordance with a determination that the one or more second user inputs correspond a request to move the first virtual object from the third position, to a fourth position that has the predefined spatial relationship to the representation of the first physical object in the representation of the field of view (e.g., the fourth position is a position in the representation of the portion of the physical environment that corresponds to a fourth location on or at the preset first surface of the second physical object), the computer system moves the first virtual object with movements that correspond to the one or more second user inputs (e.g., by an amount (speed and/or distance) and/or in a direction that corresponds to an amount (speed and/or distance) and/or direction of movement of the one or more second user inputs) (e.g., the first virtual object appears to be dragged along the preset first surface of the second physical object by the one or more second user inputs, and the sequence of fourth positions and the final position of the first virtual object in the representation of the portion of the physical environment are selected in accordance with the one or more second user input (e.g., the first virtual object follows the second inputs (e.g., the gaze input, the drag input, the movement of the cameras, etc.) throughout the duration of the second inputs, as if directly manipulated by the second inputs)). In some embodiments, the one or more second inputs correspond a request to translate the first virtual object while maintaining the first virtual object at positions that have the predefined spatial relationship to the representation of the second physical object in the representation of field of view (e.g., including the representation of the physical environment), without changing an orientation and/or size of the first virtual object (e.g., the intrinsic size of the first virtual object is maintained relative to physical environment, even though the displayed orientation and size may seem different based on the different viewing perspectives and viewing distances associated with the field of view). In some embodiments, the first virtual object appears to move along the substantially planar surface of the second physical object without being rotated around a substantially vertical axis that passes through the anchor plane or surface of the first virtual object (e.g., the bottom plane for a virtual object that sits on a horizontal plane, the back plane for the virtual object that is attached to a vertical plane, etc.)). In some embodiments, the first virtual object displayed at the fourth position is displayed at a fourth location with the preset anchor surface (e.g., a bottom surface, a back surface, etc.) of the first virtual object being located at, near, or a preset distance away from the location of the representation of the preset first surface (e.g., a top surface, a front surface, etc.) of the second physical object in a direction substantially perpendicular to the preset surface, etc.).

In some embodiments, in response to detecting the one or more second user inputs: in accordance with a determination that the one or more second user inputs correspond a request to move the first virtual object from the third position, to a fifth position that has the predefined spatial relationship to the representation of the first physical object in the representation of the field of view, the computer system moves (8016) the first virtual object from the third position in the representation of the field of view to the fifth position in the representation of the field of view, including, displaying an animated transition between the first virtual object being displayed with the predefined spatial relationship to the representation of the second physical object (e.g., at a threshold position on the second physical object) to the first virtual object being displayed with the predefined spatial relationship to the first physical object (e.g., at a landing position on the first physical object), wherein the animated transition includes movement of the first virtual object that does not correspond to the one or more second inputs (e.g., the animated transition is generated based on the final display location and appearance of the first virtual object that is selected in accordance with the one or more second user input, but the intermediate positions and appearances of the first virtual object displayed in the animated transition optionally do not vary (e.g., are optionally calculated based on the end states (e.g., the state at the moment when thresholds/criteria for switching plane/surface are met, and the starting state on the new plane/surface) of the virtual object only) when different inputs are used to achieve the same final state (e.g., the first virtual object being displayed at the fifth position)). In some embodiments, the first virtual object displayed at the fifth position is displayed at a fifth location with the preset anchor surface (e.g., a bottom surface, a back surface, etc.) of the first virtual object being located at, near, or a preset distance away from the location of the representation of the preset first surface (e.g., a top surface, a front surface, etc.) of the first physical object in a direction substantially perpendicular to the preset first surface, etc.). In some embodiments, the preset anchor surface of the first virtual object and the preset first surface of the physical object optionally vary for different physical objects (e.g., the first physical object, the second physical object, etc.). This is illustrated in various portions of FIGS. 5C1-5C61, where virtual object 5002 is moved off a plane onto another plane and then returned back to the previous plane.

In some embodiments, the determination that the one or more first user inputs correspond a request to move the first virtual object from the first position that has the predefined spatial relationship to the representation of the first physical object in the representation of the field of view to the third position that has the predefined spatial relationship to the representation of the second physical object in the representation of the field of view is made (8018) in accordance with a determination that a first condition for moving the first virtual object from the first position to the third position has been met (e.g., as a result of the one or more first inputs) and remains being met for at least a threshold amount of time (e.g., a characteristic point associated with the first virtual object (e.g., an intersection between a physical surface and a virtual ray that passes through the anchor point of the first virtual object (e.g., center of the anchor surface (e.g., the top surface, the bottom surface, the front surface, the back surface, etc.)) and the user's viewpoint) has moved from a first location on the preset first surface of the first physical object to a third location on the preset first surface of the second physical object, and that the characteristic point associated with the first virtual object is maintained at locations that correspond to the preset first surface of the second virtual object (e.g., within a threshold distance of the fourth location) for at least a threshold amount of time after the movement from the first location to the fourth location). The input hysteresis are described and illustrated in FIGS. 5C1-5C61, when inputs causes transition of virtual object 5002 from one plane to another plane, for example.

In some embodiments, the determination that the one or more first user inputs correspond a request to move the first virtual object from the first position to the third position is made (8020) in accordance with a determination that the one or more first inputs correspond to a first amount of movement of the first virtual object beyond a threshold location corresponding to the first physical object (e.g., a visual boundary between the two surfaces in the view of the portion of the physical environment), and that the first amount of movement is greater than a preset threshold amount of movement (e.g., a characteristic point associated with the first virtual object (e.g., an intersection between a physical surface and a virtual ray that passes through the anchor point of the first virtual object and the user's viewpoint) will be moved from the first location on the first preset surface of the first physical object to a location on the first preset surface of the second physical object that is at least a first threshold distance away from the visual boundary of the first physical object and the second physical object, into the preset first surface of the second physical object, in accordance with the one or more first inputs). The input hysteresis are described and illustrated in FIGS. 5C1-5C61, when inputs causes transition of virtual object 5002 from one plane to another plane, for example.

In some embodiments, the first physical object has (8022) a first surface (e.g., the preset first surface of the first physical object) (e.g., a substantially horizontal surface relative to the physical environment, a substantially vertical surface relative to the physical environment, etc.), and the second physical object has a second surface (e.g., the preset first surface of the second physical object) (e.g., a substantially vertical surface relative to the physical environment, a substantially horizontal surface relative to the physical environment, etc.), wherein the first surface and the second surface are at an angle (e.g., a finite non-zero angle, such as 10, 30, 50, 90, 130, 170 degrees, etc.) relative to each other (e.g., the first surface and the second surface are substantially perpendicular (e.g., at a substantially right angle) relative to each other) (e.g., the vertical surface and the horizontal surface are optionally connected at an intersection or corner, or completely disjoint from each other). This is illustrated in FIGS. 5C34-5C40, 5C41-5C45, 5C46-5C51, 5C52-5C55, for example, where the transitions are between two planes that are substantially perpendicular to each other.

In some embodiments, the animated transition includes (8024) a series of intermediate states in which an orientation of the first virtual object is unchanged relative to the physical environment in the representation of the field of view (e.g., the first virtual object is translated independent of the first user inputs, without any rotation). In some embodiments, the translational animation is used when transitioning between two planes that are substantially parallel to each other (e.g., from a table top to the floor, from the floor to the table top, from the front door of a fridge to a wall behind the fridge, from a wall in the room to a wall in a walk-in closet, from a wall to the floor, from a wall to a table top, etc.). This is illustrated in FIGS. 5C3-5C7, 5C15-5C19, 5C22-5C25, 5C29-5C32, 5C48-5C51, 5C53-5C55, where the virtual object only translate and does not rotate when switching between planes, for example. In some embodiments, rotational of the first virtual object is introduced into the animated transition when the virtual object is switching from a substantially horizontal surface to a substantially vertical surface, when different anchor surfaces (e.g., bottom surface vs. back surface, bottom surface vs. left surface, bottom surface vs. top surface, etc.) is defined for the first virtual object for the substantially horizontal surface and the substantially vertical surface. In some embodiments, the translational animation and any rotation introduced into the animated transition is generated without utilizing the positional and/or geometric information of the surfaces between the beginning and ending positions of the first virtual object on the surfaces, but only utilizing the beginning and final states of the first virtual object at those positions. This way, precise knowledge of the surface geometric of the surfaces are not required to generate the animated transition, and the animated transition is smooth and unaffected by the imperfect mathematical characterizations of the surfaces.

In some embodiments, while displaying the first virtual object at the first position that has the predefined spatial relationship to the representation of the first physical object in the representation of the field of view (and optionally, the sequence of intermediate positions and the second position that correspond to the sequence of intermediate locations and the second location at or on the first preset surface of the first physical object), the computer system displays (8026) a first simulated shadow of the first virtual object around a first portion of the first virtual object that is facing toward (e.g., substantially parallel to) the first physical object (e.g., facing toward the preset first surface of the first physical object (e.g., the surface that typically supports objects of the same type as the first virtual object) (e.g., the top surface of the floor, the front surface of a fridge, the top surface of the table, etc.)). While displaying the first virtual object at the third position that has the predefined spatial relationship to the representation of the second physical object in the representation of the field of view, the computer system displays a second simulated shadow of the first virtual object around a second portion of the first virtual object that is facing toward (e.g., substantially parallel to) the second physical object (e.g., facing toward the preset first surface of the second physical object (e.g., the surface that typically supports objects of the same type as the first virtual object) (e.g., the top surface of the floor, the front surface of a fridge, the top surface of the table, etc.)), the second portion of the first virtual object being different from the first portion of the first virtual object (e.g., the bottom surface vs. the back surface, the bottom surface vs. the left surface, etc.). This is illustrated by the different simulated shadows (e.g., simulated shadows 5604, 5624, 5628, etc.) showing around different anchor surfaces of virtual object 5002 when virtual object 5002 are displayed on substantially vertical planes (e.g., wall 5020-1, wall 5020-2, etc.) and substantially horizontal planes (e.g., table 5012, floor 5022, etc.), as shown in FIGS. 5C1-5C61, for example.

In some embodiments, the computer system displays (8028) the first virtual object at the first position and the second position that have the predefined spatial relationship to the representation of the first physical object includes displaying the first virtual object with a first portion of the first virtual object facing toward the first physical object (e.g., facing the preset first surface of the first physical object). The computer system displays the first virtual object at the third position that has the predefined spatial relationship to the representation of the second physical object includes displaying the first virtual object with a second portion, different from the first portion, of the first virtual object facing toward the second physical object (e.g., facing the preset first surface of the second physical object). This is illustrated by the virtual object 5002 having different anchor surfaces (e.g., back surface vs. bottom surface) for the substantially vertical planes (e.g., wall 5020-1, wall 5020-2, etc.) and the substantially horizontal planes (e.g., table 5012, floor 5022, etc.), as shown in FIGS. 5C1-5C61, for example.

In some embodiments, the first position and the second position have (8030) the predefined spatial relationship to a first surface of the first physical object, the third position has the predefined spatial relationship to a second surface of the second physical object, and the first surface and the second surface are substantially horizontal surfaces relative to the physical environment (e.g., horizontal surfaces that are at different height relative to the physical environment, horizontal surfaces that are parallel to each other, and optionally, disjoint from each other). This is illustrated in the transitions from one substantially horizontal plane to another substantially horizontal plane, and from one substantially vertical plane to another substantially vertical plane, in FIGS. 5C2-5C7, 5C15-5C19, 5C22-5C25, 5C29-5C32, 5C42-5C45, for example.

In some embodiments, the animated transition includes (8032) a series of intermediate states in which an orientation of the first virtual object is unchanged relative to the physical environment in the representation of the field of view (e.g., the first virtual object is translated independent of the first user inputs, without any rotation). This is illustrated in FIGS. 5C2-5C7, 5C15-5C19, 5C22-5C25, 5C29-5C32, 5C42-5C45, for example.

In some embodiments, the first physical object corresponds (8034) to a first plane and the second physical object corresponds to a second plane that is at an angle (e.g., substantially perpendicular) to the first plane. In response to the one or more first inputs, in accordance with a determination that the one or more first user inputs correspond a request to move the first virtual object from the first position to the third position that has the predefined spatial relationship to the representation of the second physical object in the representation of the field of view, the computer system changes an orientation of the first virtual object (e.g., rotation of the first virtual object in three-dimensional space, as opposed to in a plane that supports the first virtual object) from a first orientation to a second orientation different from the first orientation. In some embodiments, the first orientation is defined relative to the first physical object (e.g., with the bottom surface of the first virtual object facing toward the preset first surface of the first physical object, and a front surface rotated by x degrees around a vertical axis through the bottom center of the first virtual object) and the second orientation is defined relative to the second physical object (e.g., with the back surface of the first virtual object facing toward the second surface, and a top surface rotated by y degrees around a horizontal axis through the center of the back surface of the first virtual object). This is illustrated in FIGS. 5C37-5C40, and FIGS. 5C42-5C45, for example, where virtual object rotates to have its anchor surface facing toward the new supporting surface after the switching of supporting surfaces.

In some embodiments, while displaying of the first virtual object at the third position that has the predefined spatial relationship to the representation of the second physical object in the representation of the field of view and with the second orientation relative to the second physical object, the computer system detects (8036) one or more third user inputs that correspond to a request to move the first virtual object relative to the representation of the field of view. In response to detecting the one or more third user inputs: in accordance with a determination that the one or more third user inputs correspond a request to move the first virtual object from the third position to a fifth position that has the predefined spatial relationship to the representation of the first physical object in the representation of the field of view (e.g., the fifth position is a position in the representation of the portion of the physical environment that corresponds to a fifth location on or at the preset first surface of the first physical object), the computer system moves the first virtual object from the third position in the representation of the field of view (e.g., including the representation of the portion of the physical environment) to the fifth position in the representation of the field of view, wherein the first virtual object is displayed at the fifth position in the representation of the field of view with the second orientation (e.g., the second orientation is defined relative to the second physical object), without changing the orientation of the first virtual object (e.g., the first virtual object is simply translated and not rotated in three-dimensional space before, after, and during the movement). This is illustrated in FIGS. 5C47-5C51, and FIGS. 5C53-5C55, where the virtual object 5002 does not rotate when coming off a plane to return to a previous plane, for example.

In some embodiments, the portion of the physical environment further includes (8038) a third physical object (e.g., cushion 5636) that is different from the first physical object and the second physical object (e.g., the third physical object has a third surface is represented as a mesh and is not substantially planar (and optionally is neither horizontal nor vertical relative to the orientation of the physical environment), and the first and second surfaces are represented as planes and are substantially planar (and optionally, are either horizontal or vertical relative to the orientation of the physical environment)). In some embodiments, in response to detecting the one or more first user inputs: in accordance with a determination the one or more first user inputs correspond a request to move the first virtual object from the first position to a sixth position that has the predefined spatial relationship to the representation of the third physical object in the representation of the field of view (e.g., the sixth position is a position in the representation of the portion of the physical environment that corresponds to a sixth location on or at the preset first surface of the third physical object), the computer system moves the first virtual object from the first position in the representation of the field of view (e.g., including the representation of the portion of the physical environment) to the sixth position in the representation of the field of view while maintaining an existing orientation of the first virtual object (e.g., the first virtual object is simply translated and not rotated in three-dimensional space). This is illustrated in FIGS. 5C56-5C61, where movement onto a mesh surface (e.g., mesh surface 5636') from a plane, or movement onto a plane from the mesh surface (e.g., mesh surface 5636') does not cause a change in orientation of the virtual object 5002, for example.

In some embodiments, while displaying the first virtual object in the representation of the field of view (e.g., including the representation of the portion of the physical environment), the computer system detects (8040) one or more fourth user inputs that correspond to a request to resize and/or rotate the first virtual object relative to the representation of the field of view (e.g., relative to the representation of the physical environment in the computer-generated model of the physical environment). In response to detecting the one or more fourth user inputs: the computer system maintains display of the first virtual object at the first position in the representation of the field of view with a different size and/or a different orientation selected in accordance with the one or more fourth user inputs (e.g., without regard to whether the request to resize and/or rotate the first virtual object causes the first virtual object to move from a location associated with the first physical object to a location associated with the second physical object). This is illustrated in FIGS. 5C20-5C22 and FIGS. 5C26-5C29, for example. In some embodiments, in response to another input, the computer system displays an animated transition between the first virtual object being displayed at the first position to the first virtual object being displayed at a seventh position in the view of the portion of the physical environment, wherein the seventh position in the view of the portion of the physical environment corresponds to a seventh location on the second surface, and maintaining display of the first virtual object at the seventh position in the view of the physical environment after displaying the animated transition. This is illustrated in FIGS. 5C22-5C25 and FIGS. 5C29-5C32, for example.

It should be understood that the particular order in which the operations in FIGS. 8A-8F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 700) are also applicable in an analogous manner to method 8000 described above with respect to FIGS. 8A-8F. For example, the contacts, gestures, user interface objects, visual feedback, thresholds, focus selectors, animations described above with reference to method 800 optionally have one or more of the characteristics of the contacts, gestures, user interface objects, visual feedback, thresholds, focus selectors, animations described herein with reference to other methods described herein (e.g., methods 600 and 700). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:
1. A method, comprising:
at a computer system having a display generation component, an input device, and one or more cameras:
displaying, via the display generation component, a representation of a field of view of the one or more cameras, the field of view including a plurality of objects in a physical environment, the plurality of objects including a first physical object having a first surface, a second physical object positioned on the first surface, and a third physical object positioned on the first surface, wherein the second physical object extends from the first surface less than a threshold amount in a respective direction and the third physical object extends from the first surface more than the threshold amount in the respective direction;
receiving one or more first user inputs that correspond to a request to place or move a first virtual object at or to a location in the representation of the field of view that corresponds to a physical location on or near the first surface of the first physical object;

in response to the one or more first user inputs:

moving the first virtual object in the representation of the field of view from a prior position on the first surface of the first physical object that does not include other physical objects to a new position on the first surface of the first physical object, the new position comprising a position of the first virtual object in the physical environment after moving the first virtual object in accordance with the one or more first user inputs; and wherein moving the first virtual object in the representation of the field of view from the prior position on the first surface to the new position on the first surface of the first physical object includes:

in accordance with a determination that the new position of the first virtual object in the physical environment that does not coincide with any physical object positioned on the first surface, displaying the first virtual object in the representation of the field of view as being placed on the first surface;

in accordance with a determination that the new position of the first virtual object in the physical environment coincides with the second physical object positioned on the first surface and that the second physical object extends from the first surface less than the threshold amount in the respective direction, displaying the first virtual object in the representation of the field of view as being placed on the first surface at a position that coincides with the second physical object, rather than being placed on top of the second physical object, with a same predefined spatial relationship to the representation of the first surface while the first virtual object is at the prior position and while the first virtual object is at the new position that coincides with the second physical object positioned on the first surface; and in accordance with a determination that the new position of the first virtual object in the physical environment is on top of the third physical object positioned on the first surface and that the third physical object extends from the first surface more than the threshold amount in the respective direction, displaying the first virtual object in the representation of the field of view as being placed on top of the third physical object, wherein, in the representation of the field of view, a representation of third physical object is positioned between a representation of the first physical object and the first virtual object;

wherein the one or more first user inputs include a first input to move the first virtual object to a portion of the first surface that does not include any physical object positioned on the first surface, and a second input to move the first virtual object on top of the second physical object positioned on the first surface, and a third input to move the first virtual object on top of the third physical object positioned on the first surface.

2. The method of claim 1, wherein moving the first virtual object in the representation of the field of view from the prior position on the first surface to the new position on the first surface of the first physical object includes, in accordance with a determination that in the representation of the field of view the new position of the first virtual object in the physical environment is on top of the third physical object positioned on the first surface, displaying the first virtual object in the representation of the field of view with an increased placement distance extending from the first surface while at the new position on the first surface relative to its placement distance extending from the first surface while at the prior position on the first surface.

3. The method of claim 1, wherein a respective position of the first virtual object in the physical environment comprises a position in the physical environment determined by casting a virtual ray from a position associated with the computer system though a predefined anchor point of the first virtual object to a surface in the physical environment.

4. The method of claim 1, wherein the first surface of the first physical object is a substantially horizontal surface.

5. The method of claim 1, wherein the first surface of the first physical object is a substantially vertical surface, and the second physical object extends by less than the threshold amount from the first surface, along an axis normal to the first surface, to a portion of the second physical object distal the first surface, and the third physical object extends by more than the threshold amount from the first surface, along the axis normal to the first surface, to a portion of the third physical object distal the first surface.

6. The method of claim 1, wherein the first virtual object has a predefined vertical axis, and the method includes:

orienting the first virtual object in the physical environment such that the predefined vertical axis of the first virtual object is parallel to a determined vertical axis of the physical environment, determined by the computer system.

7. The method of claim 1, including, while performing the method:

obtaining updated position information regarding the first surface; and adjusting a position of the first virtual object in the physical environment based on the updated position information regarding the first surface.

8. The method of claim 1, further including:

receiving one or more second user inputs that correspond to a request to add or move a second virtual object at or to a location in the representation of the field of view that corresponds to a physical location on or near the first surface of the first physical object; and in response to the one or more second user inputs:

in accordance with a determination that a position of the second virtual object in the physical environment coincides with no physical objects positioned on the first surface, displaying the second virtual object in the representation of the field of view as being placed on the first surface;

in accordance with a determination that the position of the second virtual object in the physical environment is on top of the second physical object positioned on the first surface, displaying the second virtual object in the representation of the field of view as being placed on the first surface at a position that coincides with the second physical object, rather than being placed on top of the second physical object; and in accordance with a determination that the position of the second virtual object in the physical environment is on top of the third physical object positioned on the first surface, displaying the second virtual object in the representation of the field of view as being placed on top of the third physical object, wherein the representation of the third physical object is positioned between the first physical object and the second virtual object.

9. The method of claim 1, wherein the second physical object extends from the first surface in the respective direction by a non-zero amount.

10. A computer system, comprising:

a display generation component;

an input device;

one or more cameras;

one or more processors; and memory storing one or more programs, the one or more programs including instructions for causing the computer system to perform operations, including:

displaying, via the display generation component, a representation of a field of view of the one or more cameras, the field of view including a plurality of objects in a physical environment, the plurality of objects including a first physical object having a first surface, a second physical object positioned on the first surface, and a third physical object positioned on the first surface, wherein the second physical object extends from the first surface less than a threshold amount in a respective direction and the third physical object extends from the first surface more than the threshold amount in the respective direction;

receiving one or more first user inputs that correspond to a request to place or move a first virtual object at or to a location in the representation of the field of view that corresponds to a physical location on or near the first surface of the first physical object;

in response to the one or more first user inputs:

moving the first virtual object in the representation of the field of view from a prior position on the first surface of the first physical object that does not include other physical objects to a new position on the first surface of the first physical object, the new position comprising a position of the first virtual object in the physical environment after moving the first virtual object in accordance with the one or more first user inputs; and wherein moving the first virtual object in the representation of the field of view from the prior position on the first surface to the new position on the first surface of the first physical object includes:

in accordance with a determination that the new position of the first virtual object in the physical environment does not coincide with any physical object positioned on the first surface, displaying the first virtual object in the representation of the field of view as being placed on the first surface;

in accordance with a determination that the new position of the first virtual object in the physical environment coincides with the second physical object positioned on the first surface and that the second physical object extends from the first surface less than the threshold amount in the respective direction, displaying the first virtual object in the representation of the field of view as being placed on the first surface at a position that coincides with the second physical object, rather than being placed on top of the second physical object, with a same predefined spatial relationship to the representation of the first surface while the first virtual object is at the prior position and while the first virtual object is at the new position that coincides with the second physical object positioned on the first surface; and in accordance with a determination that the new position of the first virtual object in the physical environment is on top of the third physical object positioned on the first surface and that the third physical object extends from the first surface more than the threshold amount in the respective direction, displaying the first virtual object in the representation of the field of view as being placed on top of the third physical object, wherein, in the representation of the field of view, a representation of third physical object is positioned between a representation of the first physical object and the first virtual object.

11. The computer system of claim 10, wherein moving the first virtual object in the representation of the field of view from the prior position on the first surface to the new position on the first surface of the first physical object includes, in accordance with a determination that in the representation of the field of view the new position of the first virtual object in the physical environment is on top of the third physical object positioned on the first surface, displaying the first virtual object in the representation of the field of view with an increased placement distance extending from the first surface while at the new position on the first surface relative to its placement distance extending from the first surface while at the prior position on the first surface.

12. The computer system of claim 10, wherein a respective position of the first virtual object in the physical environment comprises a position in the physical environment determined by casting a virtual ray from a position associated with the computer system though a predefined anchor point of the first virtual object to a surface in the physical environment.

13. The computer system of claim 10, wherein the first surface of the first physical object is a substantially horizontal surface.

14. The computer system of claim 10, wherein the first surface of the first physical object is a substantially vertical surface, and the second physical object extends by less than the threshold amount from the first surface, along an axis normal to the first surface, to a portion of the second physical object distal the first surface, and the third physical object extends by more than the threshold amount from the first surface, along the axis normal to the first surface, to a portion of the third physical object distal the first surface.

15. The computer system of claim 10, wherein the first virtual object has a predefined vertical axis, and the method includes:

orienting the first virtual object in the physical environment such that the predefined vertical axis of the first virtual object is parallel to a determined vertical axis of the physical environment, determined by the computer system.

16. The computer system of claim 10, including, while performing the method:

obtaining updated position information regarding the first surface; and adjusting a position of the first virtual object in the physical environment based on the updated position information regarding the first surface.

17. The computer system of claim 10, further including:
receiving one or more second user inputs that correspond
    to a request to add or move a second virtual object at
    or to a location in the representation of the field of view
    that corresponds to a physical location on or near the
    first surface of the first physical object; and
in response to the one or more second user inputs:
    in accordance with a determination that a position of
        the second virtual object in the physical environment
        coincides with no physical objects positioned on the
        first surface, displaying the second virtual object in
        the representation of the field of view as being placed
        on the first surface;
    in accordance with a determination that the position of
        the second virtual object in the physical environment
        is on top of the second physical object positioned on
        the first surface, displaying the second virtual object
        in the representation of the field of view as being
        placed on the first surface at a position that coincides
        with the second physical object, rather than being
        placed on top of the second physical object; and
    in accordance with a determination that the position of
        the second virtual object in the physical environment
        is on top of the third physical object positioned on
        the first surface, displaying the second virtual object
        in the representation of the field of view as being
        placed on top of the third physical object, wherein
        the representation of the third physical object is
        positioned between the first physical object and the
        second virtual object.

18. The computer system of claim 10, wherein the second
physical object extends from the first surface in the respec-
tive direction by a non-zero amount.

19. A non-transitory computer readable storage medium
system, storing one or more programs that when executed by
a computer system having a display generation component,
an input device, and one or more cameras, cause the com-
puter system to:
    display, via the display generation component, a repre-
        sentation of a field of view of the one or more cameras,
        the field of view including a plurality of objects in a
        physical environment, the plurality of objects including
        a first physical object having a first surface, a second
        physical object positioned on the first surface, and a
        third physical object positioned on the first surface,
        wherein the second physical object extends from the
        first surface less than a threshold amount in a respective
        direction and the third physical object extends from the
        first surface more than the threshold amount in the
        respective direction;
    receive one or more first user inputs that correspond to a
        request to place or move a first virtual object at or to a
        location in the representation of the field of view that
        corresponds to a physical location on or near the first
        surface of the first physical object;
    in response to the one or more first user inputs:
        move the first virtual object in the representation of the
            field of view from a prior position on the first surface
            of the first physical object that does not include other
            physical objects to a new position on the first surface
            of the first physical object, the new position com-
            prising a position of the first virtual object in the
            physical environment after moving the first virtual
            object in accordance with the one or more first user
            inputs; and
        wherein moving the first virtual object in the represen-
            tation of the field of view from the prior position on the first surface to the new position on the first
surface of the first physical object includes:
    in accordance with a determination that the new
        position of the first virtual object in the physical
        environment does not coincide with any physical
        object positioned on the first surface, displaying
        the first virtual object in the representation of the
        field of view as being placed on the first surface;
    in accordance with a determination that the new
        position of the first virtual object in the physical
        environment coincides with the second physical
        object positioned on the first surface and that the
        second physical object extends from the first sur-
        face less than the threshold amount in the respec-
        tive direction, displaying the first virtual object in
        the representation of the field of view as being
        placed on the first surface at a position that coin-
        cides with the second physical object, rather than
        being placed on top of the second physical object,
        with a same predefined spatial relationship to the
        representation of the first surface while the first
        virtual object is at the prior position and while the
        first virtual object is at the new position that
        coincides with the second physical object posi-
        tioned on the first surface; and
    in accordance with a determination that the new posi-
        tion of the first virtual object in the physical envi-
        ronment is on top of the third physical object posi-
        tioned on the first surface and that the third physical
        object extends from the first surface more than the
        threshold amount in the respective direction, display-
        ing the first virtual object in the representation of the
        field of view as being placed on top of the third
        physical object, wherein, in the representation of the
        field of view, a representation of third physical object
        is positioned between a representation of the first
        physical object and the first virtual object.

20. The non-transitory computer readable storage medium
of claim 19, wherein moving the first virtual object in the
representation of the field of view from the prior position on
the first surface to the new position on the first surface of the
first physical object includes, in accordance with a determi-
nation that in the representation of the field of view the new
position of the first virtual object in the physical environ-
ment is on top of the third physical object positioned on the
first surface, displaying the first virtual object in the repre-
sentation of the field of view with an increased placement
distance extending from the first surface while at the new
position on the first surface relative to its placement distance
extending from the first surface while at the prior position on
the first surface.

21. The non-transitory computer readable storage medium
of claim 19, wherein a respective position of the first virtual
object in the physical environment comprises a position in
the physical environment determined by casting a virtual ray
from a position associated with the computer system though
a predefined anchor point of the first virtual object to a
surface in the physical environment.

22. The non-transitory computer readable storage medium
of claim 19, wherein the first surface of the first physical
object is a substantially horizontal surface.

23. The non-transitory computer readable storage medium
of claim 19, wherein the first surface of the first physical
object is a substantially vertical surface, and the second
physical object extends by less than the threshold amount
from the first surface, along an axis normal to the first
surface, to a portion of the second physical object distal the first surface, and the third physical object extends by more than the threshold amount from the first surface, along the axis normal to the first surface, to a portion of the third physical object distal the first surface.

24. The non-transitory computer readable storage medium of claim 19, wherein the first virtual object has a predefined vertical axis, and the one or more programs include instructions that when executed by the computer system cause the computer system to perform operations including:

orienting the first virtual object in the physical environment such that the predefined vertical axis of the first virtual object is parallel to a determined vertical axis of the physical environment, determined by the computer system.

25. The non-transitory computer readable storage medium of claim 19, wherein the one or more programs include instructions that when executed by the computer system cause the computer system to perform operations including:

obtaining updated position information regarding the first surface; and adjusting a position of the first virtual object in the physical environment based on the updated position information regarding the first surface.

26. The non-transitory computer readable storage medium of claim 19, wherein the one or more programs include instructions that when executed by the computer system cause the computer system to perform operations including:

receiving one or more second user inputs that correspond to a request to add or move a second virtual object at or to a location in the representation of the field of view that corresponds to a physical location on or near the first surface of the first physical object; and in response to the one or more second user inputs:

in accordance with a determination that a position of the second virtual object in the physical environment coincides with no physical objects positioned on the first surface, displaying the second virtual object in the representation of the field of view as being placed on the first surface;

in accordance with a determination that the position of the second virtual object in the physical environment is on top of the second physical object positioned on the first surface, displaying the second virtual object in the representation of the field of view as being placed on the first surface at a position that coincides with the second physical object, rather than being placed on top of the second physical object; and in accordance with a determination that the position of the second virtual object in the physical environment is on top of the third physical object positioned on the first surface, displaying the second virtual object in the representation of the field of view as being placed on top of the third physical object, wherein the representation of the third physical object is positioned between the first physical object and the second virtual object.

27. The non-transitory computer readable storage medium of claim 19, wherein the second physical object extends from the first surface in the respective direction by a non-zero amount.

* * * * *